United States Patent
Okada et al.

[11] Patent Number: 6,002,526
[45] Date of Patent: Dec. 14, 1999

[54] ZOOM LENS SYSTEM

[75] Inventors: Takashi Okada, Osaka; Hideki Nagata, Sakai, both of Japan

[73] Assignee: Minolta Co., Ltd., Osaka, Japan

[21] Appl. No.: 08/812,992

[22] Filed: Mar. 4, 1997

[30] Foreign Application Priority Data

| Mar. 6, 1996 | [JP] | Japan | 8-048550 |
| Mar. 6, 1996 | [JP] | Japan | 8-048559 |
| Mar. 6, 1996 | [JP] | Japan | 8-048563 |
| Mar. 6, 1996 | [JP] | Japan | 8-048567 |
| Mar. 6, 1996 | [JP] | Japan | 8-048573 |
| Mar. 6, 1996 | [JP] | Japan | 8-048580 |
| Mar. 6, 1996 | [JP] | Japan | 8-048628 |

[51] Int. Cl.$^6$ ............. G02B 15/14; G02B 3/02; G02B 17/00

[52] U.S. Cl. .......... 359/677; 359/678; 359/715; 359/686; 359/726; 359/734; 396/384

[58] Field of Search .......... 359/676, 677, 359/678, 715, 726, 733, 734, 686; 396/384

[56] References Cited

U.S. PATENT DOCUMENTS

| 3,052,169 | 9/1962 | Papke | 396/384 |
| 3,103,150 | 9/1963 | Lange | 396/384 |
| 3,347,143 | 10/1967 | Jacobs | 396/384 |
| 3,357,775 | 12/1967 | Appledorn et al. | 359/676 |
| 3,547,521 | 12/1970 | Ichizuka et al. | 359/676 |
| 3,738,733 | 6/1973 | Pettit | 359/726 |
| 4,232,943 | 11/1980 | Rogers | 359/726 |
| 4,249,798 | 2/1981 | Moskovich | 359/726 |
| 4,265,529 | 5/1981 | Yokota | 396/384 |
| 4,730,199 | 3/1988 | Ikemori et al. | |
| 4,786,150 | 11/1988 | Tsuji | 359/676 |
| 5,272,565 | 12/1993 | Oshikiri | 359/726 |

FOREIGN PATENT DOCUMENTS 61-184514  8/1986  Japan .

*Primary Examiner*—Hung Xuan Dang
*Assistant Examiner*—Evelyn A. Lester
*Attorney, Agent, or Firm*—Price Gess & Ubell

[57] ABSTRACT

A zoom lens system that is free from parallax, is compact, and offers excellent optical performance has, from the object side, a positive first lens unit, a negative second lens unit, a positive third lens unit, and a negative fourth lens unit. The zoom lens system has a half-prism between the second lens unit and the third lens unit so that a light beam having passed through the second lens unit is split by reflection.

24 Claims, 32 Drawing Sheets

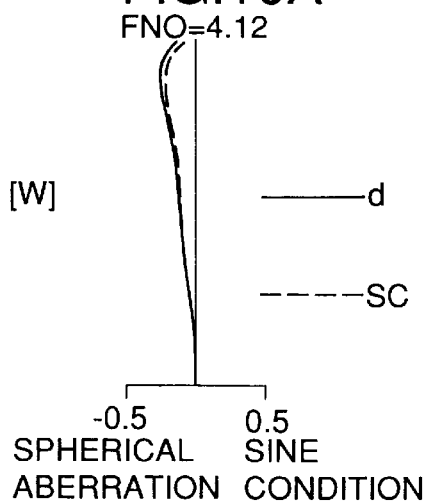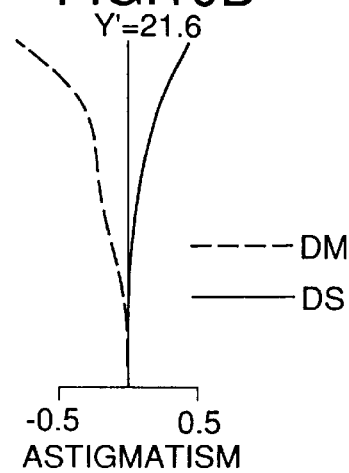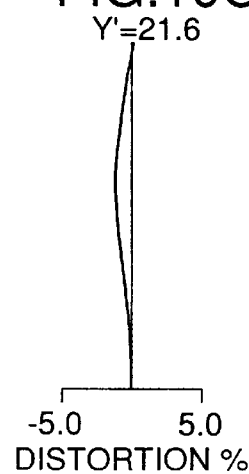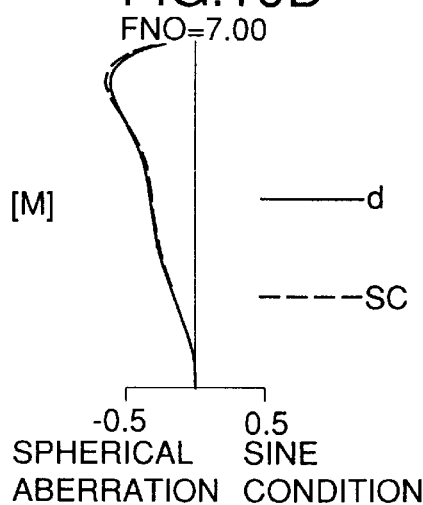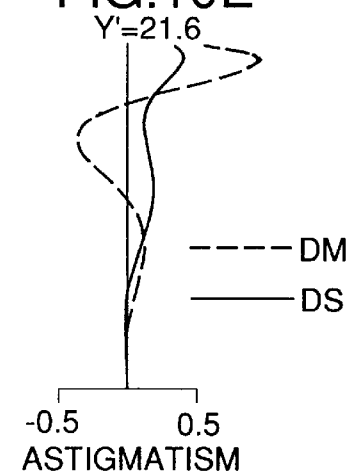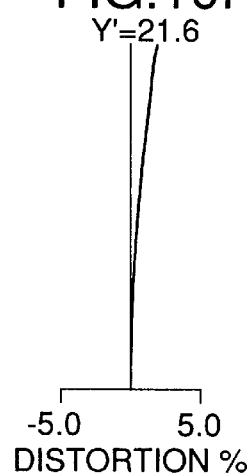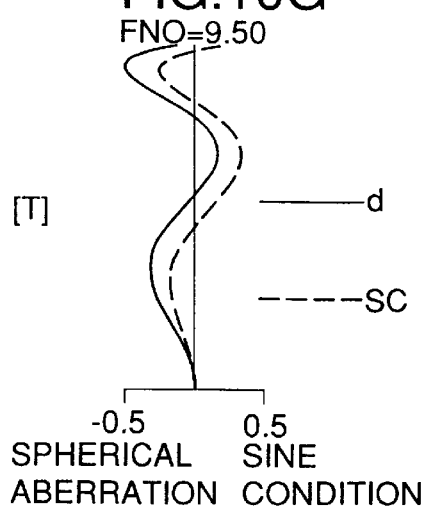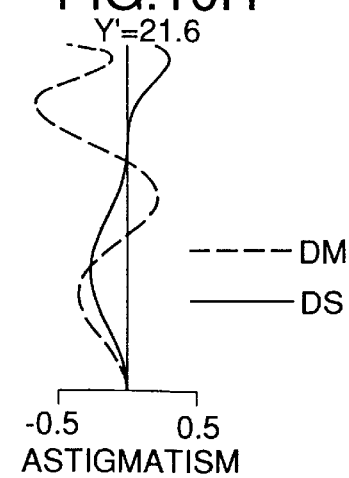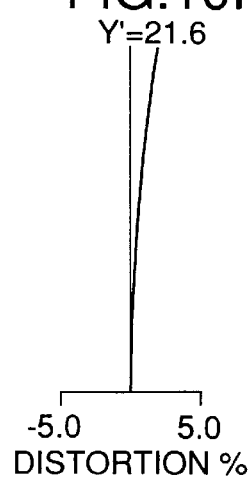

[ W(D=5m) ]
EFFECTIVE FNO=4.07
—— d
---- SC
-0.5  0.5
SPHERICAL SINE
ABERRATION CONDITION

Y'=21.6
---- DM
—— DS
-0.5  0.5
ASTIGMATISM

Y'=21.6
-5.0  5.0
DISTORTION %

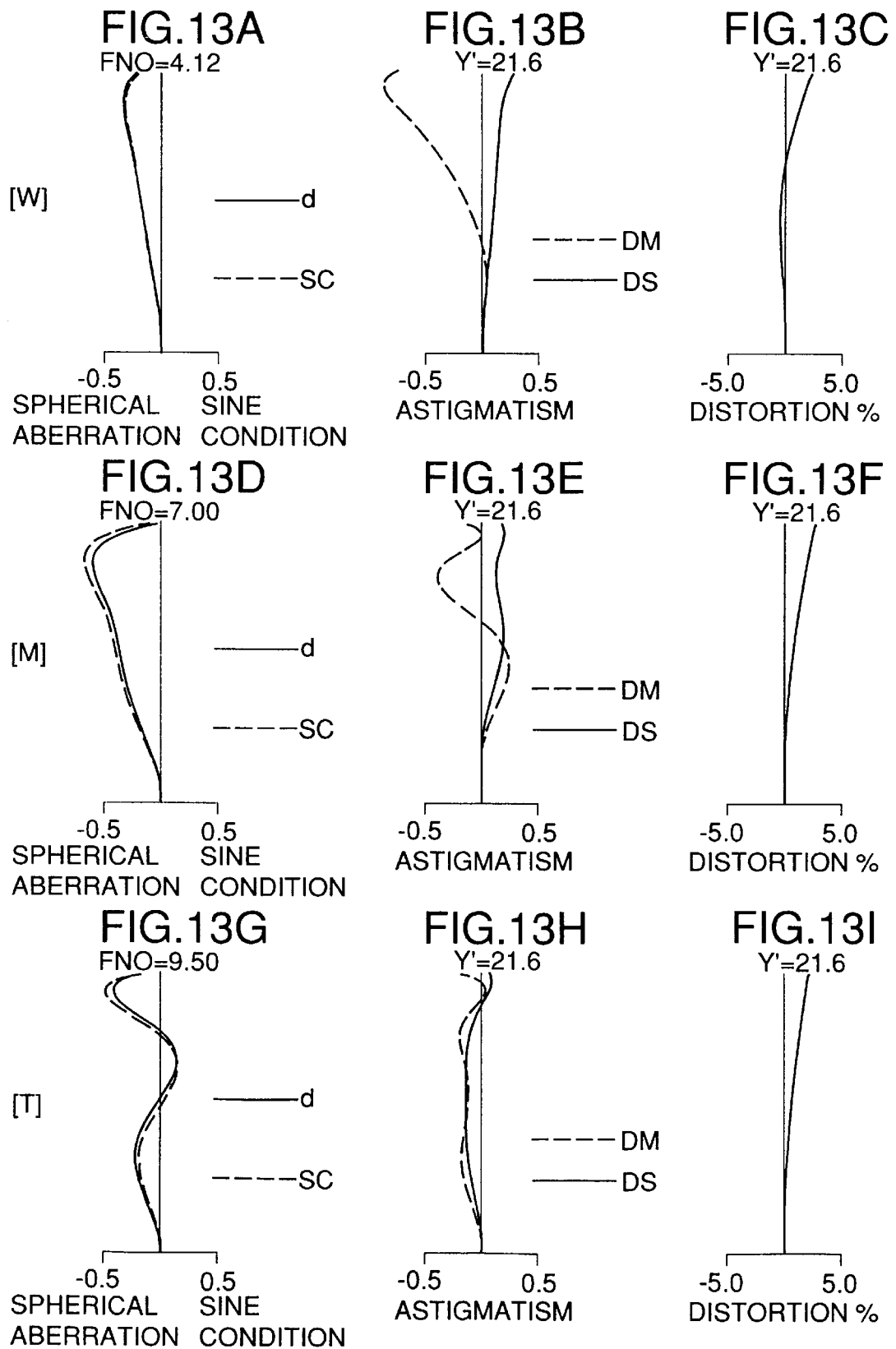

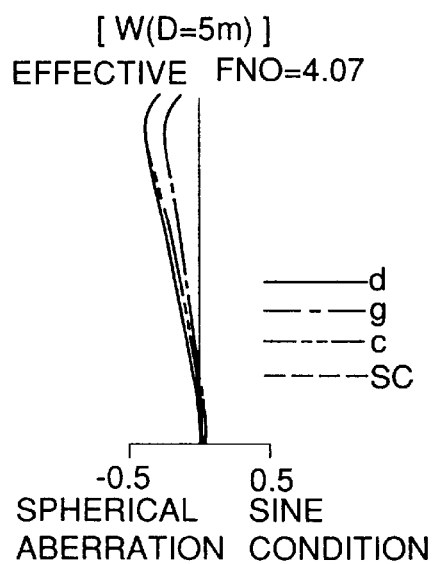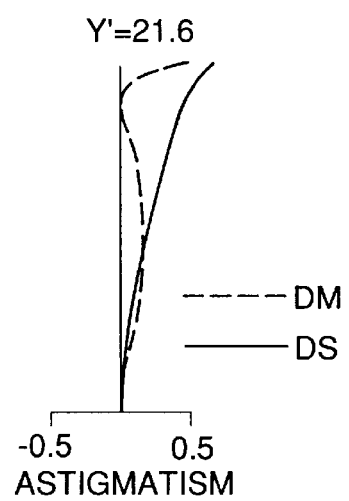

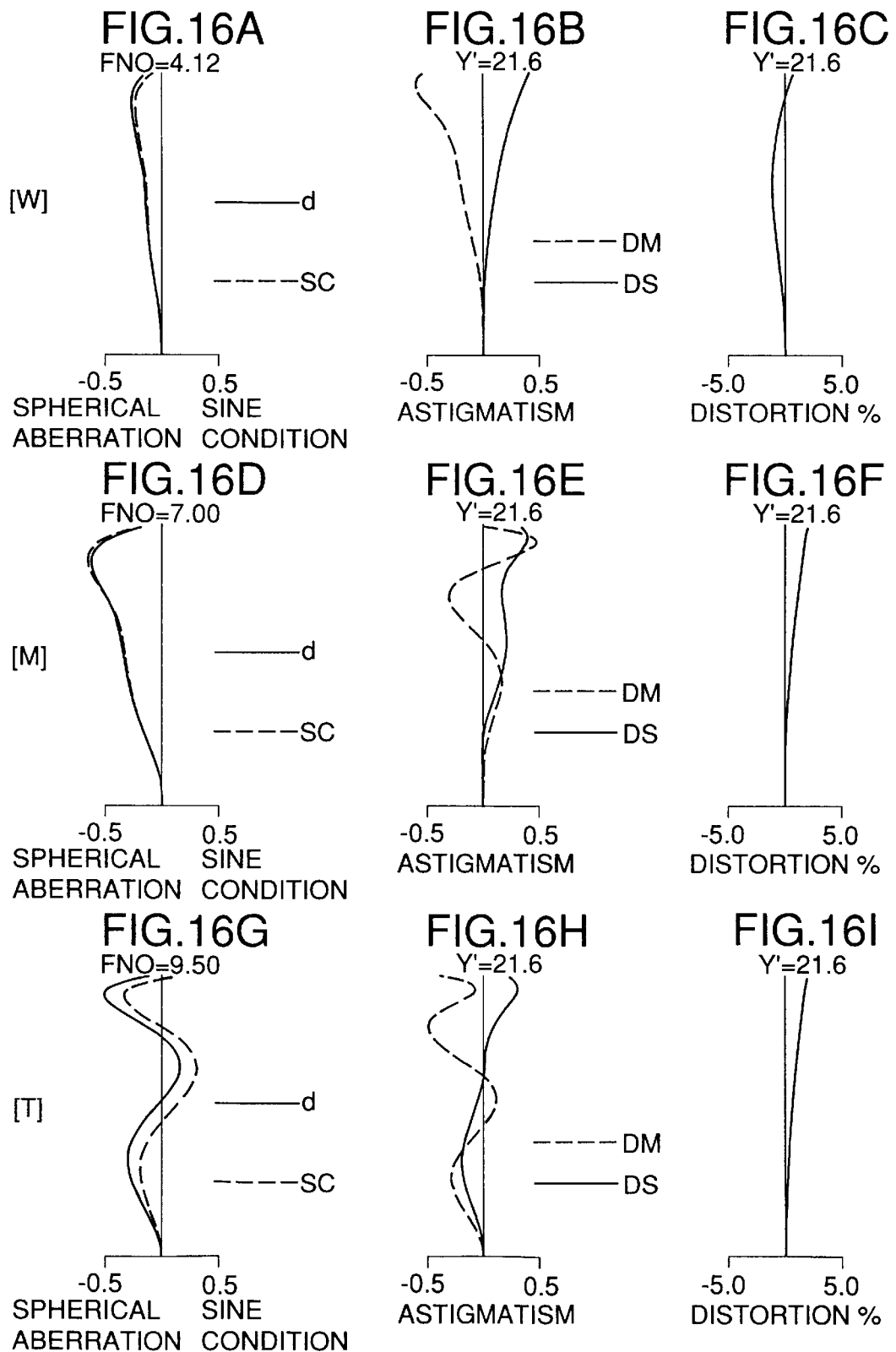

[ W(D=5m) ]
EFFECTIVE FNO=4.08

——— d
----- SC

-0.5    0.5
SPHERICAL SINE
ABERRATION CONDITION

Y'=21.6

----- DM
——— DS

-0.5    0.5
ASTIGMATISM

Y'=21.6

-5.0    5.0
DISTORTION %

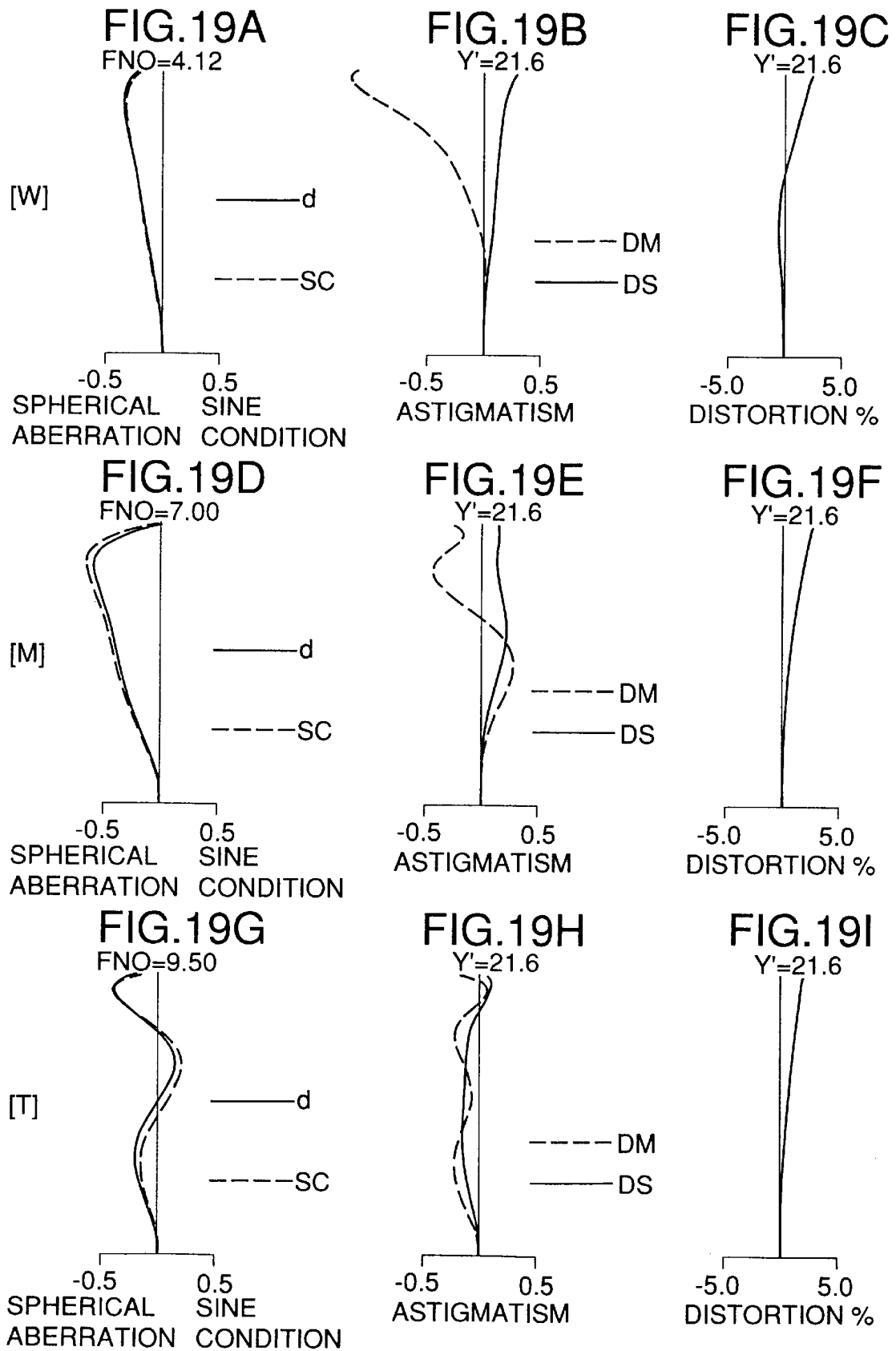

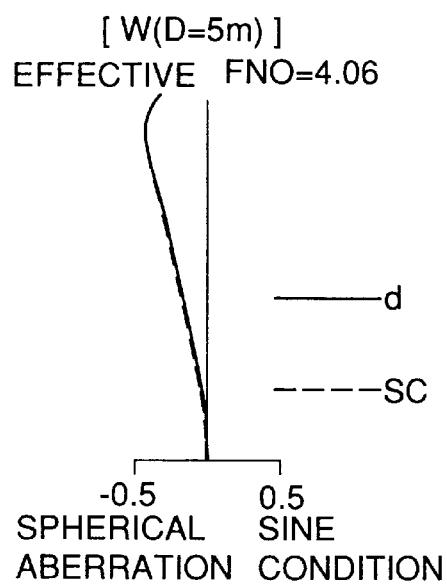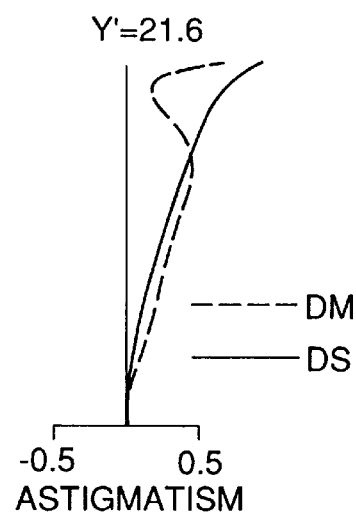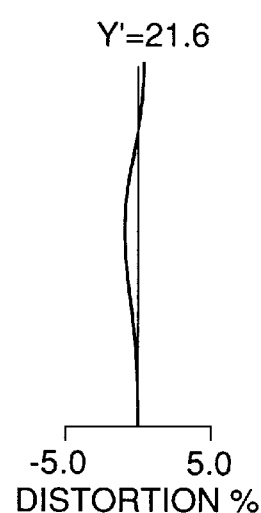

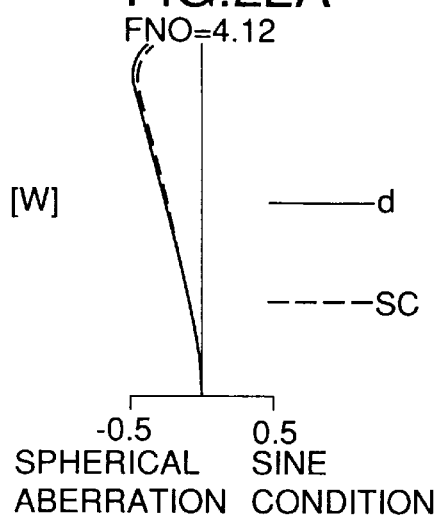
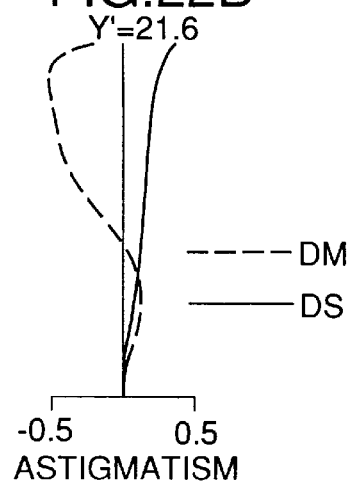
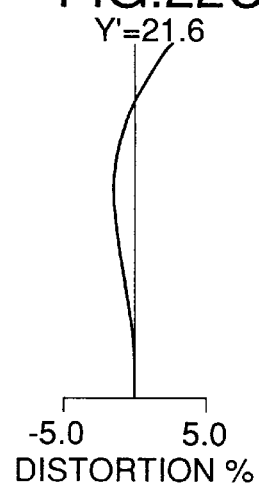
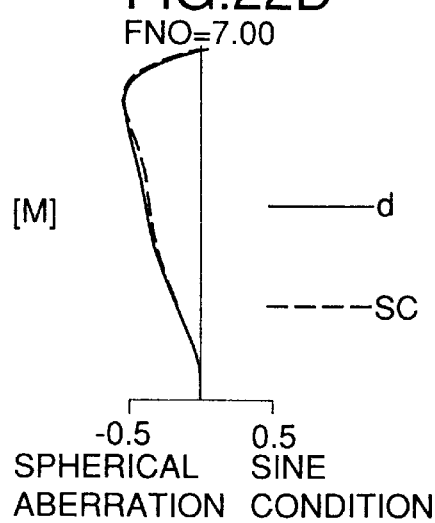
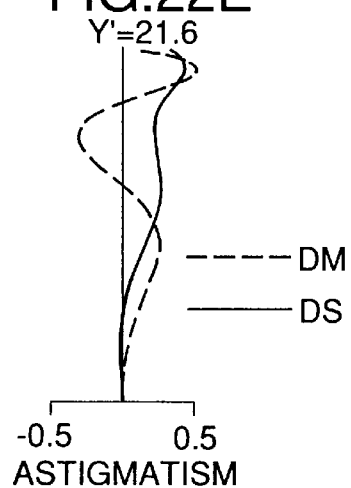
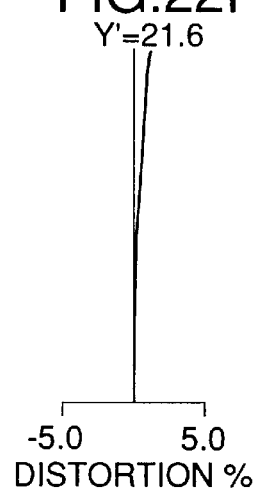
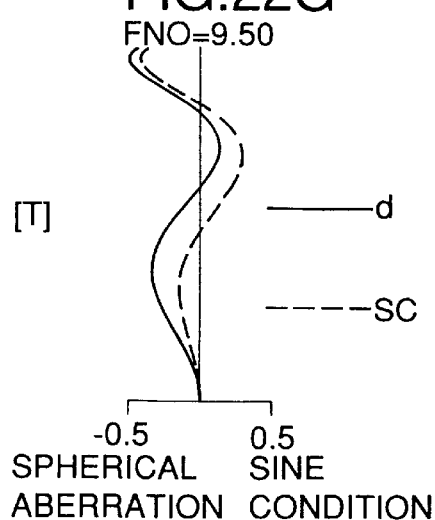
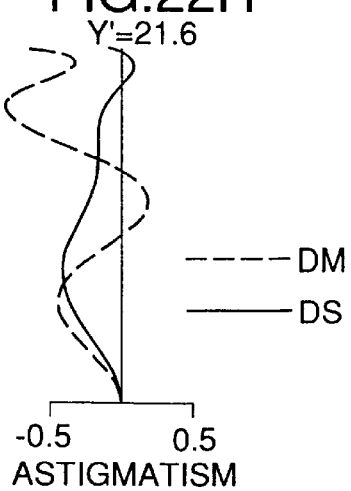
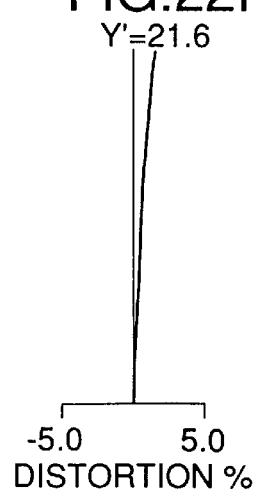

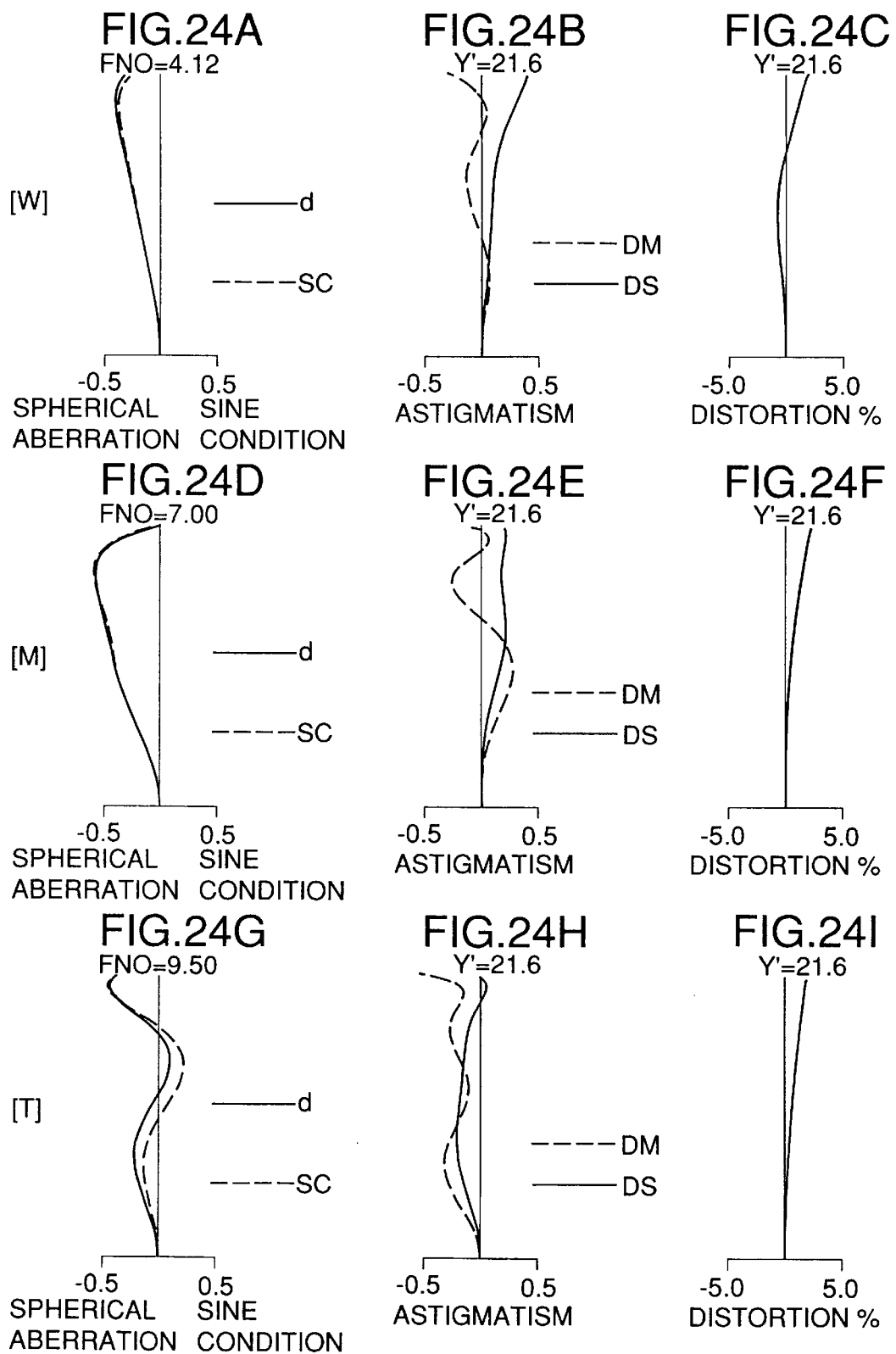

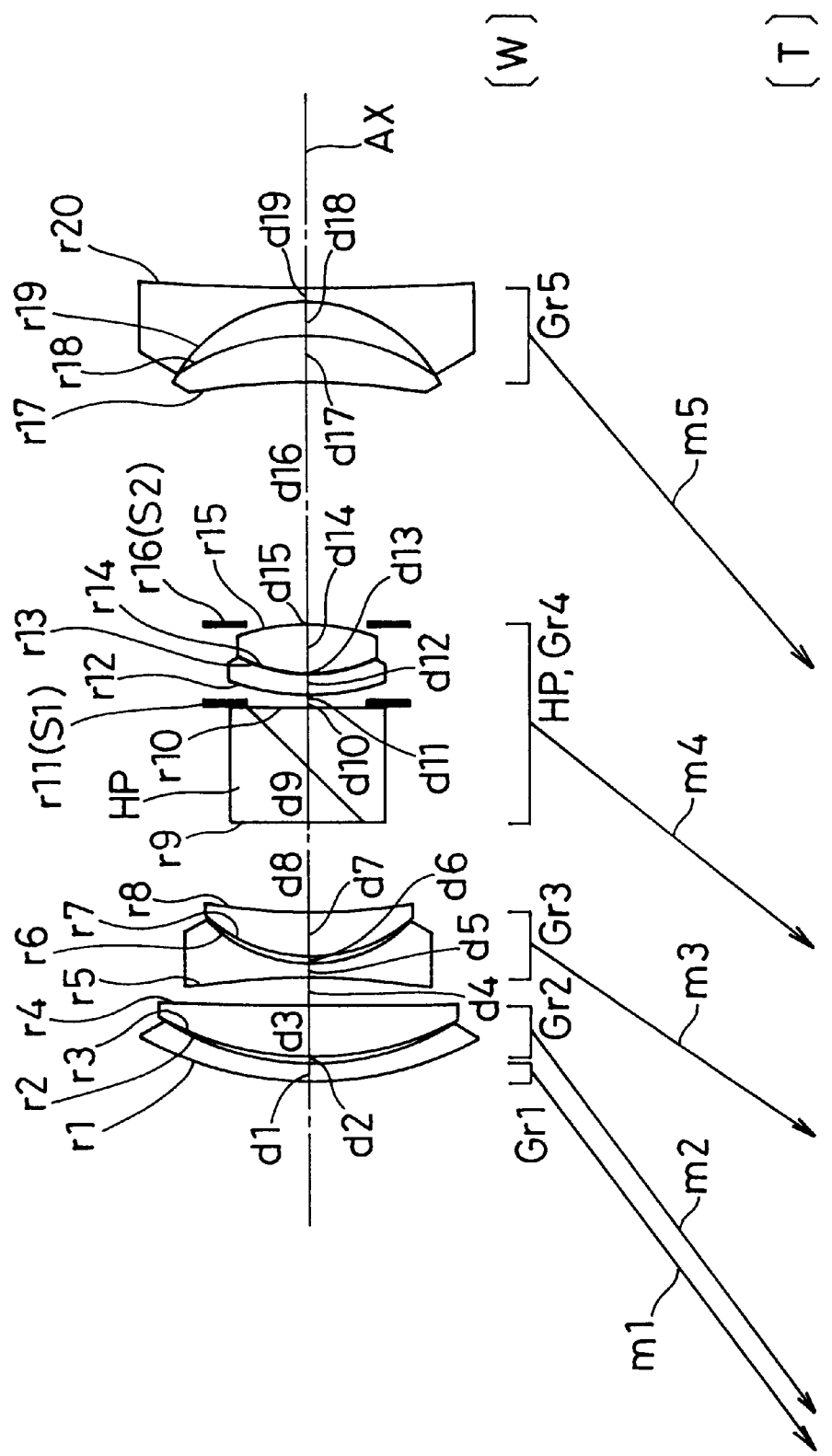

FNO=4.12

[W]

— d
----- SC

-0.5  0.5
SPHERICAL SINE
ABERRATION CONDITION

Y'=21.6

----- DM
— DS

-0.5  0.5
ASTIGMATISM

Y'=21.6

-5.0  5.0
DISTORTION %

FNO=7.00

[M]

— d
----- SC

-0.5  0.5
SPHERICAL SINE
ABERRATION CONDITION

Y'=21.6

----- DM
— DS

-0.5  0.5
ASTIGMATISM

Y'=21.6

-5.0  5.0
DISTORTION %

FNO=9.50

[T]

— d
----- SC

-0.5  0.5
SPHERICAL SINE
ABERRATION CONDITION

Y'=21.6

----- DM
— DS

-0.5  0.5
ASTIGMATISM

Y'=21.6

-5.0  5.0
DISTORTION %

FNO=4.12

[W]

—— d
---- SC

-0.5     0.5
SPHERICAL SINE
ABERRATION CONDITION

Y'=21.6

---- DM
—— DS

-0.5     0.5
ASTIGMATISM

Y'=21.6

-5.0     5.0
DISTORTION %

FNO=7.00

[M]

—— d
---- SC

-0.5     0.5
SPHERICAL SINE
ABERRATION CONDITION

Y'=21.6

---- DM
—— DS

-0.5     0.5
ASTIGMATISM

Y'=21.6

-5.0     5.0
DISTORTION %

FNO=9.50

[T]

—— d
---- SC

-0.5     0.5
SPHERICAL SINE
ABERRATION CONDITION

Y'=21.6

---- DM
—— DS

-0.5     0.5
ASTIGMATISM

Y'=21.6

-5.0     5.0
DISTORTION %

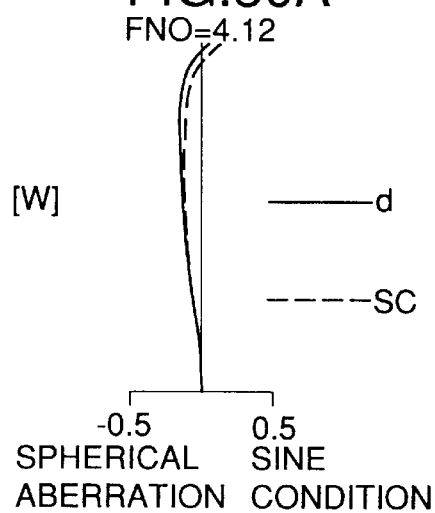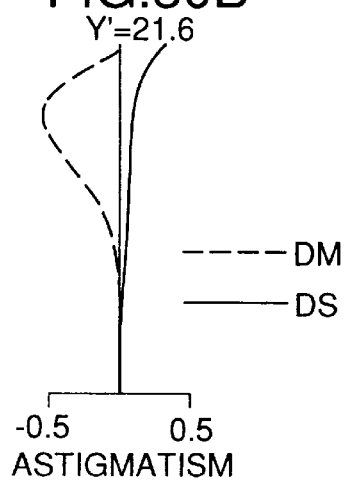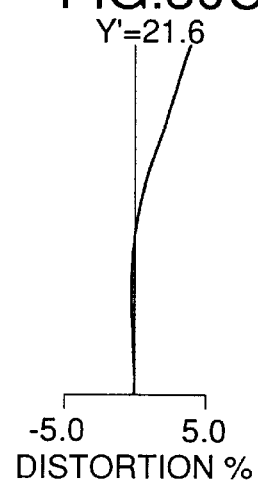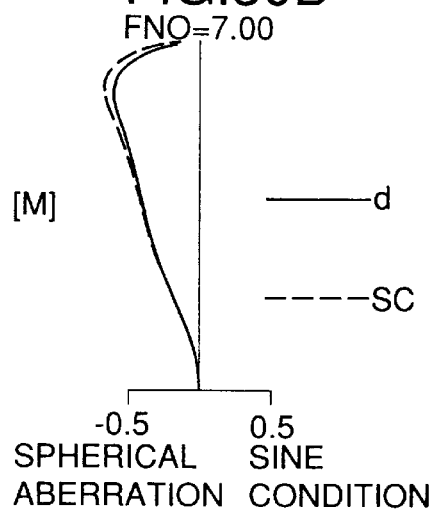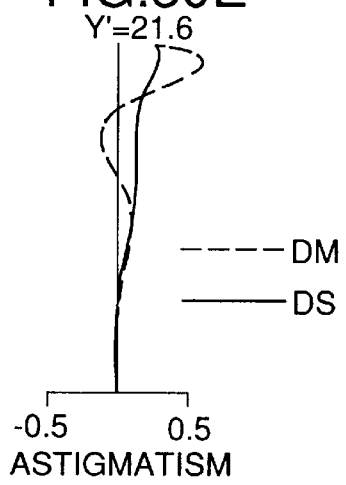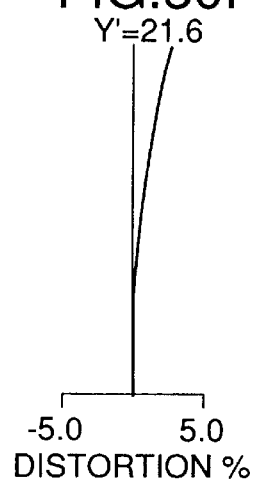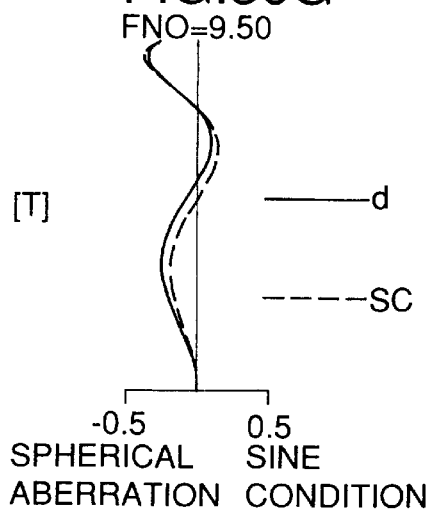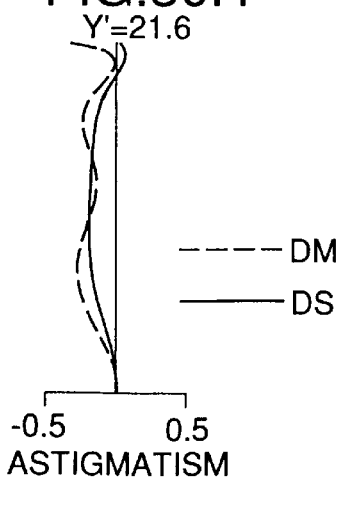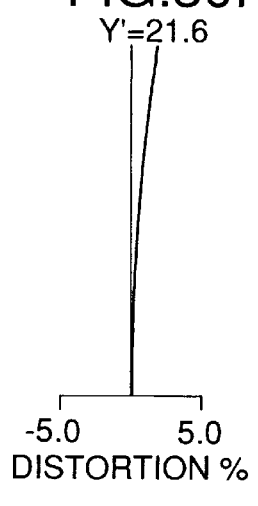

ZOOM LENS SYSTEM

BACKGROUND OF THE INVENTION

1. Field of the Invention

The present invention relates to a zoom lens system. More particularly, the present invention relates to a zoom lens system suitable for use in a lens-shutter single-lens-reflex camera.

2. Description of the Prior Art

In conventional lens-shutter cameras, the taking optical system and the viewfinder optical system are typically provided as separate optical systems. For this reason, such lens-shutter cameras suffer from parallax occurring between the taking optical system and the viewfinder optical system. In recent years, as lens-shutter cameras have come to be equipped with zoom lens systems having higher and higher magnifications, increased parallax and increased size have become serious problems with lens-shutter cameras.

On the other hand, in single-lens-reflex cameras, the taking optical system is used also as an objective lens of the viewfinder optical system. Accordingly, no parallax occurs between the taking optical system and the viewfinder optical system. However, in typical single-lens-reflex cameras, a swing mirror is provided behind the taking optical system, and the use of the swing mirror inevitably makes such cameras larger. The reasons why the swing mirror makes cameras larger are as follows. First, since the swing mirror is placed behind the taking optical system, it sets a limit on the back focus. Second, since the swing mirror is placed far away from the aperture diaphragm that is placed in the middle of the taking optical system, it needs to be large enough to reflect a light beam having a beam diameter corresponding to the position where the swing mirror is placed.

To prevent parallax and reduce the size of cameras, U.S. Pat. No. 4,730,199 proposes a zoom lens system consisting of a positive, a negative, a positive, and a negative lens unit. Specifically, in this zoom lens system, an incoming light beam is split into two light beams, one for photographing and the other for the viewfinder, by a beam splitter provided between the third and fourth lens units. This construction not only eliminates parallax, but also allows cameras to be made smaller, since it does not require a swing mirror.

Moreover, to prevent parallax and reduce the size of cameras, U.S. Pat. No. 5,272,565 proposes another zoom lens system. Specifically, in this zoom lens system, an incoming light beam is split into two light beams, one for photographing and the other for the viewfinder, by a reflecting means provided within one of the zoom lens units. This construction not only eliminates parallax, but also allows cameras to be made smaller, since it does not require a swing mirror.

Moreover, to prevent parallax and reduce the size of cameras, Japanese Published Patent No. 6-44098 proposes still another zoom lens system. Specifically, in this zoom lens system, an incoming light beam is split into two light beams, one for photographing and the other for the viewfinder, by a beam splitting member provided between the zoom lens units. This construction not only eliminates parallax, but also allows cameras to be made smaller, since it does not require a swing mirror.

However, in the zoom lens system proposed in U.S. Pat. No. 4,730,199, the paths of off-axial light rays between the third and fourth lens units are extremely far from those of axial light rays, and accordingly it is necessary to use a large beam splitter in order to cover all light beams. As a result, even if the viewfinder optical system is made smaller with the view to making a camera smaller, the large beam splitter spoils the compactness of the camera. Therefore, with this zoom lens system, it is difficult to realize a compact camera.

Moreover, in the zoom lens system proposed in U.S. Pat. No. 4,730,199, the zoom lens unit disposed just in front of the beam splitter has a positive power, and accordingly off-axial light rays incident on the beam splitter form large angles with respect to axial light rays. This not only requires a larger beam splitter, but also requires that the optical systems disposed behind the beam splitter (i.e. the negative fourth lens unit and the viewfinder optical system) have accordingly larger diameters, since off-axial light rays diverge steeply after being split by the beam splitter. As a result, the increased size of the beam splitter and the optical systems disposed behind it spoils the compactness of the zoom lens system and the viewfinder optical system. Therefore, with this zoom lens system, it is difficult to realize a compact camera.

In zoom lens systems, zooming is preferably performed by moving zoom lens units individually, because this makes it easy to correct aberrations properly. However, in a zoom lens system in which a beam splitter is provided between the zoom lens units, such as the one proposed in U.S. Pat. No. 4,730,199, extraction of a light beam for the viewfinder requires a complicated construction of the lens barrel precisely because the zoom lens units move individually. Moreover, incorporation of part of the viewfinder optical system into the lens barrel of the zoom lens system requires an even more complicated construction of the lens barrel, and thus requires that the lens barrel have a larger diameter.

In the zoom lens system proposed in U.S. Pat. No. 5,272,565, a reflecting means is provided within one of the zoom lens units. Such arrangement of a reflecting means within one of the zoom lens unit requires that one zoom lens unit be divided into two zoom blocks, one in front of the reflecting means and the other behind it, within the lens barrel. This not only complicates the construction of the lens barrel, but also makes it difficult to maintain the optical performance of that zoom lens unit in the process of assembly.

Moreover, in the zoom lens system proposed in U.S. Pat. No. 5,272,565, focusing is performed by moving part of the lens elements constituting the zoom lens unit that includes the reflecting means, or by moving the first lens unit. The former focusing method requires that part of the lens elements constituting the zoom lens unit that includes the reflecting means be moved for focusing. This further complicates the construction of the lens barrel, and thus makes it more difficult to maintain the optical performance of that zoom lens unit in the process of assembly. The latter focusing method, as compared with other focusing methods, requires a longer distance for the movement of the focusing lens unit, and thus requires a larger space for focusing. This is disadvantageous to the construction of the lens barrel.

In a zoom lens system in which a beam splitting member is provided between the zoom lens units, such as the one proposed in Japanese Published Patent No. 6-44098, the zoom lens units disposed in front of the beam splitting member and those disposed behind it tend to act independently as two separate groups. This means that aberrations need to be corrected properly within each of these groups. However, in the zoom lens system proposed in Japanese Published Patent No. 6-44098, since only one zoom lens unit is provided behind the beam splitting member, it is not possible to correct aberrations satisfactorily.

The zoom lens system proposed in Japanese Published Patent No. 6-44098 has only one zoom lens unit behind the beam splitting member. In a zoom lens system like this, in which only one zoom lens unit is provided behind the beam splitting member, the zoom lens units disposed in front of the beam splitting member need to correct most of the aberrations occurring in the zoom lens system. Since a viewfinder optical system generally needs to comply with more limitations than a taking optical system, it is difficult, in a construction in which the zoom lens units disposed in front of the beam splitting member need to correct most of the aberrations, to make those lens units suitable for a viewfinder. This, therefore, sets more limitations on the arrangement of the viewfinder optical system.

SUMMARY OF THE INVENTION

An object of the present invention is to provide a zoom lens system that is free from parallax, is compact, and still offers excellent optical performance.

Another object of the present invention is to provide a zoom lens system that is free from parallax, is compact, and offers excellent optical performance without complicating the construction of the lens barrel.

Still another object of the present invention is to provide a zoom lens system that is free from parallax and offers excellent optical performance and that allows free arrangement of the viewfinder optical system.

A zoom lens system according to the present invention comprises, from an object side, a first component having a positive refractive power, a second component having a negative refractive power, a third component having a positive refractive power, and a fourth component having a negative refractive power, and further comprises a splitter disposed between said second and third components for splitting a light beam having passed through said second component.

BRIEF DESCRIPTION OF THE DRAWINGS

This and other objects and features of this invention will become clear from the following description, taken in conjunction with the preferred embodiments with reference to the accompanied drawings in which:

FIGS. 10A to 10I are diagrams showing aberrations observed in the fifth embodiment focused for infinity;

FIGS. 13A to 13I are diagrams showing aberrations observed in the sixth embodiment focused for infinity;

FIGS. 14A to 14C are diagrams showing aberrations observed in the sixth embodiment focused for a close-up distance;

FIGS. 16A to 16I are diagrams showing aberrations observed in the seventh embodiment focused for infinity;

FIGS. 19A to 19I are diagrams showing aberrations observed in the eighth embodiment focused for infinity;

FIGS. 20A to 20C are diagrams showing aberrations observed in the eighth embodiment focused for a close-up distance;

FIGS. 22A to 22I are diagrams showing aberrations observed in the ninth embodiment focused for infinity;

FIGS. 24A to 24I are diagrams showing aberrations observed in the tenth embodiment focused for infinity;

FIG. 25 is a diagram showing the lens construction of the eleventh embodiment of the present invention;

FIGS. 30A to 30I are diagrams showing aberrations observed in the thirteenth embodiment focused for infinity;

DESCRIPTION OF THE PREFERRED EMBODIMENTS

Figure 1:
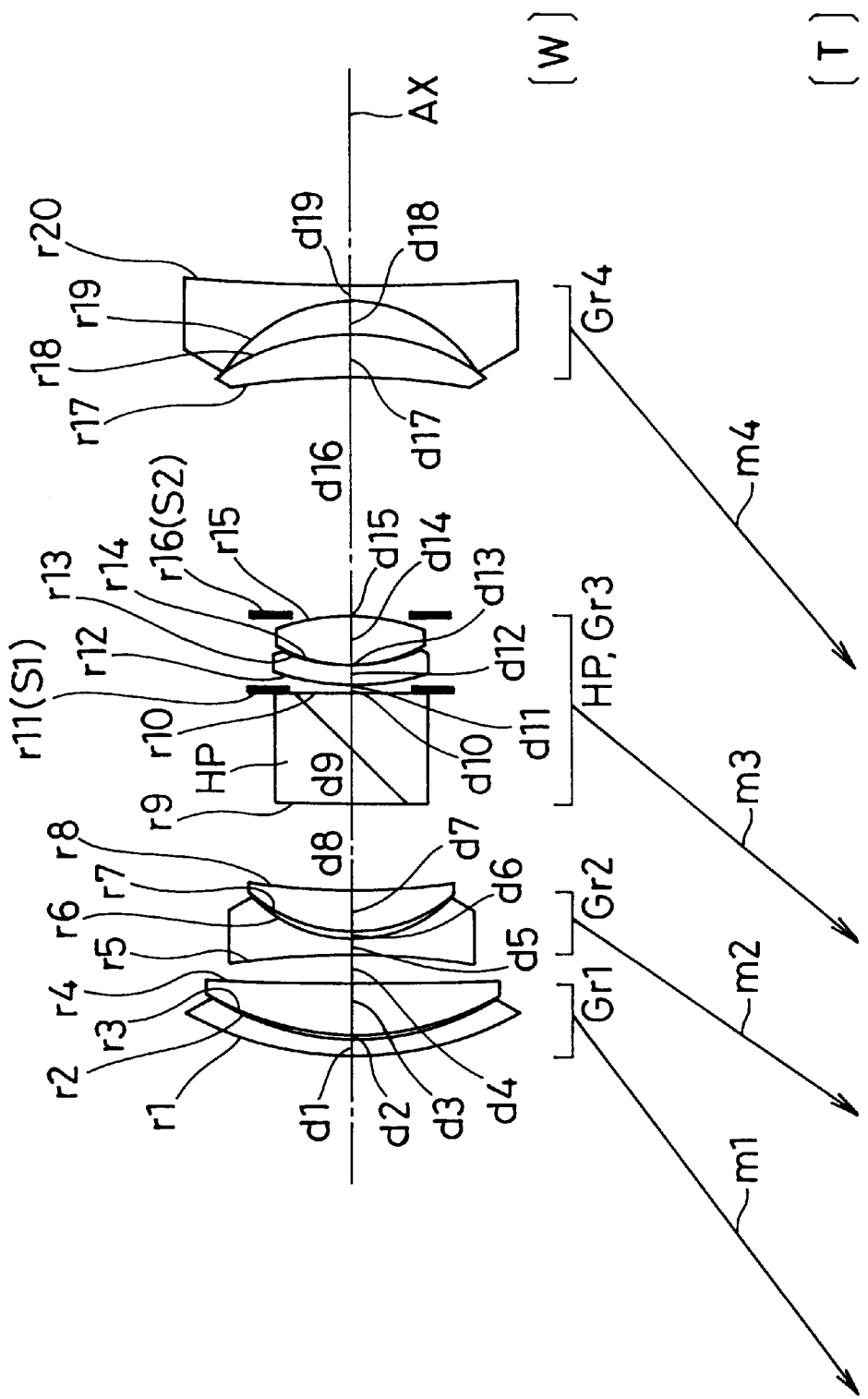
FIG. 1 is a diagram showing the lens construction of the first embodiment of the present invention.
Figure 2:
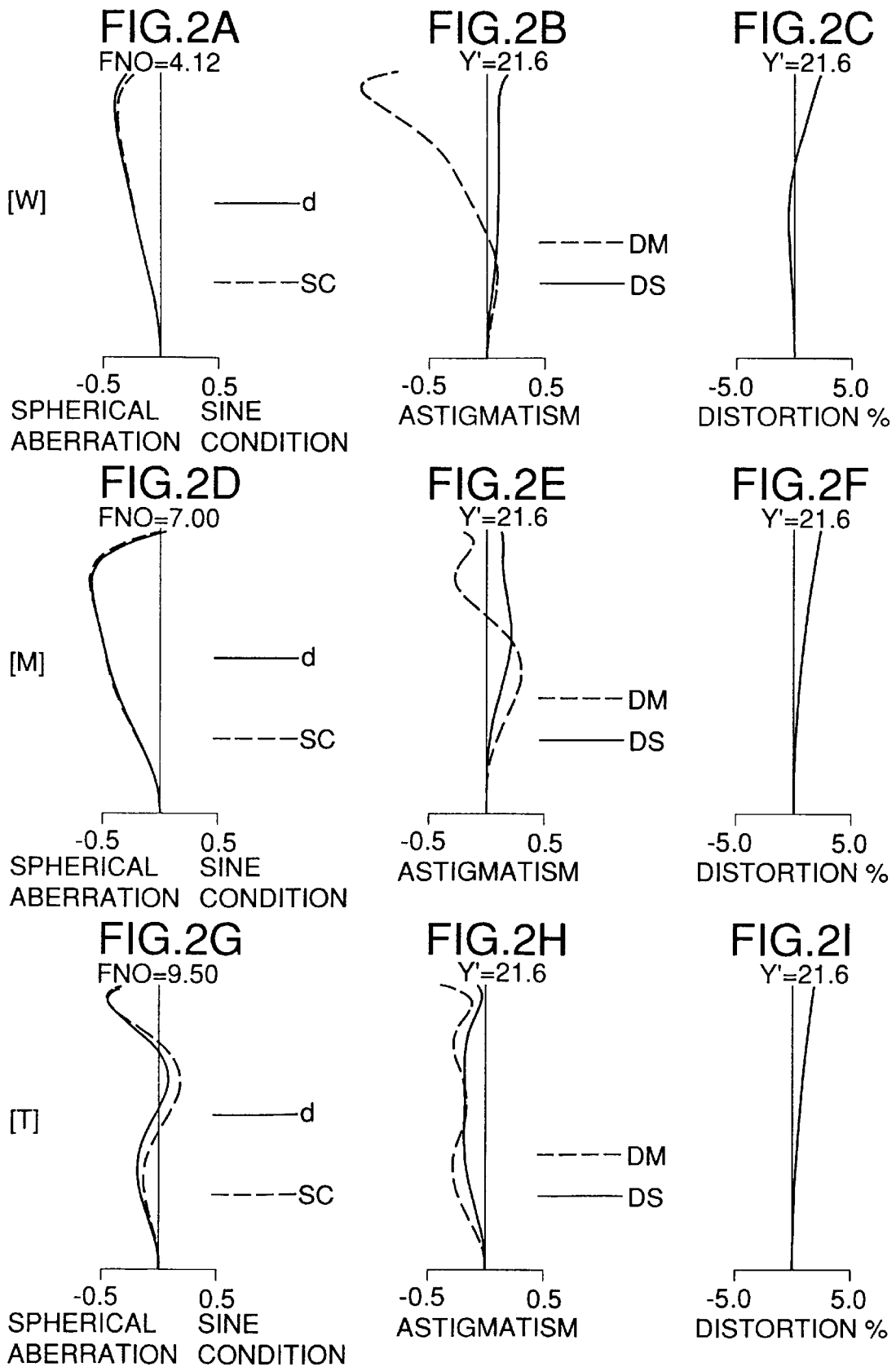
FIGS. 2A to 2I are diagrams showing aberrations observed in he first embodiment focused for infinity.
Figure 3:
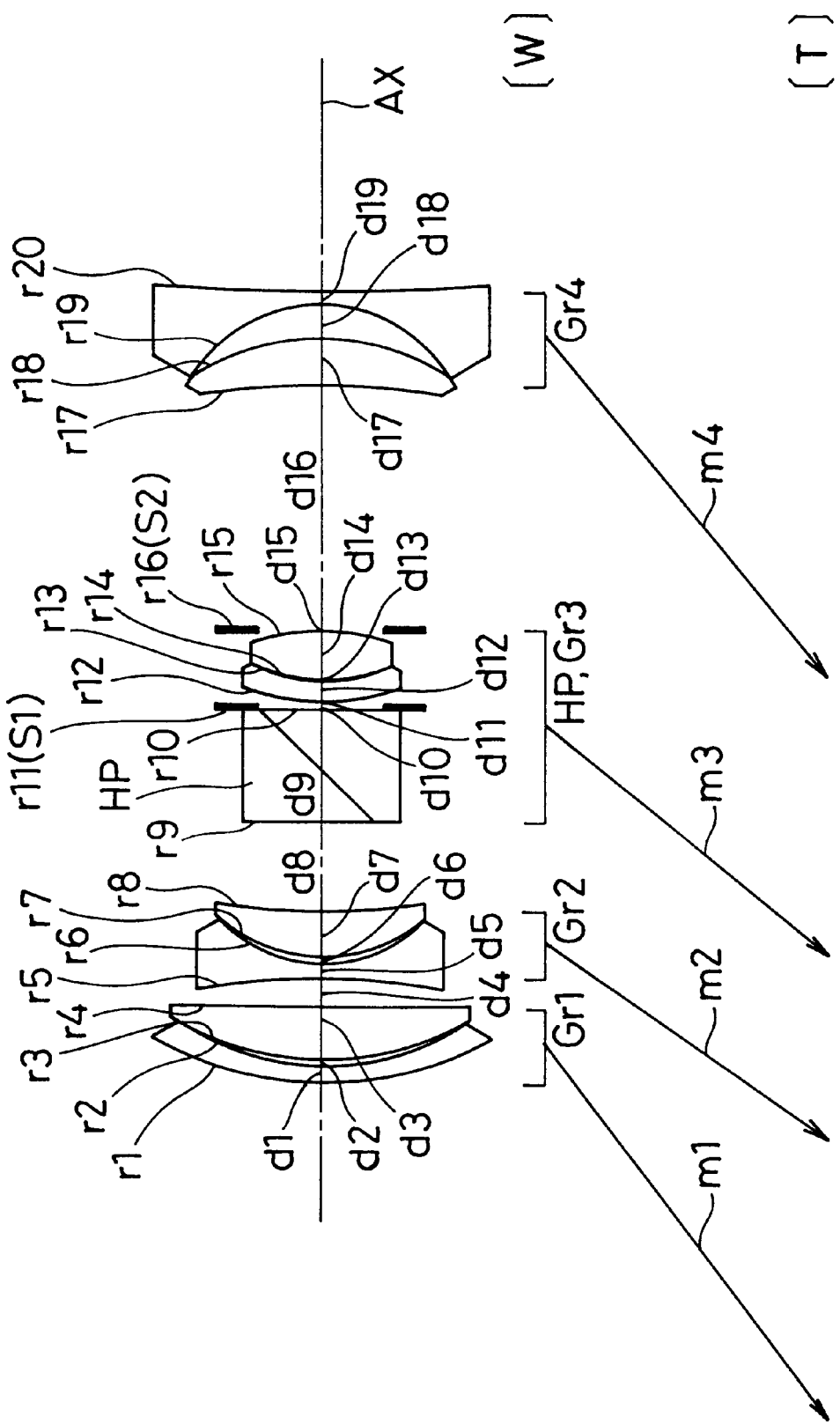
FIG. 3 is a diagram showing the lens construction of the second embodiment of the present invention.
Figure 4:
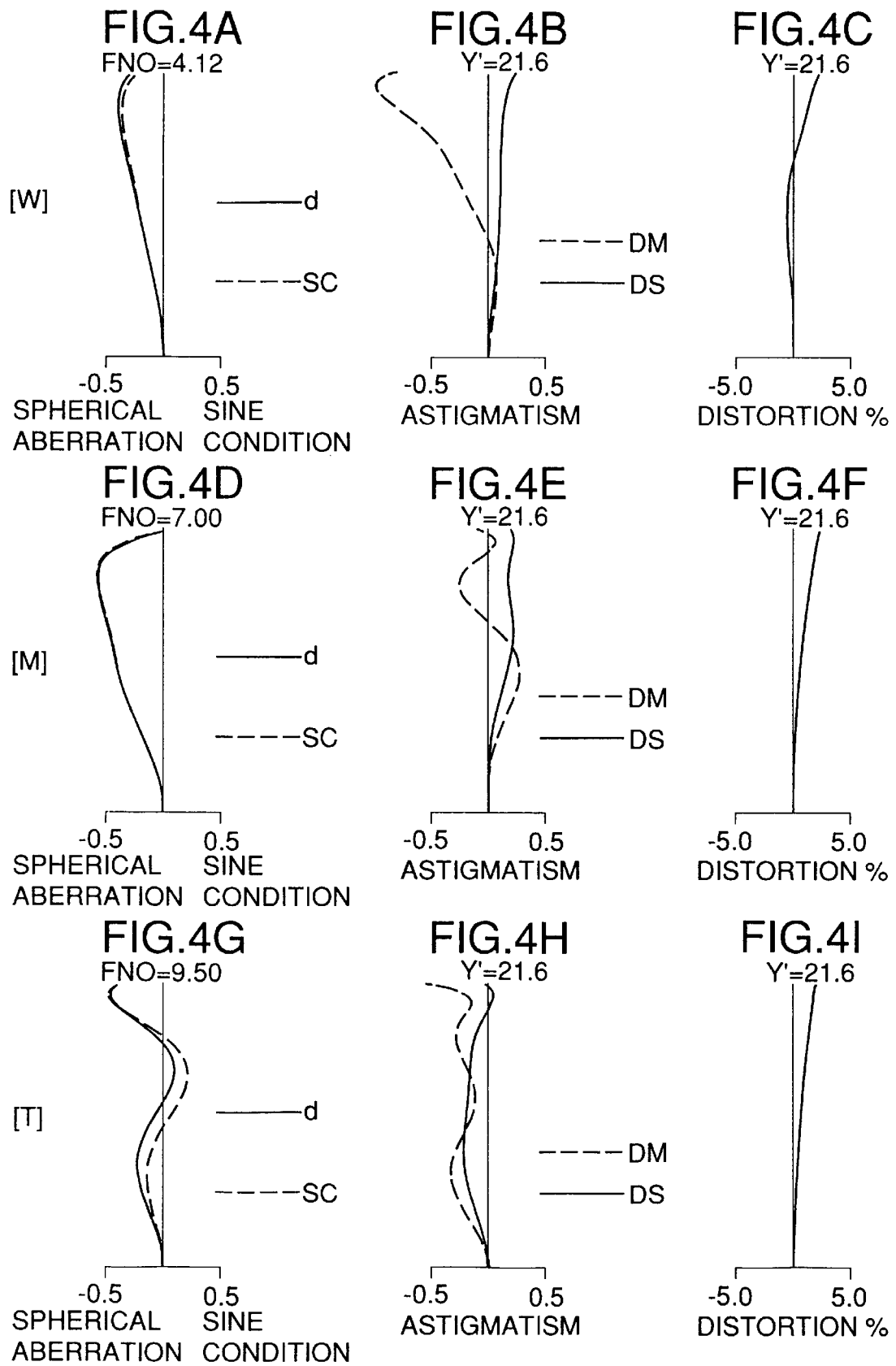
FIGS. 4A to 4I are diagrams showing aberrations observed in he second embodiment focused for infinity.

Hereinafter, zoom lens systems embodying the present invention will be described with reference to the drawings. FIGS. 1, 3, 5, 7, 9, 12, 15, 18, 21, 23, 25, 27, 29 and 31 show lens arrangements of zoom lens systems according to first to fourteenth embodiments at the wide-angle end [W] under infinity photography condition. In these figures, ri(i=1, 2, 3, . . . ) represents the radius of curvature of an ith surface counted from the object side, and di (i=1, 2, 3, . . . ) represents an ith axial distance counted from the object side. While in the first to fourteenth embodiments, a half prism HP or a pellicle mirror PM (comprising a semitransparent pellicle film) is used as a reflecting means for reflecting the luminous flux between zooming lens units to split the luminous flux, instead of the reflecting means of these types, a reflecting means may be used such as a total reflecting mirror of up-down type for reflecting the luminous flux between zooming lens units to change the optical path.

<Four-Unit Zoom Lens System of Positive, Negative, Positive, Negative Configuration (First to Tenth Embodiments)>

The first to tenth embodiments are four-unit zoom lens systems having, from the object side, a first lens unit Gr1 of positive refractive power, a second lens unit Gr2 of negative refractive power, a third lens unit Gr3 of positive refractive power and a fourth lens unit Gr4 of negative refractive power. The first lens unit Gr1 constitutes a first lens component. The second lens unit Gr2 constitutes a second lens component. The third lens unit Gr3 constitutes a third lens component. The fourth lens unit Gr4 constitutes a fourth lens component. Between the second lens unit Gr2 and the third lens unit Gr3 is disposed a half prism HP (the first to eighth and tenth embodiments) or a pellicle mirror PM (the ninth embodiment) for reflecting the luminous flux having passed through the second lens unit Gr2 to split the luminous flux. The first lens unit Gr1 to the fourth lens unit Gr4 are moved forward as shown by arrows m1 to m4 of the figures during zooming from the wide-angle end [W] to the telephoto end [T]. At this time, the distance between the first lens unit Gr1 and the second lens unit Gr2 increases, the distance between the second lens unit Gr2 and the third lens unit Gr3 decreases, and the distance between the third lens unit Gr3 and the fourth lens unit Gr4 decreases.

In the first to tenth embodiments, the lens units are arranged as follows: The first lens unit Gr1 includes from the object side a negative meniscus lens element concave to the image side and a positive meniscus lens element convex to the object side. The image side surface of the negative meniscus lens element is aspherical. The second lens unit Gr2 includes from the object side a negative bi-concave lens element and a positive meniscus lens element convex to the object side. The object side surface of the negative lens element and the image side surface of the positive meniscus lens element are aspherical. The third lens unit Gr3 includes from the object side a lens shutter S1 also used as the aperture diaphragm, a negative meniscus lens element concave to the image side, a positive bi-convex lens element and a luminous flux restricting plate S2. The image side surface of the positive lens element is aspherical. The fourth lens unit Gr4 includes from the object side a positive meniscus lens element convex to the image side and a negative bi-concave lens element. Both side surfaces of the positive meniscus lens element are aspherical. The lens shutter S1 also used as the aperture diaphragm and the luminous flux restricting plate S2 are compatible with each other in design.

In the first to tenth embodiments, as mentioned above, the half prism HP or the pellicle mirror PM for reflecting the luminous flux having passed through the second lens unit Gr2 to split the luminous flux is disposed between the second lens unit Gr2 and the third lens unit Gr3. According to this arrangement, the luminous flux incident on the zoom lens system is split into two optically equivalent luminous fluxes by the half prism HP or the pellicle mirror PM, so that no parallax is caused. Since the half prism HP or the pellicle mirror PM is disposed in the middle of the zoom lens system, the back focal length is reduced and the half prism HP or the pellicle mirror PM is reduced in size.

Additionally, in the zoom lens systems like the first to tenth embodiments having four lens units of positive, negative, positive, negative configuration from the object side, the axial and off-axial luminous fluxes both pass the lowest positions (i.e. in the vicinity of the optical axis AX) between the second lens unit Gr2 and the third lens unit Gr3, so that the half prism HP or the pellicle mirror PM disposed between the second lens unit Gr2 and the third lens unit Gr3 is further reduced in size along the diameter. Since the half prism HP or the pellicle mirror PM is reduced in size in the direction of the optical axis AX if it is reduced in size along the diameter, the actual axial distance between the second lens unit Gr2 and the third lens unit Gr3 (i.e. the distance between the most image side lens surface of the second lens unit Gr2 and the most object side surface of the third lens unit Gr3) is reduced by the size reduction of the half mirror HP or the pellicle mirror PM. As a result, the length of the zoom lens system is reduced.

In the first to tenth embodiments, since the half prism HP or the pellicle mirror PM reflects the luminous flux between the zooming lens units to split the luminous flux, the structure of the lens barrel is simple and it is easier in manufacture to maintain the optical quality of the zooming lens units than in an arrangement where the luminous flux is reflected in the middle of one zooming lens unit. Moreover, in the first to tenth embodiments, since the first lens unit Gr1 has positive refractive power, the generation of aberrations is effectively restrained by limiting the height of the axial luminous flux with the first lens unit Gr1.

It is desirable for each lens unit to include at least one positive lens element and at least one negative lens element like in the first to tenth embodiments. According to this arrangement, a zoom lens system is realized being compact, having a high zoom ratio and being corrected for aberrations in the entire zoom range.

Figure 23:
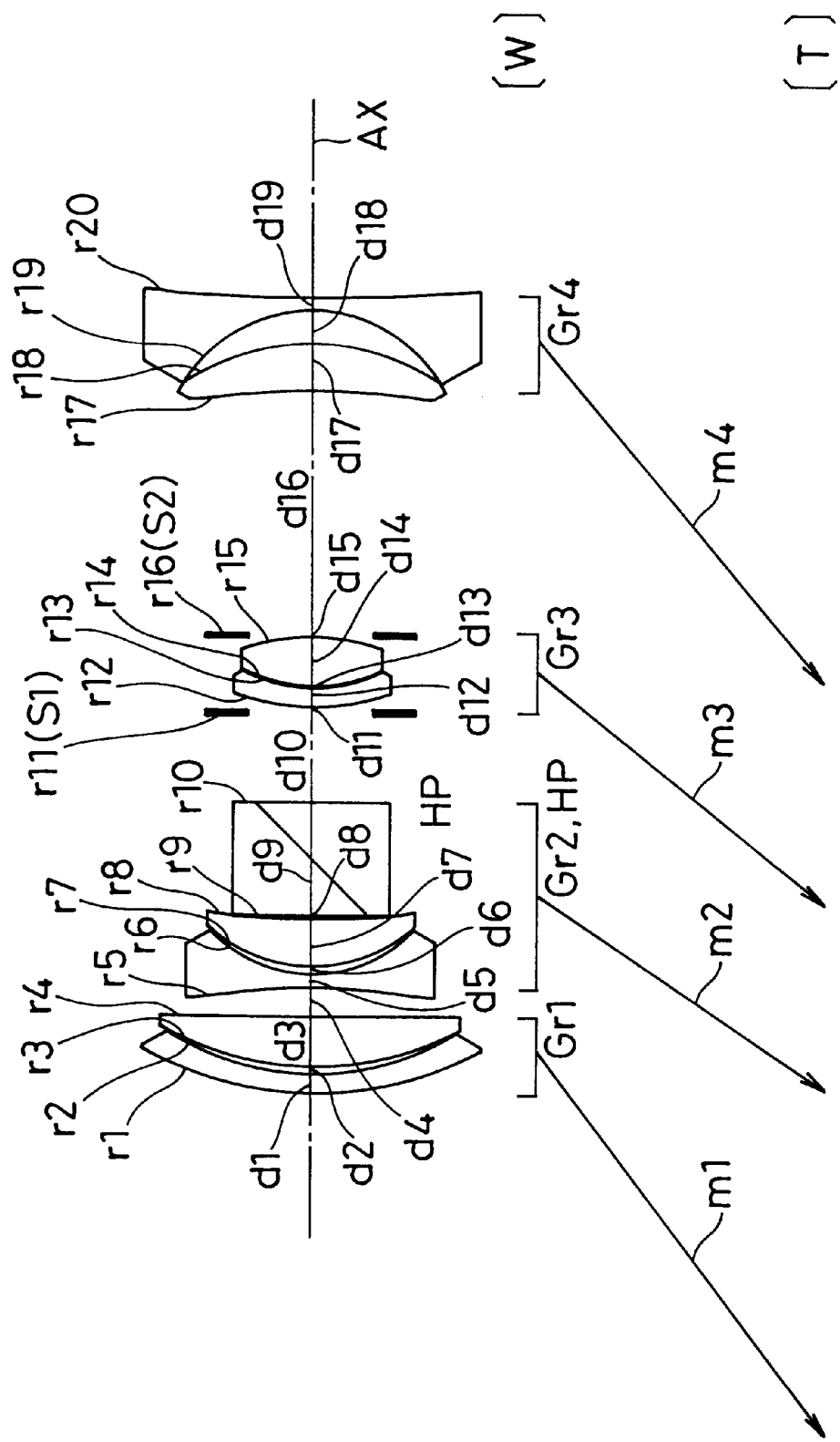
FIG. 23 is a diagram showing the lens construction of the tenth embodiment of the present invention.
Figure 26A:
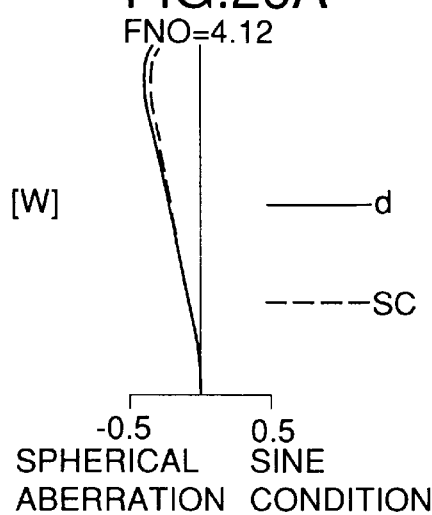
FIGS. 26A to 26I are diagrams showing aberrations observed in the eleventh embodiment focused for infinity.
Figure 26B:
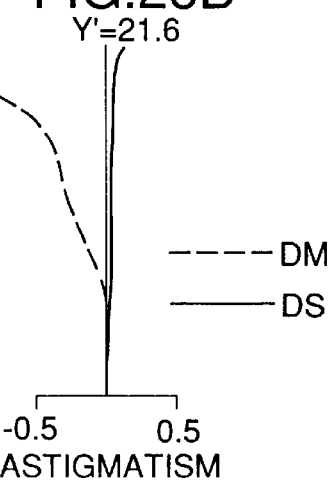
Figure 26C:
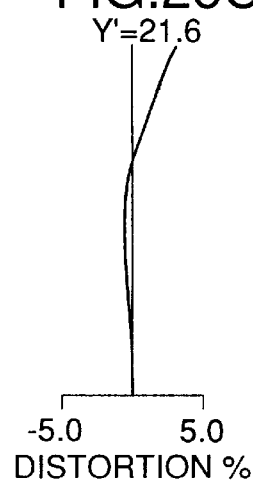
Figure 26D:
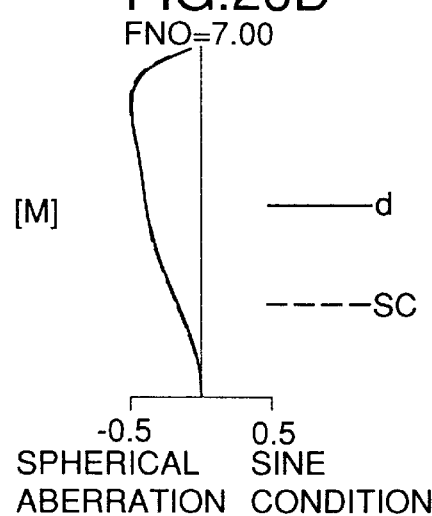
Figure 26E:
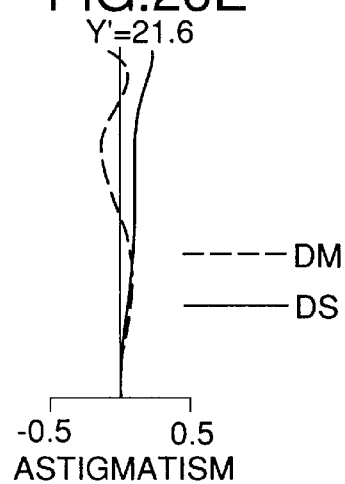
Figure 26F:
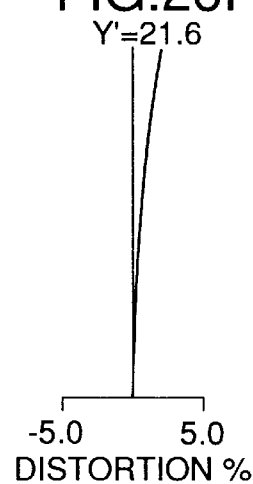
Figure 26G:
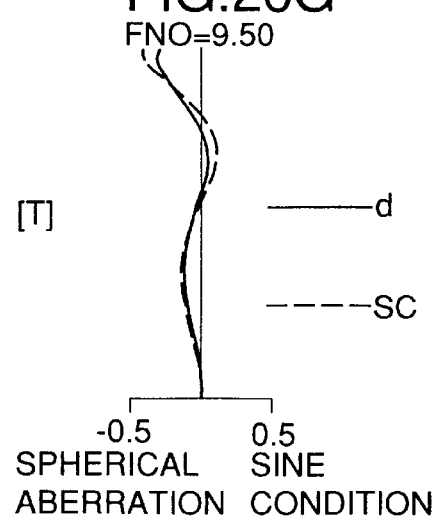
Figure 26H:
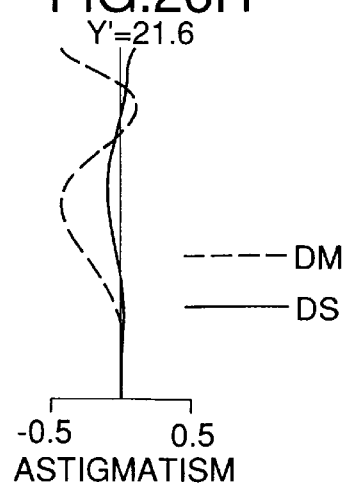
Figure 26I:
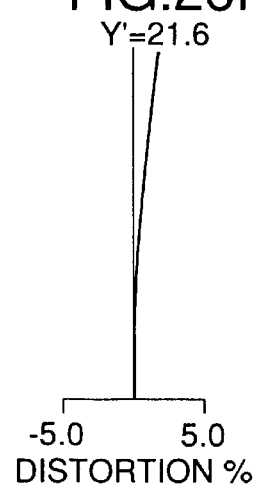

In the zoom lens systems according to the first to ninth embodiments, the half prism HP or the pellicle mirror PM is moved integrally with the third lens unit Gr3 during zooming, so that the zoom lens systems are reduced in size. In zoom lens systems having four lens units of positive, negative, positive, negative configuration from the object side, the luminous flux is thinnest (i.e. condensed) in the vicinity of the third lens unit Gr3. For this reason, the size along the diameter (i.e. the size in the direction vertical to the optical axis AX) of the half prism HP or the pellicle mirror PM is minimized, so that the half prism HP or the pellicle mirror PM is reduced also in size in the direction of the optical axis AX. Since the space is effectively used by the size reduction of the half prism HP or the pellicle mirror PM, the actual axial distance between the second lens unit Gr2 and the third lens unit Gr3 is reduced to reduce the length of the zoom lens system. In the zoom lens system according to the tenth embodiment, the half prism HP is moved integrally with the second lens unit Gr2 during zooming, so that the camera on which the zoom lens system is mounted is reduced in size. The half prism HP reflects the luminous flux having passed through the second lens unit Gr2 to split the luminous flux. In the case where the luminous flux split by the half prism HP is used as the finder luminous flux, a finder optical system corresponding to the third and succeeding zooming lens units is necessary. By arranging the zoom lens system so that the half prism HP is moved integrally with the second lens unit Gr2 during zooming as shown in FIG. 23, the half prism HP is moved in a front part of the lens barrel, so that the finder luminous flux is split in the front part of the lens barrel. Consequently, a sufficient space for disposing the finder optical system for the luminous flux split by the half prism HP is secured at a side of the third and succeeding zooming lens units. By disposing the finder optical system in the space, size reduction of the camera is achieved.

In the zoom lens systems according to the fifth to eighth embodiments, the second lens unit Gr2 situated immediately in front of the half prism HP is moved in the direction of the optical axis AX during focusing. According to this arrangement, the following advantages are obtained: First, the necessary movement amount for focusing is smaller by moving the second lens unit Gr2 for focusing than by moving only the first lens unit Gr1, so that the space necessary for focusing is minimized. This is advantageous in lens barrel structure and the length of the zoom lens system is reduced. Second, since the first lens unit Gr1 is lighter in weight than the second lens unit Gr2, the burden on the focusing driving mechanism is smaller. This is advantageous in lens barrel structure. Third, in the case where the luminous flux split by the half prism HP is used as the finder luminous flux, focusing is performed before the luminous flux is split, so that the focusing condition of the taking optical system is visually checked through the finder.

Figure 9:
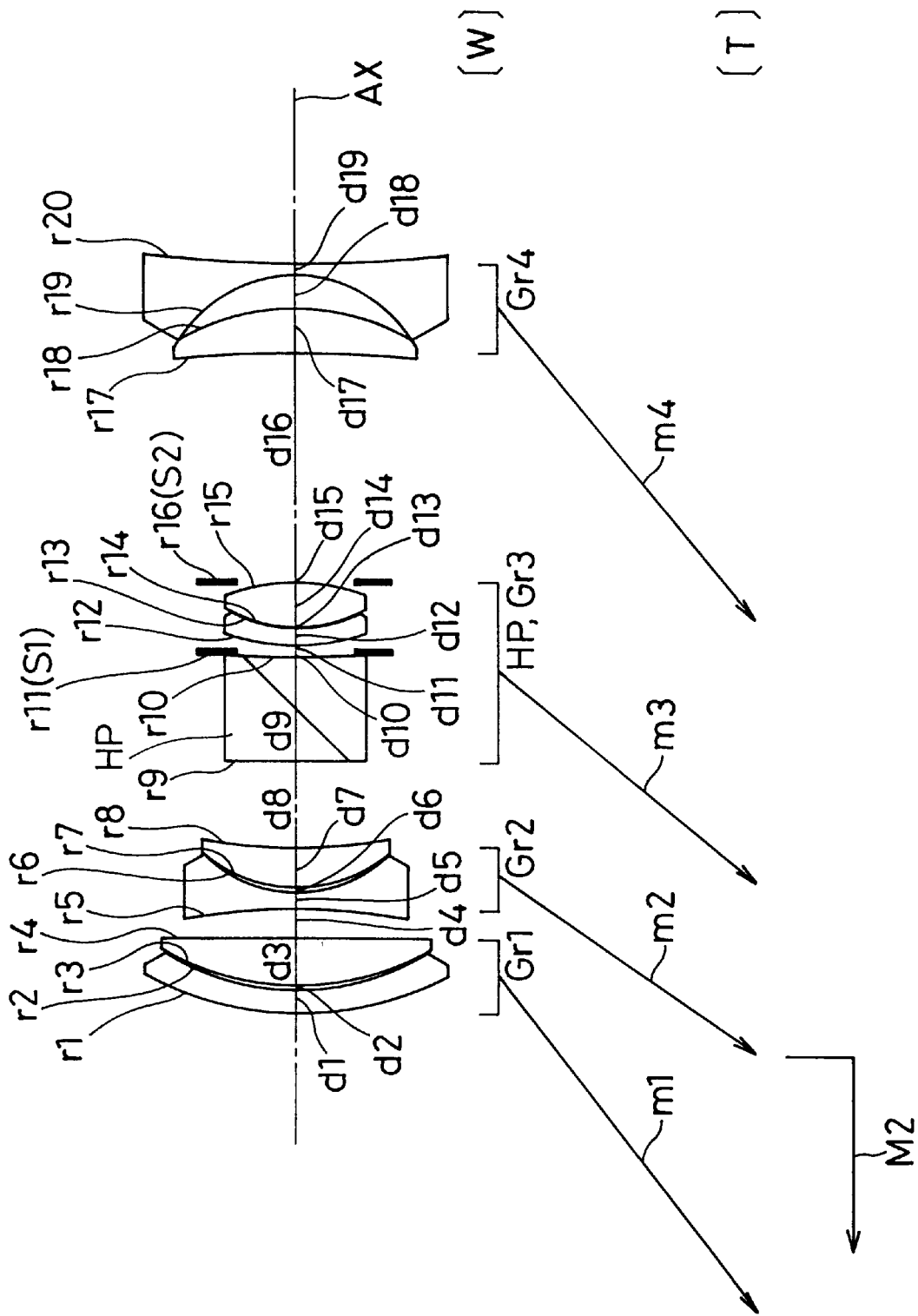
FIG. 9 is a diagram showing the lens construction of the fifth embodiment of the present invention.
Figure 11A:
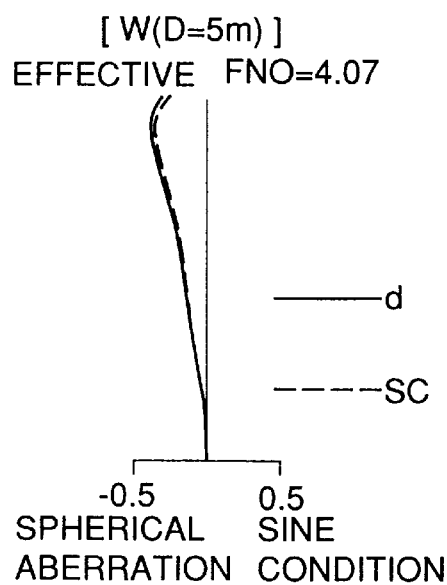
FIGS. 11A to 11C are diagrams showing aberrations observed in the fifth embodiment focused for a close-up distance.
Figure 11B:
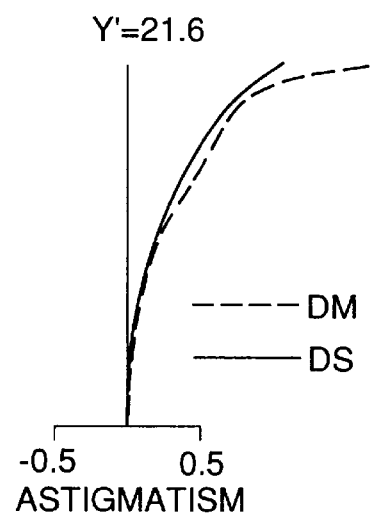
Figure 11C:
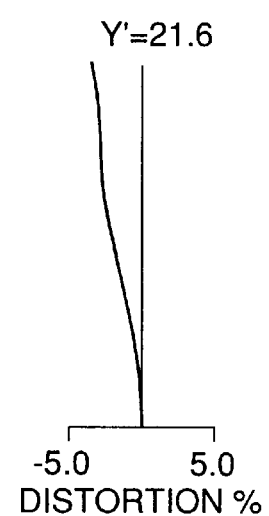

In the fifth embodiment, focusing is performed by moving only the second lens unit Gr2 as shown by an arrow M2 of FIG. 9. On the contrary, in the sixth to eighth embodiments, focusing is performed with floating as shown by arrows M1 and M2 of FIGS. 12 and 18 and arrows M2a and M2b of FIG. 15.

Figure 12:
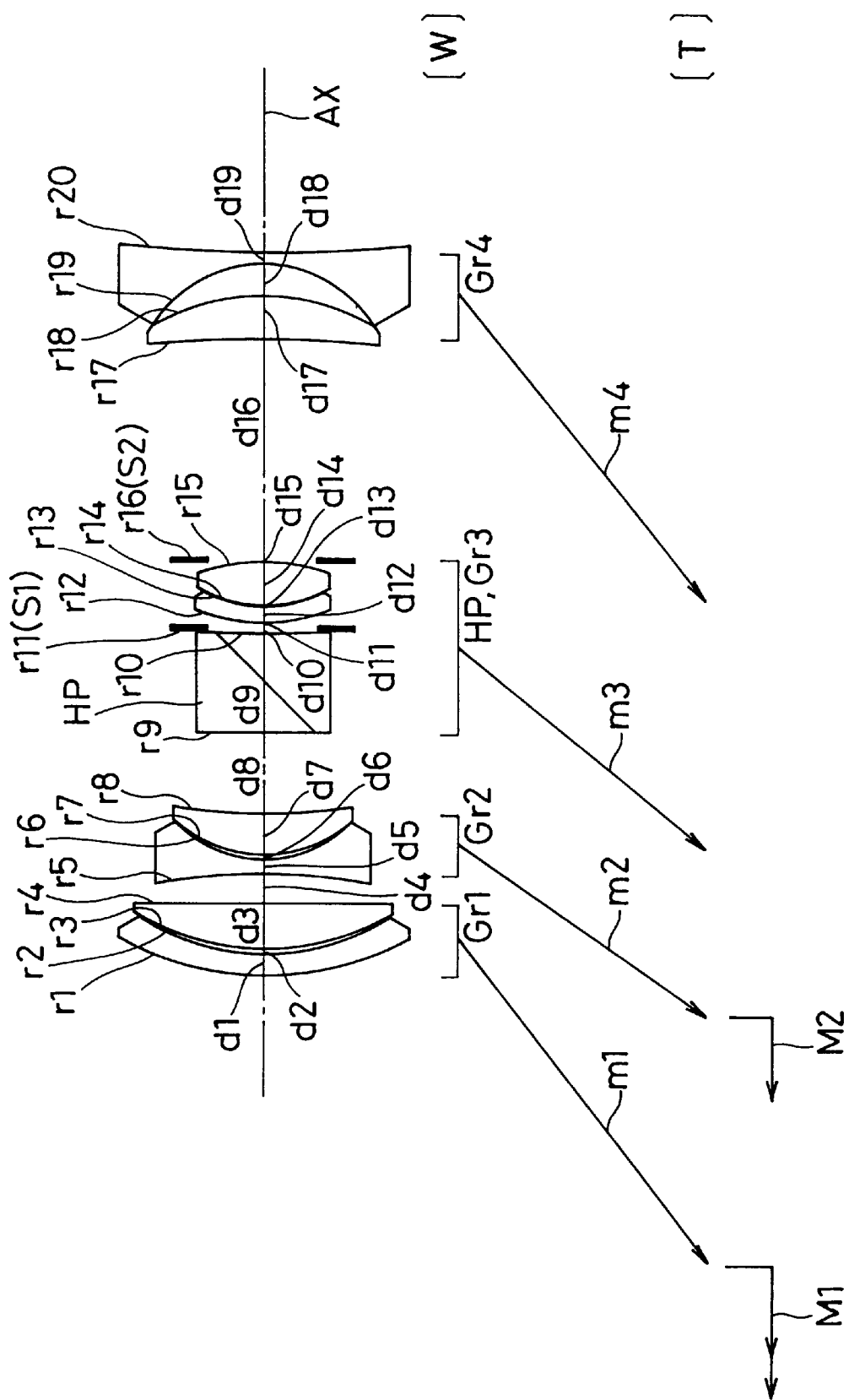
FIG. 12 is a diagram showing the lens construction of the sixth embodiment of the present invention.
Figure 18:
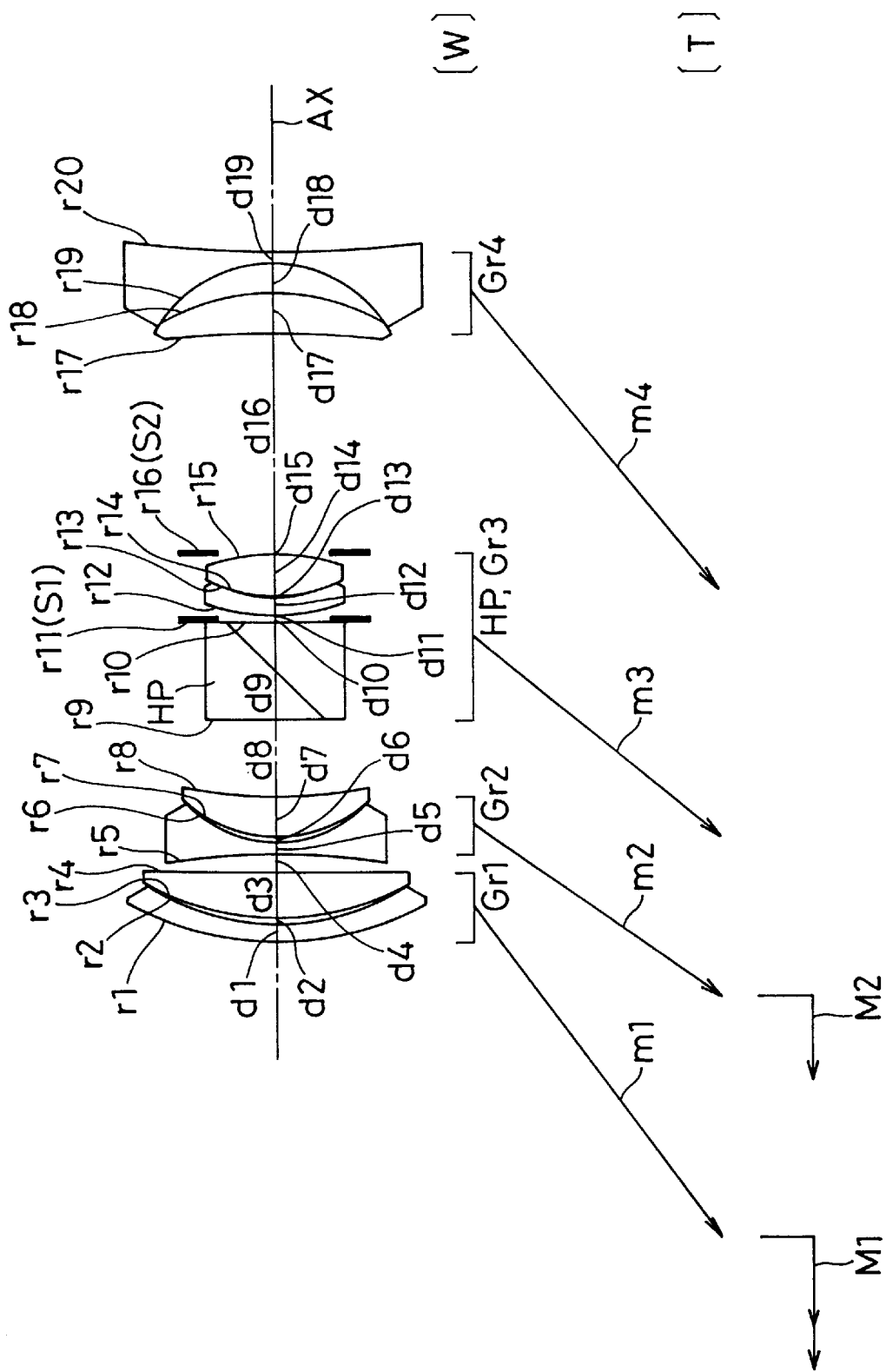
FIG. 18 is a diagram showing the lens construction of the eighth embodiment of the present invention.
Figure 21:
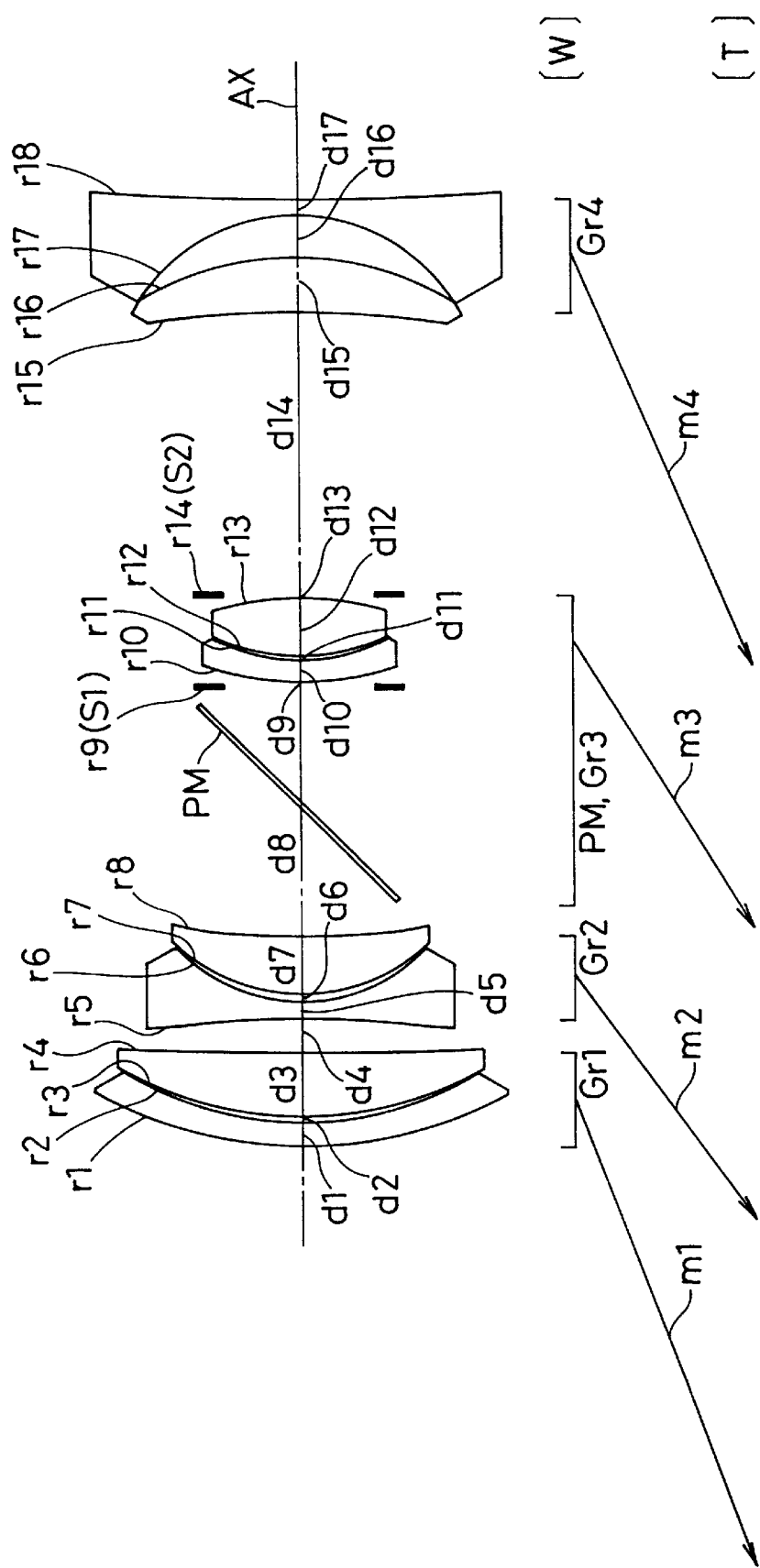
FIG. 21 is a diagram showing the lens construction of the ninth embodiment of the present invention.

For example, in the sixth and eighth embodiments, focusing is performed with a floating such that the distance d4 between the first lens unit Gr1 and the second lens unit Gr2 slightly varies as shown in FIGS. 12 and 18 (arrows M2 and M2). By the focusing with the floating, the negative excursion of spherical aberration and the positive excursion of the image plane are corrected.

Figure 15:
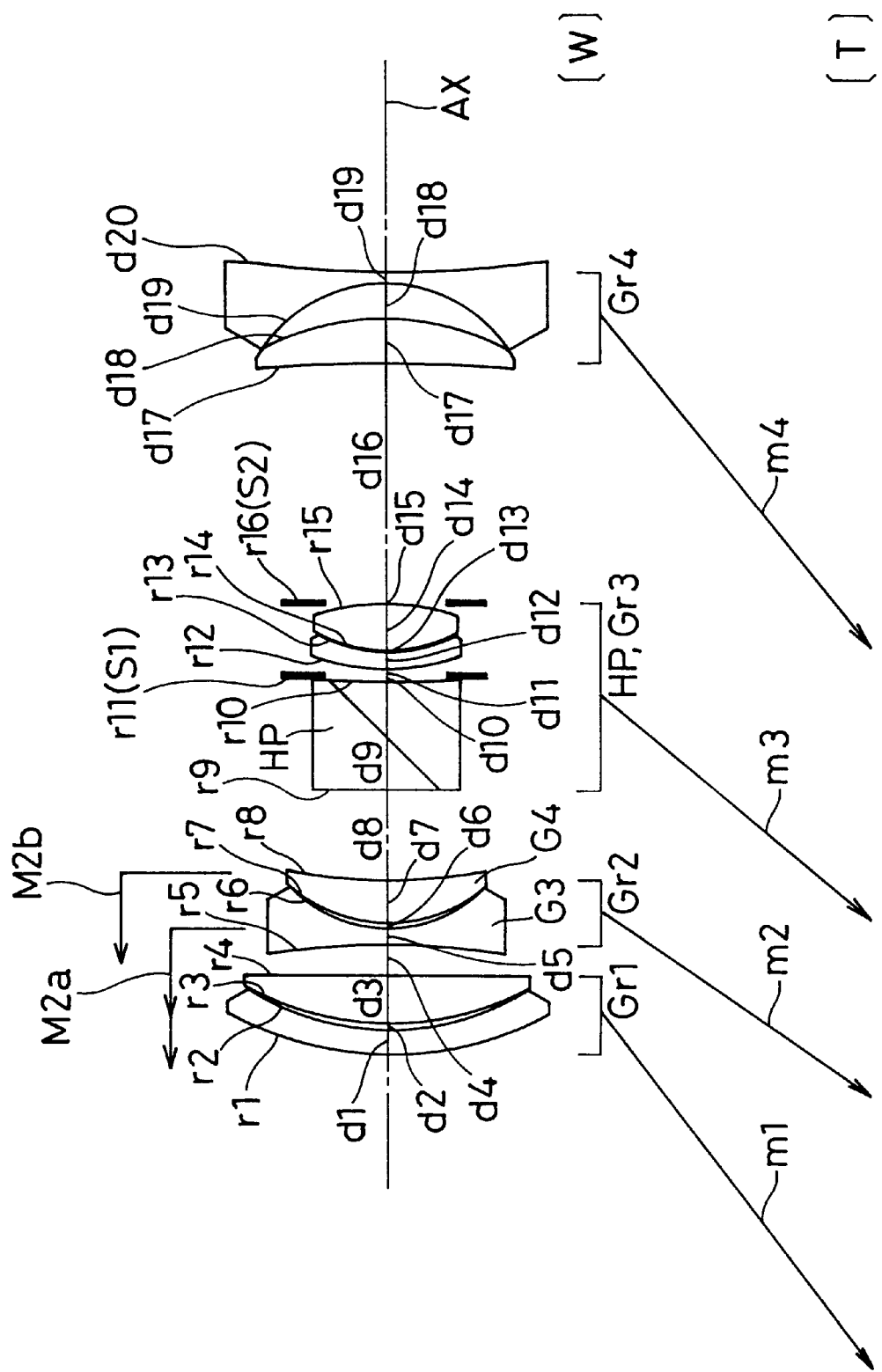
FIG. 15 is a diagram showing the lens construction of the seventh embodiment of the present invention.
Figure 17A:
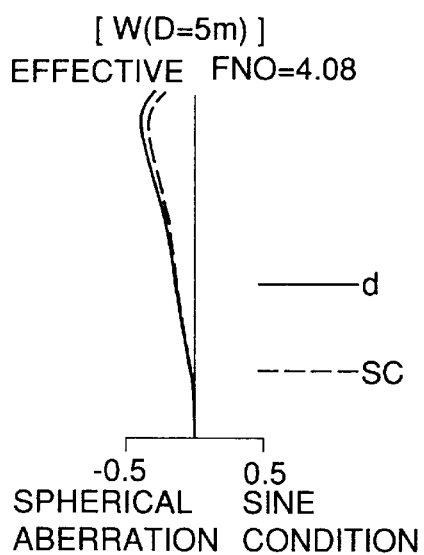
FIGS. 17A to 17C are diagrams showing aberrations observed in the seventh embodiment focused for a close-up distance.
Figure 17B:
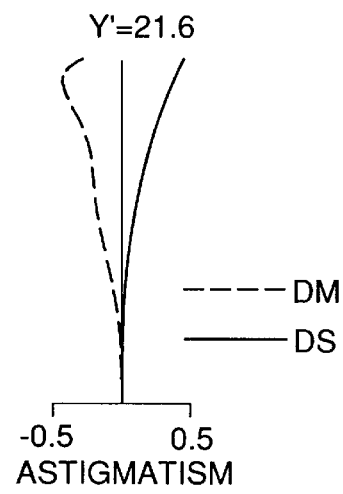
Figure 17C:
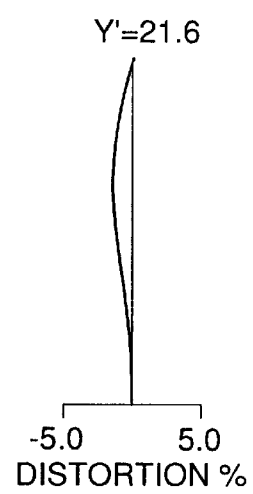

In the seventh embodiment, focusing is performed with a floating such that the distance d6 between a negative lens element G3 and a positive lens element G4 included in the second lens unit Gr2 slightly varies as shown in FIG. 15 (arrows M2a and M2b). By the focusing with the floating, the positive excursion of the image plane and the positive excursion of distortion are corrected. The effect on the image plane inclination and distortion is clear from the near aberrations of the seventh embodiment (see FIG. 17).

In the first to ninth embodiments, since the lens shutter S1 also used as the aperture diaphragm is disposed in the rear of the half prism HP or the pellicle mirror PM, the luminous flux increases in diameter as it approaches the second lens unit Gr2 situated immediately in front of the half prism HP or the pellicle mirror PM. On the other hand, in the first to ninth embodiments, since the half prism HP or the pellicle mirror PM is moved integrally with a zooming lens unit situated immediately in the rear thereof (i.e. the third lens unit Gr3) during zooming, the distance between the third lens unit Gr3 and the half prism HP or the pellicle mirror PM does not vary and the distance between the second lens unit Gr2 and the half prism HP or the pellicle mirror PM varies. Consequently, the luminous flux diameter to be covered by the half prism HP or the pellicle mirror PM is minimized, so that size reduction of the half prism HP or the pellicle mirror PM is achieved. This arrangement is advantageous in lens barrel structure since the burden such as weight on the driving mechanism for zooming is reduced because of the size reduction of the half prism HP or the pellicle mirror PM.

In the zoom lens systems according to the first to tenth embodiments, since the zooming lens unit situated immediately in front of the half prism HP or the pellicle mirror PM (i.e. the second lens unit Gr2) has negative refractive power, the off-axial luminous flux incident on the half prism HP or the pellicle mirror PM forms a small angle to the axial luminous flux (i.e. approaches afocal condition). Consequently, the luminous flux diameter to be covered by the half prism HP or the pellicle mirror PM is minimized, so that size reduction of the half prism HP or the pellicle mirror PM is achieved. This arrangement is advantageous in lens barrel structure since the burden such as weight imposed on the driving mechanism for zooming is lightened because of the size reduction of the half prism HP or the pellicle mirror PM. Additionally, since the off-axial luminous flux nearly afocal with respect to the optical axis does not spread so much when it is reflected by the half prism HP or the pellicle mirror PM, the diameter of the optical system situated in the rear of the half prism HP or the pellicle mirror PM (i.e. the finder optical system and a part of the taking optical system situated in the rear of the reflecting means) is minimized. Thus, by the size reduction of the half prism HP or the pellicle mirror PM and the optical system situated in the rear thereof, size reduction of the zoom lens system and the finder optical system is achieved.

Figure 5:
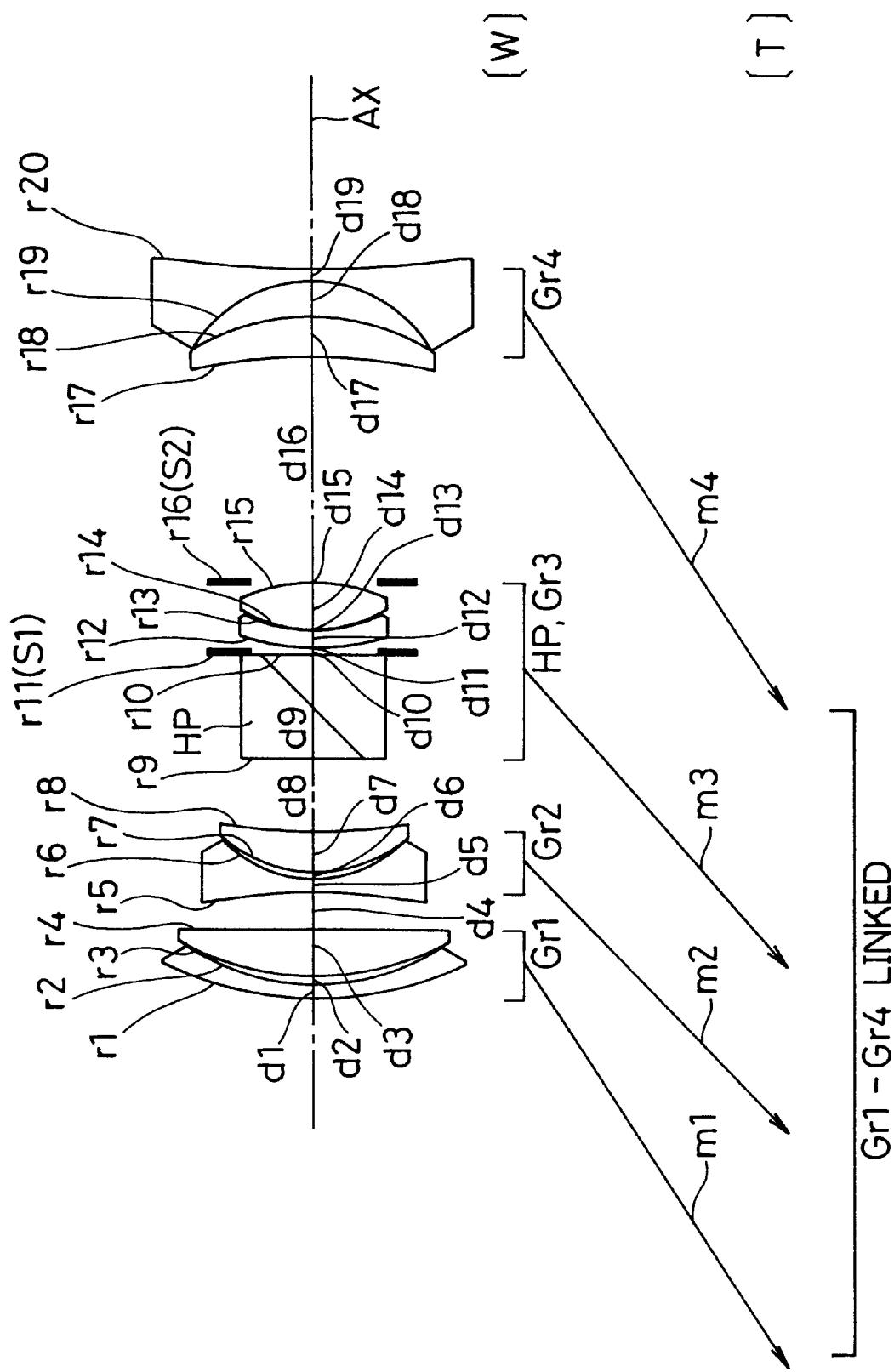
FIG. 5 is a diagram showing the lens construction of the third embodiment of the present invention.
Figure 6:
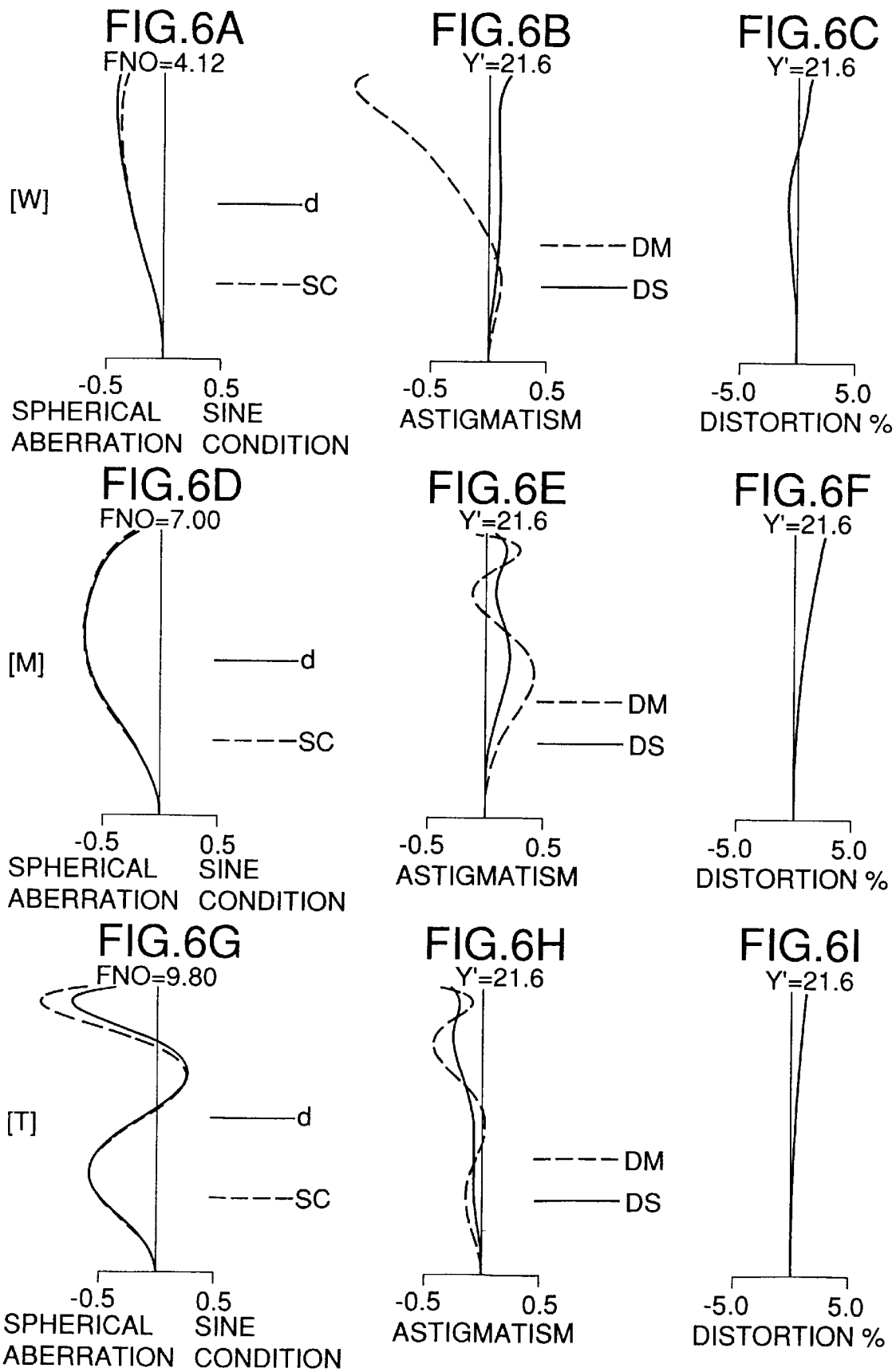
FIGS. 6A to 6I are diagrams showing aberrations observed in the third embodiment focused for infinity.
Figure 7:
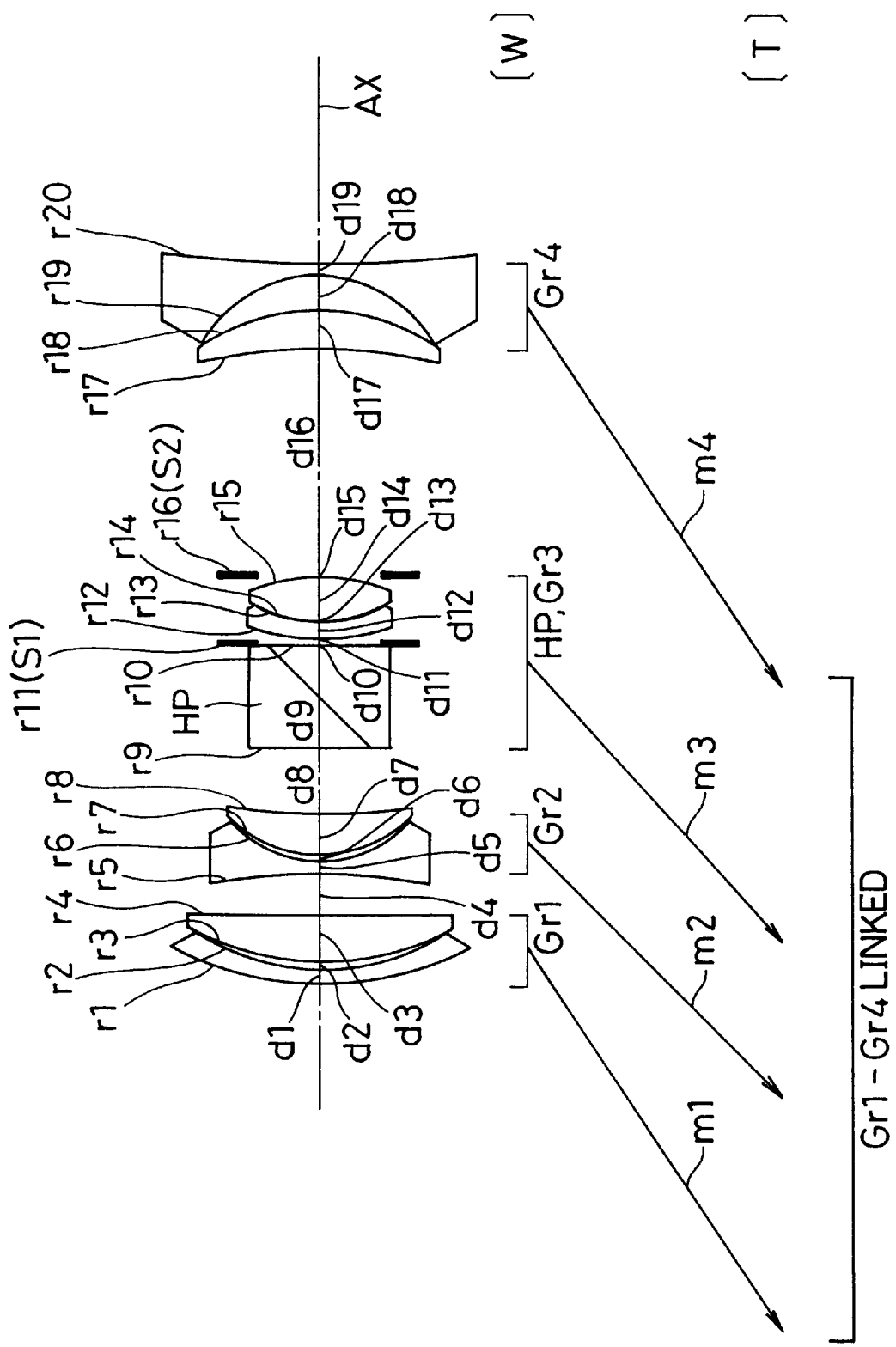
FIG. 7 is a diagram showing the lens construction of the fourth embodiment of the present invention.
Figure 8:
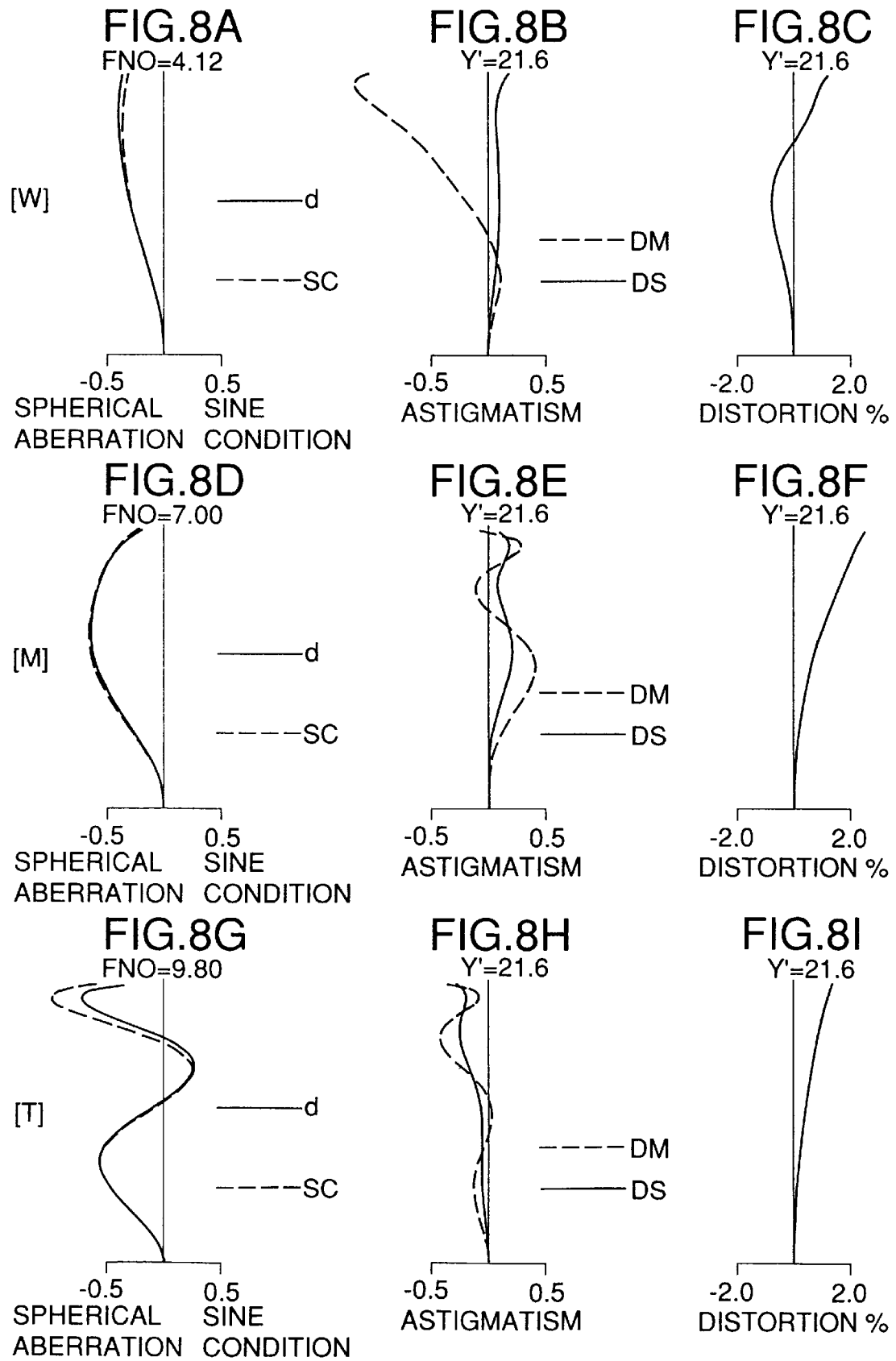
FIGS. 8A to 8I are diagrams showing aberrations observed in the fourth embodiment focused for infinity.

In the zoom lens systems according to the third and fourth embodiments, as shown in FIGS. 5 and 7, the first lens unit Gr1 situated in front of the half prism HP and the fourth lens unit Gr4 situated in the rear of the half prism HP are moved in linkage with each other during zooming. Advantages will be described of the linkage between a zooming lens unit situated in front of the half prism HP and a zooming lens unit situated in the rear of the half prism HP during zooming.

Optically thinking, a zoom lens system having a higher degree of freedom of design is more advantageous optically. Therefore, in zoom lens systems, it is more advantageous in aberration correction to perform zooming by independently moving the zooming lens units. However, if the half prism HP is disposed between the zooming lens units as described above, the structure of the lens barrel is necessarily complicated in order to direct the luminous flux reflected by the half prism HP outside the zoom lens system (e.g. as the finder luminous flux). The structure of the lens barrel is necessarily complicated for reasons such that, in order to direct the luminous flux reflected by the half prism HP outside the zoom lens system, the zoom cam ring disposed over the portion for directing the luminous flux outside the zoom lens system is desirably moved straight during zooming.

By employing the linkage arrangement for zooming, the number of zoom cams for moving the zooming lens units is reduced by one. Since the structure of the lens barrel is simplified by reducing the number of parts, this arrangement is advantageous in lens barrel structure. In the case where a part of the finder optical system is included in the lens barrel of the zoom lens system, since the structure of the lens barrel is simplified by the employment of the above-described linkage arrangement, the zoom cam ring is unnecessary, so that the lens barrel is reduced in size along the diameter. As described above, the linkage arrangement is effective, particularly, for zoom lens systems having the reflecting means for reflecting the luminous flux between the zooming lens units to split the luminous flux or change the optical path.

In four-unit zoom lens systems of positive, negative, positive, negative configuration where the half prism HP is disposed between the second lens unit Gr2 and the third lens unit Gr3, it is particularly desirable to employ the above-described linkage arrangement between the first lens unit Gr1 and the fourth lens unit Gr4 like in the third and fourth embodiments. This is because in the four-unit zoom lens system of positive, negative, positive, negative configuration, while it is difficult to move out the zooming lens units with the cam mechanism since the movement amounts of the first lens unit Gr1 and the fourth lens unit Gr4 are greater than those of the other zooming lens units, the lens barrel is easily structured by employing the linkage arrangement.

In order to achieve a compact zoom lens system, it is desirable to fulfill the following condition (1):

$$0.1 < BFW/Y' < 1.0 \quad (1)$$

where BFW is the back focal length at the wide-angle end, and Y' is the image height (½ the diagonal length of the image plane).

When the upper limit of the condition (1) is exceeded, the back focal length is too long, so that the length of the zoom lens system increases. As a result, it is difficult to achieve a compact zoom lens system. When the lower limit of the condition (1) is exceeded, the back focal length is too short. Although this is advantageous in reducing the length of the zoom lens system, it is disadvantageous in reducing the size along the diameter because it is necessary to increase the rear lens diameter in order to secure sufficient ambient illuminance.

In order to realize a zoom lens system being compact and having a high zoom ratio while maintaining high optical quality, it is desirable to fulfill the following condition (2):

$$3.5 < fT/fW \quad (2)$$

where fW is the focal length of the entire zoom lens system at the wide-angle end, and fT is the focal length of the entire zoom lens system at the telephoto end.

In zoom lens systems having a zoom ratio fulfilling the condition (2), if a reflecting means is disposed in a rear part of the lens system, the size of the camera should increase greatly and the generation of parallax is great. For this reason, in the zoom lens systems fulfilling the condition (2), it is immensely advantageous to dispose the reflecting means between the second lens unit Gr2 and the third lens unit Gr3.

In order to dispose the reflecting means such as the half prism HP between the second lens unit Gr2 and the third lens unit Gr3, it is desirable to fulfill the following condition (3) under a condition where the reflecting means such as the half prism HP is disposed:

$$0.25 < T(2-3)/fW \quad (3)$$

where T(2-3) is the distance between the most image side lens surface of the second lens unit and the most object side lens surface of the third lens unit at the wide-angle end.

When the lower limit of the condition (3) is exceeded, the distance T(2-3) between the second lens unit Gr2 and the third lens unit Gr3 is too short, so that it is difficult to structure the lens barrel so that the reflecting means is disposed between the second lens unit Gr2 and the third lens unit Gr3.

It is desirable for the second lens unit Gr2 and the third lens unit Gr3 to fulfill the following condition (4) with respect to the zooming movement amount:

$$0.5 < M2/M3 < 0.95 \quad (4)$$

where M2 is the movement amount of the second lens unit during zooming from the wide-angle end to the telephoto end, and M3 is the movement amount of the third lens unit during zooming from the wide-angle end to the telephoto end.

When the upper limit of the condition (4) is exceeded, the zooming movements of the second lens unit Gr2 and the third lens unit Gr3 are substantially the same, so that only advantages substantially the same as those produced by three-unit zoom lens systems are obtained, and if the zoom ratio is increased, the movement amount increases to increase the size of the optical system. When the lower limit of the condition (4) is exceeded, the difference in movement amount between the second lens unit Gr2 and the third lens unit Gr3 increases, so that the distance between the second lens unit Gr2 and the third lens unit Gr3 increases at the wide-angle end. Consequently, the height of the axial luminous flux incident on the third lens unit Gr3 increases and the burden of aberration correction on the third lens unit Gr3 increases, so that it is difficult to correct spherical aberration and the length of the zoom lens system at the wide-angle end increases.

Next, the structural features of the zooming lens units will be described. First, those of the first lens unit Gr1 will be described. In the first to tenth embodiments, the first lens unit Gr1 consists of a negative lens element and a positive lens element from the object side. According to this arrangement, the off-axial luminous flux having passed through the negative lens element is incident on the positive lens element at an angle gentler than its incident angle to the negative lens element, so that the aberration correction of the off-axial luminous flux on the wide-angle side where the angle of view is wide is facilitated.

It is desirable for the first lens unit Gr1 to fulfill the following condition (5):

$$0.4 < f1/fT < 0.7 \quad (5)$$

where f1 is the focal length of the first lens unit.

When the upper limit of the condition (5) is exceeded, the generation of negative distortion is great on the wide-angle side and spherical aberration shows a marked tendency to incline toward the over side on the telephoto side. When the lower limit of the condition (5) is exceeded, the refractive power of the first lens unit Gr1 is too strong, so that the generation of positive distortion is great on the wide-angle side and spherical aberration shows a marked tendency to incline toward the under side on the telephoto side.

By using an aspherical surface in the first lens unit Gr1 like in the first to tenth embodiments, more excellent optical quality is obtained. When Ymax is the maximum effective optical path diameter of the aspherical surface, it is desirable for the aspherical surface to fulfill the following condition (6) with respect to a given height y in the direction vertical to the optical axis where 0.5Ymax<y<Ymax:

$$-0.04 < \phi 1 \cdot (N'-N) \cdot d\{X(y)-X0(y)\}/dy < 0.005 \quad (6)$$

Here, $\phi 1$ is the refractive power of the first lens unit, N is the refractive index of the object side medium of the aspherical surface, N' is the refractive index of the image side medium of the aspherical surface, X(y) is the surface configuration of the aspherical surface, and X0(y) is a reference spherical surface configuration of the aspherical surface.

X(y) and X0(y) are expressed by the following equations (A) and (B):

$$X(y)=(r/\epsilon)\cdot[1-\{1\epsilon\cdot(y^2/r^2)\}^{1/2}]+\Sigma A_i y^i (\text{here}, i \geq 2) \quad (A)$$

$$X0(y)=r\#[1-\{1-\epsilon\cdot(y^2/r\#^2)\}^{1/2}] \quad (B)$$

where r is a reference radius of curvature of the aspherical surface, $\epsilon$ is a conic constant, Ai is an ith-order aspherical coefficient, and r# is a paraxial radius of curvature of the aspherical surface (here, $1/r\#=(1/r)+2\cdot A2$).

The condition (6) is a condition for correcting off-axial aberrations (particularly, distortion) on the wide-angle side and spherical aberration on the telephoto side into well-balanced condition. When the upper limit of the condition (6) is exceeded, the generation of negative distortion is great on the wide-angle side and spherical aberration shows a marked tendency to incline toward the over side on the telephoto side. When the lower limit of the condition (6) is exceeded, positive distortion increases on the wide-angle side and spherical aberration shows a marked tendency to incline toward the under side on the telephoto side.

Next, a desirable arrangement for the second lens unit Gr2 will be described. It is desirable for the second lens unit Gr2 to have a negative lens element on its most object side and have a positive lens element on its most image side. It is further desirable for the second lens unit Gr2 to consist of a negative lens element and a positive lens element from the object side like in the first to tenth embodiments. According to this arrangement, it is facilitated to set the back focal length to a predetermined length and it is also facilitated to correct coma and spherical aberration into well-balanced condition in the entire zoom range.

It is desirable for the negative lens element disposed on the most object side of the second lens unit Gr2 to fulfill the following condition (7):

$$1.0<(R1-R2)/(R1+R2)<2.0 \qquad (7)$$

where R1 is the radius of curvature of the object side surface of the negative lens element, and R2 is the radius of curvature of the image side surface of the negative lens element.

The condition (7) which defines the shape factor representing the shape of the negative lens element disposed on the most object side of the second lens unit Gr2 is a condition for correcting spherical aberration and coma into well-balanced condition. When the upper limit of the condition (7) is exceeded, spherical aberration shows a marked tendency to incline toward the over side and outward coma is generated. When the lower limit of the condition (7) is exceeded, spherical aberration shows a marked tendency to incline toward the under side and inward coma is generated.

In order to realize a zoom lens system being compact and having high optical quality, it is desirable for the second lens unit Gr2 to fulfill the following conditions (8) and (9):

$$0.05<D2/fW<0.40 \qquad (8)$$

$$0.01<D2/fT<0.08 \qquad (9)$$

where D2 is the thickness (the axial distance between the most object side lens surface and the most image side lens surface) of the second lens unit in the direction of the optical axis.

When the upper limits of the conditions (8) and (9) are exceeded, the length of the zoom lens system increases, and the front lens diameter (the diameter of the first lens unit Gr1) increases because the distance between the first lens unit Gr1 and the entrance pupil increases. When the lower limits of the conditions (8) and (9) are exceeded, it is difficult to sufficiently correct aberrations. Particularly, it is difficult to correct chromatic aberration into well-balanced condition in the entire zoom range. Even if sufficient correction could be made, the optical system would hardly be processible because the lens elements constituting the second lens unit Gr2 are too thin.

By using an aspherical surface in the second lens unit Gr2 like in the first to tenth embodiments, more excellent optical quality is obtained. It is desirable for the aspherical surface to fulfill the following condition (10) with respect to a given height y in the direction vertical to the optical axis where 0<y<Ymax:

$$-0.1<\phi2\cdot(N'-N)\cdot d\{X(y)-X0(y)\}/dy<0.01 \qquad (10)$$

Here, $\phi2$ is the refractive power of the second lens unit.

When the upper limit of the condition (10) is exceeded, spherical aberration shows a marked tendency to incline toward the under side in the entire zoom range and the generation of flare of the off-axial luminous flux is great on the telephoto side. On the wide-angle side, outside coma is generated. When the lower limit of the condition (10) is exceeded, spherical aberration shows a marked tendency to incline toward the over side in the entire zoom range and flare of the off-axial luminous flux shows a marked tendency to be overcorrected on the telephoto side. On the wide-angle side, inward coma is generated.

In the second lens unit Gr2, it is desirable to provide an aspherical surface on the most object side lens element (desirably, on its object side surface) or on the most image side lens element (desirably, on its image side surface). According to the former arrangement, the correction of coma on the wide-angle side is facilitated. According to the latter arrangement, the correction of spherical aberration is facilitated.

By using a bi-aspherical lens as the lens element having an aspherical surface or by providing an aspherical surface on each of the most object side surface and the most image side surface of the second lens unit Gr2, spherical aberration, flare of the off-axial luminous flux on the telephoto side and coma on the wide-angle side are corrected into better-balanced condition. That is, spherical aberration, flare and coma which cannot be sufficiently corrected by one aspherical surface are corrected by the other aspherical surface. In this case, it is desirable that the aspherical surfaces both fulfill the above-described condition (10).

It is desirable for the second lens unit Gr2 to fulfill the following condition (11):

$$0.1<|f2|/fT<0.5 \qquad (11)$$

where f2 is the focal length of the second lens unit.

When the upper limit of the condition (11) is exceeded, the refractive power of the second lens unit Gr2 is too weak, so that the length of the zoom lens system at the wide-angle end increases and the movement amount of the second lens unit Gr2 during zooming increases to increase the length of the zoom lens system at the telephoto end. When the lower limit of the condition (11) is exceeded, the refractive power of the second lens unit Gr2 is too strong, so that inward coma is generated on the wide-angle side and spherical aberration shows a marked tendency to incline toward the over side on the telephoto side.

Next, a desirable arrangement for the third lens unit Gr3 will be described. In order to realize a zoom lens system being compact and having high optical quality, it is desirable for the third lens unit Gr3 to fulfill the following conditions (12) and (13):

$$0.05<D3/fW<0.40 \qquad (12)$$

$$0.01<D3/fT<0.08 \qquad (13)$$

where D3 is the thickness (the axial distance between the most object side lens surface and the most image side lens surface) of the third lens unit in the direction of the optical axis.

When the upper limits of the conditions (12) and (13) are exceeded, the length of the zoom lens system increases and the back focal length decreases to increase the rear lens diameter (the diameter of the fourth lens unit Gr4). When the lower limits of the conditions (12) and (13) are exceeded, it is difficult to sufficiently correct aberrations. Particularly, it is difficult to correct chromatic aberration into well-balanced condition in the entire zoom range. Even if sufficient correction could be made, the optical system would hardly be processible because the lens elements constituting the third lens unit Gr3 are too thin.

By using an aspherical surface in the third lens unit Gr3 like in the first to tenth embodiments, more excellent optical quality is obtained. It is desirable for the aspherical surface to fulfill the following condition (14) with respect to a given height y in the direction vertical to the optical axis where 0<y<Ymax:

$$-0.01 < \phi 3 \cdot (N'-N) \cdot d\{X(y)-X0(y)\}/dy < 0.003 \quad (14)$$

Here, $\phi 3$ is the refractive power of the third lens unit.

When the upper limit of the condition (14) is exceeded, spherical aberration shows a marked tendency to incline toward the under side in the entire zoom range and inward coma is generated on the wide-angle side. When the lower limit of the condition (14) is exceeded, spherical aberration shows a marked tendency to incline toward the over side and outward coma is generated on the wide-angle side.

In the third lens unit Gr3, it is desirable to provide an aspherical surface on the most object side lens element (desirably, on its object side surface) or on the most image side lens element (desirably, on its image side surface). According to the former arrangement, the correction of spherical aberration is facilitated. According to the latter arrangement, the correction of coma is facilitated.

It is desirable for the third lens unit Gr3 to fulfill the following condition(15):

$$0.1 < f3/fT < 0.5 \quad (15)$$

where f3 is the focal length of the third lens unit.

When the upper limit of the condition (15) is exceeded, the refractive power of the third lens unit Gr3 is too strong, so that the length of the zoom lens system at the wide-angle end increases and the movement amount of the third lens unit Gr3 during zooming increases to increase the length of the zoom lens system at the telephoto end. When the lower limit of the condition (15) is exceeded, the refractive power of the third lens unit Gr3 is too strong, so that spherical aberration shows a marked tendency to incline toward the under side in the entire zoom range.

Next, a desirable arrangement for the fourth lens unit Gr4 will be described. It is desirable for the fourth lens unit Gr4 to have a positive lens element on its most object side and have a negative lens element on its most image side. By the employment of the telephoto-type arrangement, the back focal length is minimized. It is further desirable for the fourth lens unit Gr4 to consist of a positive lens element and a negative lens element from the object side like in the first to tenth embodiments. By this arrangement, the fourth lens unit Gr4 is further reduced in size in the direction of the optical axis to achieve size reduction of the zoom lens system.

By using an aspherical surface in the fourth lens unit Gr4 like in the first to tenth embodiments, more excellent optical quality is obtained. It is desirable for the aspherical surface to fulfill the following condition (16) with respect to a given height y in the direction vertical to the optical axis where 0.5Ymax<y<Ymax:

$$-0.05 < \phi 4 \cdot (N'-N) \cdot d\{X(y)-X0(y)\}/dy < 0.01 \quad (16)$$

Here, $\phi 4$ is the refractive power of the fourth lens unit.

When the upper limit of the condition (16) is exceeded, positive distortion and field curvature show a marked tendency to excurse toward the positive side in the range between the wide-angle end and the middle focal length condition, and spherical aberration inclines toward the over side on the telephoto side. When the lower limit of the condition (16) is exceeded, negative distortion and field curvature show a marked tendency to excurse toward the positive side in the range between the wide-angle end and the middle focal length condition, and spherical aberration inclines toward the under side on the telephoto side.

By using a bi-aspherical lens as the lens element having an aspherical surface or by providing an aspherical surface on each of the most object side surface and the most image side surface of the fourth lens unit Gr4, spherical aberration, distortion and field curvature are corrected into better-balanced condition. That is, spherical aberration, distortion and field curvature which cannot be sufficiently corrected by one aspherical surface are corrected by the other aspherical surface. In this case, it is desirable that the aspherical surfaces both fulfill the above-described condition (16).

It is desirable for the fourth lens unit Gr4 to fulfill the following condition (17):

$$0.1 < |f4|/fT < 0.4 \quad (17)$$

where f4 is the focal length of the fourth lens unit.

When the upper limit of the condition (17) is exceeded, the refractive power of the fourth lens unit Gr4 is too weak, so that the length of the zoom lens system at the wide-angle end increases. When the lower limit of the condition (17) is exceeded, the refractive power of the fourth lens unit Gr4 is too strong, the generation of positive distortion is great and spherical aberration shows a marked tendency to incline toward the over side on the telephoto side.

<Five-Unit Zoom Lens System Having Four Lens Component of Positive, Negative, Positive, Negative Configuration Where First Lens Component Is Moved with Floating During Zooming (Eleventh Embodiment)>

The eleventh embodiment is a five-unit zoom lens system having, from the object side, a first lens unit Gr1 of negative refractive power, a second lens unit Gr2 of positive refractive power, a third lens unit Gr3 of negative refractive power, a fourth lens unit Gr4 of positive refractive power and a fifth lens unit Gr5 of negative refractive power. The first lens unit Gr1 and the second lens unit Gr2 constitute a first lens component. The third lens unit Gr3 constitutes a second lens component. The fourth lens unit Gr4 constitutes a third lens component. The fifth lens unit Gr5 constitutes a fourth lens component. Between the third lens unit Gr3 and the fourth lens unit Gr4 is disposed a half prism HP for reflecting the luminous flux having passed through the third lens unit Gr3 to split the luminous flux. The first lens unit Gr1 to the fifth lens unit Gr5 are moved forward as shown by arrows m1 to m5 of FIG. 25 during zooming from the wide-angle end [W] to the telephoto end [T]. At this time, the distance between the first lens unit Gr1 and the second lens unit Gr2 decreases, the distance between the second lens unit Gr2 and the third lens unit Gr3 increases, the distance between the third lens unit Gr3 and the fourth lens unit Gr4 decreases, and the distance between the fourth lens unit Gr4 and the fifth lens unit Gr5 decreases.

In the eleventh embodiment, the lens units are arranged as follows: The first lens unit Gr1 includes a negative meniscus lens element concave to the image side. The image side surface of the lens element is aspherical. The second lens unit Gr2 includes a positive meniscus lens element convex to the object side. The third lens unit Gr3 includes from the object side a negative bi-concave lens element and a positive meniscus lens element convex to the object side. The object side surface of the negative lens element and the image side surface of the positive meniscus lens element are aspherical.

The fourth lens unit Gr4 includes from the object side a lens shutter S1 also used as the aperture diaphragm, a negative meniscus lens element concave to the image side, a positive bi-convex lens element and a luminous flux restricting plate S2. The image side surface of the positive lens element is aspherical. The fifth lens unit Gr5 includes from the object side a positive meniscus lens element convex to the image side and a negative bi-concave lens element. Both side surfaces of the positive meniscus lens element are aspherical. The lens shutter S1 also used as the aperture diaphragm and the luminous flux restricting plate S2 are compatible with each other in design.

The eleventh embodiment is a five-unit zoom lens system where the distance d2 between the first lens unit Gr1 and the second lens unit Gr2 slightly decreases during zooming from the wide-angle side to the telephoto side as shown in FIG. 25. That is, in a four-component zoom lens system of positive, negative, positive, negative configuration, the first lens component is divided into the first lens unit Gr1 and the second lens unit Gr2 and moved with floating during zooming. By the floating, spherical aberration and the inclination of the image plane toward the negative side on the telephoto side are corrected. By thus disposing three zooming lens units having negative, positive, negative refractive power from the object side in front of the half prism HP, the angle at which the off-axial luminous flux is incident on the zooming lens units situated in the rear of the first lens unit Gr1 of negative refractive power is gentler, so that aberrations are advantageously corrected by the succeeding lens units.

If the reflecting means such as the half prism HP is disposed in the middle of a zoom lens system, the zooming lens units situated in front thereof and the zooming lens units situated in the rear thereof are more independent of each other, so that it is necessary to excellently correct aberrations for both the zooming lens units situated in front and in the rear of the half prism HP. In the eleventh embodiment, since three zooming lens units are disposed in front of the half prism HP, aberrations in front of the half prism HP are sufficiently corrected. On the other hand, since the fourth lens unit Gr4 of positive refractive power and the fifth lens unit Gr5 of negative refractive power are disposed in the rear of the half prism HP, aberrations in the rear of the half prism HP are also sufficiently corrected.

Additionally, since a sufficient zooming amount is secured by the first lens unit Gr1 to the third lens unit Gr3 situated in front of the half prism HP, in the case where the luminous flux is directed to the finder optical system by splitting the luminous flux by the half prism HP, the burden imposed on the finder optical system during zooming is lightened, and accordingly, the structure of the finder optical system is simplified while the zoom ratio of the zoom lens system is increased.

In the zoom lens system according to the eleventh embodiment, as mentioned above, the half prism HP for reflecting the luminous flux having passed through the third lens unit Gr3 to split the luminous flux is disposed between the third lens unit Gr3 and the fourth lens unit Gr4. According to this arrangement, the luminous flux incident on the zoom lens system is split into two optically equivalent luminous fluxes by the half prism HP, so that no parallax is caused. Since the half prism HP is disposed in the middle of the zoom lens system, the back focal length is reduced and the half prism HP is reduced in size.

Additionally, in the substantially four-component zoom lens systems of positive (negative, positive), negative, positive, negative configuration like the eleventh embodiment where the first lens component is divided into the first lens unit Gr1 of negative refractive power and the second lens unit Gr2 of positive refractive power and moved with floating during zooming, the axial and off-axial luminous fluxes both pass the lowest positions (i.e. in the vicinity of the optical axis AX) between the third lens unit Gr3 and the fourth lens unit Gr4, so that the half prism HP disposed between the third lens unit Gr3 and the fourth lens unit Gr4 is further reduced in size along the diameter (i.e. in the direction vertical to the optical axis AX). Since the half prism HP is reduced in size in the direction of the optical axis AX if it is reduced in size along the diameter, the actual axial distance between the third lens unit Gr3 and the fourth lens unit Gr4 (i.e. the distance between the most image side lens surface of the third lens unit Gr3 and the most object side lens surface of the third lens unit Gr4) is reduced by the size reduction of the half mirror HP. As a result, the zoom lens system is reduced in length.

In the eleventh embodiment, since the half prism HP reflects the luminous flux between the zooming lens units to split the luminous flux, the structure of the lens barrel is simple and it is easier in manufacture to maintain the optical quality of the zooming lens units than an arrangement where the luminous flux is reflected in the middle of one zooming lens unit. Moreover, in the eleventh embodiment, since the first lens unit Gr1 has positive refractive power, the generation of aberrations is effectively restrained by limiting the height of the axial luminous flux with the first lens unit Gr1.

In the zoom lens system according to the eleventh embodiment, the half prism HP is moved integrally with the fourth lens unit Gr4 during zooming, so that the zoom lens system is reduced in size. As mentioned above, in the substantially four-component zoom lens system of positive (negative, positive), negative, positive, negative configuration, the luminous flux is thinnest (i.e. condensed) in the vicinity of the fourth lens unit Gr4. For this reason, the size along the diameter (i.e. the size in the direction vertical to the optical axis AX) of the half prism HP is minimized, so that the half prism HP is also reduced in size in the direction of the optical axis AX. Since the space is effectively used by the size reduction of the half prism HP, the actual axial distance between the third lens unit Gr3 and the fourth lens unit Gr4 is reduced to reduce the length of the zoom lens system.

In the eleventh embodiment, since the lens shutter S1 also used as the aperture diaphragm is provided in the rear of the half prism HP, the luminous flux increases in diameter as it approaches the third lens unit Gr3 situated immediately in front of the half prism HP. On the other hand, in the eleventh embodiment, since the half prism HP is moved integrally with a zooming lens unit situated immediately in the rear thereof (i.e. the fourth lens unit Gr4) during zooming, the distance between the fourth lens unit Gr4 and the half prism HP does not vary and the distance between the third lens unit Gr3 and the half prism HP varies. Consequently, the luminous flux diameter to be covered by the half prism HP is minimized, so that size reduction of the half prism HP is achieved. This arrangement is advantageous in lens barrel structure since the burden such as weight imposed on the driving mechanism for zooming is lightened because of the size reduction of the half prism HP.

In the zoom lens system according to the eleventh embodiment, since the zooming lens unit situated immediately in front of the half prism HP (i.e. the third lens unit) has negative refractive power, the off-axial luminous flux incident on the half prism HP forms a small angle to the axial luminous flux (i.e. approaches afocal condition).

Consequently, the luminous flux diameter to be covered by the half prism HP is minimized, so that size reduction of the half prism HP is reduced. This arrangement is advantageous in lens barrel structure since the burden such as weight imposed on the driving mechanism for zooming is lightened because of the size reduction of the half prism HP. Additionally, since the off-axial luminous flux nearly afocal with respect to the optical axis does not spread so much when it is reflected by the half prism HP, the diameter of the optical system situated in the rear of the half prism HP (i.e. the finder optical system and a part of the taking optical system situated in the rear of the reflecting means) is minimized. Thus, by the size reduction of the half prism HP and the optical system situated in the rear thereof, size reduction of the zoom lens system and the finder optical system is achieved.

In the eleventh embodiment, in order to achieve size reduction of the zoom lens system, it is desirable to fulfill the above-described condition (1). In order to realize a zoom lens system being compact and having a high zoom ratio while maintaining high optical quality, it is desirable to fulfill the above-described condition (2).

In order to dispose the reflecting means such as the half prism HP between the third lens unit Gr3 and the fourth lens unit Gr4, it is desirable to fulfill the following condition (3a) under a condition where the reflecting means such as the half prism HP is disposed:

$$0.25 < T(3-4)/fW \tag{3a}$$

where T(3–4) is the distance between the most image side lens surface of the third lens unit and the most object side lens surface of the fourth lens unit at the wide-angle end.

When the lower limit of the condition (3a) is exceeded, the distance T(3–4) between the third lens unit Gr3 and the fourth lens unit Gr4 is too short, so that it is difficult to structure the lens barrel so that the reflecting means is disposed between the third lens unit Gr3 and the fourth lens unit Gr4.

It is desirable for the third lens unit Gr3 and the fourth lens unit Gr4 to fulfill the following condition (4a) with respect to the zooming movement amount:

$$0.5 < M3/M4 < 0.95 \tag{4a}$$

where M4 is the movement amount of the fourth lens unit during zooming from the wide-angle end to the telephoto end.

When the upper limit of the condition (4a) is exceeded, the zooming movements of the third lens unit Gr3 and the fourth lens unit Gr4 are substantially the same, so that only advantages substantially the same as those produced by three-unit zoom lens systems are obtained, and if the zoom ratio is increased, the movement amount increases to increase the size of the optical system. When the lower limit of the condition (4a) is exceeded, the difference in movement amount between the third lens unit Gr3 and the fourth lens unit Gr4 increases, so that the distance between the third lens unit Gr3 and the fourth lens unit Gr4 increases at the wide-angle end. Consequently, the height of the axial luminous flux incident on the fourth lens unit Gr4 increases, so that it is difficult to correct spherical aberration and the length of the zoom lens system at the wide-angle end increases.

Next, the structural features of the zooming lens units will be described. First, those of the first lens unit Gr1 and the second lens unit Gr2 will be described. In the eleventh embodiment, the first lens unit Gr1 includes a negative lens element and the second lens unit includes a positive lens element. According to this arrangement, the off-axial luminous flux having passed through the negative lens element is incident on the positive lens element at an angle gentler than its incident angle to the negative lens element, so that the aberration correction of the off-axial luminous flux on the wide-angle side where the angle of view is wide is facilitated.

It is desirable for the first lens unit Gr1 and the second lens unit Gr2 to fulfill the following condition (5a):

$$0.4 < f1,2/fT < 0.7 \tag{5a}$$

where f1,2 is the composite focal length of the first and second lens units.

When the upper limit of the condition (5a) is exceeded, the generation of negative distortion is great on the wide-angle side and spherical aberration shows a marked tendency to incline toward the over side on the telephoto side. When the lower limit of the condition (5a) is exceeded, the composite refractive power of the first lens unit Gr1 and the second lens unit Gr2 is too strong, so that the generation of positive distortion is great on the wide-angle side and spherical aberration shows a marked tendency to incline toward the under side on the telephoto side.

By using an aspherical surface in the first lens unit Gr1 or by using an aspherical surface in the second lens unit Gr2, more excellent optical quality is obtained. It is desirable for the aspherical surface to fulfill the following condition (6a) with respect to a given height y in the direction vertical to the optical axis where $0.5Y\max < y < Y\max$:

$$-0.04 < \phi 1,2 \cdot (N'-N) \cdot d\{X(y)-X0(y)\}/dy < 0.005 \tag{6a}$$

Here, $\phi 1,2$ is the composite refractive power of the first and second lens units.

The condition (6a) is a condition for correcting off-axial aberrations (particularly, distortion) on the wide-angle side and spherical aberration on the telephoto side into well-balanced condition. When the upper limit of the condition (6a) is exceeded, the generation of negative distortion is great on the wide-angle side and spherical aberration shows a marked tendency to incline toward the over side on the telephoto side. When the lower limit of the condition (6a) is exceeded, positive distortion increases on the wide-angle side and spherical aberration shows a marked tendency to incline toward the under side on the telephoto side.

Next, a desirable arrangement for the third lens unit Gr3 will be described. It is desirable for the third lens unit Gr3 to have a negative lens element on its most object side and have a positive lens element on its most image side. It is further desirable for the third lens unit to consist of a negative lens element and a positive lens element from the object side like in the eleventh embodiment. According to this arrangement, it is facilitated to set the back focal length to a predetermined length and it is also facilitated to correct coma and spherical aberration into well-balanced condition in the entire zoom range.

It is desirable for the negative lens element disposed on the most object side in the third lens unit Gr3 to fulfill the above-described condition(7). Since the third lens unit Gr3 of the eleventh embodiment corresponds to the second lens unit Gr2 of the first to tenth embodiments, the advantages produced by fulfilling the condition (7) are the same as those in the first to tenth embodiments.

In order to realize a zoom lens system being compact and having high optical quality, it is desirable for the third lens unit Gr3 to fulfill the following conditions (8a) and (9a):

$$0.05 < D3/fW < 0.40 \quad (8a)$$

$$0.01 < D3/fT < 0.08 \quad (9a)$$

When the upper limits of the conditions (8a) and (9a) are exceeded, the length of the zoom lens system increases, and the front lens diameter (the diameter of the first lens unit Gr1) increases because the distance between the first lens unit Gr1 and the entrance pupil increases. When the lower limits of the conditions (8a) and (9a) are exceeded, it is difficult to sufficiently correct aberrations. Particularly, it is difficult to correct chromatic aberration into well-balanced condition. Even if sufficient correction could be made, the optical system would hardly be processible.

By using an aspherical surface in the third lens unit Gr3 like in the eleventh embodiment, more excellent optical quality is obtained. It is desirable for the aspherical surface to fulfill the following condition (10a) with respect to a given height y in the direction vertical to the optical axis where 0<y<Ymax:

$$-0.1 < \phi 3 \cdot (N'-N) \cdot d\{X(y)-X0(y)\}/dy < 0.01 \quad (10a)$$

When the upper limit of the condition (10a) is exceeded, spherical aberration shows a marked tendency to incline toward the under side in the entire zoom range and the generation of flare of the off-axial luminous flux is great on the telephoto side. On the wide-angle side, outside coma is generated. When the lower limit of the condition (10a) is exceeded, spherical aberration shows a marked tendency to incline toward the over side in the entire zoom range and flare of the off-axial luminous flux shows a marked tendency to be overcorrected on the telephoto side. On the wide-angle side, inward coma is generated.

In the third lens unit Gr3, it is desirable to provide an aspherical surface on the most object side lens element (desirably, on its object side surface) or on the most image side lens element (desirably, on its image side surface). According to the former arrangement, the correction of coma on the wide-angle side is facilitated. According to the latter arrangement, the correction of spherical aberration is facilitated.

By using a bi-aspherical lens as the lens element having an aspherical surface or by providing an aspherical surface on each of the most object side surface and the most image side surface, spherical aberration, flare of the off-axial luminous flux on the telephoto side and coma on the wide-angle side are corrected into well-balanced condition. That is, spherical aberration, flare and coma which cannot be sufficiently corrected by one aspherical surface are corrected by the other aspherical surface. In this case, it is desirable that the aspherical surfaces both fulfill the above-described condition (10a).

It is desirable for the third lens unit Gr3 to fulfill the following condition (11a):

$$0.1 < |f3|/fT < 0.5 \quad (11a)$$

When the upper limit of the condition (11a) is exceeded, the refractive power of the third lens unit Gr3 is too weak, so that the length of the zoom lens system at the wide-angle end increases and the movement amount of the third lens unit Gr3 during zooming increases to increase the length of the zoom lens system at the telephoto end. When the lower limit of the condition (11a) is exceeded, the refractive power of the third lens unit Gr3 is too strong, so that inward coma is generated on the wide-angle side and spherical aberration shows a marked tendency to incline toward the over side on the telephoto side.

Next, a desirable arrangement for the fourth lens unit Gr4 will be described. In the substantially four-component zoom lens system of positive (negative, positive), negative, positive, negative configuration like the eleventh embodiment, in order to realize a zoom lens system being compact and having high optical quality, it is desirable for the fourth lens unit Gr4 to fulfill the following conditions (12a) and (13a):

$$0.05 < D4/fW < 0.40 \quad (12a)$$

$$0.01 < D4/fT < 0.08 \quad (13a)$$

where D4 is the thickness of the fourth lens unit in the direction of the optical axis (the axial distance between the most object side lens surface and the most image side lens surface).

When the upper limits of the conditions (12a) and (13a) are exceeded, the length of the zoom lens system increases and the back focal length decreases to increase the rear lens diameter (the diameter of the fifth lens unit Gr5). When the lower limits of the conditions (12a) and (13a) are exceeded, it is difficult to sufficiently correct aberrations. Particularly, it is difficult to correct chromatic aberration into well-balanced condition. Even if sufficient correction could be made, the optical system would hardly be processible.

By using an aspherical surface in the fourth lens unit Gr4 like in the eleventh embodiment, more excellent optical quality is obtained. It is desirable for the aspherical surface to fulfill the following condition (14a) with respect to a given height y in the direction vertical to the optical axis where 0<y<Ymax:

$$-0.01 < \phi 4 \cdot (N'-N) \cdot d\{X(y)-X0(y)\}/dy < 0.003 \quad (14a)$$

When the upper limit of the condition (14a) is exceeded, spherical aberration shows a marked tendency to incline toward the under side in the entire zoom range and inward coma is generated on the wide-angle side. When the lower limit of the condition (14a) is exceeded, spherical aberration shows a marked tendency to incline toward the over side and outward coma is generated on the wide-angle side.

In the fourth lens unit Gr4, it is desirable to provide an aspherical surface on the most object side lens element (desirably, on its object side surface) or on the most image side lens element (desirably, on its image side surface). According to the former arrangement, the correction of spherical aberration is facilitated. On the other hand, according to the latter arrangement, the correction of coma is facilitated.

It is desirable for the fourth lens unit Gr4 to fulfill the following condition(15a):

$$0.1 < f4/fT < 0.5 \quad (15a)$$

When the upper limit of the condition (15a) is exceeded, the refractive power of the fourth lens unit Gr4 is too weak, so that the length of the zoom lens system at the wide-angle end increases and the movement amount of the fourth lens unit Gr4 during zooming increases to increase the length of the zoom lens system at the telephoto end. When the lower limit of the condition (15a) is exceeded, the refractive power of the fourth lens unit Gr4 is too strong, so that spherical aberration shows a marked tendency to incline toward the under side in the entire zoom range.

Next, a desirable arrangement for the fifth lens unit Gr5 will be described. It is desirable for the fifth lens unit Gr5 to have a positive lens element on its most object side and have a negative lens element on its most image side. By the employment of the telephoto-type arrangement, the back focal length is minimized. It is further desirable for the fifth lens unit Gr5 to consist of a positive lens element and a negative lens element from the object side like in the eleventh embodiment. By this arrangement, the fifth lens unit Gr5 is further reduced in size in the direction of the optical axis to achieve size reduction of the zoom lens system.

By using an aspherical surface in the fifth lens unit Gr5 like in the eleventh embodiment, more excellent optical quality is obtained. It is desirable for the aspherical surface to fulfill the following condition (16a) with respect to a given height y in the direction vertical to the optical axis where 0.5Ymax<y<Ymax:

$$-0.05 < \phi 5 \cdot (N'-N) \cdot d\{X(y) - X0(y)\}/dy < 0.01 \quad (16a)$$

Here, $\phi 5$ is the refractive power of the fifth lens unit.

When the upper limit of the condition (16a) is exceeded, positive distortion and field curvature show a marked tendency to excurse toward the positive side in the range between the wide-angle end and the middle focal length condition, and spherical aberration inclines toward the over side on the telephoto side. When the lower limit of the condition (16a) is exceeded, negative distortion and field curvature show a marked tendency to excurse toward the negative side in the range between the wide-angle end and the middle focal length condition, and spherical aberration inclines toward the under side on the telephoto side.

By using a bi-aspherical lens as the lens element having an aspherical surface or by providing an aspherical surface on each of the most object side surface and the most image side surface, spherical aberration, distortion and field curvature are corrected into better-balanced condition. That is, spherical aberration, distortion and field curvature which cannot be sufficiently corrected by one aspherical surface are corrected by the other aspherical surface. In this case, it is desirable that the aspherical surfaces both fulfill the above-described condition (16a).

It is desirable for the fifth lens unit Gr5 to fulfill the following condition (17a):

$$0.1 < |f5|/fT < 0.4 \quad (17a)$$

where f5 is the focal length of the fifth lens unit.

When the upper limit of the condition (17a) is exceeded, the refractive power of the fifth lens unit Gr5 is too weak, so that the length of the zoom lens system at the wide-angle end increases. When the lower limit of the condition (17a) is exceeded, the refractive power of the fifth lens unit Gr5 is too strong, the generation of positive distortion is great and spherical aberration shows a marked tendency to incline toward the over side on the telephoto side.

<Five-Unit Zoom Lens System Having Four Lens Component of Positive, Negative, Positive, Negative Configuration Where Second Lens Component Is Moved with Floating During Zooming (Twelfth Embodiment)>

The twelfth embodiment is a five-unit zoom lens system having, from the object side, a first lens unit Gr1 of positive refractive power, a second lens unit Gr2 of negative refractive power, a third lens unit Gr3 of positive refractive power, a fourth lens unit Gr4 of positive refractive power and a fifth lens unit Gr5 of negative refractive power. The first lens nit Gr1 constitutes a first lens component. The second lens unit Gr2 and the third lens unit Gr3 constitute a second lens component. The fourth lens unit Gr4 constitutes a third lens component. The fifth lens unit Gr5 constitutes a fourth lens component. Between the third lens unit Gr3 and the fourth lens unit Gr4 is disposed a half prism HP for reflecting the luminous flux having passed through the third lens unit Gr3 to split the luminous flux. The first lens unit Gr1 to the fifth lens unit Gr5 are moved forward as shown by arrows m1 to m5 of FIG. 27 during zooming from the wide-angle end [W] to the telephoto end [T]. At this time, the distance between the first lens unit Gr1 and the second lens unit Gr2 increases, the distance between the second lens unit Gr2 and the third lens unit Gr3 decreases, the distance between the third lens unit Gr3 and the fourth lens unit Gr4 decreases, and the distance between the fourth lens unit Gr4 and the fifth lens unit Gr5 decreases.

In the twelfth embodiment, the lens units are arranged as follows: The first lens unit Gr1 includes from the object side a negative meniscus lens element concave to the image side and a positive meniscus lens element convex to the object side. The image side surface of the negative meniscus lens element is aspherical. The second lens unit Gr2 includes a negative bi-concave lens element. The object side surface of the lens element is aspherical. The third lens unit Gr3 includes a positive meniscus lens element convex to the object side. The image side surface of the lens element is aspherical. The fourth lens unit Gr4 includes from the object side a lens shutter S1 also used as the aperture diaphragm, a negative meniscus lens element concave to the image side, a positive bi-convex lens element and a luminous flux restricting plate S2. The image side surface of the positive lens element is aspherical. The fifth lens unit Gr5 includes from the object side a positive meniscus lens element convex to the image side and a negative bi-concave lens element. Both side surfaces of the positive meniscus lens element are aspherical. The lens shutter S1 and the luminous flux restricting plate S2 are compatible with each other in design.

Figure 27:
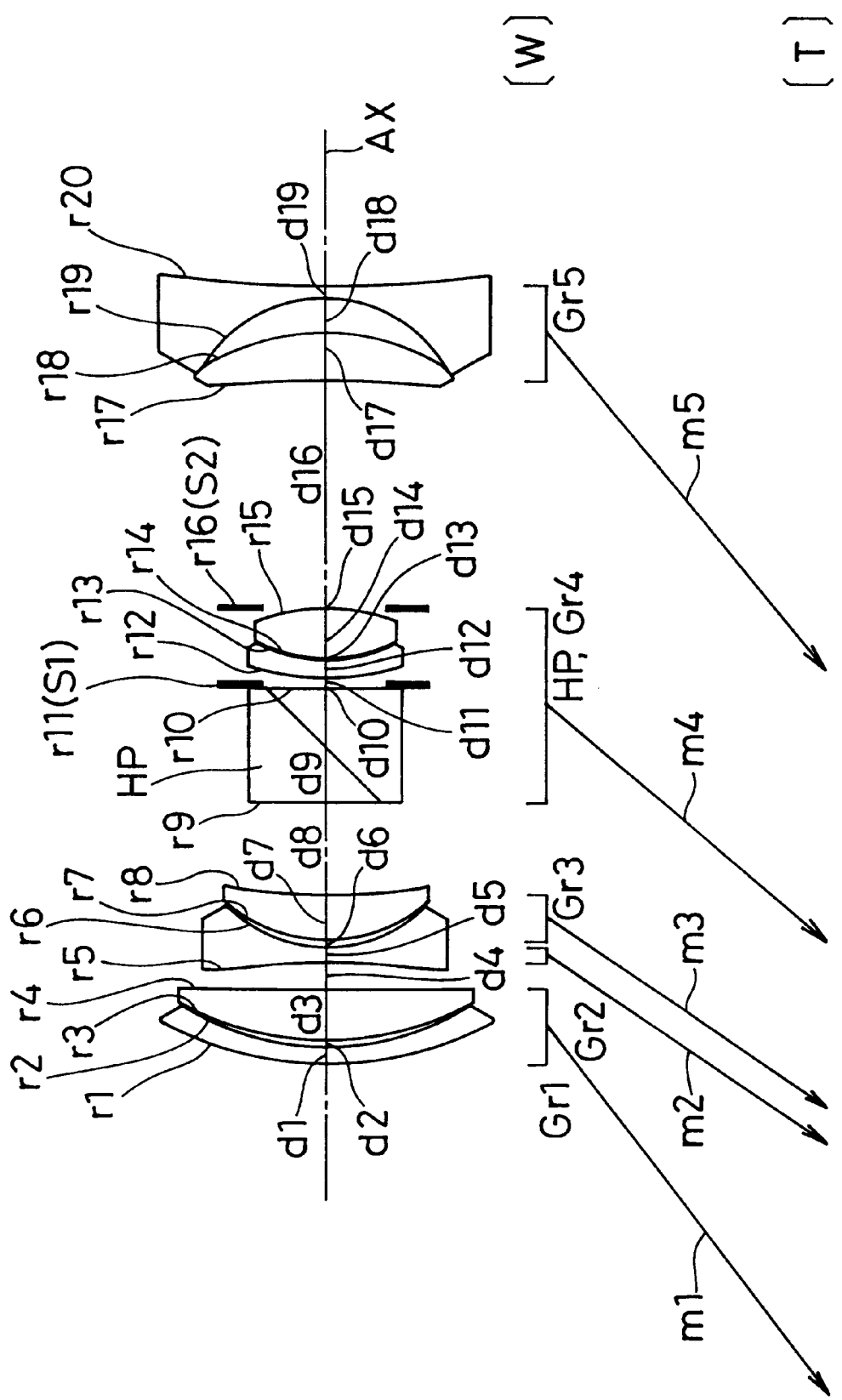
FIG. 27 is a diagram showing the lens construction of the twelfth embodiment of the present invention.
Figure 28A:
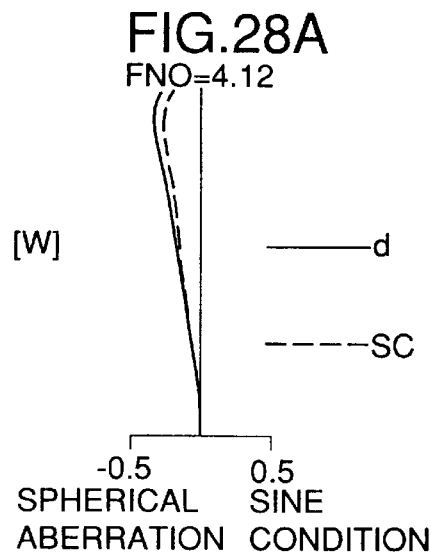
FIGS. 28A to 28I are diagrams showing aberrations observed in the twelfth embodiment focused for infinity.
Figure 28B:
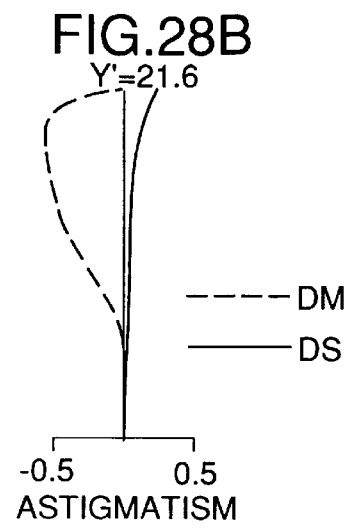
Figure 28C:
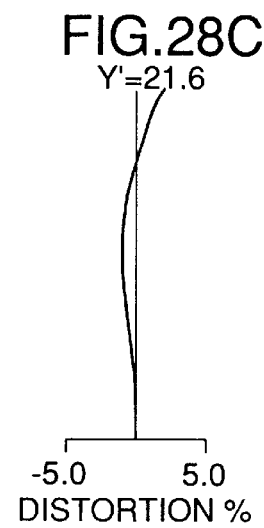
Figure 28D:
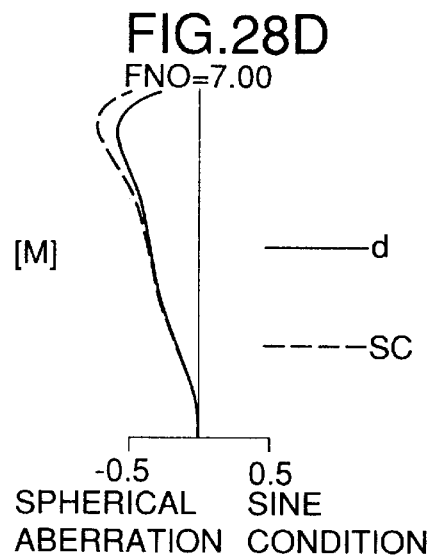
Figure 28E:
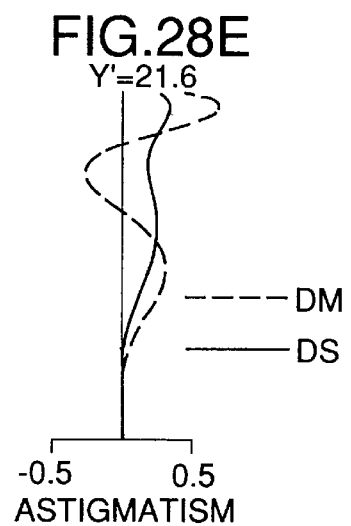
Figure 28F:
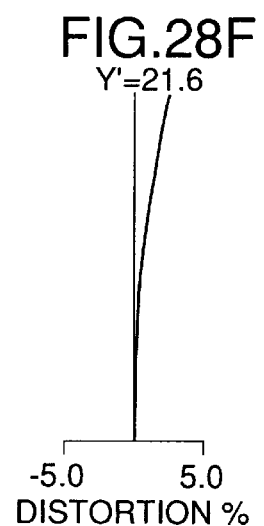
Figure 28G:
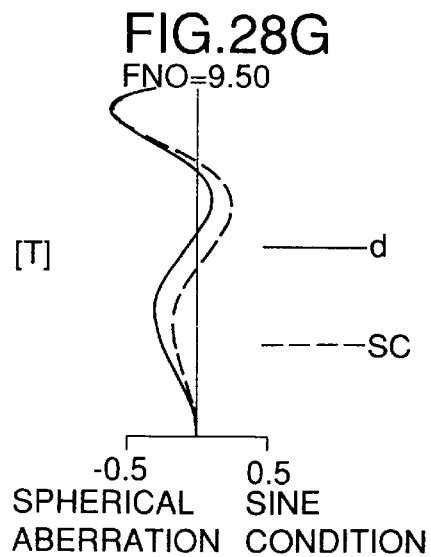
Figure 28H:
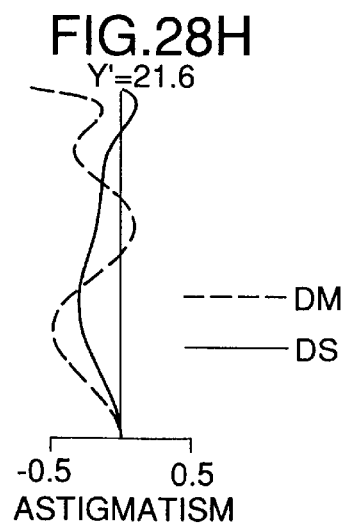
Figure 28I:
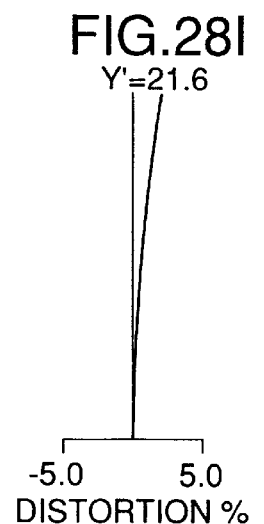

The twelfth embodiment is a five-unit zoom lens system where the distance d6 between the second lens unit Gr2 and the third lens unit Gr3 slightly varies during zooming as shown in FIG. 27. That is, in a four-component zoom lens system of positive, negative, positive, negative configuration, the second lens component is divided into the second lens unit Gr2 of negative refractive power and the third lens unit Gr3 of positive refractive power and moved with floating during zooming. By the floating, spherical aberration and the inclination of the image plane toward the negative side on the telephoto side are corrected. By thus disposing three zooming lens units having positive, negative, positive refractive power from the object side in front of the half prism HP, the height of the axial luminous flux is reduced by the zooming lens units situated in front of the half prism HP, so that aberrations of the axial luminous flux which are difficult to correct in telephoto lenses are corrected. Additionally, since the error sensitivity decreases, the manufacture of the zoom lens system is facilitated.

As described previously, if the reflecting means such as the half prism HP is disposed in the middle of a zoom lens system, the zooming lens units situated in front thereof and the zooming lens units situated in the rear thereof are more independent of each other, so that it is necessary to excellently correct aberrations for both the zooming lens units situated in front and in the rear of the half prism HP. In the twelfth embodiment, like in the eleventh embodiment, since three zooming lens units are disposed in front of the half prism HP, aberrations in front of the half prism HP are sufficiently corrected. On the other hand, since the fourth lens unit Gr4 of positive refractive power and the fifth lens unit Gr5 of negative refractive power are disposed in the rear of the half prism HP, aberrations in the rear of the half prism HP are also sufficiently corrected.

Additionally, since a sufficient zooming amount is secured by the first lens unit Gr1 to the third lens unit Gr3 situated in front of the half prism HP, in the case where the luminous flux is directed to the finder optical system by splitting the luminous flux by the half prism HP, the burden imposed on the finder optical system during zooming is lightened, and accordingly, the structure of the finder optical system is simplified while the zoom ratio of the zoom lens system is increased.

In the zoom lens system according to the twelfth embodiment, like in the eleventh embodiment, the half prism HP for reflecting the luminous flux having passed through the third lens unit Gr3 to split the luminous flux is disposed between the third lens unit Gr3 and the fourth lens unit Gr4. According to this arrangement, the luminous flux incident on the zoom lens system is split into two optically equivalent luminous fluxes by the half prism HP, so that no parallax is caused. Since the half prism HP is disposed in the middle of the zoom lens system, the back focal length is reduced and the half prism HP is reduced in size.

Additionally, in the substantially four-component zoom lens systems of positive, negative (negative, positive), positive, negative configuration like the twelfth embodiment where the second lens component is divided into the second lens unit Gr2 of negative refractive power and the third lens unit Gr3 of positive refractive power and moved with floating during zooming, like in the eleventh embodiment, the axial and off-axial luminous fluxes both pass the lowest positions (i. e. in the vicinity of the optical axis AX) between the third lens unit Gr3 and the fourth lens unit Gr4, so that the half prism HP disposed between the third lens unit Gr3 and the fourth lens unit Gr4 is further reduced in size along the diameter (i.e. in the direction vertical to the optical axis AX). Since the half prism HP is reduced in size in the direction of the optical axis AX if it is reduced in size along the diameter, the actual axial distance between the third lens unit Gr3 and the fourth lens unit Gr4 (i.e. the distance between the most image side lens surface of the third lens unit Gr3 and the most object side lens surface of the third lens unit Gr4) is reduced by the size reduction of the half mirror HP. As a result, the zoom lens system is reduced in length.

In the twelfth embodiment, like in the first to eleventh embodiments, since the half prism HP reflects the luminous flux between the zooming lens units to split the luminous flux, the structure of the lens barrel is simple and it is easier in manufacture to maintain the optical quality of the zooming lens units than an arrangement where the luminous flux is reflected in the middle of one zooming lens unit. Moreover, in the twelfth embodiment, since the first lens unit Gr1 has positive refractive power, the generation of aberrations is effectively restrained by limiting the height of the axial luminous flux with the first lens unit Gr1.

In the zoom lens system according to the twelfth embodiment, like in the eleventh embodiment, the half prism HP is moved integrally with the fourth lens unit Gr4 during zooming, so that a size reduction of the zoom lens system is achieved. As mentioned above, in the substantially four-component zoom lens system of positive, negative (negative, positive), positive, negative configuration, the luminous flux is thinnest (i.e. condensed) in the vicinity of the fourth lens unit Gr4. For this reason, the size along the diameter (i.e. the size in the direction vertical to the optical axis AX) of the half prism HP is minimized, so that the half prism HP is also reduced in size in the direction of the optical axis AX. Since the space is effectively used by the size reduction of the half prism HP, the actual axial distance between the third lens unit Gr3 and the fourth lens unit Gr4 is reduced to reduce the length of the zoom lens system.

In the twelfth embodiment, since the lens shutter S1 also used as the aperture diaphragm is provided in the rear of the half prism HP, the luminous flux increases in diameter as it approaches the third lens unit Gr3 situated immediately in front of the half prism HP. On the other hand, in the twelfth embodiment, since the half prism HP is moved integrally with a zooming lens unit situated immediately in the rear thereof (i.e. the fourth lens unit Gr4) during zooming, the distance between the fourth lens unit Gr4 and the half prism HP does not vary and the distance between the third lens unit Gr3 and the half prism HP varies. Consequently, the luminous flux diameter to be covered by the half prism HP is minimized, so that size reduction of the half prism HP is achieved. This arrangement is advantageous in lens barrel structure since the burden such as weight imposed on the driving mechanism for zooming is lightened because of the size reduction of the half prism HP.

In the zoom lens system according to the twelfth embodiment, since the composite refractive power of the second lens unit Gr2 and the third lens unit Gr3 situated in front of the half prism HP is negative, the off-axial luminous flux incident on the half prism HP forms a small angle to the axial luminous flux (i.e. approaches afocal condition). Consequently, the luminous flux diameter to be covered by the half prism HP is minimized, so that the size reduction of the half prism HP is achieved. This arrangement is advantageous in lens barrel structure since the burden such as weight imposed on the driving mechanism for zooming is lightened because of the size reduction of the half prism HP. Additionally, since the off-axial luminous flux nearly afocal with respect to the optical axis does not spread so much when it is reflected by the half prism HP, the diameter of the optical system situated in the rear of the half prism HP (i.e. the finder optical system and a part of the taking optical system situated in the rear of the reflecting means) is minimized. Thus, by the size reduction of the half prism HP and the optical system situated in the rear thereof, size reduction of the zoom lens system and the finder optical system is achieved.

In the twelfth embodiment, in order to achieve size reduction of the zoom lens system, it is desirable to fulfill the above-described condition (1). In order to realize a zoom lens system being compact and having a high zoom ratio while maintaining high optical quality, it is desirable to fulfill the above-described condition (2).

In order to dispose the reflecting means such as the half prism HP between the third lens unit Gr3 and the fourth lens unit Gr4, it is desirable to fulfill the above-described condition (3a) like in the eleventh embodiment. Moreover, it is desirable for the third lens unit Gr3 and the fourth lens unit Gr4 to fulfill the above-described condition (4a) like in the eleventh embodiment. Further, it is desirable for the second lens unit Gr2 and the fourth lens unit Gr4 to fulfill the following condition (4b) with respect to the zooming movement amount:

$$0.5 < M2/M4 < 0.95 \qquad (4b)$$

When the upper limit of the conditions (4a) and (4b) is exceeded, the zooming movements of the second lens unit Gr2 to the fourth lens unit Gr4 are substantially the same, so that only advantages substantially the same as those produced by three-unit zoom lens systems are obtained, and if the zoom ratio is increased, the movement amount increases to increase the size of the optical system. When the lower limit of the conditions (4a) and (4b) is exceeded, the difference in movement amount between the second lens unit Gr2 and the third lens unit Gr3 and the fourth lens unit Gr4 increases, so that the distance between the third lens unit Gr3 and the fourth lens unit Gr4 increases at the wide-angle end. Consequently, the height of the axial luminous flux incident on the fourth lens unit Gr4 increases, so that it is difficult to correct spherical aberration and the length of the zoom lens system at the wide-angle end increases.

Next, the structural features of the zooming lens units will be described. With respect to the first lens unit Gr1, its structural features are the same as those of the above-described first to tenth embodiments, and for example, it is desirable to fulfill the above-described conditions (5) and (6). With respect to the fourth lens unit Gr4 and the fifth lens unit Gr5, their structural features are the same as those of the above-described eleventh embodiment, and for example, it is desirable to fulfill the above-described conditions (12a), (13a), (14a), (15a), (16a) and (17a).

Desirable arrangements for the second lens unit Gr2 and the third lens unit Gr3 will be described. It is desirable for the second lens unit Gr2 to have a negative lens element on its most object side and for the third lens unit Gr3 to have a positive lens element on its most image side. It is further desirable for the second lens unit Gr2 to consist of a negative lens element and for the third lens unit Gr3 to consist of the positive lens element like in the twelfth embodiment. According to this arrangement, it is facilitated to set the back focal length to a predetermined length and it is also facilitated to correct coma and spherical aberration into well-balanced condition in the entire zoom range.

It is desirable for the negative lens element disposed on the most object side in the second lens unit Gr2 to fulfill the above-described condition (7). Since the third lens unit Gr3 of the twelfth embodiment corresponds to the object side negative lens element in the second lens unit Gr2 of the first to tenth embodiments, the advantages produced by fulfilling the condition (7) are the same as those in the first to tenth embodiments.

In order to realize a zoom lens system being compact and having high optical quality, it is desirable for the second lens unit Gr2 and the third lens unit Gr3 to fulfill the following conditions (8b) and (9b):

$$0.05 < D2,3/fW < 0.40 \tag{8b}$$

$$0.01 < D2,3/fT < 0.08 \tag{9b}$$

where D2,3 is the thickness of the second and third lens units in the direction of the optical axis (i.e. the axial distance between the most object side lens surface of the second lens unit and the most image side lens surface of the third lens unit).

When the upper limits of the conditions (8b) and (9b) are exceeded, the length of the zoom lens system increases, and the front lens diameter (the diameter of the first lens unit Gr1) increases because the distance between the first lens unit Gr1 and the entrance pupil increases. When the lower limits of the conditions (8b) and (9b) are exceeded, it is difficult to sufficiently correct aberrations. Particularly, it is difficult to correct chromatic aberration into well-balanced condition. Even if sufficient correction could be made, the optical system would hardly be processible.

By using an aspherical surface in the second lens unit Gr2 or by using an aspherical surface in the third lens unit Gr3, more excellent optical quality is obtained. It is desirable for the aspherical surface to fulfill the following condition (10b) with respect to a given height y in the direction vertical to the optical axis where 0<y<Ymax:

$$-0.1 < \phi 2,3 \cdot (N'-N) \cdot d\{X(y)-X0(y)\}/dy < 0.01 \tag{10b}$$

where $\phi 2,3$ is the composite refractive power of the second and third lens units.

When the upper limit of the condition (10b) is exceeded, spherical aberration shows a marked tendency to incline toward the under side in the entire zoom range, and the generation of flare of the off-axial luminous flux is great on the telephoto side. On the wide-angle side, outside coma is generated. When the lower limit of the condition (10b) is exceeded, spherical aberration shows a marked tendency to incline toward the over side in the entire zoom range, and flare of the off-axial luminous flux shows a marked tendency to be overcorrected on the telephoto side. On the wide-angle side, inward coma is generated.

It is desirable to provide an aspherical surface on the most object side lens element (desirably, on its object side surface) in the second lens unit Gr2 or on the most image side lens element (desirably, on its image side surface) in the third lens unit Gr3. According to the former arrangement, the correction of coma on the wide-angle side is facilitated. According to the latter arrangement, the correction of spherical aberration is facilitated.

By using a bi-aspherical lens as the lens element having an aspherical surface or by providing an aspherical surface on each of the most object side surface and the most image side surface, spherical aberration, flare of the off-axial luminous flux on the telephoto side and coma on the wide-angle side are corrected into better-balanced condition. That is, spherical aberration, flare and coma which cannot be sufficiently corrected by one aspherical surface are corrected by the other aspherical surface. In this case, it is desirable that the aspherical surfaces both fulfill the above-described condition (10b).

It is desirable for the second lens unit Gr2 and the third lens unit Gr3 to fulfill the following condition (11b):

$$0.1 < |f2,3|/fT < 0.5 \tag{11b}$$

where f2,3 is the composite focal length of the second and third lens units.

When the upper limit of the condition (11b) is exceeded, the composite refractive power of the second lens unit Gr2 and the third lens unit Gr3 is too weak, so that the length of the zoom lens system at the wide-angle end increases and the movement amounts of the second lens unit Gr2 and the third lens unit Gr3 during zooming increases to increase the length of the zoom lens system at the telephoto end. When the lower limit of the condition (11b) is exceeded, the composite refractive power of the second lens unit Gr2 and the third lens unit Gr3 is too strong, so that inward coma is generated on the wide-angle side and spherical aberration shows a marked tendency to incline toward the over side on the telephoto side.

<Six-Unit Zoom Lens System Having Four Lens Component of Positive, Negative, Positive, Negative Configuration Where Third Lens Component Is Moved with Floating During Zooming (Thirteenth Embodiment)>

The thirteenth embodiment is a six-unit zoom lens system having, from the object side, a first lens unit Gr1 of positive refractive power, a second lens unit Gr2 of negative refractive power, a third lens unit Gr3 of no refractive power, a fourth lens unit Gr4 of negative refractive power, a fifth lens unit Gr5 of positive refractive power and a sixth lens unit Gr6 of negative refractive power. The first lens unit Gr1 constitutes a first lens component. The second lens unit Gr2 constitutes a second lens component. The third lens unit Gr3 to the fifth lens unit Gr5 constitute a third lens component.

The sixth lens unit Gr6 constitutes a fourth lens component. Between the second lens unit Gr2 and the third lens unit Gr3 is disposed a half prism HP for reflecting the luminous flux having passed through the second lens unit Gr2 to split the luminous flux. The first lens unit Gr1 to the sixth lens unit Gr6 are moved forward as shown by arrows m1 to m6 of FIG. 29 during zooming from the wide-angle end [W] to the telephoto end [T]. At this time, the distance between the first lens unit Gr1 and the second lens unit Gr2 increases, the distance between the second lens unit Gr2 and the third lens unit Gr3 decreases, the distance between the third and fourth lens units decreases, the distance between the fourth lens unit Gr4 and the fifth lens unit Gr5 increases, and the distance between the fifth lens unit Gr5 and the sixth lens unit Gr6 decreases.

In the thirteenth embodiment, the lens units are arranged as follows: The first lens unit Gr1 includes from the object side a negative meniscus lens element concave to the image side and a positive meniscus lens element convex to the object side. The image side surface of the negative meniscus lens element is aspherical. The second lens unit Gr2 includes from the object side a negative bi-concave lens element and a positive meniscus lens element convex to the object side. The object side surface of the negative lens element and the image side surface of the positive meniscus lens element are aspherical. The third lens unit Gr3 includes a lens shutter S1 also used as the aperture diaphragm. The fourth lens unit Gr4 includes a negative meniscus lens element concave to the image side. The fifth lens unit Gr5 includes a positive bi-convex lens element and a luminous flux restricting plate S2. The image side surface of the positive lens element is aspherical. The sixth lens unit Gr6 includes from the object side a positive meniscus lens element convex to the image side and a negative bi-concave lens element. Both side surfaces of the positive meniscus lens element are aspherical. The lens shutter S1 and the luminous flux restricting plate S2 are compatible with each other in design.

Figure 29:
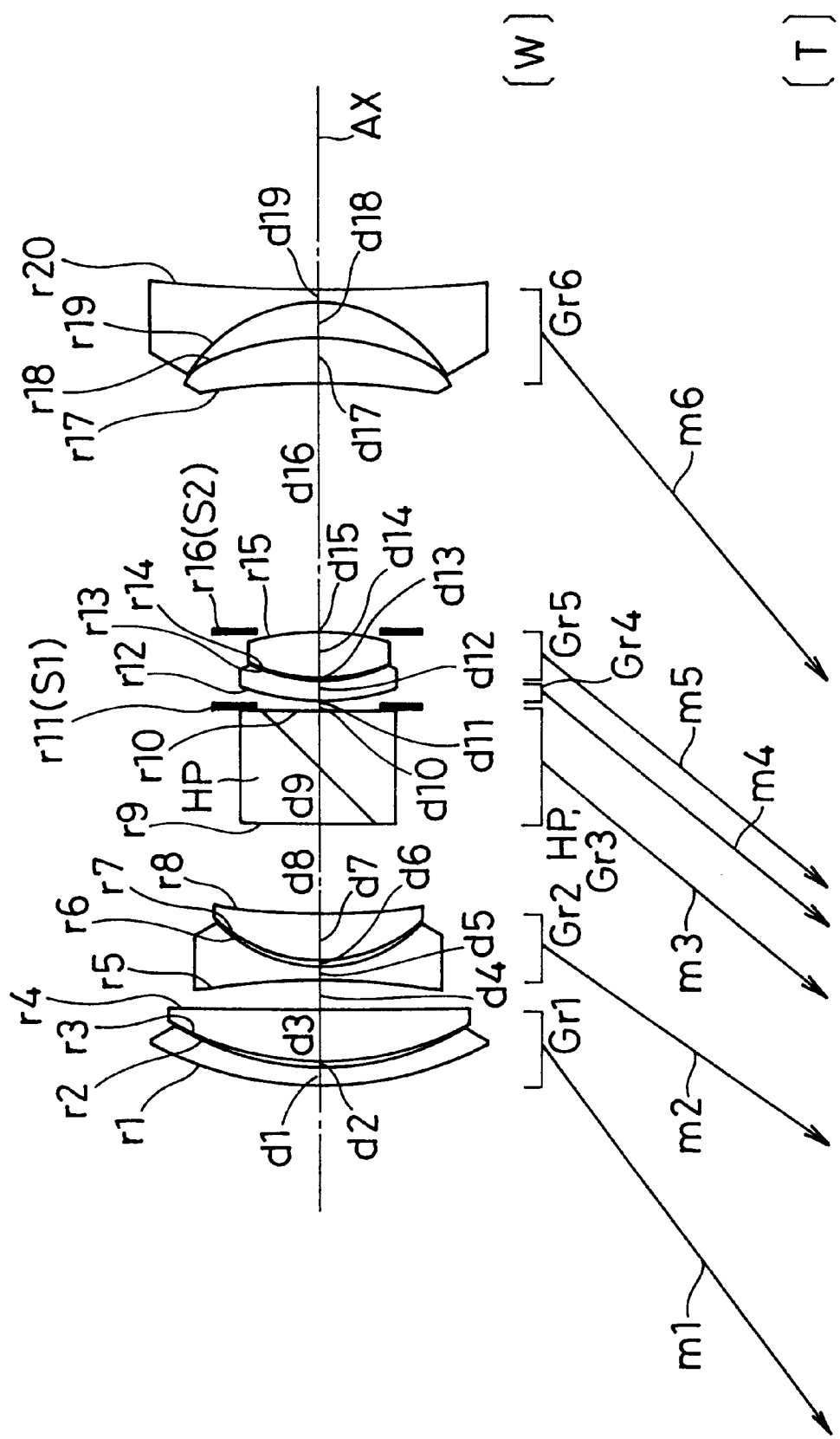
FIG. 29 is a diagram showing the lens construction of the thirteenth embodiment of the present invention.

The thirteenth embodiment is a six-unit zoom lens system where the distance d13 between the fourth and fifth lens units Gr4 and Gt5 slightly varies during zooming as shown in FIG. 29. That is, in a four-component zoom lens system of positive, negative, positive, negative configuration, the third lens component is divided into the third lens unit Gr3 of no refractive power, the fourth lens unit Gr4 of negative refractive power and the fifth lens unit Gr5 of positive refractive power and moved with floating during zooming. By thus slightly varying the distance between the fourth lens unit Gr4 and the fifth lens unit Gr5 during zooming, spherical aberration and the inclination of the image plane toward the negative side on the telephoto side are corrected and the flare caused by the upper ray on the telephoto side is corrected. Moreover, by thus disposing zooming lens units having negative, positive, negative refractive power from the object side in the rear of the half prism HP, a sufficient back focal length is secured and the sixth lens unit Gr6 is reduced in size along the diameter.

In the zoom lens system according to the thirteenth embodiment, since three zooming lens units are disposed in the rear of the half prism HP, the burden of aberration correction imposed on the zooming lens units disposed in front of the half prism HP is light. Generally, the position of the finder optical system is strictly restricted compared with that of the taking optical system. If the burden of aberration correction imposed on the zooming lens units situated in front of the half prism HP is lightened, in the case where the luminous flux is directed to the finder optical system by splitting the luminous flux by the half prism HP, it is facilitated to arrange the zooming lens units disposed in front of the half prism HP to be suitable for the finder. For this reason, the restriction on the position of the finder optical system is lightened.

In the zoom lens system according to the thirteenth embodiment, like in the first to tenth embodiments, the half prism HP for reflecting the luminous flux having passed through the second lens unit Gr2 to split the luminous flux is disposed between the second lens unit Gr2 and the third lens unit Gr3. According to this arrangement, the luminous flux incident on the zoom lens system is split into two optically equivalent luminous fluxes by the half prism HP, so that no parallax is caused. Since the half prism HP is disposed in the middle of the zoom lens system, the back focal length is reduced and the half prism HP is reduced in size.

Additionally, in the substantially four-component zoom lens systems of positive, negative, positive (negative, positive), negative configuration like the thirteenth embodiment where the third lens component is divided into the lens shutter S1 also used as the aperture diaphragm, the fourth lens unit Gr4 of negative refractive power and the fifth lens unit Gr5 of positive refractive power and moved with floating during zooming, like in the first to tenth embodiments, the axial and off-axial luminous fluxes both pass the lowest positions (i.e. in the vicinity of the optical axis AX) between the second lens unit Gr2 and the third lens unit Gr3, so that the half prism HP disposed between the second lens unit Gr2 and the third lens unit Gr3 is further reduced in size along the diameter (i.e. in the direction vertical to the optical axis AX). Since the half prism HP is reduced in size in the direction of the optical axis AX if it is reduced in size along the diameter, the actual axial distance between the second lens unit Gr2 and the fourth lens unit Gr4 (i.e. the distance between the most image side lens surface of the second lens unit Gr2 and the most object side lens surface of the third lens unit Gr4) is reduced by the size reduction of the half mirror HP. As a result, the zoom lens system is reduced in length.

In the thirteenth embodiment, like in the first to twelfth embodiments, since the half prism HP reflects the luminous flux between the zooming lens units to split the luminous flux, the structure of the lens barrel is simple and it is easier in manufacture to maintain the optical quality of the zooming lens units than an arrangement where the luminous flux is reflected in the middle of one zooming lens unit. Moreover, in the thirteenth embodiment, since the first lens unit Gr1 has positive refractive power, the generation of aberrations is effectively restrained by limiting the height of the axial luminous flux with the first lens unit Gr1.

In the zoom lens system according to the thirteenth embodiment, like in the first to tenth embodiments, the half prism HP is moved integrally with the third lens unit Gr3 during zooming, so that size reduction of the zoom lens system is achieved. As mentioned above, in the substantially four-component zoom lens system of positive, negative, positive (negative, positive), negative configuration, the luminous flux is thinnest (i.e. condensed) in the vicinity of the third lens unit Gr3. For this reason, the size along the diameter (i.e. the size in the direction vertical to the optical axis AX) of the half prism HP is minimized, so that the half prism HP is also reduced in size in the direction of the optical axis AX. Since the space is effectively used by the size reduction of the half prism HP, the actual axial distance between the second lens unit Gr2 and the fourth lens unit Gr4 is reduced to reduce the length of the zoom lens system.

In the thirteenth embodiment, since the third lens unit Gr3 including the lens shutter S1 also used as the aperture diaphragm is disposed immediately in the rear of the half prism HP, the luminous flux increases in diameter as it approaches the second lens unit Gr2 situated immediately in front of the half prism HP. On the other hand, in the thirteenth embodiment, since the half prism HP is moved integrally with the third lens unit Gr3 situated immediately in the rear thereof during zooming, the distance between the third lens unit Gr3 and the half prism HP does not vary and the distance between the second lens unit Gr2 and the half prism HP varies. Consequently, the luminous flux diameter to be covered by the half prism HP is minimized, so that size reduction of the half prism HP is achieved. This arrangement is advantageous in lens barrel structure since the burden such as weight imposed on the driving mechanism for zooming is lightened because of the size reduction of the half prism HP.

In the zoom lens system according to the thirteenth embodiment, since the zooming lens unit situated immediately in front of the half prism HP (i.e. the second lens unit Gr2) has negative refractive power, the off-axial luminous flux incident on the half prism HP forms a small angle to the axial luminous flux (i.e. approaches afocal condition). Consequently, the luminous flux diameter to be covered by the half prism HP is minimized, so that size reduction of the half prism HP is achieved. This arrangement is advantageous in lens barrel structure since the burden such as weight imposed on the driving mechanism for zooming is lightened because of the size reduction of the half prism HP. Additionally, since the off-axial luminous flux nearly afocal with respect to the optical axis does not spread so much when it is reflected by the half prism HP, the diameter of the optical system situated in the rear of the half prism HP (i.e. the finder optical system and a part of the taking optical system situated in the rear of the reflecting means) is minimized. Thus, by the size reduction of the half prism HP and the optical system situated in the rear thereof, size reduction of the zoom lens system and the finder optical system is achieved.

In the thirteenth embodiment, in order to achieve size reduction of the zoom lens system, it is desirable to fulfill the above-described condition (1). In order to realize a zoom lens system being compact and having a high zoom ratio while maintaining high optical quality, it is desirable to fulfill the above-described condition (2).

In order to dispose the reflecting means such as the half prism HP between the second lens unit Gr2 and the fourth lens unit Gr4, it is desirable to fulfill the following condition (3b) under a condition where the reflecting means such as the half prism HP is disposed:

$$0.25 < T(2-4)/fW \quad (3b)$$

where T(2-4) is the distance between the most image side lens surface of the second lens unit and the most object side lens surface of the fourth lens unit at the wide-angle end.

When the lower limit of the condition (3b) is exceeded, the distance T(2-4) between the second lens unit Gr2 and the fourth lens unit Gr4 is too short, so that it is difficult to structure the lens barrel so that the reflecting means is disposed between the second lens unit Gr2 and the fourth lens unit Gr4.

Moreover, it is desirable for the second lens unit Gr2 and the fourth lens unit Gr4 to fulfill the above-described condition (4b) like in the twelfth embodiment. Further, it is desirable for the second lens unit Gr2 and the fifth lens unit Gr5 to fulfill the following condition (4c) with respect to the zooming movement amount:

$$0.5 < M2/M5 < 0.95 \quad (4c)$$

where M5 is the movement amount of the fifth lens unit during zooming from the wide-angle end to the telephoto end.

When the upper limit of the conditions (4b) and (4c) is exceeded, the zooming movements of the second lens unit Gr2 to the fourth lens unit Gr4 and that of the fifth lens unit Gr5 are substantially the same, so that only advantages substantially the same as those produced by three-unit zoom lens systems are obtained, and if the zoom ratio is increased, the movement amount increases to increase the size of the optical system. When the lower limit of the conditions (4b) and (4c) is exceeded, the difference in movement amount between the second lens unit Gr2 and the fourth lens unit Gr4 and that between the second lens unit Gr2 and the fifth lens unit Gr5 increase, so that the distance between the second lens unit Gr2 and the fourth lens unit Gr4 and that between the second lens unit Gr2 and the fifth lens unit Gr5 increase at the wide-angle end. Consequently, the height of the axial luminous flux incident on the fourth lens unit Gr4 increases, so that it is difficult to correct spherical aberration and the length of the zoom lens system at the wide-angle end increases.

Next, the structural features of the zooming lens units will be described. With respect to the first lens unit Gr1 and the second lens unit Gr2, their structural features are the same as those of the above-described first to tenth embodiments, and for example, it is desirable to fulfill the above-described conditions (5), (6), (7), (8), (9), (10) and (11).

Next, desirable arrangements for the fourth lens unit Gr4 and the fifth lens unit Gr5 will be described. In order to realize a zoom lens system being compact and having high optical quality, it is desirable for the fourth lens unit Gr4 and the fifth lens unit Gr5 to fulfill the following conditions (12b) and (13b):

$$0.05 < D4,5/fW < 0.40 \quad (12b)$$

$$0.01 < D4,5/fT < 0.08 \quad (13b)$$

where D4,5 is the composite thickness of the fourth and fifth lens units in the direction of the optical axis (the axial distance between the most object side lens surface of the fourth lens unit and the most image side lens surface of the fifth lens unit).

When the upper limits of the conditions (12b) and (13b) are exceeded, the length of the zoom lens system increases and the back focal length decreases to increase the rear lens diameter (the diameter of the sixth lens unit Gr6). When the lower limits of the conditions (12b) and (13b) are exceeded, it is difficult to sufficiently correct aberrations. Particularly, it is difficult to correct chromatic aberration into well-balanced condition. Even if sufficient correction could be made, the optical system would hardly be processible.

By using an aspherical surface in the fourth lens unit Gr4 and by using an aspherical surface in the fifth lens unit Gr5 like in the thirteenth embodiment, more excellent optical quality is obtained. It is desirable for the aspherical surface to fulfill the following condition (14b) with respect to a given height y in the direction vertical to the optical axis where 0<y<Ymax:

$$-0.01 < \phi 4,5 \cdot (N'-N) \cdot d\{X(y)-X0(y)\}/dy < 0.003 \quad (14b)$$

where $\phi 4,5$ is the composite refractive power of the fourth and fifth lens units.

When the upper limit of the condition (14b) is exceeded, spherical aberration shows a marked tendency to incline toward the under side in the entire zoom range and inward coma is generated on the wide-angle side. When the lower limit of the condition (14b) is exceeded, spherical aberration shows a marked tendency to incline toward the over side and outward coma is generated on the wide-angle side.

In the fourth and fifth lens units Gr4 and Gt5, it is desirable to provide an aspherical surface on the most object side lens element (desirably, on its object side surface) or on the most image side lens element (desirably, on its image side surface). According to the former arrangement, the correction of spherical aberration is facilitated. According to the latter arrangement, the correction of coma is facilitated.

It is desirable for the fourth lens unit Gr4 and the fifth lens unit Gr5 to fulfill the following condition (15b):

$$0.1 < f4,5/fT < 0.5 \tag{15b}$$

where f4,5 is the composite focal length of the fourth and fifth lens units.

When the upper limit of the condition (15b) is exceeded, the composite refractive power of the fourth lens unit Gr4 and the fifth lens unit Gr5 is too weak, so that the length of the zoom lens system at the wide-angle end increases and the movement amount of the fourth and fifth lens units Gr4 and Gt5 during zooming increases to increase the length of the zoom lens system at the telephoto end. When the lower limit of the condition (15b) is exceeded, the composite refractive power of the fourth lens unit Gr4 and the fifth lens unit Gr5 is too strong, so that spherical aberration shows a marked tendency to incline toward the under side in the entire zoom range.

Next, a desirable arrangement for the sixth lens unit Gr6 will be described. It is desirable for the sixth lens unit Gr6 to have a positive lens element on its most object side and have a negative lens element on its most image side. By the employment of the telephoto-type arrangement, the back focal length is minimized. It is further desirable for the sixth lens unit Gr6 to consist of a positive lens element and a negative lens element from the object side. By this arrangement, the sixth lens unit Gr6 is further reduced in size in the direction of the optical axis to achieve size reduction of the zoom lens system.

By using an aspherical surface in the sixth lens unit Gr6 like in the thirteenth embodiment, more excellent optical quality is obtained. It is desirable for the aspherical surface to fulfill the following condition (16b) with respect to a given height y in the direction vertical to the optical axis where 0.5Ymax<y<Ymax:

$$-0.05 < \phi 6 \cdot (N'-N) \cdot d\{X(y)-X0(y)\}/dy < 0.01 \tag{16b}$$

Here, $\phi 6$ is the refractive power of the sixth lens unit.

When the upper limit of the condition (16b) is exceeded, positive distortion and field curvature show a marked tendency to excurse toward the positive side in the range between the wide-angle end and the middle focal length condition, and spherical aberration inclines toward the over side on the telephoto side. When the lower limit of the condition (16b) is exceeded, negative distortion and field curvature show a marked tendency to excurse toward the negative side in the range between the wide-angle end and the middle focal length condition, and spherical aberration inclines toward the under side on the telephoto side.

By using a bi-aspherical lens as the lens element having an aspherical surface or by providing an aspherical surface on each of the most object side surface and the most image side surface, spherical aberration, distortion and field curvature are corrected into better-balanced condition. That is, spherical aberration, distortion and field curvature which cannot be sufficiently corrected by one aspherical surface are corrected by the other aspherical surface. In this case, it is desirable that the aspherical surfaces both fulfill the above-described condition (16b).

It is desirable for the sixth lens unit Gr6 to fulfill the following condition (17b):

$$0.1 < |f6|/fT < 0.4 \tag{17b}$$

where f6 is the focal length of the sixth lens unit.

When the upper limit of the condition (17b) is exceeded, the refractive power of the sixth lens unit Gr6 is too weak, so that the length of the zoom lens system at the wide-angle end increases. When the lower limit of the condition (17b) is exceeded, the refractive power of the sixth lens unit Gr6 is too strong, the generation of positive distortion is great and spherical aberration shows a marked tendency to incline toward the over side on the telephoto side.

<Five-Unit Zoom Lens System Having Four Lens Component of Positive, Negative, Positive, Negative Configuration Where Fourth Lens Component Is Moved with Floating During Zooming (Fourteenth Embodiment)>

The fourteenth embodiment is a zoom lens system having, from the object side, a first lens unit Gr1 of positive refractive power, a second lens unit Gr2 of negative refractive power, a third lens unit Gr3 of positive refractive power, a fourth lens unit Gr4 of positive refractive power and a fifth lens unit Gr5 of negative refractive power. The first lens unit Gr1 constitutes a first lens component. The second lens unit Gr2 constitutes a second lens component. The third lens unit Gr3 constitutes a third lens component. The fourth lens unit Gr4 and the fifth lens unit Gr5 constitute a fourth lens component. Between the second lens unit Gr2 and the third lens unit Gr3 is disposed a half prism HP for reflecting the luminous flux having passed through the second lens unit Gr2 to split the luminous flux. The first lens unit Gr1 to the fifth lens unit Gr5 are moved forward as shown by arrows m1 to m5 of FIG. 31 during zooming from the wide-angle end [W] to the telephoto end [T]. At this time, the distance between the first and second lens units G1 and Gr2 increases, the distance between the second and third lens units decreases, the distance between the third lens unit Gr3 and the fourth lens unit Gr4 decreases, and the distance between the fourth lens unit Gr4 and the fifth lens unit Gr5 increases.

In the fourteenth embodiment, the lens units are arranged as follows: The first lens unit Gr1 includes from the object side a negative meniscus lens element concave to the image side and a positive meniscus lens element convex to the object side. The image side surface of the negative meniscus lens element is aspherical. The second lens unit Gr2 includes from the object side a negative bi-concave lens element and a positive meniscus lens element convex to the object side. The object side surface of the negative lens element and the image side surface of the positive meniscus lens element are aspherical. The third lens unit Gr3 includes from the object side a lens shutter S1 also used as the aperture diaphragm, a negative meniscus lens element concave to the image side, a positive bi-convex lens element and a light restricting plate S2. The image side surface of the positive lens element is aspherical. The fourth lens unit Gr4 includes a positive meniscus lens element convex to the image side. Both side surfaces of the lens element are aspherical. The fifth lens unit Gr5 includes a negative bi-concave lens element. The lens shutter S1 also used as the aperture diaphragm and the luminous flux restricting plate S2 are compatible with each other in design.

Figure 31:
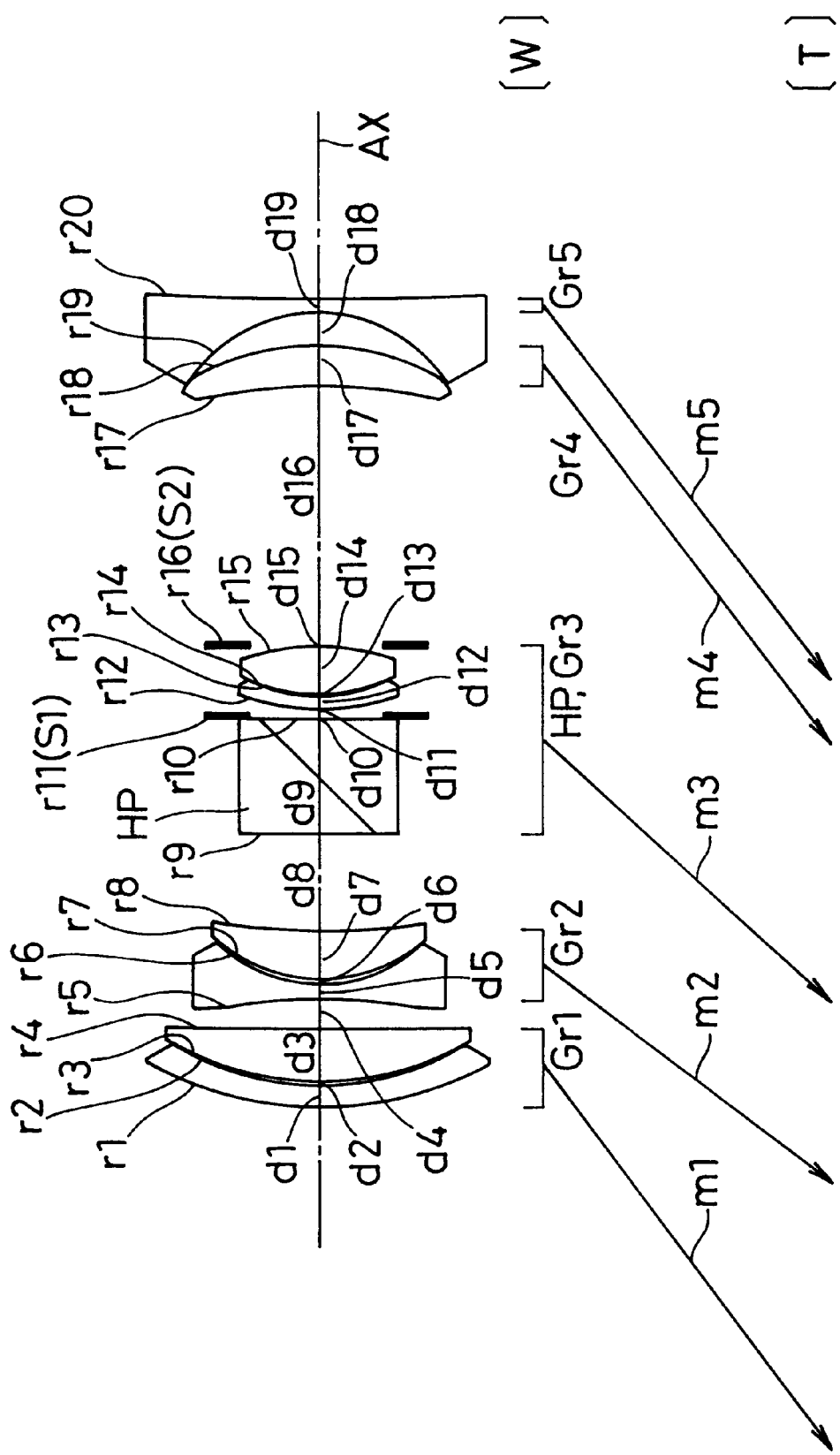
FIG. 31 is a diagram showing the lens construction of the fourteenth embodiment of the present invention.
Figure 32A:
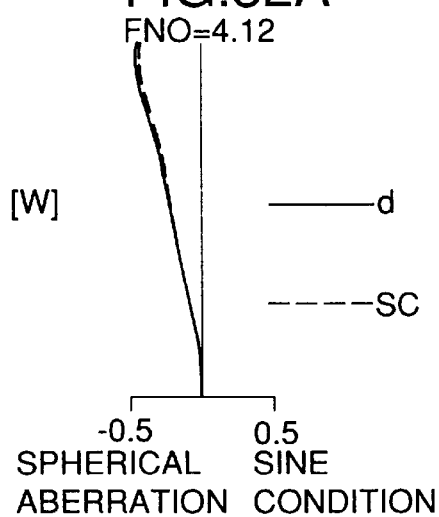
FIGS. 32A to 32I are diagrams showing aberrations observed in the fourteenth embodiment focused for infinity.
Figure 32B:
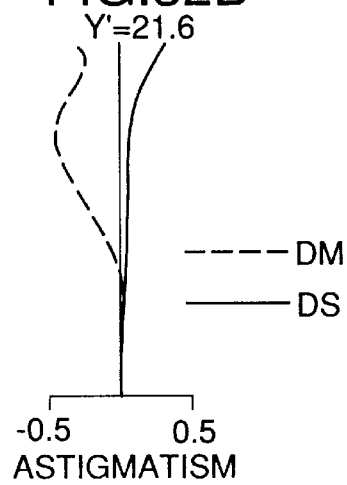
Figure 32C:
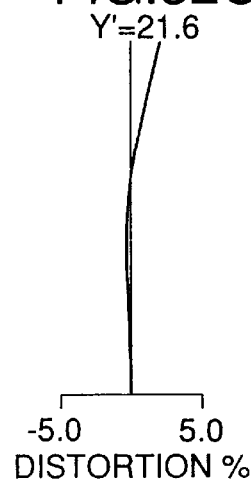
Figure 32D:
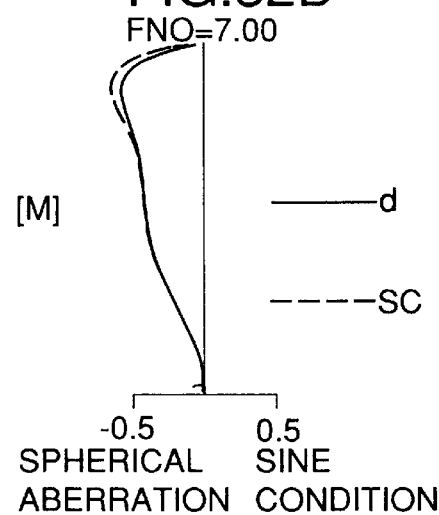
Figure 32E:
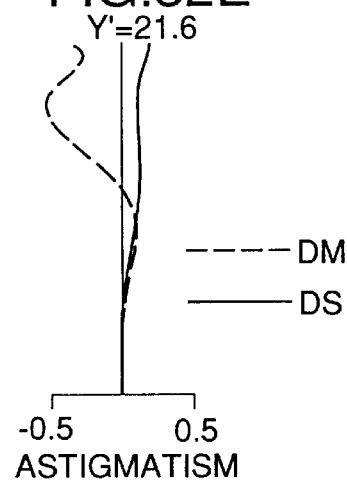
Figure 32F:
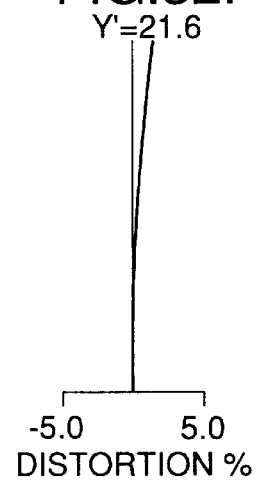
Figure 32G:
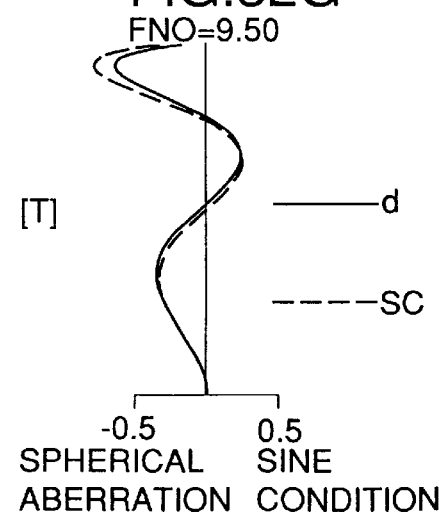
Figure 32H:
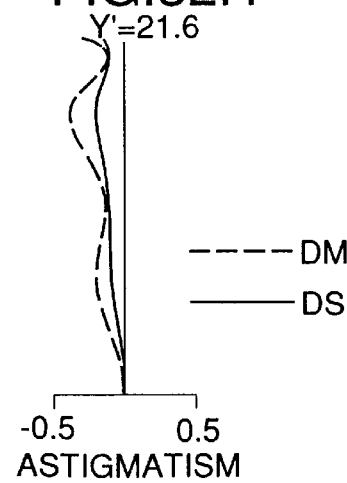
Figure 32I:
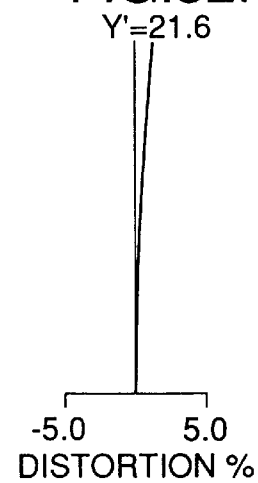

The fourteenth embodiment is a five-unit zoom lens system where the distance d18 between the fourth lens unit Gr4 and the fifth lens unit Gr5 slightly varies during zooming as shown in FIG. 31. That is, in a four-component zoom lens system of positive, negative, positive, negative configuration, the fourth lens component is divided into the fourth lens unit Gr4 and the fifth lens unit Gr5 and moved with floating during zooming. By the floating, spherical aberration and the inclination of the image plane toward the negative side on the telephoto side are corrected. By thus disposing zooming lens units having positive, positive, negative refractive power from the object side (telephoto type) in the rear of the half prism HP, the zooming lens units situated in the rear of the half prism HP (i.e. the third lens unit Gr3 to the fifth lens unit Gr5) are reduced in size in the direction of the optical axis AX.

In the zoom lens system according to the fourteenth embodiment, like in the thirteenth embodiment, since three zooming lens units are disposed in the rear of the half prism HP, the burden of aberration correction imposed on the zooming lens units disposed in front of the half prism HP is light. Generally, the position of the finder optical system is strictly restricted compared with that of the taking optical system. If the burden of aberration correction imposed on the zooming lens units situated in front of the half prism HP is lightened, in the case where the luminous flux is directed to the finder optical system by splitting the luminous flux by the half prism HP, it is facilitated to arrange the zooming lens units disposed in front of the half prism HP to be suitable for the finder. For this reason, the restriction on the position of the finder optical system is lightened.

In the zoom lens system according to the fourteenth embodiment, like in the first to tenth embodiments, the half prism HP for reflecting the luminous flux having passed through the second lens unit Gr2 to split the luminous flux is disposed between the second lens unit Gr2 and the third lens unit Gr3. According to this arrangement, the luminous flux incident on the zoom lens system is split into two optically equivalent luminous fluxes by the half prism HP, so that no parallax is caused. Since the half prism HP is disposed in the middle of the zoom lens system, the back focal length is reduced and the half prism HP is reduced in size.

Additionally, in the substantially four-component zoom lens systems of positive, negative, positive, negative (positive, negative) configuration like the fourteenth embodiment where the fourth lens component is divided into the fourth lens unit Gr4 of positive refractive power and the fifth lens unit Gr5 of negative refractive power and moved with floating during zooming, like in the first to tenth embodiments, the axial and off-axial luminous fluxes both pass the lowest positions (i.e. in the vicinity of the optical axis AX) between the second lens unit Gr2 and the third lens unit Gr3, so that the half prism HP disposed between the second lens unit Gr2 and the third lens unit Gr3 is further reduced in size along the diameter (i.e. in the direction vertical to the optical axis AX). Since the half prism HP is reduced in size in the direction of the optical axis AX if it is reduced in size along the diameter, the actual axial distance between the second lens unit Gr2 and the fourth lens unit Gr4 (i.e. the distance between the most image side lens surface of the second lens unit Gr2 and the most object side lens surface of the fourth lens unit Gr4) is reduced by the size reduction of the half mirror HP. As a result, the zoom lens system is reduced in length.

In the fourteenth embodiment, like in the first to thirteenth embodiments, since the half prism HP reflects the luminous flux between the zooming lens units to split the luminous flux, the structure of the lens barrel is simple and it is easier in manufacture to maintain the optical quality of the zooming lens units than an arrangement where the luminous flux is reflected in the middle of one zooming lens unit. Moreover, in the fourteenth embodiment, since the first lens unit Gr1 has positive refractive power, the generation of aberrations is effectively restrained by limiting the height of the axial luminous flux with the first lens unit Gr1.

In the zoom lens system according to the fourteenth embodiment, like in the first to tenth embodiments, the half prism HP is moved integrally with the third lens unit Gr3 during zooming, so that size reduction of the zoom lens system is achieved. As mentioned above, in the substantially four-component zoom lens system of positive, negative, positive, negative (positive, negative) configuration, the luminous flux is thinnest (i.e. condensed) in the vicinity of the third lens unit Gr3. For this reason, the size along the diameter (i.e. the size in the direction vertical to the optical axis AX) of the half prism HP is minimized, so that the half prism HP is also reduced in size in the direction of the optical axis AX. Since the space is effectively used by the size reduction of the half prism HP, the actual axial distance between the second lens unit Gr2 and the third lens unit Gr3 is reduced to reduce the length of the zoom lens system.

In the fourteenth embodiment, since the lens shutter S1 also used as the aperture diaphragm is disposed in the rear of the half prism HP, the luminous flux increases in diameter as it approaches the second lens unit Gr2 situated immediately in front of the half prism HP. On the other hand, in the fourteenth embodiment, since the half prism HP is moved integrally with the zooming lens unit situated immediately in the rear thereof (i.e. the third lens unit Gr3) during zooming, the distance between the third lens unit Gr3 and the half prism HP does not vary and the distance between the second lens unit Gr2 and the half prism HP varies. Consequently, the luminous flux diameter to be covered by the half prism HP is minimized, so that size reduction of the half prism HP is achieved. This arrangement is advantageous in lens barrel structure since the burden such as weight imposed on the driving mechanism for zooming is lightened because of the size reduction of the half prism HP.

In the zoom lens system according to the fourteenth embodiment, since the zooming lens unit situated immediately in front of the half prism HP (i.e. the second lens unit Gr2) has negative refractive power, the off-axial luminous flux incident on the half prism HP forms a small angle to the axial luminous flux (i.e. approaches afocal condition). Consequently, the luminous flux diameter to be covered by the half prism HP is minimized, so that size reduction of the half prism HP is achieved. This arrangement is advantageous in lens barrel structure since the burden such as weight imposed on the driving mechanism for zooming is lightened because of the size reduction of the half prism HP. Additionally, since the off-axial luminous flux nearly afocal with respect to the optical axis does not spread so much when it is reflected by the half prism HP, the diameter of the optical system situated in the rear of the half prism HP (i.e. the finder optical system and a part of the taking optical system situated in the rear of the reflecting means) is minimized. Thus, by the size reduction of the half prism HP and the optical system situated in the rear thereof, size reduction of the zoom lens system and the finder optical system is achieved.

In the fourteenth embodiment, in order to achieve size reduction of the zoom lens system, it is desirable to fulfill the above-described condition (1). In order to realize a zoom lens system being compact and having a high zoom ratio while maintaining high optical quality, it is desirable to fulfill the above-described condition (2).

In order to dispose the reflecting means such as the half mirror HP between the second lens unit Gr2 and the third lens unit Gr3, like in the first to tenth embodiments, it is desirable to fulfill the above-described condition (3). Moreover, like in the first to tenth embodiments, it is desirable for the second lens unit Gr2 and the third lens unit Gr3 to fulfill the above-described condition (4) with respect to the zooming movement amount.

Next, the structural features of the zooming lens units will be described. With respect to the first lens unit Gr1 to the third lens unit Gr3, their structural features are the same as those of the above-described first to tenth embodiments, and for example, it is desirable to fulfill the above-described conditions (5), (6), (7), (8), (9), (10), (11), (12), (13), (14) and (15).

Desirable arrangements for the fourth lens unit Gr4 and the fifth lens unit Gr5 will be described. It is desirable for the fourth lens unit Gr4 to have positive refractive power and for the fifth lens unit Gr5 to have negative refractive power. By the employment of the telephoto-type arrangement, the back focal length is minimized. It is further desirable for the fourth lens unit Gr4 to consist of one positive lens element and for the fifth lens unit Gr5 to consist of one negative lens element like in the fourteenth embodiment. By this arrangement, the fourth lens unit Gr4 and the fifth lens unit Gr5 are further reduced in size in the direction of the optical axis to achieve size reduction of the zoom lens system.

By using an aspherical surface in the fourth lens unit Gr4 like in the fourteenth embodiment or by using an aspherical surface in the fifth lens unit Gr5, more excellent optical quality is obtained. It is desirable for the aspherical surface to fulfill the following condition (16c) with respect to a given height y in the direction vertical to the optical axis where $0.5 Y_{max} < y < Y_{max}$:

$$-0.05 < \phi 4,5 \cdot (N'-N) \cdot d\{X(y)-X0(y)\}/dy < 0.01 \quad (16c)$$

Here, $\phi 4,5$ is the composite refractive power of the fourth and fifth lens units.

When the upper limit of the condition (16c) is exceeded, positive distortion and field curvature show a marked tendency to excurse toward the positive side in the range between the wide-angle end and the middle focal length condition, and spherical aberration inclines toward the over side on the telephoto side. When the lower limit of the condition (16c) is exceeded, negative distortion and field curvature show a marked tendency to excurse toward the negative side in the range between the wide-angle end and the middle focal length condition, and spherical aberration inclines toward the under side on the telephoto side.

By using a bi-aspherical lens as the lens element having an aspherical surface or by providing an aspherical surface on each of the most object side surface and the most image side surface, spherical aberration, distortion and field curvature are corrected into better-balanced condition. That is, spherical aberration, distortion and field curvature which cannot be sufficiently corrected by one aspherical surface are corrected by the other aspherical surface. In this case, it is desirable that the aspherical surfaces both fulfill the above-described conditions (16) and (16c).

It is desirable for the fourth lens unit Gr4 and the fifth lens unit Gr5 to fulfill the following condition (17c):

$$0.1 < |f4,5|/fT < 0.4 \quad (17c)$$

where f4,5 is the composite focal length of the fourth and fifth lens units.

When the upper limit of the condition (17c) is exceeded, the composite refractive power of the fourth lens unit Gr4 and the fifth lens unit Gr5 is too weak, so that the length of the zoom lens system at the wide-angle end increases. When the lower limit of the condition (17c) is exceeded, the composite refractive power of the fourth lens unit Gr4 and the fifth lens unit Gr5 is too strong, the generation of positive distortion is great and spherical aberration shows a marked tendency to incline toward the over side on the telephoto side.

Hereinafter, the structures of the zoom lens systems embodying the present invention will be more specifically described with reference to construction data and aberration quality. The construction data of the first to fourteenth embodiments are shown in Tables and the lens arrangements of the first to fourteenth embodiments are shown in FIGS. 1, 3, 5, 7, 9, 12, 15, 18, 21, 23, 25, 27, 29 and 31.

In the construction data of the embodiments, ri (i=1, 2, 3, ...) is the radius of curvature of an ith surface counted from the object side, di (i=1, 2, 3, ...) is an ith axial distance counted from the object side, and Ni (i=1, 2, 3, ...) and vi (i=1, 2, 3, ...) are the refractive power (Nd) and Abbe number (vd) to the d-line of an ith lens counted from the object side. In the construction data, the axial distances which vary during zooming are the actual axial distances at the wide-angle end [W], at the middle focal length condition [M] and at the telephoto end [T] under infinity photography condition. The focal lengths f and the F-numbers FNO of the entire lens system at the conditions [W], [M] and [T] are also shown.

The surfaces marked with asterisks are aspherical surfaces defined by the above-described equation (A) expressing the aspherical surface configuration. Values of the embodiments for the conditions (6), (6a), (10), (10a), (10b), (14), (14a), (14b), (16), (16a), (16b) and (16c) with respect to the aspherical surface are also shown. In the case where the refractive power changes during zooming, values for. the wide-angle end [W] and the telephoto end [T] are shown. Tables 1 to 4 show values of the embodiments for the other conditions. Table 5 shows the zooming movement amount of each lens unit from the wide-angle end [W] to the middle focal length condition [M] to the telephoto end [T] at infinity (D=∞) in the first, third and fourth embodiments. Table 6 shows the focusing movement amount (moving out amount) at the wide-angle end [W] in nearest photography (D=5 m) in the fifth to eighth embodiments.

FIGS. 2A to 2I, 4A to 4I, 6A to 6I, 8A to 8I, 10A to 10I, 13A to 13I, 16A to 16I, 19A to 19I, 22A to 22I, 24A to 24I, 26A to 26I, 28A to 28I, 30A to 30I, and 32A to 32I are aberration diagrams showing aberrations observed in the first to fourteenth embodiments, respectively, when they are focused for infinity. Among these diagrams, FIGS. 2A to 2C, 4A to 4C, 6A to 6C, 8A to 8C, 10A to 10C, 13A to 13C, 16A to 16C, 19A to 19C, 22A to 22C, 24A to 24C, 26A to 26C, 28A to 28C, 30A to 30C, and 32A to 32C show aberrations at the wide-angle end [W], FIGS. 2D to 2F, 4D to 4F, 6D to 6F, 8D to 8F, 10D to 10F, 13D to 13F, 16D to 16F, 19D to 19F, 22D to 22F, 24D to 24F, 26D to 26F, 28D to 28F, 30D to 30F, and 32D to 32F show aberrations at the middle focal length [M], and FIGS. 2G to 2I, 4G to 4I, 6G to 6I, 8G to 8I, 10G to 10I, 13G to 13I, 16G to 16I, 19G to 19I, 22G to 22I, 24G to 24I, 26G to 26I, 28G to 28I, 30G to 30I, and 32G to 32I show aberrations at the telephoto end [T]. Figs. 11A to 11C, 14A to 14C, 17A to 17C, and 20A to 20C are aberration diagrams showing aberrations observed in the fifth to eighth embodiments, respectively, when they are focused for the closest shooting distance at the wide-angle end [W (D=5 m)]. In spherical aberration diagrams, the solid line (d) represents aberrations for d-lines, the dash-dot line (g) represents aberrations for g-lines, the dash-dot-dot line (c) represents aberrations for c-lines, and the broken line (SC) represents sine condition. In astigmatism diagrams, the broken line (DM) and the solid line (DS) represent astigmatism on the meridional and sagittal planes, respectively.

As described heretofore, according to the present invention, it is possible to realize a zoom lens system that is free from parallax, is compact, and offers excellent optical performance. Furthermore, by using a zoom lens system according to the present invention, it is possible to make cameras compact.

TABLE 1

<< Embodiment 1 >>
f = 39.1~87.3~178.0
FNO = 4.12~7.00~9.50

| Radius of Curvature | Axial Distance | Index of Refraction | Abbe Number |
|---|---|---|---|
| r1    31.742 | | | |
| | d1  1.600 | N1  1.84666 | ν1  23.82 |
| r2*   24.282 | | | |
| | d2  0.500 | | |
| r3    27.548 | | | |
| | d3  5.000 | N2  1.51680 | ν2  64.20 |
| r4    490.045 | | | |
| | d4  2.742~18.742~37.742 | | |
| r5*   -50.651 | | | |
| | d5  1.400 | N3  1.80700 | ν3  39.79 |
| r6    13.245 | | | |
| | d6  0.500 | | |
| r7    13.812 | | | |
| | d7  4.500 | N4  1.78472 | ν4  25.75 |
| r8*   145.647 | | | |
| | d8  8.300~5.723~0.489 | | |
| r9    ∞ | | | |
| | d9  11.000 | N5  1.51680 | ν5  64.20 |
| r10   ∞ | | | |
| | d10  0.200 | | |
| r11   ∞ (Aperture Diaphragm) | | | |
| | d11  0.500 | | |
| r12   24.201 | | | |
| | d12  1.735 | N6  1.84666 | ν6  23.82 |
| r13   14.492 | | | |
| | d13  0.300 | | |
| r14   14.660 | | | |
| | d14  4.700 | N7  1.51728 | ν7  69.43 |
| r15*  -20.500 | | | |
| | d15  0.200 | | |
| r16   ∞ (Light Beam Restricting Plate) | | | |
| | d16  23.394~10.744~2.500 | | |
| r17*  -52.987 | | | |
| | d17  4.100 | N8  1.84666 | ν8  23.82 |
| r18*  -23.222 | | | |
| | d18  3.300 | | |
| r19   -13.947 | | | |
| | d19  1.302 | N9  1.74400 | ν9  44.93 |
| r20   212.239 | | | |
| Σd = 75.272~76.045~81.568 | | | |

[Aspherical Coefficients]

r2: $\epsilon = 1.0000$
 $A4 = -0.85013 \times 10^{-6}$
 $A6 = 0.32298 \times 10^{-8}$
 $A8 = -0.54523 \times 10^{-10}$
 $A10 = 0.27043 \times 10^{-12}$
 $A12 = -0.56376 \times 10^{-15}$
r5: $\epsilon = 1.0000$
 $A4 = 0.18895 \times 10^{-4}$
 $A6 = 0.48637 \times 10^{-7}$
 $A8 = 0.13779 \times 10^{-9}$
 $A10 = -0.18314 \times 10^{-11}$
 $A12 = -0.27882 \times 10^{-14}$
r8: $\epsilon = 1.0000$
 $A4 = 0.33176 \times 10^{-4}$
 $A6 = 0.53118 \times 10^{-7}$ TABLE 1-continued $A8 = 0.28185 \times 10^{-8}$
 $A10 = -0.10321 \times 10^{-10}$
 $A12 = -0.75073 \times 10^{-13}$
r15: $\epsilon = 1.0000$
 $A4 = 0.95143 \times 10^{-5}$
 $A6 = 0.53310 \times 10^{-6}$
 $A8 = -0.16704 \times 10^{-7}$
 $A10 = 0.23059 \times 10^{-9}$
 $A12 = -0.26914 \times 10^{-13}$
r17: $\epsilon = 1.0000$
 $A4 = 0.28288 \times 10^{-8}$
 $A6 = -0.56729 \times 10^{-7}$
 $A8 = 0.49027 \times 10^{-8}$
 $A10 = -0.26465 \times 10^{-10}$
 $A12 = -0.84998 \times 10^{-14}$
r18: $\epsilon = 1.0000$
 $A4 = -0.19642 \times 10^{-4}$
 $A6 = -0.12920 \times 10^{-6}$
 $A8 = 0.27558 \times 10^{-8}$
 $A10 = 0.67847 \times 10^{-11}$
 $A12 = -0.14025 \times 10^{-12}$

[Values Corresponding to Condition (6) (aspherical surface r2 in the first lens unit Gr1)]

$y = 1.3300 \ldots \phi1 \cdot (N' - N) \cdot d\{(X(y) - X0(y)\}/dy = 0.6715 \times 10^{-7}$
$y = 2.6600 \ldots \phi1 \cdot (N' - N) \cdot d\{(X(y) - X0(y)\}/dy = 0.5239 \times 10^{-6}$
$y = 3.9900 \ldots \phi1 \cdot (N' - N) \cdot d\{(X(y) - X0(y)\}/dy = 0.1718 \times 10^{-5}$
$y = 5.3200 \ldots \phi1 \cdot (N' - N) \cdot d\{(X(y) - X0(y)\}/dy = 0.4013 \times 10^{-5}$
$y = 6.6500 \ldots \phi1 \cdot (N' - N) \cdot d\{(X(y) - X0(y)\}/dy = 0.7947 \times 10^{-5}$
$y = 7.9800 \ldots \phi1 \cdot (N' - N) \cdot d\{(X(y) - X0(y)\}/dy = 0.1442 \times 10^{-4}$
$y = 9.3100 \ldots \phi1 \cdot (N' - N) \cdot d\{(X(y) - X0(y)\}/dy = 0.2475 \times 10^{-4}$
$y = 10.6400 \ldots \phi1 \cdot (N' - N) \cdot d\{(X(y) - X0(y)\}/dy = 0.4067 \times 10^{-4}$
$y = 11.9700 \ldots \phi1 \cdot (N' - N) \cdot d\{(X(y) - X0(y)\}/dy = 0.6504 \times 10^{-4}$
$y = 13.3000 \ldots \phi1 \cdot (N' - N) \cdot d\{(X(y) - X0(y)\}/dy = 0.1052 \times 10^{-3}$

[Values Corresponding to Condition (10) (aspherical surface r5 in the second lens unit Gr2)]

$y = 1.0900 \ldots \phi2 \cdot (N' - N) \cdot d\{(X(y) - X0(y)\}/dy = -0.1889 \times 10^{-5}$
$y = 2.1800 \ldots \phi2 \cdot (N' - N) \cdot d\{(X(y) - X0(y)\}/dy = -0.1532 \times 10^{-4}$
$y = 3.2700 \ldots \phi2 \cdot (N' - N) \cdot d\{(X(y) - X0(y)\}/dy = -0.5292 \times 10^{-4}$
$y = 4.3600 \ldots \phi2 \cdot (N' - N) \cdot d\{(X(y) - X0(y)\}/dy = -0.1296 \times 10^{-3}$
$y = 5.4500 \ldots \phi2 \cdot (N' - N) \cdot d\{(X(y) - X0(y)\}/dy = -0.2634 \times 10^{-3}$
$y = 6.5400 \ldots \phi2 \cdot (N' - N) \cdot d\{(X(y) - X0(y)\}/dy = -0.4757 \times 10^{-3}$
$y = 7.6300 \ldots \phi2 \cdot (N' - N) \cdot d\{(X(y) - X0(y)\}/dy = -0.7875 \times 10^{-3}$
$y = 8.7200 \ldots \phi2 \cdot (N' - N) \cdot d\{(X(y) - X0(y)\}/dy = -0.1209 \times 10^{-2}$
$y = 9.8100 \ldots \phi2 \cdot (N' - N) \cdot d\{(X(y) - X0(y)\}/dy = -0.1717 \times 10^{-2}$
$y = 10.0900 \ldots \phi2 \cdot (N' - N) \cdot d\{(X(y) - X0(y)\}/dy = -0.2200 \times 10^{-2}$

[Values Corresponding to Condition (10) (aspherical surface r8 in the second lens unit Gr2)]

$y = 0.8700 \ldots \phi2 \cdot (N' - N) \cdot d\{(X(y) - X0(y)\}/dy = 0.1635 \times 10^{-5}$
$y = 1.7400 \ldots \phi2 \cdot (N' - N) \cdot d\{(X(y) - X0(y)\}/dy = 0.1317 \times 10^{-4}$
$y = 2.6100 \ldots \phi2 \cdot (N' - N) \cdot d\{(X(y) - X0(y)\}/dy = 0.4512 \times 10^{-4}$
$y = 3.4800 \ldots \phi2 \cdot (N' - N) \cdot d\{(X(y) - X0(y)\}/dy = 0.1099 \times 10^{-3}$
$y = 4.3500 \ldots \phi2 \cdot (N' - N) \cdot d\{(X(y) - X0(y)\}/dy = 0.2244 \times 10^{-3}$
$y = 5.2200 \ldots \phi2 \cdot (N' - N) \cdot d\{(X(y) - X0(y)\}/dy = 0.4132 \times 10^{-3}$
$y = 6.0900 \ldots \phi2 \cdot (N' - N) \cdot d\{(X(y) - X0(y)\}/dy = 0.7111 \times 10^{-3}$
$y = 6.9600 \ldots \phi2 \cdot (N' - N) \cdot d\{(X(y) - X0(y)\}/dy = 0.1161 \times 10^{-2}$
$y = 7.8300 \ldots \phi2 \cdot (N' - N) \cdot d\{(X(y) - X0(y)\}/dy = 0.1797 \times 10^{-2}$
$y = 8.7000 \ldots \phi2 \cdot (N' - N) \cdot d\{(X(y) - X0(y)\}/dy = 0.2603 \times 10^{-2}$

[Values Corresponding to Condition (14) (aspherical surface r15 in the third lens unit Gr3)]

$y = 0.6349 \ldots \phi3 \cdot (N' - N) \cdot d\{(X(y) - X0(y)\}/dy = -0.1895 \times 10^{-6}$
$y = 1.2698 \ldots \phi3 \cdot (N' - N) \cdot d\{(X(y) - X0(y)\}/dy = -0.1653 \times 10^{-5}$
$y = 1.9047 \ldots \phi3 \cdot (N' - N) \cdot d\{(X(y) - X0(y)\}/dy = -0.6246 \times 10^{-5}$
$y = 2.5396 \ldots \phi3 \cdot (N' - N) \cdot d\{(X(y) - X0(y)\}/dy = -0.1657 \times 10^{-4}$
$y = 3.1744 \ldots \phi3 \cdot (N' - N) \cdot d\{(X(y) - X0(y)\}/dy = -0.3558 \times 10^{-4}$
$y = 3.8093 \ldots \phi3 \cdot (N' - N) \cdot d\{(X(y) - X0(y)\}/dy = -0.6595 \times 10^{-4}$
$y = 4.4442 \ldots \phi3 \cdot (N' - N) \cdot d\{(X(y) - X0(y)\}/dy = -0.1104 \times 10^{-3}$
$y = 5.0791 \ldots \phi3 \cdot (N' - N) \cdot d\{(X(y) - X0(y)\}/dy = -0.1754 \times 10^{-3}$
$y = 5.7140 \ldots \phi3 \cdot (N' - N) \cdot d\{(X(y) - X0(y)\}/dy = -0.2808 \times 10^{-3}$
$y = 6.3489 \ldots \phi3 \cdot (N' - N) \cdot d\{(X(y) - X0(y)\}/dy = -0.4820 \times 10^{-3}$

[Values Corresponding to Condition (16) (aspherical surface r17 in the fourth lens unit Gr4)]

$y = 1.1200 \ldots \phi4 \cdot (N' - N) \cdot d\{(X(y) - X0(y)\}/dy = 0.1395 \times 10^{-7}$
$y = 2.2400 \ldots \phi4 \cdot (N' - N) \cdot d\{(X(y) - X0(y)\}/dy = 0.2338 \times 10^{-6}$

TABLE 1-continued y = 3.3600 ... φ4 · (N' − N) · d{(X(y) − X0(y)}/dy = −0.8343 × 10$^{-6}$
y = 4.4800 ... φ4 · (N' − N) · d{(X(y) − X0(y)}/dy = −0.1718 × 10$^{-4}$
y = 5.6000 ... φ4 · (N' − N) · d{(X(y) − X0(y)}/dy = −0.9666 × 10$^{-4}$
y = 6.7200 ... φ4 · (N' − N) · d{(X(y) − X0(y)}/dy = −0.3386 × 10$^{-3}$
y = 7.8400 ... φ4 · (N' − N) · d{(X(y) − X0(y)}/dy = −0.8687 × 10$^{-3}$
y = 8.9600 ... φ4 · (N' − N) · d{(X(y) − X0(y)}/dy = −0.1699 × 10$^{-2}$
y = 10.0800 ... φ4 · (N' − N) · d{(X(y) − X0(y)}/dy = −0.2349 × 10$^{-2}$
y = 11.2000 ... φ4 · (N' − N) · d{(X(y) − X0(y)}/dy = −0.1056 × 10$^{-2}$
[Values Corresponding to Condition (16) (aspherical surface r18 in the fourth lens unit Gr4)]

y = 1.1800 ... φ4 · (N' − N) · d{(X(y) − X0(y)}/dy = −0.3664 × 10$^{-5}$
y = 2.3600 ... φ4 · (N' − N) · d{(X(y) − X0(y)}/dy = −0.3026 × 10$^{-4}$
y = 3.5400 ... φ4 · (N' − N) · d{(X(y) − X0(y)}/dy = −0.1053 × 10$^{-3}$
y = 4.7200 ... φ4 · (N' − N) · d{(X(y) − X0(y)}/dy = −0.2491 × 10$^{-3}$
y = 5.9000 ... φ4 · (N' − N) · d{(X(y) − X0(y)}/dy = −0.4513 × 10$^{-3}$
y = 7.0800 ... φ4 · (N' − N) · d{(X(y) − X0(y)}/dy = −0.6373 × 10$^{-3}$
y = 8.2600 ... φ4 · (N' − N) · d{(X(y) − X0(y)}/dy = −0.6907 × 10$^{-3}$
y = 9.4400 ... φ4 · (N' − N) · d{(X(y) − X0(y)}/dy = −0.7233 × 10$^{-3}$
y = 10.6200 ... φ4 · (N' − N) · d{(X(y) − X0(y)}/dy = −0.2031 × 10$^{-2}$
y = 11.8000 ... φ4 · (N' − N) · d{(X(y) − X0(y)}/dy = −0.9598 × 10$^{-2}$

TABLE 2

<< Embodiment 2 >>
f = 39.1~87.3~178.0
FNO = 4.12~7.00~9.50

| Radius of Curvature | Axial Distance | Index of Refraction | Abbe Number |
|---|---|---|---|
| r1    31.780 | | | |
| | d1  1.800 | N1  1.84666 | ν1  23.82 |
| r2*   24.351 | | | |
| | d2  0.500 | | |
| r3    27.548 | | | |
| | d3  5.000 | N2  1.51680 | ν2  64.20 |
| r4    451.955 | | | |
| | d4  2.742~18.742~37.742 | | |
| r5*   −52.414 | | | |
| | d5  1.400 | N3  1.80700 | ν3  39.79 |
| r6    13.245 | | | |
| | d6  0.500 | | |
| r7    13.812 | | | |
| | d7  4.600 | N4  1.78472 | ν4  25.75 |
| r8*   124.047 | | | |
| | d8  8.600~6.206~1.452 | | |
| r9    ∞ | | | |
| | d9  11.000 | N5  1.51680 | ν5  64.20 |
| r10   ∞ | | | |
| | d10  0.400 | | |
| r11   ∞ (Aperture Diaphragm) | | | |
| | d11  0.500 | | |
| r12   23.498 | | | |
| | d12  1.735 | N6  1.84666 | ν6  23.82 |
| r13   14.305 | | | |
| | d13  0.300 | | |
| r14   14.576 | | | |
| | d14  4.700 | N7  1.51728 | ν7  69.43 |
| r15*  −20.905 | | | |
| | d15  0.200 | | |
| r16   ∞ (Light Beam Restricting Plate) | | | |
| | d16  23.544~10.823~2.500 | | |
| r17*  −57.077 | | | |
| | d17  4.300 | N8  1.84666 | ν8  23.82 |
| r18*  −23.984 | | | |
| | d18  3.300 | | |
| r19   −14.043 | | | |
| | d19  1.302 | N9  1.74400 | ν9  44.93 |
| r20   198.656 | | | |
| | Σd = 76.423~77.308~83.291 | | |

[Aspherical Coefficients]

r2:  ε = 1.0000

TABLE 2-continued

A4 = −0.88023 × 10$^{-6}$
A6 = 0.51386 × 10$^{-8}$
A8 = −0.81296 × 10$^{-10}$
A10 = 0.44096 × 10$^{-12}$
A12 = −0.94660 × 10$^{-15}$
r5:  ε = 1.0000
A4 = 0.17967 × 10$^{-4}$
A6 = 0.58381 × 10$^{-7}$
A8 = 0.66235 × 10$^{-11}$
A10 = −0.12325 × 10$^{-11}$
A12 = −0.27882 × 10$^{-14}$
r8:  ε = 1.0000
A4 = 0.31483 × 10$^{-4}$
A6 = 0.81801 × 10$^{-7}$
A8 = 0.24816 × 10$^{-8}$
A10 = −0.11818 × 10$^{-10}$
A12 = −0.47581 × 10$^{-13}$
r15:  ε = 1.0000
A4 = 0.94165 × 10$^{-5}$
A6 = 0.49688 × 10$^{-6}$
A8 = −0.16717 × 10$^{-7}$
A10 = 0.23099 × 10$^{-9}$
A12 = −0.24779 × 10$^{-13}$
r17:  ε = 1.0000
A4 = 0.68475 × 10$^{-6}$
A6 = −0.71551 × 10$^{-7}$
A8 = 0.47575 × 10$^{-8}$
A10 = −0.26013 × 10$^{-10}$
A12 = −0.35515 × 10$^{-14}$
r18:  ε = 1.0000
A4 = −0.19289 × 10$^{-4}$
A6 = −0.14117 × 10$^{-6}$
A8 = 0.25896 × 10$^{-8}$
A10 = 0.71357 × 10$^{-11}$
A12 = −0.13396 × 10$^{-12}$

[Values Corresponding to Condition (6) (aspherical surface r2 in the first lens unit Gr1)]

y = 1.3300 ... φ1 · (N' − N) · d{(X(y) − X0(y)}/dy = 0.6936 × 10$^{-7}$
y = 2.6600 ... φ1 · (N' − N) · d{(X(y) − X0(y)}/dy = 0.5334 × 10$^{-6}$
y = 3.9900 ... φ1 · (N' − N) · d{(X(y) − X0(y)}/dy = 0.1716 × 10$^{-5}$
y = 5.3200 ... φ1 · (N' − N) · d{(X(y) − X0(y)}/dy = 0.3938 × 10$^{-5}$
y = 6.6500 ... φ1 · (N' − N) · d{(X(y) − X0(y)}/dy = 0.7728 × 10$^{-5}$
y = 7.9800 ... φ1 · (N' − N) · d{(X(y) − X0(y)}/dy = 0.1401 × 10$^{-4}$
y = 9.3100 ... φ1 · (N' − N) · d{(X(y) − X0(y)}/dy = 0.2404 × 10$^{-4}$
y = 10.6400 ... φ1 · (N' − N) · d{(X(y) − X0(y)}/dy = 0.3925 × 10$^{-4}$
y = 11.9700 ... φ1 · (N' − N) · d{(X(y) − X0(y)}/dy = 0.6228 × 10$^{-4}$
y = 13.3000 ... φ1 · (N' − N) · d{(X(y) − X0(y)}/dy = 0.1026 × 10$^{-3}$
[Values Corresponding to Condition (10) (aspherical surface r5 in the second lens unit Gr2)]

y = 1.0900 ... φ2 · (N' − N) · d{(X(y) − X0(y)}/dy = −0.1836 × 10$^{-5}$
y = 2.1800 ... φ2 · (N' − N) · d{(X(y) − X0(y)}/dy = −0.1494 × 10$^{-4}$
y = 3.2700 ... φ2 · (N' − N) · d{(X(y) − X0(y)}/dy = −0.5184 × 10$^{-4}$
y = 4.3600 ... φ2 · (N' − N) · d{(X(y) − X0(y)}/dy = −0.1275 × 10$^{-3}$
y = 5.4500 ... φ2 · (N' − N) · d{(X(y) − X0(y)}/dy = −0.2602 × 10$^{-3}$
y = 6.5400 ... φ2 · (N' − N) · d{(X(y) − X0(y)}/dy = −0.4710 × 10$^{-3}$
y = 7.6300 ... φ2 · (N' − N) · d{(X(y) − X0(y)}/dy = −0.7807 × 10$^{-3}$
y = 8.7200 ... φ2 · (N' − N) · d{(X(y) − X0(y)}/dy = −0.1200 × 10$^{-2}$
y = 9.8100 ... φ2 · (N' − N) · d{(X(y) − X0(y)}/dy = −0.1707 × 10$^{-2}$
y = 10.9000 ... φ2 · (N' − N) · d{(X(y) − X0(y)}/dy = −0.2207 × 10$^{-2}$
[Values Corresponding to Condition (10) (aspherical surface r8 in the second lens unit Gr2)]

y = 0.8700 ... φ2 · (N' − N) · d{(X(y) − X0(y)}/dy = 0.1586 × 10$^{-5}$
y = 1.7400 ... φ2 · (N' − N) · d{(X(y) − X0(y)}/dy = 0.1282 × 10$^{-4}$
y = 2.6100 ... φ2 · (N' − N) · d{(X(y) − X0(y)}/dy = 0.4413 × 10$^{-4}$
y = 3.4800 ... φ2 · (N' − N) · d{(X(y) − X0(y)}/dy = 0.1081 × 10$^{-3}$
y = 4.3500 ... φ2 · (N' − N) · d{(X(y) − X0(y)}/dy = 0.2220 × 10$^{-3}$
y = 5.2200 ... φ2 · (N' − N) · d{(X(y) − X0(y)}/dy = 0.4105 × 10$^{-3}$
y = 6.0900 ... φ2 · (N' − N) · d{(X(y) − X0(y)}/dy = 0.7078 × 10$^{-3}$
y = 6.9600 ... φ2 · (N' − N) · d{(X(y) − X0(y)}/dy = 0.1155 × 10$^{-2}$
y = 7.8300 ... φ2 · (N' − N) · d{(X(y) − X0(y)}/dy = 0.1788 × 10$^{-2}$
y = 8.7000 ... φ2 · (N' − N) · d{(X(y) − X0(y)}/dy = 0.2597 × 10$^{-2}$
[Values Corresponding to Condition (14) (aspherical surface r15 in the third lens unit Gr3)]

y = 0.5755 ... φ3 · (N' − N) · d{(X(y) − X0(y)}/dy = −0.1387 × 10$^{-6}$

TABLE 2-continued y = 1.1510 ... φ3 · (N' − N) · d{(X(y) − X0(y)}/dy = −0.1188 × 10$^{-5}$
y = 1.7265 ... φ3 · (N' − N) · d{(X(y) − X0(y)}/dy = −0.4402 × 10$^{-5}$
y = 2.3020 ... φ3 · (N' − N) · d{(X(y) − X0(y)}/dy = −0.1150 × 10$^{-4}$
y = 2.8775 ... φ3 · (N' − N) · d{(X(y) − X0(y)}/dy = −0.2445 × 10$^{-4}$
y = 3.4530 ... φ3 · (N' − N) · d{(X(y) − X0(y)}/dy = −0.4505 × 10$^{-4}$
y = 4.0285 ... φ3 · (N' − N) · d{(X(y) − X0(y)}/dy = −0.7469 × 10$^{-4}$
y = 4.6040 ... φ3 · (N' − N) · d{(X(y) − X0(y)}/dy = −0.1152 × 10$^{-3}$
y = 5.1795 ... φ3 · (N' − N) · d{(X(y) − X0(y)}/dy = −0.1723 × 10$^{-3}$
y = 5.7550 ... φ3 · (N' − N) · d{(X(y) − X0(y)}/dy = −0.2629 × 10$^{-3}$

[Values Corresponding to Condition (16) (aspherical surface r17 in the fourth lens unit Gr4)]

y = 1.1100 ... φ4 · (N' − N) · d{(X(y) − X0(y)}/dy = −0.8669 × 10$^{-7}$
y = 2.2200 ... φ4 · (N' − N) · d{(X(y) − X0(y)}/dy = −0.4639 × 10$^{-6}$
y = 3.3300 ... φ4 · (N' − N) · d{(X(y) − X0(y)}/dy = −0.2378 × 10$^{-5}$
y = 4.4400 ... φ4 · (N' − N) · d{(X(y) − X0(y)}/dy = −0.1729 × 10$^{-4}$
y = 5.5500 ... φ4 · (N' − N) · d{(X(y) − X0(y)}/dy = −0.8596 × 10$^{-4}$
y = 6.6600 ... φ4 · (N' − N) · d{(X(y) − X0(y)}/dy = −0.2949 × 10$^{-3}$
y = 7.7700 ... φ4 · (N' − N) · d{(X(y) − X0(y)}/dy = −0.7572 × 10$^{-3}$
y = 8.8800 ... φ4 · (N' − N) · d{(X(y) − X0(y)}/dy = −0.1495 × 10$^{-2}$
y = 9.9900 ... φ4 · (N' − N) · d{(X(y) − X0(y)}/dy = −0.2123 × 10$^{-2}$
y = 11.1000 ... φ4 · (N' − N) · d{(X(y) − X0(y)}/dy = −0.1195 × 10$^{-2}$

[Values Corresponding to Condition (16) (aspherical surface r18 in the fourth lens unit Gr4)]

y = 1.1800 ... φ4 · (N' − N) · d{(X(y) − X0(y)}/dy = −0.3596 × 10$^{-5}$
y = 2.3600 ... φ4 · (N' − N) · d{(X(y) − X0(y)}/dy = −0.2985 × 10$^{-4}$
y = 3.5400 ... φ4 · (N' − N) · d{(X(y) − X0(y)}/dy = −0.1047 × 10$^{-3}$
y = 4.7200 ... φ4 · (N' − N) · d{(X(y) − X0(y)}/dy = −0.2509 × 10$^{-3}$
y = 5.9000 ... φ4 · (N' − N) · d{(X(y) − X0(y)}/dy = −0.4644 × 10$^{-3}$
y = 7.0800 ... φ4 · (N' − N) · d{(X(y) − X0(y)}/dy = −0.6818 × 10$^{-3}$
y = 8.2600 ... φ4 · (N' − N) · d{(X(y) − X0(y)}/dy = −0.7985 × 10$^{-3}$
y = 9.4400 ... φ4 · (N' − N) · d{(X(y) − X0(y)}/dy = −0.9172 × 10$^{-3}$
y = 10.6200 ... φ4 · (N' − N) · d{(X(y) − X0(y)}/dy = −0.2240 × 10$^{-2}$
y = 11.8000 ... φ4 · (N' − N) · d{(X(y) − X0(y)}/dy = −0.9419 × 10$^{-2}$

TABLE 3

<< Embodiment 3 >>
f = 39.1~87.3~178.0
FN0 = 4.12~7.00~9.80

| Radius of Curvature | Axial Distance | Index of Refraction | | Abbe Number | |
|---|---|---|---|---|---|
| r1  34.212 | | | | | |
| | d1  1.600 | N1 | 1.84666 | ν1 | 23.82 |
| r2* 25.250 | | | | | |
| | d2  0.700 | | | | |
| r3  27.548 | | | | | |
| | d3  5.000 | N2 | 1.51680 | ν2 | 64.20 |
| r4  1260.906 | | | | | |
| | d4  4.442~19.863~31.218 | | | | |
| r5* −52.046 | | | | | |
| | d5  1.400 | N3 | 1.80500 | ν3 | 40.97 |
| r6  13.245 | | | | | |
| | d6  0.600 | | | | |
| r7  13.812 | | | | | |
| | d7  4.500 | N4 | 1.78472 | ν4 | 25.75 |
| r8* 120.877 | | | | | |
| | d8  7.400~5.600~1.900 | | | | |
| r9  ∞ | | | | | |
| | d9  11.000 | N5 | 1.51680 | ν5 | 64.20 |
| r10 ∞ | | | | | |
| | d10 0.200 | | | | |
| r11 ∞ (Aperture Diaphragm) | | | | | |
| | d11 0.500 | | | | |
| r12 24.346 | | | | | |
| | d12 1.735 | N6 | 1.84666 | ν6 | 23.82 |
| r13 14.575 | | | | | |
| | d13 0.300 | | | | |
| r14 14.881 | | | | | |
| | d14 4.700 | N7 | 1.51728 | ν7 | 69.43 |
| r15* −20.102 | | | | | |
| | d15 0.200 | | | | |

TABLE 3-continued

| | | | | | |
|---|---|---|---|---|---|
| r16 ∞ (Light Beam Restricting Plate) | | | | | |
| | d16 23.776~10.154~2.500 | | | | |
| r17* 44.759 | | | | | |
| | d17 4.000 | N8 | 1.84666 | ν8 | 23.82 |
| r18* −23.675 | | | | | |
| | d18 3.600 | | | | |
| r19 −14.620 | | | | | |
| | d19 1.302 | N9 | 1.67003 | ν9 | 47.15 |
| r20 125.845 | | | | | |

Σd = 76.954~76.955~76.955

[Aspherical Coefficients]

r2: ε = 1.0000
A4 = −0.72513 × 10$^{-6}$
A6 = 0.27339 × 10$^{-8}$
A8 = −0.43931 × 10$^{-10}$
A10 = 0.20537 × 10$^{-12}$
A12 = −0.40923 × 10$^{-15}$ r5: ε = 1.0000
A4 = 0.15645 × 10$^{-4}$
A6 = 0.90716 × 10$^{-7}$
A8 = −0.12069 × 10$^{-9}$
A10 = −0.18612 × 10$^{-11}$
A12 = −0.27882 × 10$^{-14}$ r8: ε = 1.0000
A4 = 0.32037 × 10$^{-4}$
A6 = 0.12256 × 10$^{-6}$
A8 = 0.28467 × 10$^{-8}$
A10 = −0.12153 × 10$^{-10}$
A12 = −0.11544 × 10$^{-12}$ r15: ε = 1.0000
A4 = 0.56687 × 10$^{-5}$
A6 = 0.67729 × 10$^{-6}$
A8 = −0.17843 × 10$^{-7}$
A10 = 0.20784 × 10$^{-9}$
A12 = −0.22445 × 10$^{-2}$ r17: ε = 1.0000
A4 = −0.21161 × 10$^{-5}$
A6 = 0.96065 × 10$^{-7}$
A8 = 0.53593 × 10$^{-8}$
A10 = −0.23460 × 10$^{-10}$
A12 = −0.10282 × 10$^{-13}$ r18: ε = 1.0000
A4 = −0.15685 × 10$^{-4}$
A6 = −0.13645 × 10$^{-6}$
A8 = 0.22253 × 10$^{-8}$
A10 = 0.15154 × 10$^{-10}$
A12 = −0.13329 × 10$^{-12}$

[Values Corresponding to Condition (6) (aspherical surface r2 in the first lens unit Gr1)]

y = 1.3300 ... φ1 · (N'−N) · d{(X(y)−X0(y)}/dy = 0.5728 × 10$^{-7}$
y = 2.6600 ... φ1 · (N'−N) · d{(X(y)−X0(y)}/dy = 0.4468 × 10$^{-6}$
y = 3.9900 ... φ1 · (N'−N) · d{(X(y)−X0(y)}/dy = 0.1465 × 10$^{-5}$
y = 5.3200 ... φ1 · (N'−N) · d{(X(y)−X0(y)}/dy = 0.3413 × 10$^{-5}$
y = 6.6500 ... φ1 · (N'−N) · d{(X(y)−X0(y)}/dy = 0.6738 × 10$^{-5}$
y = 7.9800 ... φ1 · (N'−N) · d{(X(y)−X0(y)}/dy = 0.1219 × 10$^{-4}$
y = 9.3100 ... φ1 · (N'−N) · d{(X(y)−X0(y)}/dy = 0.2092 × 10$^{-4}$
y = 10.6400 ... φ1 · (N'−N) · d{(X(y)−X0(y)}/dy = 0.3445 × 10$^{-4}$
y = 11.9700 ... φ1 · (N'−N) · d{(X(y)−X0(y)}/dy = 0.5515 × 10$^{-4}$
y = 13.3000 ... φ1 · (N'−N) · d{(X(y)−X0(y)}/dy = 0.8846 × 10$^{-4}$

[Values Corresponding to Condition (10) (aspherical surface r5 in the second lens unit Gr2)]

y = 1.0900 ... φ2 · (N'−N) · d{(X(y)−X0(y)}/dy = −0.1582 × 10$^{-5}$
y = 2.1800 ... φ2 · (N'−N) · d{(X(y)−X0(y)}/dy = −0.1304 × 10$^{-4}$
y = 3.2700 ... φ2 · (N'−N) · d{(X(Y)−X0(y)}/dy = −0.4612 × 10$^{-4}$
y = 4.3600 ... φ2 · (N'−N) · d{(X(y)−X0(y)}/dy = −0.1160 × 10$^{-3}$
y = 5.4500 ... φ2 · (N'−N) · d{(X(y)−X0(y)}/dy = −0.2420 × 10$^{-3}$
y = 6.5400 ... φ2 · (N'−N) · d{(X(y)−X0(y)}/dy = −0.4460 × 10$^{-3}$
y = 7.6300 ... φ2 · (N'−N) · d{(X(y)−X0(y)}/dy = −0.7461 × 10$^{-3}$
y = 8.7200 ... φ2 · (N'−N) · d{(X(y)−X0(y)}/dy = −0.1141 × 10$^{-2}$
y = 9.8100 ... φ2 · (N'−N) · d{(X(y)−X0(y)}/dy = −0.1579 × 10$^{-2}$
y = 10.9000 ... φ2 · (N'−N) · d{(X(y)−X0(y)}/dy = −0.1895 × 10$^{-2}$

TABLE 3-continued

[Values Corresponding to Condition (10) (aspherical surface r8 in the second lens unit Gr2)]

$y = 0.8700 \ldots \phi 4)2 \cdot (N'-N) \cdot d\{(X(y)-X0(y)\}/dy = 0.4596 \times 10^{-5}$
$y = 1.7400 \ldots \phi)2 \cdot (N'-N) \cdot d\{(X(y)-X0(y)\}/dy = 0.1296 \times 10^{-4}$
$y = 2.6100 \ldots \phi 2 \cdot (N'-N) \cdot d\{(X(y)-X0(y)\}/dy = 0.4493 \times 10^{-4}$
$y = 3.4800 \ldots \phi 2 \cdot (N'-N) \cdot d\{(X(y)-X0(y)\}/dy = 0.1112 \times 10^{-3}$
$y = 4.3500 \ldots \phi 2 \cdot (N'-N) \cdot d\{(X(y)-X0(y)\}/dy = 0.2313 \times 10^{-3}$
$y = 5.2200 \ldots \phi 2 \cdot (N'-N) \cdot d\{(X(y)-X0(y)\}/dy = 0.4336 \times 10^{-3}$
$y = 6.0900 \ldots \phi 2 \cdot (N'-N) \cdot d\{(X(y)-X0(y)\}/dy = 0.7569 \times 10^{-3}$
$y = 6.9600 \ldots \phi 2 \cdot (N'-N) \cdot d\{(X(y)-X0(y)\}/dy = 0.1243 \times 10^{-2}$
$y = 7.8300 \ldots \phi 2 \cdot (N'-N) \cdot d\{(X(y)-X0(y)\}/dy = 0.1910 \times 10^{-2}$
$y = 8.7000 \ldots \phi 2 \cdot (N'-N) \cdot d\{(X(y)-X0(y)\}/dy = 0.2680 \times 10^{-2}$

[Values Corresponding to Condition (14) (aspherical surface r15 in the third lens unit Gr3)]

$y = 0.6723 \ldots \phi 3 \cdot (N'-N) \cdot d\{(X(y)-X0(y)\}/dy = -0.1405 \times 10^{-6}$
$y = 1.3446 \ldots \phi 3 \cdot (N'-N) \cdot d\{(X(y)-X0(y)\}/dy = -0.1357 \times 10^{-5}$
$y = 2.0170 \ldots \phi 3 \cdot (N'-N) \cdot d\{(X(y)-X0(y)\}/dy = -0.5729 \times 10^{-5}$
$y = 2.6893 \ldots \phi 3 \cdot (N'-N) \cdot d\{(X(y)-X0(y)\}/dy = -0.1666 \times 10^{-4}$
$y = 3.3616 \ldots \phi 3 \cdot (N'-N) \cdot d\{(X(y)-X0(y)\}/dy = -0.3824 \times 10^{-4}$
$y = 4.0339 \ldots \phi 3 \cdot (N'-N) \cdot d\{(X(y)-X0(y)\}/dy = -0.7408 \times 10^{-4}$
$y = 4.7062 \ldots \phi 3 \cdot (N'-N) \cdot d\{(X(y)-X0(y)\}/dy = -0.1271 \times 10^{-3}$
$y = 5.3785 \ldots \phi 3 \cdot (N'-N) \cdot d\{(X(y)-X0(y)\}/dy = -0.2033 \times 10^{-3}$
$y = 6.0509 \ldots \phi 3 \cdot (N'-N) \cdot d\{(X(y)-X0(y)\}/dy = -0.3233 \times 10^{-3}$
$y = 6.7232 \ldots \phi 3 \cdot (N'-N) \cdot d\{(X(y)-X0(y)\}/dy = -0.5475 \times 10^{-3}$

[Values Corresponding to Condition (16) (aspherical surface r17 in the fourth lens unit Gr4)]

$y = 1.1600 \ldots \phi 4 \cdot (N'-N) \cdot d\{(X(y)-X0(y)\}/dy = 0.3836 \times 10^{-6}$
$y = 2.3200 \ldots \phi 4 \cdot (N'-N) \cdot d\{(X(y)-X0(y)\}/dy = 0.3470 \times 10^{-5}$
$y = 3.4800 \ldots \phi 4 \cdot (N'-N) \cdot d\{(X(y)-X0(y)\}/dy = 0.1082 \times 10^{-4}$
$y = 4.6400 \ldots \phi 4 \cdot (N'-N) \cdot d\{(X(y)-X0(y)\}/dy = 0.9023 \times 10^{-5}$
$y = 5.8000 \ldots \phi 4 \cdot (N'-N) \cdot d\{(X(y)-X0(y)\}/dy = -0.6057 \times 10^{-4}$
$y = 6.9600 \ldots \phi 4 \cdot (N'-N) \cdot d\{(X(y)-X0(y)\}/dy = -0.3334 \times 10^{-3}$
$y = 8.1200 \ldots \phi 4 \cdot (N'-N) \cdot d\{(X(y)-X0(y)\}/dy = -0.1010 \times 10^{-2}$
$y = 9.2800 \ldots \phi 4 \cdot (N'-N) \cdot d\{(X(y)-X0(y)\}/dy = -0.2213 \times 10^{-2}$
$y = 10.4400 \ldots \phi 4 \cdot (N'-N) \cdot d\{(X(y)-X0(y)\}/dy = -0.3567 \times 10^{-2}$
$y = 11.6000 \ldots \phi 4 \cdot (N'-N) \cdot d\{(X(y)-X0(y)\}/dy = -0.3276 \times 10^{-2}$

[Values Corresponding to Condition (16) (aspherical surface r18 in the fourth lens unit Gr4)]

$y = 1.2000 \ldots \phi 4 \cdot (N'-N) \cdot d\{(X(y)-X0(y)\}/dy = -0.2960 \times 10^{-5}$
$y = 2.4000 \ldots \phi 4 \cdot (N'-N) \cdot d\{(X(y)-X0(y)\}/dy = -0.2478 \times 10^{-4}$
$y = 3.6000 \ldots \phi 4 \cdot (N'-N) \cdot d\{(X(y)-X0(y)\}/dy = -0.8768 \times 10^{-4}$
$y = 4.8000 \ldots \phi 4 \cdot (N'-N) \cdot d\{(X(y)-X0(y)\}/dy = -0.2098 \times 10^{-3}$
$y = 6.0000 \ldots \phi 4 \cdot (N'-N) \cdot d\{(X(y)-X0(y)\}/dy = -0.3751 \times 10^{-3}$
$y = 7.2000 \ldots \phi 4 \cdot (N'-N) \cdot d\{(X(y)-X0(y)\}/dy = -0.4783 \times 10^{-3}$
$y = 8.4000 \ldots \phi 4 \cdot (N'-N) \cdot d\{(X(y)-X0(y)\}/dy = -0.2906 \times 10^{-3}$
$y = 9.6000 \ldots \phi 4 \cdot (N'-N) \cdot d\{(X(y)-X0(y)\}/dy = 0.3856 \times 10^{-3}$
$y = 10.8000 \ldots \phi 4 \cdot (N'-N) \cdot d\{(X(y)-X0(y)\}/dy = 0.9593 \times 10^{-3}$
$y = 12.0000 \ldots \phi 4 \cdot (N'-N) \cdot d\{(X(y)-X0(y)\}/dy = -0.2165 \times 10^{-2}$

TABLE 4

<< Embodiment 4 >>
f = 39.1~87.3~178.0
FN0 = 4.12~7.00~9.80

| Radius of Curvature | | Axial Distance | | Index of Refraction | | Abbe Number | |
|---|---|---|---|---|---|---|---|
| r1 | 33.989 | | | | | | |
| | | d1 | 1.600 | N1 | 1.84666 | v1 | 23.82 |
| r2* | 25.220 | | | | | | |
| | | d2 | 0.700 | | | | |
| r3 | 27.548 | | | | | | |
| | | d3 | 5.000 | N2 | 1.51680 | v2 | 64.20 |
| r4 | 957.258 | | | | | | |
| | | d4 | 4.442~20.099~31.631 | | | | |
| r5* | −49.231 | | | | | | |
| | | d5 | 1.400 | N3 | 1.80500 | v3 | 40.97 |
| r6 | 13.245 | | | | | | |
| | | d6 | 0.500 | | | | |
| r7 | 13.812 | | | | | | |
| | | d7 | 4.500 | N4 | 1.78472 | v4 | 25.75 |
| r8* | 147.273 | | | | | | |
| | | d8 | 7.000~5.200~1.500 | | | | |
| r9 | ∞ | | | | | | |
| | | d9 | 11.000 | N5 | 1.51680 | v5 | 64.20 |
| r10 | ∞ | | | | | | |
| | | d10 | 0.200 | | | | |
| r11 | ∞ (Aperture Diaphragm) | | | | | | |
| | | d11 | 0.500 | | | | |
| r12 | 24.323 | | | | | | |
| | | d12 | 1.735 | N6 | 1.84666 | v6 | 23.82 |
| r13 | 14.525 | | | | | | |
| | | d13 | 0.300 | | | | |
| r14 | 14.914 | | | | | | |
| | | d14 | 4.700 | N7 | 1.51728 | v7 | 69.43 |
| r15. | −19.925 | | | | | | |
| | | d15 | 0.200 | | | | |
| r16 | ∞ (Light Beam Restricting Plate) | | | | | | |
| | | d16 | 24.189~10.333~3.2500 | | | | |
| r17* | −42.343 | | | | | | |
| | | d17 | 4.000 | N8 | 1.84666 | v8 | 23.82 |
| r18* | −23.268 | | | | | | |
| | | d18 | 3.600 | | | | |
| r19 | −14.642 | | | | | | |
| | | d19 | 1.302 | N9 | 1.67003 | v9 | 47.15 |
| r20 | 145.338 | | | | | | |
| | | Σd = 76.868~76.868~76.868 | | | | | |

[Aspherical Coefficients]

r2: $\epsilon = 1.0000$
$A4 = -0.73453 \times 10^{-6}$
$A6 = 0.41169 \times 10^{-8}$
$A8 = -0.67955 \times 10^{-10}$
$A10 = 0.37799 \times 10^{-12}$
$A12 = -0.83384 \times 10^{-15}$ r5: $\epsilon = 1.0000$
$A4 = 0.15343 \times 10^{-4}$
$A6 = 0.77008 \times 10^{-7}$
$A8 = 0.60256 \times 10^{-10}$
$A10 = -0.28371 \times 10^{-11}$
$A12 = -0.27882 \times 10^{-14}$ r8: $\epsilon = 1.0000$
$A4 = 0.30088 \times 10^{-4}$
$A6 = 0.11694 \times 10^{-6}$
$A8 = 0.27404 \times 10^{-8}$
$A10 = -0.12391 \times 10^{-10}$
$A12 = -0.11980 \times 10^{-12}$ r15: $\epsilon = 1.0000$
$A4 = 0.42446 \times 10^{-5}$
$A6 = 0.67465 \times 10^{-6}$
$A8 = 0.18019 \times 10^{-7}$
$A10 = 0.20833 \times 10^{-9}$
$A12 = 0.21206 \times 10^{-12}$ r17: $\epsilon = 1.0000$
$A4 = 0.24741 \times 10^{-5}$
$A6 = 0.83493 \times 10^{-7}$
$A8 = 0.55732 \times 10^{-8}$
$A10 = -0.25775 \times 10^{-10}$
$A12 = -0.11310 \times 10^{-14}$ r18: $\epsilon = 1.0000$
$A4 = -0.15950 \times 10^{-4}$
$A6 = -0.11930 \times 10^{-6}$
$A8 = 0.21416 \times 10^{-8}$
$A10 = 0.15488 \times 10^{-10}$
$A12 = -0.13287 \times 10^{-12}$

[Values Corresponding to Condition (6) (aspherical surface r2 in the first lens unit Gr1)]

$y = 1.3300 \ldots \phi 1 \cdot (N'-N) \cdot d\{(X(y)-X0(y)\}/dy = 0.5774 \times 10^{-7}$
$y = 2.6600 \ldots \phi 1 \cdot (N'-N) \cdot d\{(X(y)-X0(y)\}/dy = 0.4449 \times 10^{-6}$
$y = 3.9900 \ldots \phi 1 \cdot (N'-N) \cdot d\{(X(y)-X0(y)\}/dy = 0.1436 \times 10^{-5}$
$y = 5.3200 \ldots \phi 1 \cdot (N'-N) \cdot d\{(X(y)-X0(y)\}/dy = 0.3312 \times 10^{-5}$
$y = 6.6500 \ldots \phi 1 \cdot (N'-N) \cdot d\{(X(y)-X0(y)\}/dy = 0.6531 \times 10^{-5}$
$y = 7.9800 \ldots \phi 1 \cdot (N'-N) \cdot d\{(X(y)-X0(y)\}/dy = 0.1188 \times 10^{-4}$
$y = 9.3100 \ldots \phi 1 \cdot (N'-N) \cdot d\{(X(y)-X0(y)\}/dy = 0.2041 \times 10^{-4}$
$y = 10.6400 \ldots \phi 1 \cdot (N'-N) \cdot d\{(X(y)-X0(y)\}/dy = 0.3337 \times 10^{-4}$
$y = 11.9700 \ldots \phi 1 \cdot (N'-N) \cdot d\{(X(y)-X0(y)\}/dy = 0.5317 \times 10^{-4}$

TABLE 4-continued y = 13.3000 ... φ1 · (N'–N) · d{(X(y)–X0(y)}/dy = 0.8881 × 10$^{-4}$
[Values Corresponding to Condition (10) (aspherical surface r5 in the second lens unit Gr2)]

y = 1.0900 ... φ2 · (N'–N) · d{(X(y)–X0(y)}/dy = –0.1549 × 10$^{-5}$
y = 2.1800 ... φ2 · (N'–N) · d{(X(y)–X0(y)}/dy = –0.1273 × 10$^{-4}$
y = 3.2700 ... φ2 · (N'–N) · d{(X(y)–X0(y)}/dy = –0.4481 × 10$^{-4}$
y = 4.3600 ... φ2 · (N'–N) · d{(X(y)–X0(y)}/dy = –0.1123 × 10$^{-3}$
y = 5.4500 ... φ2 · (N'–N) · d{(X(y)–X0(y)}/dy = –0.2338 × 10$^{-3}$
y = 6.5400 ... φ2 · (N'–N) · d{(X(y)–X0(y)}/dy = –0.4306 × 10$^{-3}$
y = 7.6300 ... φ2 · (N'–N) · d{(X(y)–X0(y)}/dy = –0.7202 × 10$^{-3}$
y = 8.7200 ... φ2 · (N'–N) · d{(X(y)–X0(y)}/dy = –0.1098 × 10$^{-2}$
y = 9.8100 ... φ2 · (N'–N) · d{(X(y)–X0(y)}/dy = –0.1498 × 10$^{-2}$
y = 10.9000 ... φ2 · (N'–N) · d{(X(y)–X0(y)}/dy = –0.1722 × 10$^{-2}$
[Values Corresponding to Condition (10)(aspherical surface r8 in the second lens unit Gr2)]

y = 0.8700 ... φ2 · (N'–N) · d{(X(y)–X0(y)}/dy = 0.1499 × 10$^{-5}$
y = 1.7400 ... φ2 · (N'–N) · d{(X(y)–X0(y)}/dy = 0.1217 × 10$^{-4}$
y = 2.6100 ... φ2 · (N'–N) · d{(X(y)–X0(y)}/dy = 0.4223 × 10$^{-4}$
y = 3.4800 ... φ2 · (N'–N) · d{(X(y)–X0(y)}/dy = 0.1046 × 10$^{-3}$
y = 4.3500 ... φ2 · (N'–N) · d{(X(y)–X0(y)}/dy = 0.2177 × 10$^{-3}$
y = 5.2200 ... φ2 · (N'–N) · d{(X(y)–X0(y)}/dy = 0.4084 × 10$^{-3}$
y = 6.0900 ... φ2 · (N'–N) · d{(X(y)–X0(y)}/dy = 0.7125 × 10$^{-3}$
y = 6.9600 ... φ2 · (N'–N) · d{(X(y)–X0(y)}/dy = 0.1167 × 10$^{-2}$
y = 7.8300 ... φ2 · (N'–N) · d{(X(y)–X0(y)}/dy = 0.1780 × 10$^{-2}$
y = 8.7000 ... φ2 · (N'–N) · d{(X(y)–X0(y)}/dy = 0.2457 × 10$^{-2}$
[Values Corresponding to Condition (14) (aspherical surface r15 in the third lens unit Gr3)]

y = 0.6723 ... φ3 · (N'–N) · d{(X(y)–X0(y)}/dy = –0.1077 × 10$^{-6}$
y = 1.3446 ... φ3 · (N'–N) · d{(X(y)–X0(y)}/dy = –0.1094 × 10$^{-5}$
y = 2.0170 ... φ3 · (N'–N) · d{(X(y)–X0(y)}/dy = –0.4833 × 10$^{-5}$
y = 2.6893 ... φ3 · (N'–N) · d{(X(y)–X0(y)}/dy = –0.1450 × 10$^{-4}$
y = 3.3616 ... φ3 · (N'–N) · d{(X(y)–X0(y)}/dy = –0.3391 × 10$^{-4}$
y = 4.0339 ... φ3 · (N'–N) · d{(X(y)–X0(y)}/dy = –0.6627 × 10$^{-4}$
y = 4.7062 ... φ3 · (N'–N) · d{(X(y)–X0(y)}/dy = –0.1140 × 10$^{-3}$
y = 5.3785 ... φ3 · (N'–N) · d{(X(y)–X0(y)}/dy = –0.1824 × 10$^{-3}$
y = 6.0509 ... φ3 · (N'–N) · d{(X(y)–X0(y)}/dy = –0.2912 × 10$^{-3}$
y = 6.7232 ... φ3 · (N'–N) · d{(X(y)–X0(y)}/dy = –0.5003 × 10$^{-3}$
[Values Corresponding to Condition (16) (aspherical surface r17 in the fourth lens unit Gr4)]

y = 1.1600 ... φ4 · (N'–N) · d{(X(y)–X0(y)}/dy = 0.4356 × 10$^{-6}$
y = 2.3200 ... φ4 · (N'–N) · d{(X(y)–X0(y)}/dy = 0.3768 × 10$^{-5}$
y = 3.4800 ... φ4 · (N'–N) · d{(X(y)–X0(y)}/dy = 0.1108 × 10$^{-4}$
y = 4.6400 ... φ4 · (N'–N) · d{(X(y)–X0(y)}/dy = 0.6884 × 10$^{-5}$
y = 5.8000 ... φ4 · (N'–N) · d{(X(y)–X0(y)}/dy = –0.7203 × 10$^{-4}$
y = 6.9600 ... φ4 · (N'–N) · d{(X(y)–X0(y)}/dy = –0.3685 × 10$^{-3}$
y = 8.1200 ... φ4 · (N'–N) · d{(X(y)–X0(y)}/dy = –0.9093 × 10$^{-2}$
y = 9.2800 ... φ4 · (N'–N) · d{(X(y)–X0(y)}/dy = –0.2387 × 10$^{-2}$
y = 10.4400 ... φ4 · (N'–N) · d{(X(y)–X0(y)}/dy = –0.6884 × 10$^{-5}$
y = 11.6000 ... φ4 · (N'–N) · d{(X(y)–X0(y)}/dy = –0.4051 × 10$^{-2}$
[Values Corresponding to Condition (16) (aspherical surface r18 in the fourth lens unit Gr4)]

y = 1.2000 ... φ4 · (N'–N) · d{(X(y)–X0(y)}/dy = –0.2979 × 10$^{-5}$
y = 2.4000 ... φ4 · (N'–N) · d{(X(y)–X0(y)}/dy = –0.2476 × 10$^{-4}$
y = 3.6000 ... φ4 · (N'–N) · d{(X(y)–X0(y)}/dy = –0.8677 × 10$^{-4}$
y = 4.8000 ... φ4 · (N'–N) · d{(X(y)–X0(y)}/dy = 0.2052 × 10$^{-3}$
y = 6.0000 ... φ4 · (N'–N) · d{(X(y)–X0(y)}/dy = –0.3610 × 10$^{-3}$
y = 7.2000 ... φ4 · (N'–N) · d{(X(y)–X0(y)}/dy = –04449 × 10$^{-3}$
y = 8.4000 ... φ4 · (N'–N) · d{(X(y)–X0(y)}/dy = –0.2227 × 10$^{-3}$
y = 9.6000 ... φ4 · (N'–N) · d{(X(y)–X0(y)}/dy = 0.5168 × 10$^{-3}$
y = 10.8000 ... φ4 · (N'–N) · d{(X(y)–X0(y)}/dy = 0.1222 × 10$^{-2}$
y = 12.0000 ... φ4 · (N'–N) · d{(X(y)–X0(y)}/dy = –0.1596 × 10$^{-2}$

TABLE 5

<< Embodiment 5 >>
f = 39.1~87.3~178.0
FNO = 4.12~7.00~9.50

| | Radius of Curvature | | Axial Distance | | Index of Refraction | | Abbe Number |
|---|---|---|---|---|---|---|---|
| r1 | 32.314 | | | | | | |
| | | d1 | 2.500 | N1 | 1.84666 | ν1 | 23.82 |
| r2* | 24.370 | | | | | | |
| | | d2 | 0.500 | | | | |
| r3 | 27.548 | | | | | | |
| | | d3 | 4.803 | N2 | 1.51680 | ν2 | 64.20 |
| r4 | 640.381 | | | | | | |
| | | d4 | 3.240~19.240~36.240 | | | | |
| r5* | –53.447 | | | | | | |
| | | d5 | 1.700 | N3 | 1.80700 | ν3 | 39.79 |
| r6 | 13.245 | | | | | | |
| | | d6 | 0.400 | | | | |
| r7 | 13.812 | | | | | | |
| | | d7 | 4.500 | N4 | 1.78472 | ν4 | 25.75 |
| r8* | 83.179 | | | | | | |
| | | d8 | 9.000~6.867~1.388 | | | | |
| r9 | ∞ | | | | | | |
| | | d9 | 11.000 | N5 | 1.51680 | ν5 | 64.20 |
| r10 | ∞ | | | | | | |
| | | d10 | 0.700 | | | | |
| r11 | ∞ (Aperture Diaphragm) | | | | | | |
| | | d11 | 0.500 | | | | |
| r12 | 21.427 | | | | | | |
| | | d12 | 1.735 | N6 | 1.84666 | ν6 | 23.82 |
| r13 | 13.712 | | | | | | |
| | | d13 | 0.300 | | | | |
| r14 | 14.360 | | | | | | |
| | | d14 | 4.706 | N7 | 1.51728 | ν7 | 69.43 |
| r15* | –21.848 | | | | | | |
| | | d15 | 0.200 | | | | |
| r16 | ∞ (Light Beam Restricting Plate) | | | | | | |
| | | d16 | 24.339~10.741~2.500 | | | | |
| r17* | –91.233 | | | | | | |
| | | d17 | 4.500 | N8 | 1.84666 | ν8 | 23.82 |
| r18* | –26.641 | | | | | | |
| | | d18 | 3.500 | | | | |
| r19 | –14.378 | | | | | | |
| | | d19 | 1.200 | N9 | 1.74400 | ν9 | 44.93 |
| r20 | 130.803 | | | | | | |
| | Σd = 79.312~79.586~82.866 | | | | | | |

[Aspherical Coefficients]

r2:    ε = 1.0000
       A4 = –0.10486 × 10$^{-5}$
       A6 = 0.13352 × 10$^{-7}$
       A8 = –0.20956 × 10$^{-9}$
       A10 = 0.12744 × 10$^{-11}$
       A12 = –0.28614 × 10$^{-14}$
r5:    ε = 1.0000
       A4 = 0.15438 × 10$^{-4}$
       A6 = –0.85441 × 10$^{-8}$
       A8 = 0.38520 × 10$^{-9}$
       A10 = –0.17754 × 10$^{-11}$
       A12 = –0.27882 × 10$^{-14}$
r8:    ε = 1.0000
       A4 = 0.27189 × 10$^{-4}$
       A6 = 0.10225 × 10$^{-7}$
       A8 = 0.22886 × 10$^{-8}$
       A10 = –0.11306 × 10$^{-10}$
       A12 = –0.29531 × 10$^{-13}$
r15:   ε = 1.0000
       A4 = 0.93563 × 10$^{-5}$
       A6 = 0.41482 × 10$^{-6}$
       A8 = –0.17017 × 10$^{-7}$
       A10 = 0.22823 × 10$^{-9}$
       A12 = –0.46080 × 10$^{-13}$
r17:   ε = 1.0000
       A4 = 0.60640 × 10$^{-5}$
       A6 = –0.10928 × 10$^{-6}$
       A8 = 0.35619 × 10$^{-8}$
       A10 = –0.17088 × 10$^{-10}$

TABLE 5-continued $$A12 = -0.99510 \times 10^{-14}$$
r18: $\epsilon = 1.0000$
$$A4 = -0.16264 \times 10^{-4}$$
$$A6 = -0.13371 \times 10^{-6}$$
$$A8 = 0.18474 \times 10^{-8}$$
$$A10 = 0.56204 \times 10^{-11}$$
$$A12 = -0.99199 \times 10^{-13}$$

[Values Corresponding to Condition (6) (aspherical surface r2 in the first lens unit Gr1)]

$y = 1.3300 \ldots \phi1 \cdot (N' - N) \cdot d\{(X(y) - X0(y)\}/dy = 0.8164 \times 10^{-7}$
$y = 2.6600 \ldots \phi1 \cdot (N' - N) \cdot d\{(X(y) - X0(y)\}/dy = 0.5967 \times 10^{-6}$
$y = 3.9900 \ldots \phi1 \cdot (N' - N) \cdot d\{(X(y) - X0(y)\}/dy = 0.1790 \times 10^{-5}$
$y = 5.3200 \ldots \phi1 \cdot (N' - N) \cdot d\{(X(y) - X0(y)\}/dy = 0.3867 \times 10^{-5}$
$y = 6.6500 \ldots \phi1 \cdot (N' - N) \cdot d\{(X(y) - X0(y)\}/dy = 0.7443 \times 10^{-5}$
$y = 7.9800 \ldots \phi1 \cdot (N' - N) \cdot d\{(X(y) - X0(y)\}/dy = 0.1376 \times 10^{-4}$
$y = 9.3100 \ldots \phi1 \cdot (N' - N) \cdot d\{(X(y) - X0(y)\}/dy = 0.2405 \times 10^{-4}$
$y = 10.6400 \ldots \phi1 \cdot (N' - N) \cdot d\{(X(y) - X0(y)\}/dy = 0.3875 \times 10^{-4}$
$y = 11.9700 \ldots \phi1 \cdot (N' - N) \cdot d\{(X(y) - X0(y)\}/dy = 0.6044 \times 10^{-4}$
$y = 13.3000 \ldots \phi1 \cdot (N' - N) \cdot d\{(X(y) - X0(y)\}/dy = 0.1120 \times 10^{-3}$

[Values Corresponding to Condition (10) (aspherical surface r5 in the second lens unit Gr2)]

$y = 1.0900 \ldots \phi2 \cdot (N' - N) \cdot d\{(X(y) - X0(y)\}/dy = -0.1793 \times 10^{-5}$
$y = 2.1800 \ldots \phi2 \cdot (N' - N) \cdot d\{(X(y) - X0(y)\}/dy = -0.1431 \times 10^{-4}$
$y = 3.2700 \ldots \phi2 \cdot (N' - N) \cdot d\{(X(y) - X0(y)\}/dy = -0.4827 \times 10^{-4}$
$y = 4.3600 \ldots \phi2 \cdot (N' - N) \cdot d\{(X(y) - X0(y)\}/dy = -0.1149 \times 10^{-3}$
$y = 5.4500 \ldots \phi2 \cdot (N' - N) \cdot d\{(X(y) - X0(y)\}/dy = -0.2268 \times 10^{-3}$
$y = 6.5400 \ldots \phi2 \cdot (N' - N) \cdot d\{(X(y) - X0(y)\}/dy = -0.3997 \times 10^{-3}$
$y = 7.6300 \ldots \phi2 \cdot (N' - N) \cdot d\{(X(y) - X0(y)\}/dy = -0.6510 \times 10^{-3}$
$y = 8.7200 \ldots \phi2 \cdot (N' - N) \cdot d\{(X(y) - X0(y)\}/dy = -0.9929 \times 10^{-3}$
$y = 9.8100 \ldots \phi2 \cdot (N' - N) \cdot d\{(X(y) - X0(y)\}/dy = -0.1412 \times 10^{-2}$
$y = 10.9000 \ldots \phi2 \cdot (N' - N) \cdot d\{(X(y) - X0(y)\}/dy = -0.1822 \times 10^{-2}$

[Values Corresponding to Condition (10) (aspherical surface r8 in the second lens unit Gr2)]

$y = 0.8700 \ldots \phi2 \cdot (N' - N) \cdot d\{(X(y) - X0(y)\}/dy = 0.1563 \times 10^{-5}$
$y = 1.7400 \ldots \phi2 \cdot (N' - N) \cdot d\{(X(y) - X0(y)\}/dy = 0.1254 \times 10^{-4}$
$y = 2.6100 \ldots \phi2 \cdot (N' - N) \cdot d\{(X(y) - X0(y)\}/dy = 0.4266 \times 10^{-4}$
$y = 3.4800 \ldots \phi2 \cdot (N' - N) \cdot d\{(X(y) - X0(y)\}/dy = 0.1029 \times 10^{-3}$
$y = 4.3500 \ldots \phi2 \cdot (N' - N) \cdot d\{(X(y) - X0(y)\}/dy = 0.2077 \times 10^{-3}$
$y = 5.2200 \ldots \phi2 \cdot (N' - N) \cdot d\{(X(y) - X0(y)\}/dy = 0.3771 \times 10^{-3}$
$y = 6.0900 \ldots \phi2 \cdot (N' - N) \cdot d\{(X(y) - X0(y)\}/dy = 0.6395 \times 10^{-3}$
$y = 6.9600 \ldots \phi2 \cdot (N' - N) \cdot d\{(X(y) - X0(y)\}/dy = 0.1029 \times 10^{-2}$
$y = 7.8300 \ldots \phi2 \cdot (N' - N) \cdot d\{(X(y) - X0(y)\}/dy = 0.1574 \times 10^{-2}$
$y = 8.7000 \ldots \phi2 \cdot (N' - N) \cdot d\{(X(y) - X0(y)\}/dy = 0.2264 \times 10^{-2}$

[Values Corresponding to Condition (14) (aspherical surface r15 in the third lens unit Gr3)]

$y = 0.6349 \ldots \phi2 \cdot (N' - N) \cdot d\{(X(y) - X0(y)\}/dy = -0.1871 \times 10^{-6}$
$y = 1.2698 \ldots \phi3 \cdot (N' - N) \cdot d\{(X(y) - X0(y)\}/dy = -0.1602 \times 10^{-5}$
$y = 1.9047 \ldots \phi3 \cdot (N' - N) \cdot d\{(X(y) - X0(y)\}/dy = -0.5889 \times 10^{-5}$
$y = 2.5396 \ldots \phi3 \cdot (N' - N) \cdot d\{(X(y) - X0(y)\}/dy = -0.1510 \times 10^{-4}$
$y = 3.1744 \ldots \phi3 \cdot (N' - N) \cdot d\{(X(y) - X0(y)\}/dy = -0.3106 \times 10^{-4}$
$y = 3.8093 \ldots \phi3 \cdot (N' - N) \cdot d\{(X(y) - X0(y)\}/dy = -0.5453 \times 10^{-4}$
$y = 4.4442 \ldots \phi3 \cdot (N' - N) \cdot d\{(X(y) - X0(y)\}/dy = -0.8518 \times 10^{-4}$
$y = 5.0791 \ldots \phi3 \cdot (N' - N) \cdot d\{(X(y) - X0(y)\}/dy = -0.1246 \times 10^{-3}$
$y = 5.7140 \ldots \phi3 \cdot (N' - N) \cdot d\{(X(y) - X0(y)\}/dy = -0.1860 \times 10^{-3}$
$y = 6.3489 \ldots \phi3 \cdot (N' - N) \cdot d\{(X(y) - X0(y)\}/dy = -0.3146 \times 10^{-3}$

[Values Corresponding to Condition (16) (aspherical surface r17 in the fourth lens unit Gr4)]

$y = 1.1200 \ldots \phi4 \cdot (N' - N) \cdot d\{(X(y) - X0(y)\}/dy = -0.8643 \times 10^{-6}$
$y = 2.2400 \ldots \phi4 \cdot (N' - N) \cdot d\{(X(y) - X0(y)\}/dy = -0.6379 \times 10^{-5}$
$y = 3.3600 \ldots \phi4 \cdot (N' - N) \cdot d\{(X(y) - X0(y)\}/dy = -0.2011 \times 10^{-4}$
$y = 4.4800 \ldots \phi4 \cdot (N' - N) \cdot d\{(X(y) - X0(y)\}/dy = -0.4989 \times 10^{-4}$
$y = 5.6000 \ldots \phi4 \cdot (N' - N) \cdot d\{(X(y) - X0(y)\}/dy = -0.1212 \times 10^{-3}$
$y = 6.7200 \ldots \phi4 \cdot (N' - N) \cdot d\{(X(y) - X0(y)\}/dy = -0.2904 \times 10^{-3}$
$y = 7.8400 \ldots \phi4 \cdot (N' - N) \cdot d\{(X(y) - X0(y)\}/dy = -0.6342 \times 10^{-3}$
$y = 8.9600 \ldots \phi4 \cdot (N' - N) \cdot d\{(X(y) - X0(y)\}/dy = -0.1167 \times 10^{-2}$
$y = 10.0800 \ldots \phi4 \cdot (N' - N) \cdot d\{(X(y) - X0(y)\}/dy = -0.1606 \times 10^{-2}$
$y = 11.2000 \ldots \phi4 \cdot (N' - N) \cdot d\{(X(y) - X0(y)\}/dy = -0.8664 \times 10^{-3}$

[Values Corresponding to Condition (16) (aspherical surface r18 in the fourth lens unit Gr4)]

$y = 1.1800 \ldots \phi4 \cdot (N' - N) \cdot d\{(X(y) - X0(y)\}/dy = -0.2847 \times 10^{-5}$
$y = 2.3600 \ldots \phi4 \cdot (N' - N) \cdot d\{(X(y) - X0(y)\}/dy = -0.2378 \times 10^{-4}$
$y = 3.5400 \ldots \phi4 \cdot (N' - N) \cdot d\{(X(y) - X0(y)\}/dy = -0.8451 \times 10^{-4}$
$y = 4.7200 \ldots \phi4 \cdot (N' - N) \cdot d\{(X(y) - X0(y)\}/dy = -0.2074 \times 10^{-3}$
$y = 5.9000 \ldots \phi4 \cdot (N' - N) \cdot d\{(X(y) - X0(y)\}/dy = -0.4006 \times 10^{-3}$
$y = 7.0800 \ldots \phi4 \cdot (N' - N) \cdot d\{(X(y) - X0(y)\}/dy = -0.6376 \times 10^{-3}$
$y = 8.2600 \ldots \phi4 \cdot (N' - N) \cdot d\{(X(y) - X0(y)\}/dy = -0.8703 \times 10^{-2}$
$y = 9.4400 \ldots \phi4 \cdot (N' - N) \cdot d\{(X(y) - X0(y)\}/dy = -0.1201 \times 10^{-2}$
$y = 10.6200 \ldots \phi4 \cdot (N' - N) \cdot d\{(X(y) - X0(y)\}/dy = -0.2496 \times 10^{-2}$
$y = 11.8000 \ldots \phi4 \cdot (N' - N) \cdot d\{(X(y) - X0(y)\}/dy = -0.8005 \times 10^{-2}$

TABLE 6

<< Embodiment 6 >>
f = 39.1~87.3~178.0
FNO = 4.12~7.00~9.50

| Radius of Curvature | Axial Distance | Index of Refraction | Abbe Number |
|---|---|---|---|
| r1  31.822 | | | |
| | d1  2.000 | N1  1.84666 | ν1  23.82 |
| r2*  24.038 | | | |
| | d2  0.500 | | |
| r3  27.548 | | | |
| | d3  5.000 | N2  1.51680 | ν2  64.20 |
| r4  714.291 | | | |
| | d4  1.500~17.500~36.500 | | |
| r5*  −53.899 | | | |
| | d5  1.600 | N3  1.80700 | ν3  39.79 |
| r6  13.245 | | | |
| | d6  0.500 | | |
| r7  13.812 | | | |
| | d7  4.600 | N4  1.78472 | ν4  25.75 |
| r8*  111.088 | | | |
| | d8  8.500~6.065~0.995 | | |
| r9  ∞ | | | |
| | d9  11.000 | N5  1.51680 | ν5  64.20 |
| r10  ∞ | | | |
| | d10  0.200 | | |
| r11  ∞ (Aperture Diaphragm) | | | |
| | d11  0.500 | | |
| r12  22.991 | | | |
| | d12  1.735 | N6  1.84666 | ν6  23.82 |
| r13  14.003 | | | |
| | d13  0.300 | | |
| r14  14.451 | | | |
| | d14  4.700 | N7  1.51728 | ν7  69.43 |
| r15*  −21.067 | | | |
| | d15  0.200 | | |
| r16  ∞ (Light Beam Restricting Plate) | | | |
| | d16  23.869~10.875~2.700 | | |
| r17*  −80.435 | | | |
| | d17  4.400 | N8  1.84666 | ν8  23.82 |
| r18*  −25.446 | | | |
| | d18  3.300 | | |
| r19  −14.082 | | | |
| | d19  1.302 | N9  1.74400 | ν9  44.93 |
| r20  119.136 | | | |

Σd = 75.706~76.277~82.632

[Aspherical Coefficients]

r2: $\epsilon = 1.0000$
$$A4 = -0.95844 \times 10^{-6}$$
$$A6 = 0.43500 \times 10^{-8}$$
$$A8 = -0.75930 \times 10^{-10}$$
$$A10 = 0.40266 \times 10^{-12}$$
$$A12 = -0.88228 \times 10^{-15}$$

r5: $\epsilon = 1.0000$
$$A4 = 0.15591 \times 10^{-4}$$
$$A6 = 0.46875 \times 10^{-7}$$
$$A8 = -0.93570 \times 10^{-11}$$
$$A10 = -0.85301 \times 10^{-12}$$
$$A12 = -0.27882 \times 10^{-14}$$

r8: $\epsilon = 1.0000$
$$A4 = 0.30441 \times 10^{-4}$$
$$A6 = 0.58747 \times 10^{-7}$$
$$A8 = 0.23924 \times 10^{-8}$$

TABLE 6-continued

```
            A10 = -0.12474 × 10⁻¹⁰
            A12 = -0.29758 × 10⁻¹³
    r15:    ε = 1.0000
            A4 = 0.73939 × 10⁻⁵
            A6 = 0.45904 × 10⁻⁶
            A8 = -0.16826 × 10⁻⁷
            A10 = 0.23028 × 10⁻⁹
            A12 = -0.30030 × 10⁻¹³
    r17:    ε = 1.0000
            A4 = 0.49253 × 10⁻⁵
            A6 = -0.10596 × 10⁻⁶
            A8 = 0.43371 × 10⁻⁸
            A10 = -0.22541 × 10⁻¹⁰
            A12 = -0.11971 × 10⁻¹³
    r18:    ε = 1.0000
            A4 = -0.18625 × 10⁻⁴
            A6 = -0.11558 × 10⁻⁶
            A8 = 0.19965 × 10⁻⁸
            A10 = 0.70729 × 10⁻¹¹
            A12 = -0.12821 × 10⁻²
```

[Values Corresponding to Condition (6) (aspherical surface r2 in the first lens unit Gr1)]

$y = 1.3300 \ldots \phi1 \cdot (N' - N) \cdot d\{(X(y) - X0(y)\}/dy = 0.7556 \times 10^{-7}$
$y = 2.6600 \ldots \phi1 \cdot (N' - N) \cdot d\{(X(y) - X0(y)\}/dy = 0.5867 \times 10^{-6}$
$y = 3.9900 \ldots \phi1 \cdot (N' - N) \cdot d\{(X(y) - X0(y)\}/dy = 0.1915 \times 10^{-5}$
$y = 5.3200 \ldots \phi1 \cdot (N' - N) \cdot d\{(X(y) - X0(y)\}/dy = 0.4463 \times 10^{-5}$
$y = 6.6500 \ldots \phi1 \cdot (N' - N) \cdot d\{(X(y) - X0(y)\}/dy = 0.8872 \times 10^{-5}$
$y = 7.9800 \ldots \phi1 \cdot (N' - N) \cdot d\{(X(y) - X0(y)\}/dy = 0.1623 \times 10^{-4}$
$y = 9.3100 \ldots \phi1 \cdot (N' - N) \cdot d\{(X(y) - X0(y)\}/dy = 0.2811 \times 10^{-4}$
$y = 10.6400 \ldots \phi1 \cdot (N' - N) \cdot d\{(X(y) - X0(y)\}/dy = 0.4656 \times 10^{-4}$
$y = 11.9700 \ldots \phi1 \cdot (N' - N) \cdot d\{(X(y) - X0(y)\}/dy = 0.7533 \times 10^{-4}$
$y = 13.3000 \ldots \phi1 \cdot (N' - N) \cdot d\{(X(y) - X0(y)\}/dy = 0.1257 \times 10^{-3}$

[Values Corresponding to Condition (10) (aspherical surface r5 in the second lens unit Gr2)]

$y = 1.0900 \ldots \phi2 \cdot (N' - N) \cdot d\{(X(y) - X0(y)\}/dy = -0.1618 \times 10^{-5}$
$y = 2.1800 \ldots \phi2 \cdot (N' - N) \cdot d\{(X(y) - X0(y)\}/dy = -0.1315 \times 10^{-4}$
$y = 3.2700 \ldots \phi2 \cdot (N' - N) \cdot d\{(X(y) - X0(y)\}/dy = -0.4555 \times 10^{-4}$
$y = 4.3600 \ldots \phi2 \cdot (N' - N) \cdot d\{(X(y) - X0(y)\}/dy = -0.1117 \times 10^{-3}$
$y = 5.4500 \ldots \phi2 \cdot (N' - N) \cdot d\{(X(y) - X0(y)\}/dy = -0.2272 \times 10^{-3}$
$y = 6.5400 \ldots \phi2 \cdot (N' - N) \cdot d\{(X(y) - X0(y)\}/dy = -0.4097 \times 10^{-3}$
$y = 7.6300 \ldots \phi2 \cdot (N' - N) \cdot d\{(X(y) - X0(y)\}/dy = -0.6766 \times 10^{-3}$
$y = 8.7200 \ldots \phi2 \cdot (N' - N) \cdot d\{(X(y) - X0(y)\}/dy = -0.1037 \times 10^{-2}$
$y = 9.8100 \ldots \phi2 \cdot (N' - N) \cdot d\{(X(y) - X0(y)\}/dy = -0.1473 \times 10^{-2}$
$y = 10.9000 \ldots \phi2 \cdot (N' - N) \cdot d\{(X(y) - X0(y)\}/dy = -0.1904 \times 10^{-2}$

[Values Corresponding to Condition (10) (aspherical surface r8 in the second lens unit Gr2)]

$y = 0.8700 \ldots \phi2 \cdot (N' - N) \cdot d\{(X(y) - X0(y)\}/dy = 0.1558 \times 10^{-5}$
$y = 1.7400 \ldots \phi2 \cdot (N' - N) \cdot d\{(X(y) - X0(y)\}/dy = 0.1256 \times 10^{-4}$
$y = 2.6100 \ldots \phi2 \cdot (N' - N) \cdot d\{(X(y) - X0(y)\}/dy = 0.4308 \times 10^{-4}$
$y = 3.4800 \ldots \phi2 \cdot (N' - N) \cdot d\{(X(y) - X0(y)\}/dy = 0.1051 \times 10^{-3}$
$y = 4.3500 \ldots \phi2 \cdot (N' - N) \cdot d\{(X(y) - X0(y)\}/dy = 0.2144 \times 10^{-3}$
$y = 5.2200 \ldots \phi2 \cdot (N' - N) \cdot d\{(X(y) - X0(y)\}/dy = 0.3939 \times 10^{-3}$
$y = 6.0900 \ldots \phi2 \cdot (N' - N) \cdot d\{(X(y) - X0(y)\}/dy = 0.6747 \times 10^{-3}$
$y = 6.9600 \ldots \phi2 \cdot (N' - N) \cdot d\{(X(y) - X0(y)\}/dy = 0.1095 \times 10^{-2}$
$y = 7.8300 \ldots \phi2 \cdot (N' - N) \cdot d\{(X(y) - X0(y)\}/dy = 0.1689 \times 10^{-2}$
$y = 8.7000 \ldots \phi2 \cdot (N' - N) \cdot d\{(X(y) - X0(y)\}/dy = 0.2454 \times 10^{-2}$

[Values Corresponding to Condition (14) (aspherical surface r15 in the third lens unit Gr3)]

$y = 0.5904 \ldots \phi3 \cdot (N' - N) \cdot d\{(X(y) - X0(y)\}/dy = -0.1173 \times 10^{-6}$
$y = 1.1807 \ldots \phi3 \cdot (N' - N) \cdot d\{(X(y) - X0(y)\}/dy = -0.1019 \times 10^{-5}$
$y = 1.7711 \ldots \phi3 \cdot (N' - N) \cdot d\{(X(y) - X0(y)\}/dy = -0.3834 \times 10^{-5}$
$y = 2.3614 \ldots \phi3 \cdot (N' - N) \cdot d\{(X(y) - X0(y)\}/dy = -0.1012 \times 10^{-4}$
$y = 2.9518 \ldots \phi3 \cdot (N' - N) \cdot d\{(X(y) - X0(y)\}/dy = -0.2155 \times 10^{-4}$
$y = 3.5421 \ldots \phi3 \cdot (N' - N) \cdot d\{(X(y) - X0(y)\}/dy = -0.3940 \times 10^{-4}$
$y = 4.1325 \ldots \phi3 \cdot (N' - N) \cdot d\{(X(y) - X0(y)\}/dy = -0.6430 \times 10^{-4}$
$y = 4.7228 \ldots \phi3 \cdot (N' - N) \cdot d\{(X(y) - X0(y)\}/dy = -0.9738 \times 10^{-4}$
$y = 5.3132 \ldots \phi3 \cdot (N' - N) \cdot d\{(X(y) - X0(y)\}/dy = -0.1446 \times 10^{-3}$
$y = 5.9035 \ldots \phi3 \cdot (N' - N) \cdot d\{(X(y) - X0(y)\}/dy = -0.2267 \times 10^{-3}$

[Values Corresponding to Condition (16) (aspherical surface r17 in the fourth lens unit Gr4)]

$y = 1.1100 \ldots \phi4 \cdot (N' - N) \cdot d\{(X(y) - X0(y)\}/dy = -0.7140 \times 10^{-6}$
$y = 2.2200 \ldots \phi4 \cdot (N' - N) \cdot d\{(X(y) - X0(y)\}/dy = -0.5234 \times 10^{-5}$
$y = 3.3300 \ldots \phi4 \cdot (N' - N) \cdot d\{(X(y) - X0(y)\}/dy = -0.1688 \times 10^{-4}$
$y = 4.4400 \ldots \phi4 \cdot (N' - N) \cdot d\{(X(y) - X0(y)\}/dy = -0.4554 \times 10^{-4}$
$y = 5.5500 \ldots \phi4 \cdot (N' - N) \cdot d\{(X(y) - X0(y)\}/dy = -0.1238 \times 10^{-3}$
$y = 6.6600 \ldots \phi4 \cdot (N' - N) \cdot d\{(X(y) - X0(y)\}/dy = -0.3214 \times 10^{-3}$
$y = 7.7700 \ldots \phi4 \cdot (N' - N) \cdot d\{(X(y) - X0(y)\}/dy = -0.7265 \times 10^{-3}$
$y = 8.8800 \ldots \phi4 \cdot (N' - N) \cdot d\{(X(y) - X0(y)\}/dy = -0.1334 \times 10^{-2}$
$y = 9.9900 \ldots \phi4 \cdot (N' - N) \cdot d\{(X(y) - X0(y)\}/dy = -0.1743 \times 10^{-2}$
$y = 11.1000 \ldots \phi4 \cdot (N' - N) \cdot d\{(X(y) - X0(y)\}/dy = -0.5032 \times 10^{-3}$

[Values Corresponding to Condition (16) (aspherical surface r18 in the fourth lens unit Gr4)]

$y = 1.1800 \ldots \phi4 \cdot (N' - N) \cdot d\{(X(y) - X0(y)\}/dy = -0.3411 \times 10^{-5}$
$y = 2.3600 \ldots \phi4 \cdot (N' - N) \cdot d\{(X(y) - X0(y)\}/dy = -0.2816 \times 10^{-4}$
$y = 3.5400 \ldots \phi4 \cdot (N' - N) \cdot d\{(X(y) - X0(y)\}/dy = -0.9838 \times 10^{-4}$
$y = 4.7200 \ldots \phi4 \cdot (N' - N) \cdot d\{(X(y) - X0(y)\}/dy = -0.2362 \times 10^{-3}$
$y = 5.9000 \ldots \phi4 \cdot (N' - N) \cdot d\{(X(y) - X0(y)\}/dy = -0.4441 \times 10^{-3}$
$y = 7.0800 \ldots \phi4 \cdot (N' - N) \cdot d\{(X(y) - X0(y)\}/dy = -0.6831 \times 10^{-3}$
$y = 8.2600 \ldots \phi4 \cdot (N' - N) \cdot d\{(X(y) - X0(y)\}/dy = -0.9048 \times 10^{-3}$
$y = 9.4400 \ldots \phi4 \cdot (N' - N) \cdot d\{(X(y) - X0(y)\}/dy = -0.1307 \times 10^{-2}$
$y = 10.6200 \ldots \phi4 \cdot (N' - N) \cdot d\{(X(y) - X0(y)\}/dy = -0.3198 \times 10^{-2}$
$y = 11.8000 \ldots \phi4 \cdot (N' - N) \cdot d\{(X(y) - X0(y)\}/dy = -0.1125 \times 10^{-1}$

TABLE 7

<< Embodiment 7 >>
f = 39.1~87.3~178.0
FNO = 4.12~7.00~9.50

| | Radius of Curvature | Axial Distance | Index of Refraction | Abbe Number |
|---|---|---|---|---|
| r1 | 32.525 | | | |
| | | d1  2.500 | N1  1.84666 | ν1  23.82 |
| r2* | 24.445 | | | |
| | | d2  0.500 | | |
| r3 | 27.548 | | | |
| | | d3  4.803 | N2  1.51680 | ν2  64.20 |
| r4 | 705.373 | | | |
| | | d4  3.240~19.240~36.240 | | |
| r5* | -53.635 | | | |
| | | d5  1.700 | N3  1.80700 | ν3  39.79 |
| r6 | 13.245 | | | |
| | | d6  0.500 | | |
| r7 | 13.812 | | | |
| | | d7  4.500 | N4  1.78472 | ν4  25.75 |
| r8* | 79.869 | | | |
| | | d8  9.000~6.712~1.137 | | |
| r9 | ∞ | | | |
| | | d9  11.000 | N5  1.51680 | ν5  64.20 |
| r10 | ∞ | | | |
| | | d10  0.700 | | |
| r11 | ∞ (Aperture Diaphragm) | | | |
| | | d11  0.500 | | |
| r12 | 21.462 | | | |
| | | d12  1.735 | N6  1.84666 | ν6  23.82 |
| r13 | 13.705 | | | |
| | | d13  0.300 | | |
| r14 | 14.306 | | | |
| | | d14  4.700 | N7  1.51728 | ν7  69.43 |
| r15* | -21.883 | | | |
| | | d15  0.200 | | |
| r16 | ∞ (Light Beam Restricting Plate) | | | |
| | | d16  24.110~10.676~2.500 | | |
| r17* | -93.734 | | | |
| | | d17  4.500 | N8  1.84666 | ν8  23.82 |
| r18* | -26.808 | | | |
| | | d18  3.500 | | |
| r19 | -14.422 | | | |
| | | d19  1.200 | N9  1.74400 | ν9  44.93 |
| r20 | 125.570 | | | |
| | | Σd = 79.189~79.466~82.715 | | |

[Aspherical Coefficients]

```
    r2:    ε = 1.0000
           A4 = -0.93771 × 10⁻⁶
           A6 = 0.98042 × 10⁻⁸
```

TABLE 7-continued

```
            A8  = -0.15774 × 10⁻⁹
            A10 =  0.95526 × 10⁻¹²
            A12 = -0.21664 × 10⁻¹⁴
    r5:     ε = 1.0000
            A4  =  0.16117 × 10⁻⁴
            A6  = -0.82379 × 10⁻⁸
            A8  =  0.47967 × 10⁻⁹
            A10 = -0.23226 × 10⁻¹¹
            A12 = -0.27882 × 10⁻¹⁴
    r8      ε = 1.0000
            A4  =  0.28766 × 10⁻⁴
            A6  =  0.31932 × 10⁻⁷
            A8  =  0.23659 × 10⁻⁸
            A10 = -0.11119 × 10⁻¹⁰
            A12 = -0.30194 × 10⁻¹³
    r15:    ε = 1.0000
            A4  =  0.10069 × 10⁻⁴
            A6  =  0.42316 × 10⁻⁶
            A8  = -0.16964 × 10⁻⁷
            A10 =  0.22839 × 10⁻⁹
            A12 = -0.46096 × 10⁻¹³
    r17:    ε = 1.0000
            A4  =  0.61828 × 10⁻⁵
            A6  = -0.11148 × 10⁻⁶
            A8  =  0.34762 × 10⁻⁸
            A10 = -0.16648 × 10⁻¹⁰
            A12 = -0.42342 × 10⁻¹⁴
    r18:    ε = 1.0000
            A4  = -0.15908 × 10⁻⁴
            A6  = -0.13729 × 10⁻⁶
            A8  =  0.17717 × 10⁻⁸
            A10 =  0.56731 × 10⁻¹¹
            A12 = -0.91010 × 10⁻¹³
```

[Values Corresponding to Condition (6) (aspherical surface r2 in the first lens unit Gr1)]

$y = 1.3300 \ldots \phi 1 \cdot (N' - N) \cdot d\{(X(y) - X0(y)\}/dy = 0.7344 \times 10^{-7}$
$y = 2.6600 \ldots \phi 1 \cdot (N' - N) \cdot d\{(X(y) - X0(y)\}/dy = 0.5463 \times 10^{-6}$
$y = 3.9900 \ldots \phi 1 \cdot (N' - N) \cdot d\{(X(y) - X0(y)\}/dy = 0.1682 \times 10^{-5}$
$y = 5.3200 \ldots \phi 1 \cdot (N' - N) \cdot d\{(X(y) - X0(y)\}/dy = 0.3730 \times 10^{-5}$
$y = 6.6500 \ldots \phi 1 \cdot (N' - N) \cdot d\{(X(y) - X0(y)\}/dy = 0.7269 \times 10^{-5}$
$y = 7.9800 \ldots \phi 1 \cdot (N' - N) \cdot d\{(X(y) - X0(y)\}/dy = 0.1340 \times 10^{-4}$
$y = 9.3100 \ldots \phi 1 \cdot (N' - N) \cdot d\{(X(y) - X0(y)\}/dy = 0.2332 \times 10^{-4}$
$y = 10.6400 \ldots \phi 1 \cdot (N' - N) \cdot d\{(X(y) - X0(y)\}/dy = 0.3785 \times 10^{-4}$
$y = 11.9700 \ldots \phi 1 \cdot (N' - N) \cdot d\{(X(y) - X0(y)\}/dy = 0.5993 \times 10^{-4}$
$y = 13.3000 \ldots \phi 1 \cdot (N' - N) \cdot d\{(X(y) - X0(y)\}/dy = 0.1088 \times 10^{-3}$

[Values Corresponding to Condition (10) (aspherical surface r5 in the second lens unit Gr2)]

$y = 1.0900 \ldots \phi 2 \cdot (N' - N) \cdot d\{(X(y) - X0(y)\}/dy = -0.5173 \times 10^{-5}$
$y = 2.1800 \ldots \phi 2 \cdot (N' - N) \cdot d\{(X(y) - X0(y)\}/dy = -0.4132 \times 10^{-4}$
$y = 3.2700 \ldots \phi 2 \cdot (N' - N) \cdot d\{(X(y) - X0(y)\}/dy = -0.1395 \times 10^{-3}$
$y = 4.3600 \ldots \phi 2 \cdot (N' - N) \cdot d\{(X(y) - X0(y)\}/dy = -0.3328 \times 10^{-3}$
$y = 5.4500 \ldots \phi 2 \cdot (N' - N) \cdot d\{(X(y) - X0(y)\}/dy = -0.6600 \times 10^{-3}$
$y = 6.5400 \ldots \phi 2 \cdot (N' - N) \cdot d\{(X(y) - X0(y)\}/dy = -0.1170 \times 10^{-2}$
$y = 7.6300 \ldots \phi 2 \cdot (N' - N) \cdot d\{(X(y) - X0(y)\}/dy = -0.1918 \times 10^{-2}$
$y = 8.7200 \ldots \phi 2 \cdot (N' - N) \cdot d\{(X(y) - X0(y)\}/dy = -0.2942 \times 10^{-2}$
$y = 9.8100 \ldots \phi 2 \cdot (N' - N) \cdot d\{(X(y) - X0(y)\}/dy = -0.4196 \times 10^{-2}$
$y = 10.9000 \ldots \phi 2 \cdot (N' - N) \cdot d\{(X(y) - X0(y)\}/dy = -0.5392 \times 10^{-2}$

[Values Corresponding to Condition (10) (aspherical surface r8 in the second lens unit Gr2)]

$y = 0.8700 \ldots \phi 2 \cdot (N' - N) \cdot d\{(X(y) - X0(y)\}/dy = -0.2881 \times 10^{-5}$
$y = 1.7400 \ldots \phi 2 \cdot (N' - N) \cdot d\{(X(y) - X0(y)\}/dy = -0.2317 \times 10^{-4}$
$y = 2.6100 \ldots \phi 2 \cdot (N' - N) \cdot d\{(X(y) - X0(y)\}/dy = -0.7914 \times 10^{-4}$
$y = 3.4800 \ldots \phi 2 \cdot (N' - N) \cdot d\{(X(y) - X0(y)\}/dy = -0.1920 \times 10^{-3}$
$y = 4.3500 \ldots \phi 2 \cdot (N' - N) \cdot d\{(X(y) - X0(y)\}/dy = -0.3897 \times 10^{-3}$
$y = 5.2200 \ldots \phi 2 \cdot (N' - N) \cdot d\{(X(y) - X0(y)\}/dy = -0.7124 \times 10^{-3}$
$y = 6.0900 \ldots \phi 2 \cdot (N' - N) \cdot d\{(X(y) - X0(y)\}/dy = -0.1217 \times 10^{-2}$
$y = 6.9600 \ldots \phi 2 \cdot (N' - N) \cdot d\{(X(y) - X0(y)\}/dy = -0.1973 \times 10^{-2}$
$y = 7.8300 \ldots \phi 2 \cdot (N' - N) \cdot d\{(X(y) - X0(y)\}/dy = -0.3048 \times 10^{-2}$
$y = 8.7000 \ldots \phi 2 \cdot (N' - N) \cdot d\{(X(y) - X0(y)\}/dy = -0.4449 \times 10^{-2}$

[Values Corresponding to Condition (14) (aspherical surface r15 in the third lens unit Gr3)]

$y = 0.6349 \ldots \phi 3 \cdot (N' - N) \cdot d\{(X(y) - X0(y)\}/dy = -0.2011 \times 10^{-6}$
$y = 1.2698 \ldots \phi 3 \cdot (N' - N) \cdot d\{(X(y) - X0(y)\}/dy = -0.1716 \times 10^{-5}$
$y = 1.9047 \ldots \phi 3 \cdot (N' - N) \cdot d\{(X(y) - X0(y)\}/dy = -0.6288 \times 10^{-5}$
$y = 2.5396 \ldots \phi 3 \cdot (N' - N) \cdot d\{(X(y) - X0(y)\}/dy = -0.1609 \times 10^{-4}$
$y = 3.1744 \ldots \phi 3 \cdot (N' - N) \cdot d\{(X(y) - X0(y)\}/dy = -0.3313 \times 10^{-4}$
$y = 3.8093 \ldots \phi 3 \cdot (N' - N) \cdot d\{(X(y) - X0(y)\}/dy = -0.5839 \times 10^{-4}$
$y = 4.4442 \ldots \phi 3 \cdot (N' - N) \cdot d\{(X(y) - X0(y)\}/dy = -0.9189 \times 10^{-4}$
$y = 5.0791 \ldots \phi 3 \cdot (N' - N) \cdot d\{(X(y) - X0(y)\}/dy = -0.1357 \times 10^{-3}$
$y = 5.7140 \ldots \phi 3 \cdot (N' - N) \cdot d\{(X(y) - X0(y)\}/dy = -0.2037 \times 10^{-3}$
$y = 6.3489 \ldots \phi 3 \cdot (N' - N) \cdot d\{(X(y) - X0(y)\}/dy = -0.3421 \times 10^{-3}$

[Values Corresponding to Condition (16) (aspherical surface r17 in the fourth lens unit Gr4)]

$y = 1.1200 \ldots \phi 4 \cdot (N' - N) \cdot d\{(X(y) - X0(y)\}/dy = -0.8814 \times 10^{-6}$
$y = 2.2400 \ldots \phi 4 \cdot (N' - N) \cdot d\{(X(y) - X0(y)\}/dy = -0.6497 \times 10^{-5}$
$y = 3.3600 \ldots \phi 4 \cdot (N' - N) \cdot d\{(X(y) - X0(y)\}/dy = -0.2037 \times 10^{-4}$
$y = 4.4800 \ldots \phi 4 \cdot (N' - N) \cdot d\{(X(y) - X0(y)\}/dy = -0.4985 \times 10^{-4}$
$y = 5.6000 \ldots \phi 4 \cdot (N' - N) \cdot d\{(X(y) - X0(y)\}/dy = -0.1193 \times 10^{-3}$
$y = 6.7200 \ldots \phi 4 \cdot (N' - N) \cdot d\{(X(y) - X0(y)\}/dy = -0.2839 \times 10^{-3}$
$y = 7.8400 \ldots \phi 4 \cdot (N' - N) \cdot d\{(X(y) - X0(y)\}/dy = -0.6227 \times 10^{-3}$
$y = 8.9600 \ldots \phi 4 \cdot (N' - N) \cdot d\{(X(y) - X0(y)\}/dy = -0.1169 \times 10^{-2}$
$y = 10.0800 \ldots \phi 4 \cdot (N' - N) \cdot d\{(X(y) - X0(y)\}/dy = -0.1713 \times 10^{-2}$
$y = 11.2000 \ldots \phi 4 \cdot (N' - N) \cdot d\{(X(y) - X0(y)\}/dy = -0.1371 \times 10^{-2}$

[Values Corresponding to Condition (16) (aspherical surface r18 in the fourth lens unit Gr4)]

$y = 1.1800 \ldots \phi 4 \cdot (N' - N) \cdot d\{(X(y) - X0(y)\}/dy = -0.2788 \times 10^{-5}$
$y = 2.3600 \ldots \phi 4 \cdot (N' - N) \cdot d\{(X(y) - X0(y)\}/dy = -0.2335 \times 10^{-4}$
$y = 3.5400 \ldots \phi 4 \cdot (N' - N) \cdot d\{(X(y) - X0(y)\}/dy = -0.8330 \times 10^{-4}$
$y = 4.7200 \ldots \phi 4 \cdot (N' - N) \cdot d\{(X(y) - X0(y)\}/dy = -0.2056 \times 10^{-3}$
$y = 5.9000 \ldots \phi 4 \cdot (N' - N) \cdot d\{(X(y) - X0(y)\}/dy = -0.4002 \times 10^{-3}$
$y = 7.0800 \ldots \phi 4 \cdot (N' - N) \cdot d\{(X(y) - X0(y)\}/dy = -0.6424 \times 10^{-3}$
$y = 8.2600 \ldots \phi 4 \cdot (N' - N) \cdot d\{(X(y) - X0(y)\}/dy = -0.8789 \times 10^{-3}$
$y = 9.4400 \ldots \phi 4 \cdot (N' - N) \cdot d\{(X(y) - X0(y)\}/dy = -0.1173 \times 10^{-2}$
$y = 10.6200 \ldots \phi 4 \cdot (N' - N) \cdot d\{(X(y) - X0(y)\}/dy = -0.2247 \times 10^{-2}$
$y = 11.8000 \ldots \phi 4 \cdot (N' - N) \cdot d\{(X(y) - X0(y)\}/dy = -0.6929 \times 10^{-2}$

TABLE 8

<< Embodiment 8 >>
f = 39.1~87.3~178.0
FNO = 4.12~7.00~9.50

| Radius of Curvature | Axial Distance | Index of Refraction | Abbe Number |
|---|---|---|---|
| r1    32.044 | | | |
| | d1   2.000 | N1  1.84666 | ν1  23.82 |
| r2*   24.268 | | | |
| | d2   0.500 | | |
| r3    27.548 | | | |
| | d3   5.000 | N2  1.51680 | ν2  64.20 |
| r4    595.249 | | | |
| | d4   2.000~18.000~37.000 | | |
| r5*   -53.559 | | | |
| | d5   1.500 | N3  1.80700 | ν3  39.79 |
| r6    13.245 | | | |
| | d6   0.500 | | |
| r7    13.812 | | | |
| | d7   4.600 | N4  1.78472 | ν4  25.75 |
| r8*   112.354 | | | |
| | d8   8.300~6.072~1.156 | | |
| r9    ∞ | | | |
| | d9   11.000 | N5  1.51680 | ν5  64.20 |
| r10   ∞ | | | |
| | d10  0.200 | | |
| r11   ∞ (Aperture Diaphragm) | | | |
| | d11  0.500 | | |
| r12   23.170 | | | |
| | d12  1.735 | N6  1.84666 | ν6  23.82 |
| r13   14.086 | | | |
| | d13  0.300 | | |
| r14   14.529 | | | |
| | d14  4.700 | N7  1.51728 | ν7  69.43 |
| r15*  -20.959 | | | |
| | d15  0.200 | | |
| r16   ∞ (Light Beam Restricting Plate) | | | |
| | d16  24.215~10.993~2.500 | | |

TABLE 8-continued

| | | | | | | |
|---|---|---|---|---|---|---|
| r17* | −73.362 | | | | | |
| | | d17 | 4.400 | N8 1.84666 | ν8 | 23.82 |
| r18* | −25.000 | | | | | |
| | | d18 | 3.300 | | | |
| r19 | −14.037 | | | | | |
| | | d19 | 1.302 | N9 1.74400 | ν9 | 44.93 |
| r20 | 137.571 | | | | | |

$\Sigma d = 76.252 \sim 76.802 \sim 82.393$

[Aspherical Coefficients]

r2: $\epsilon = 1.0000$
$A4 = -0.87731 \times 10^{-6}$
$A6 = 0.41058 \times 10^{-8}$
$A8 = -0.66650 \times 10^{-10}$
$A10 = 0.33563 \times 10^{-12}$
$A12 = -0.69904 \times 10^{-15}$ r5: $\epsilon = 1.0000$
$A4 = 0.18292 \times 10^{-4}$
$A6 = 0.32136 \times 10^{-7}$
$A8 = 0.40496 \times 10^{-10}$
$A10 = -0.89038 \times 10^{-12}$
$A12 = -0.27882 \times 10^{-14}$ r8: $\epsilon = 1.0000$
$A4 = 0.33547 \times 10^{-4}$
$A6 = 0.44905 \times 10^{-7}$
$A8 = 0.23663 \times 10^{-8}$
$A10 = -0.11858 \times 10^{-10}$
$A12 = -0.27406 \times 10^{-13}$ r15: $\epsilon = 1.0000$
$A4 = 0.64880 \times 10^{-5}$
$A6 = 0.46968 \times 10^{-6}$
$A8 = -0.16718 \times 10^{-7}$
$A10 = 0.23128 \times 10^{-9}$
$A12 = -0.23623 \times 10^{-13}$ r17: $\epsilon = 1.0000$
$A4 = 0.36354 \times 10^{-5}$
$A6 = -0.96702 \times 10^{-7}$
$A8 = 0.44527 \times 10^{-8}$
$A10 = -0.23713 \times 10^{-10}$
$A12 = -0.66305 \times 10^{-14}$ r18: $\epsilon = 1.0000$
$A4 = -0.18864 \times 10^{-4}$
$A6 = -0.12379 \times 10^{-6}$
$A8 = 0.21540 \times 10^{-8}$
$A10 = 0.76630 \times 10^{-11}$
$A12 = -0.13383 \times 10^{-12}$

[Values Corresponding to Condition (6) (aspherical surface r2 in the first lens unit Gr1)]

$y = 1.3300 \ldots \phi1 \cdot (N' - N) \cdot d\{(X(y) - X0(y))\}/dy = 0.6913 \times 10^{-7}$
$y = 2.6600 \ldots \phi1 \cdot (N' - N) \cdot d\{(X(y) - X0(y))\}/dy = 0.5360 \times 10^{-6}$
$y = 3.9900 \ldots \phi1 \cdot (N' - N) \cdot d\{(X(y) - X0(y))\}/dy = 0.1744 \times 10^{-5}$
$y = 5.3200 \ldots \phi1 \cdot (N' - N) \cdot d\{(X(y) - X0(y))\}/dy = 0.4043 \times 10^{-5}$
$y = 6.6500 \ldots \phi1 \cdot (N' - N) \cdot d\{(X(y) - X0(y))\}/dy = 0.7986 \times 10^{-5}$
$y = 7.9800 \ldots \phi1 \cdot (N' - N) \cdot d\{(X(y) - X0(y))\}/dy = 0.1453 \times 10^{-4}$
$y = 9.3100 \ldots \phi1 \cdot (N' - N) \cdot d\{(X(y) - X0(y))\}/dy = 0.2508 \times 10^{-4}$
$y = 10.6400 \ldots \phi1 \cdot (N' - N) \cdot d\{(X(y) - X0(y))\}/dy = 0.4147 \times 10^{-4}$
$y = 11.9700 \ldots \phi1 \cdot (N' - N) \cdot d\{(X(y) - X0(y))\}/dy = 0.6670 \times 10^{-4}$
$y = 13.3000 \ldots \phi1 \cdot (N' - N) \cdot d\{(X(y) - X0(y))\}/dy = 0.1091 \times 10^{-3}$

[Values Corresponding to Condition (10) (aspherical surface r5 in the second lens unit Gr2)]

$y = 1.0900 \ldots \phi2 \cdot (N' - N) \cdot d\{(X(y) - X0(y))\}/dy = -0.1895 \times 10^{-5}$
$y = 2.1800 \ldots \phi2 \cdot (N' - N) \cdot d\{(X(y) - X0(y))\}/dy = -0.1530 \times 10^{-4}$
$y = 3.2700 \ldots \phi2 \cdot (N' - N) \cdot d\{(X(y) - X0(y))\}/dy = -0.5245 \times 10^{-4}$
$y = 4.3600 \ldots \phi2 \cdot (N' - N) \cdot d\{(X(y) - X0(y))\}/dy = -0.1270 \times 10^{-3}$
$y = 5.4500 \ldots \phi2 \cdot (N' - N) \cdot d\{(X(y) - X0(y))\}/dy = -0.2547 \times 10^{-3}$
$y = 6.5400 \ldots \phi2 \cdot (N' - N) \cdot d\{(X(y) - X0(y))\}/dy = -0.4527 \times 10^{-3}$
$y = 7.6300 \ldots \phi2 \cdot (N' - N) \cdot d\{(X(y) - X0(y))\}/dy = -0.7380 \times 10^{-3}$
$y = 8.7200 \ldots \phi2 \cdot (N' - N) \cdot d\{(X(y) - X0(y))\}/dy = -0.1119 \times 10^{-2}$
$y = 9.8100 \ldots \phi2 \cdot (N' - N) \cdot d\{(X(y) - X0(y))\}/dy = -0.1579 \times 10^{-2}$
$y = 10.9000 \ldots \phi2 \cdot (N' - N) \cdot d\{(X(y) - X0(y))\}/dy = -0.2041 \times 10^{-2}$

[Values Corresponding to Condition (10) (aspherical surface r8 in the second lens unit Gr2)]

$y = 0.8700 \ldots \phi2 \cdot (N' - N) \cdot d\{(X(y) - X0(y))\}/dy = 0.1715 \times 10^{-5}$
$y = 1.7400 \ldots \phi2 \cdot (N' - N) \cdot d\{(X(y) - X0(y))\}/dy = 0.1380 \times 10^{-4}$
$y = 2.6100 \ldots \phi2 \cdot (N' - N) \cdot d\{(X(y) - X0(y))\}/dy = 0.4717 \times 10^{-4}$
$y = 3.4800 \ldots \phi2 \cdot (N' - N) \cdot d\{(X(y) - X0(y))\}/dy = 0.1144 \times 10^{-3}$
$y = 4.3500 \ldots \phi2 \cdot (N' - N) \cdot d\{(X(y) - X0(y))\}/dy = 0.2317 \times 10^{-3}$
$y = 5.2200 \ldots \phi2 \cdot (N' - N) \cdot d\{(X(y) - X0(y))\}/dy = 0.4218 \times 10^{-3}$
$y = 6.0900 \ldots \phi2 \cdot (N' - N) \cdot d\{(X(y) - X0(y))\}/dy = 0.7160 \times 10^{-3}$
$y = 6.9600 \ldots \phi2 \cdot (N' - N) \cdot d\{(X(y) - X0(y))\}/dy = 0.1153 \times 10^{-2}$
$y = 7.8300 \ldots \phi2 \cdot (N' - N) \cdot d\{(X(y) - X0(y))\}/dy = 0.1767 \times 10^{-2}$
$y = 8.7000 \ldots \phi2 \cdot (N' - N) \cdot d\{(X(y) - X0(y))\}/dy = 0.2563 \times 10^{-2}$

[Values Corresponding to Condition (14) (aspherical surface r15 in the third lens unit Gr3)]

$y = 0.5830 \ldots \phi3 \cdot (N' - N) \cdot d\{(X(y) - X0(y))\}/dy = -0.9953 \times 10^{-7}$
$y = 1.1660 \ldots \phi3 \cdot (N' - N) \cdot d\{(X(y) - X0(y))\}/dy = -0.8746 \times 10^{-6}$
$y = 1.7490 \ldots \phi3 \cdot (N' - N) \cdot d\{(X(y) - X0(y))\}/dy = -0.3336 \times 10^{-5}$
$y = 2.3321 \ldots \phi3 \cdot (N' - N) \cdot d\{(X(y) - X0(y))\}/dy = -0.8928 \times 10^{-5}$
$y = 2.9151 \ldots \phi3 \cdot (N' - N) \cdot d\{(X(y) - X0(y))\}/dy = -0.1927 \times 10^{-4}$
$y = 3.4981 \ldots \phi3 \cdot (N' - N) \cdot d\{(X(y) - X0(y))\}/dy = -0.3568 \times 10^{-4}$
$y = 4.0811 \ldots \phi3 \cdot (N' - N) \cdot d\{(X(y) - X0(y))\}/dy = -0.5896 \times 10^{-4}$
$y = 4.6641 \ldots \phi3 \cdot (N' - N) \cdot d\{(X(y) - X0(y))\}/dy = -0.9040 \times 10^{-4}$
$y = 5.2471 \ldots \phi3 \cdot (N' - N) \cdot d\{(X(y) - X0(y))\}/dy = -0.1356 \times 10^{-3}$
$y = 5.8302 \ldots \phi3 \cdot (N' - N) \cdot d\{(X(y) - X0(y))\}/dy = -0.2134 \times 10^{-3}$

[Values Corresponding to Condition (16) (aspherical surface r17 in the fourth lens unit Gr4)]

$y = 1.1100 \ldots \phi4 \cdot (N' - N) \cdot d\{(X(y) - X0(y))\}/dy = -0.5205 \times 10^{-6}$
$y = 2.2200 \ldots \phi4 \cdot (N' - N) \cdot d\{(X(y) - X0(y))\}/dy = -0.3756 \times 10^{-5}$
$y = 3.3300 \ldots \phi4 \cdot (N' - N) \cdot d\{(X(y) - X0(y))\}/dy = -0.1232 \times 10^{-4}$
$y = 4.4400 \ldots \phi4 \cdot (N' - N) \cdot d\{(X(y) - X0(y))\}/dy = -0.3628 \times 10^{-4}$
$y = 5.5500 \ldots \phi4 \cdot (N' - N) \cdot d\{(X(y) - X0(y))\}/dy = -0.1100 \times 10^{-3}$
$y = 6.6600 \ldots \phi4 \cdot (N' - N) \cdot d\{(X(y) - X0(y))\}/dy = -0.3069 \times 10^{-3}$
$y = 7.7700 \ldots \phi4 \cdot (N' - N) \cdot d\{(X(y) - X0(y))\}/dy = -0.7218 \times 10^{-3}$
$y = 8.8800 \ldots \phi4 \cdot (N' - N) \cdot d\{(X(y) - X0(y))\}/dy = -0.1362 \times 10^{-2}$
$y = 9.9900 \ldots \phi4 \cdot (N' - N) \cdot d\{(X(y) - X0(y))\}/dy = -0.1854 \times 10^{-2}$
$y = 11.1000 \ldots \phi4 \cdot (N' - N) \cdot d\{(X(y) - X0(y))\}/dy = -0.8232 \times 10^{-3}$

[Values Corresponding to Condition (16) (aspherical surface r18 in the fourth lens unit Gr4)]

$y = 1.1800 \ldots \phi4 \cdot (N' - N) \cdot d\{(X(y) - X0(y))\}/dy = -0.3445 \times 10^{-5}$
$y = 2.3600 \ldots \phi4 \cdot (N' - N) \cdot d\{(X(y) - X0(y))\}/dy = -0.2849 \times 10^{-4}$
$y = 3.5400 \ldots \phi4 \cdot (N' - N) \cdot d\{(X(y) - X0(y))\}/dy = -0.9968 \times 10^{-4}$
$y = 4.7200 \ldots \phi4 \cdot (N' - N) \cdot d\{(X(y) - X0(y))\}/dy = -0.2393 \times 10^{-3}$
$y = 5.9000 \ldots \phi4 \cdot (N' - N) \cdot d\{(X(y) - X0(y))\}/dy = -0.4480 \times 10^{-3}$
$y = 7.0800 \ldots \phi4 \cdot (N' - N) \cdot d\{(X(y) - X0(y))\}/dy = -0.6800 \times 10^{-3}$
$y = 8.2600 \ldots \phi4 \cdot (N' - N) \cdot d\{(X(y) - X0(y))\}/dy = -0.8712 \times 10^{-3}$
$y = 9.4400 \ldots \phi4 \cdot (N' - N) \cdot d\{(X(y) - X0(y))\}/dy = -0.1196 \times 10^{-2}$
$y = 10.6200 \ldots \phi4 \cdot (N' - N) \cdot d\{(X(y) - X0(y))\}/dy = -0.2954 \times 10^{-2}$
$y = 11.8000 \ldots \phi4 \cdot (N' - N) \cdot d\{(X(y) - X0(y))\}/dy = -0.1088 \times 10^{-1}$

TABLE 9

<< Embodiment 9 >>
$f = 39.1 \sim 87.3 \sim 178.0$
$FNO = 4.12 \sim 7.00 \sim 9.50$

| Radius of Curvature | Axial Distance | Index of Refraction | Abbe Number |
|---|---|---|---|
| r1  31.928 | | | |
| | d1  1.800 | N1 1.84666 | ν1 23.82 |
| r2*  24.683 | | | |
| | d2  0.500 | | |
| r3  27.548 | | | |
| | d3  5.000 | N2 1.51680 | ν2 64.20 |
| r4  3560.491 | | | |
| | d4  2.742~18.742~37.742 | | |
| r5*  −55.734 | | | |
| | d5  1.400 | N3 1.80700 | ν3 39.79 |
| r6  13.245 | | | |
| | d6  0.500 | | |
| r7  13.812 | | | |
| | d7  4.600 | N4 1.78472 | ν4 25.75 |
| r8*  109.536 | | | |
| | d8  19.600~16.546~12.185 | | |
| r9  ∞ (Aperature Diaphragm) | | | |
| | d9  0.500 | | |

TABLE 9-continued

| | | | | | | | |
|---|---|---|---|---|---|---|---|
| r10 | ∞ | | | | | | |
| | | d10 | 1.735 | N5 | 1.84666 | ν5 | 23.82 |
| r11 | 14.235 | | | | | | |
| | | d11 | 0.300 | | | | |
| r12 | 14.420 | | | | | | |
| | | d12 | 4.700 | N6 | 1.51728 | ν6 | 69.43 |
| r13* | −21.587 | | | | | | |
| | | d13 | 0.200 | | | | |
| r14 | ∞ (Light Beam Restricting Plate) | | | | | | |
| | | d14 | 22.237~10.475~2.500 | | | | |
| r15* | −56.164 | | | | | | |
| | | d15 | 4.300 | N7 | 1.84666 | ν7 | 23.82 |
| R16* | −24.443 | | | | | | |
| | | d16 | 3.300 | | | | |
| r17 | −14.078 | | | | | | |
| | | d17 | 1.302 | N8 | 1.74400 | ν8 | 44.93 |
| r18 | 227.830 | | | | | | |
| | | Σd = 74.716~75.900~82.564 | | | | | |

[Aspherical Coefficients]

r2: $\epsilon = 1.0000$
  $A4 = -0.10387 \times 10^{-5}$
  $A6 = 0.14003 \times 10^{-7}$
  $A8 = -0.19371 \times 10^{-9}$
  $A10 = 0.10911 \times 10^{-11}$
  $A12 = -0.22935 \times 10^{-14}$ r5: $\epsilon = 1.0000$
  $A4 = 0.22111 \times 10^{-4}$
  $A6 = 0.71361 \times 10^{-7}$
  $A8 = -0.19282 \times 10^{-9}$
  $A10 = 0.12651 \times 10^{-12}$
  $A12 = -0.27882 \times 10^{-14}$ r8: $\epsilon = 1.0000$
  $A4 = 0.34892 \times 10^{-4}$
  $A6 = 0.90608 \times 10^{-7}$
  $A8 = 0.21963 \times 10^{-8}$
  $A10 = -0.11066 \times 10^{-10}$
  $A12 = 0.28057 \times 10^{-14}$ r13: $\epsilon = 1.0000$
  $A4 = 0.11678 \times 10^{-4}$
  $A6 = 0.47826 \times 10^{-6}$
  $A8 = -0.16743 \times 10^{-7}$
  $A10 = 0.23096 \times 10^{-9}$
  $A12 = -0.25236 \times 10^{-13}$ r15: $\epsilon = 1.0000$
  $A4 = 0.15706 \times 10^{-5}$
  $A6 = -0.87296 \times 10^{-7}$
  $A8 = 0.45867 \times 10^{-8}$
  $A10 = -0.25741 \times 10^{-10}$
  $A12 = -0.81964 \times 10^{-15}$ r16: $\epsilon = 1.0000$
  $A4 = -0.19052 \times 10^{-4}$
  $A6 = -0.14488 \times 10^{-6}$
  $A8 = 0.24153 \times 10^{-8}$
  $A10 = 0.75600 \times 10^{-11}$
  $A12 = -0.12536 \times 10^{-12}$

[Values Corresponding to Condition (6) (aspherical surface r2 in the first lens unit Gr1)]

$y = 1.3300 \ldots \phi1 \cdot (N'-N) \cdot d\{(X(y)-X0(y)\}/dy = 0.8054 \times 10^{-7}$
$y = 2.6600 \ldots \phi1 \cdot (N'-N) \cdot d\{(X(y)-X0(y)\}/dy = 0.5838 \times 10^{-6}$
$y = 3.9900 \ldots \phi1 \cdot (N'-N) \cdot d\{(X(y)-X0(y)\}/dy = 0.1717 \times 10^{-5}$
$y = 5.3200 \ldots \phi1 \cdot (N'-N) \cdot d\{(X(y)-X0(y)\}/dy = 0.3583 \times 10^{-5}$
$y = 6.6500 \ldots \phi1 \cdot (N'-N) \cdot d\{(X(y)-X0(y)\}/dy = 0.6605 \times 10^{-5}$
$y = 7.9800 \ldots \phi1 \cdot (N'-N) \cdot d\{(X(y)-X0(y)\}/dy = 0.1181 \times 10^{-4}$
$y = 9.3100 \ldots \phi1 \cdot (N'-N) \cdot d\{(X(y)-X0(y)\}/dy = 0.2041 \times 10^{-4}$
$y = 10.6400 \ldots \phi1 \cdot (N'-N) \cdot d\{(X(y)-X0(y)\}/dy = 0.3283 \times 10^{-4}$
$y = 11.9700 \ldots \phi1 \cdot (N'-N) \cdot d\{(X(y)-X0(y)\}/dy = 0.5028 \times 10^{-4}$
$y = 13.3000 \ldots \phi1 \cdot (N'-N) \cdot d\{(X(y)-X0(y)\}/dy = 0.8707 \times 10^{-4}$

[Values Corresponding to Condition (10) (aspherical surface r5 in the second lens unit Gr2)]

$y = 1.0900 \ldots \phi1 \cdot (N'-N) \cdot d\{(X(y)-X0(y)\}/dy = -0.2259 \times 10^{-4}$
$y = 2.1800 \ldots \phi2 \cdot (N'-N) \cdot d\{(X(y)-X0(y)\}/dy = -0.1838 \times 10^{-4}$
$y = 3.2700 \ldots \phi2 \cdot (N'-N) \cdot d\{(X(y)-X0(y)\}/dy = -0.6366 \times 10^{-4}$
$y = 4.3600 \ldots \phi2 \cdot (N'-N) \cdot d\{(X(y)-X0(y)\}/dy = -0.1561 \times 10^{-4}$
$y = 5.4500 \ldots \phi2 \cdot (N'-N) \cdot d\{(X(y)-X0(y)\}/dy = -0.3168 \times 10^{-4}$
$y = 6.5400 \ldots \phi2 \cdot (N'-N) \cdot d\{(X(y)-X0(y)\}/dy = -0.5701 \times 10^{-4}$
$y = 7.6300 \ldots \phi2 \cdot (N'-N) \cdot d\{(X(y)-X0(y)\}/dy = -0.9408 \times 10^{-3}$
$y = 8.7200 \ldots \phi2 \cdot (N'-N) \cdot d\{(X(y)-X0(y)\}/dy = -0.1450 \times 10^{-2}$
$y = 9.8100 \ldots \phi2 \cdot (N'-N) \cdot d\{(X(y)-X0(y)\}/dy = -0.2104 \times 10^{-2}$
$y = 10.9000 \ldots \phi2 \cdot (N'-N) \cdot d\{(X(y)-X0(y)\}/dy = -0.2870 \times 10^{-2}$

[Values Corresponding to Condition (10) (aspherical surface r8 in the second lens unit Gr2)]

$y = 0.8700 \ldots \phi2 \cdot (N'-N) \cdot d\{(X(y)-X0(y)\}/dy = 0.1758 \times 10^{-5}$
$y = 1.7400 \ldots \phi2 \cdot (N'-N) \cdot d\{(X(y)-X0(y)\}/dy = 0.1420 \times 10^{-4}$
$y = 2.6100 \ldots \phi2 \cdot (N'-N) \cdot d\{(X(y)-X0(y)\}/dy = 0.4884 \times 10^{-4}$
$y = 3.4800 \ldots \phi2 \cdot (N'-N) \cdot d\{(X(y)-X0(y)\}/dy = 0.1194 \times 10^{-3}$
$y = 4.3500 \ldots \phi2 \cdot (N'-N) \cdot d\{(X(y)-X0(y)\}/dy = 0.2439 \times 10^{-3}$
$y = 5.2200 \ldots \phi2 \cdot (N'-N) \cdot d\{(X(y)-X0(y)\}/dy = 0.4481 \times 10^{-3}$
$y = 6.0900 \ldots \phi2 \cdot (N'-N) \cdot d\{(X(y)-X0(y)\}/dy = 0.7680 \times 10^{-3}$
$y = 6.9600 \ldots \phi2 \cdot (N'-N) \cdot d\{(X(y)-X0(y)\}/dy = 0.1252 \times 10^{-2}$
$y = 7.8300 \ldots \phi2 \cdot (N'-N) \cdot d\{(X(y)-X0(y)\}/dy = 0.1958 \times 10^{-2}$
$y = 8.7000 \ldots \phi2 \cdot (N'-N) \cdot d\{(X(y)-X0(y)\}/dy = 0.2945 \times 10^{-2}$

[Values Corresponding to Condition (14) (aspherical surface r13 in the third lens unit Gr3)]

$y = 0.5785 \ldots \phi1 \cdot (N'-N) \cdot d\{(X(y)-X0(y)\}/dy = -0.1737 \times 10^{-4}$
$y = 1.1569 \ldots \phi3 \cdot (N'-N) \cdot d\{(X(y)-X0(y)\}/dy = -0.1467 \times 10^{-5}$
$y = 1.7354 \ldots \phi3 \cdot (N'-N) \cdot d\{(X(y)-X0(y)\}/dy = -0.5334 \times 10^{-5}$
$y = 2.3138 \ldots \phi3 \cdot (N'-N) \cdot d\{(X(y)-X0(y)\}/dy = -0.1367 \times 10^{-4}$
$y = 2.8923 \ldots \phi3 \cdot (N'-N) \cdot d\{(X(y)-X0(y)\}/dy = -0.2856 \times 10^{-4}$
$y = 3.4707 \ldots \phi3 \cdot (N'-N) \cdot d\{(X(y)-X0(y)\}/dy = -0.5186 \times 10^{-4}$
$y = 4.0492 \ldots \phi3 \cdot (N'-N) \cdot d\{(X(y)-X0(y)\}/dy = -0.8490 \times 10^{-4}$
$y = 4.6276 \ldots \phi3 \cdot (N'-N) \cdot d\{(X(y)-X0(y)\}/dy = -0.1294 \times 10^{-3}$
$y = 5.2061 \ldots \phi3 \cdot (N'-N) \cdot d\{(X(y)-X0(y)\}/dy = -0.1911 \times 10^{-3}$
$y = 5.7846 \ldots \phi3 \cdot (N'-N) \cdot d\{(X(y)-X0(y)\}/dy = -0.2876 \times 10^{-3}$

[Values Corresponding to Condition (16) (aspherical surface r15 in the fourth lens unit Gr4)]

$y = 1.1100 \ldots \phi4 \cdot (N'-N) \cdot d\{(X(y)-X0(y)\}/dy = -0.2210 \times 10^{-6}$
$y = 2.2200 \ldots \phi4 \cdot (N'-N) \cdot d\{(X(y)-X0(y)\}/dy = -0.1417 \times 10^{-5}$
$y = 3.3300 \ldots \phi4 \cdot (N'-N) \cdot d\{(X(y)-X0(y)\}/dy = -0.4859 \times 10^{-5}$
$y = 4.4400 \ldots \phi4 \cdot (N'-N) \cdot d\{(X(y)-X0(y)\}/dy = -0.2048 \times 10^{-4}$
$y = 5.5500 \ldots \phi4 \cdot (N'-N) \cdot d\{(X(y)-X0(y)\}/dy = -0.8460 \times 10^{-4}$
$y = 6.6600 \ldots \phi4 \cdot (N'-N) \cdot d\{(X(y)-X0(y)\}/dy = -0.2746 \times 10^{-3}$
$y = 7.7700 \ldots \phi4 \cdot (N'-N) \cdot d\{(X(y)-X0(y)\}/dy = -0.6876 \times 10^{-3}$
$y = 8.8800 \ldots \phi4 \cdot (N'-N) \cdot d\{(X(y)-X0(y)\}/dy = -0.1323 \times 10^{-2}$
$y = 9.9900 \ldots \phi4 \cdot (N'-N) \cdot d\{(X(y)-X0(y)\}/dy = -0.1773 \times 10^{-2}$
$y = 11.1000 \ldots \phi4 \cdot (N'-N) \cdot d\{(X(y)-X0(y)\}/dy = -0.5842 \times 10^{-3}$

[Values Corresponding to Condition (16) (aspherical surface r16 in the fourth lens unit Gr4)]

$y = 1.1800 \ldots \phi4 \cdot (N'-N) \cdot d\{(X(y)-X0(y)\}/dy = -0.3609 \times 10^{-5}$
$y = 2.3600 \ldots \phi4 \cdot (N'-N) \cdot d\{(X(y)-X0(y)\}/dy = -0.3002 \times 10^{-4}$
$y = 3.5400 \ldots \phi4 \cdot (N'-N) \cdot d\{(X(y)-X0(y)\}/dy = -0.1057 \times 10^{-3}$
$y = 4.7200 \ldots \phi4 \cdot (N'-N) \cdot d\{(X(y)-X0(y)\}/dy = -0.2553 \times 10^{-3}$
$y = 5.9000 \ldots \phi4 \cdot (N'-N) \cdot d\{(X(y)-X0(y)\}/dy = -0.4785 \times 10^{-3}$
$y = 7.0800 \ldots \phi4 \cdot (N'-N) \cdot d\{(X(y)-X0(y)\}/dy = -0.7174 \times 10^{-3}$
$y = 8.2600 \ldots \phi4 \cdot (N'-N) \cdot d\{(X(y)-X0(y)\}/dy = -0.8665 \times 10^{-3}$
$y = 9.4400 \ldots \phi4 \cdot (N'-N) \cdot d\{(X(y)-X0(y)\}/dy = -0.9934 \times 10^{-3}$
$y = 10.6200 \ldots \phi4 \cdot (N'-N) \cdot d\{(X(y)-X0(y)\}/dy = -0.2156 \times 10^{-2}$
$y = 11.8000 \ldots \phi4 \cdot (N'-N) \cdot d\{(X(y)-X0(y)\}/dy = -0.8582 \times 10^{-2}$

TABLE 10

<< Embodiment 10 >>
f = 39.1~87.3~178.0
FNO = 4.12~7.00~9.50

| Radius of Curvature | Axial Distance | | Index of Refraction | | Abbe Number | |
|---|---|---|---|---|---|---|
| r1 | 31.780 | | | | | |
| | | d1 | 1.800 | N1 | 1.84666 | ν1 | 23.82 |
| r2* | 24.351 | | | | | |
| | | d2 | 0.500 | | | | |
| r3 | 27.548 | | | | | |
| | | d3 | 5.000 | N2 | 1.51680 | ν2 | 64.20 |
| r4 | 451.955 | | | | | |
| | | d4 | 2.742~18.742~37.742 | | | | |

TABLE 10-continued

| | | | | | | | |
|---|---|---|---|---|---|---|---|
| r5* | −52.414 | | | | | | |
| | | d5 | 1.400 | N3 | 1.80700 | ν3 | 39.79 |
| r6 | 13.245 | | | | | | |
| | | d6 | 0.500 | | | | |
| r7 | 13.812 | | | | | | |
| | | d7 | 4.600 | N4 | 1.78472 | ν4 | 25.75 |
| r8* | 124.047 | | | | | | |
| | | d8 | 0.300 | | | | |
| r9 | ∞ | | | | | | |
| | | d9 | 11.000 | N5 | 1.51680 | ν5 | 64.20 |
| r10 | ∞ | | | | | | |
| | | d10 | 8.700~6.306~1.552 | | | | |
| r11 | ∞ (Aperature Diaphragm) | | | | | | |
| | | d11 | 0.500 | | | | |
| r12 | 23.498 | | | | | | |
| | | d12 | 1.735 | N6 | 1.84666 | ν6 | 23.82 |
| r13 | 14.305 | | | | | | |
| | | d13 | 0.300 | | | | |
| r14 | 14.576 | | | | | | |
| | | d14 | 4.700 | N7 | 1.51728 | ν7 | 69.43 |
| r15* | −20.905 | | | | | | |
| | | d15 | 0.200 | | | | |
| r16 | ∞ (Light Beam Restricting Plate) | | | | | | |
| | | d16 | 23.544~10.823~2.500 | | | | |
| r17* | −57.077 | | | | | | |
| | | d17 | 4.300 | N8 | 1.84666 | ν23.82 | |
| r18* | −23.984 | | | | | | |
| | | d18 | 3.300 | | | | |
| r19 | −14.043 | | | | | | |
| | | d19 | 1.302 | N9 | 1.74400 | ν9 | 44.93 |
| r20 | 198.656 | | | | | | |
| | | Σd = 76.423~77.308~83.231 | | | | | |

[Aspherical Coefficients]

r2: $\epsilon = 1.0000$
$A4 = -0.10387 \times 10^{-5}$
$A6 = 0.14003 \times 10^{-7}$
$A8 = -0.19371 \times 10^{-9}$
$A10 = 0.10911 \times 10^{-11}$
$A12 = -0.22935 \times 10^{-14}$ r5: $\epsilon = 1.0000$
$A4 = 0.22111 \times 10^{-4}$
$A6 = 0.71361 \times 10^{-7}$
$A8 = -0.19282 \times 10^{9}$
$A10 = 0.12651 \times 10^{-12}$
$A12 = -0.27882 \times 10^{14}$ r8: $\epsilon = 1.0000$
$A4 = 0.34892 \times 10^{-4}$
$A6 = 0.90608 \times 10^{-7}$
$A8 = 0.21963 \times 10^{-8}$
$A10 = -0.11066 \times 10^{10}$
$A12 = 0.28057 \times 10^{-14}$ r15: $\epsilon = 1.0000$
$A4 = 0.11678 \times 10^{-4}$
$A6 = 0.47826 \times 10^{-6}$
$A8 = -0.16743 \times 10^{-7}$
$A10 = 0.23096 \times 10^{-9}$
$A12 = -0.25236 \times 10^{-13}$ r17: $\epsilon = 1.0000$
$A4 = 0.15706 \times 10^{-5}$
$A6 = -0.87296 \times 10^{-7}$
$A8 = 0.45867 \times 10^{-8}$
$A10 = -0.25741 \times 10^{-10}$
$A12 = -0.81964 \times 10^{-15}$ r18: $\epsilon = 1.0000$
$A4 = -0.19052 \times 10^{-4}$
$A6 = -0.14488 \times 10^{-6}$
$A8 = 0.24153 \times 10^{-8}$
$A10 = 0.75600 \times 10^{-11}$
$A12 = -0.12536 \times 10^{-12}$

[Values Corresponding to Condition (6) (aspherical surface r2 in the first lens unit Gr1)]

$y = 1.3300 \ldots \phi1 \cdot (N'-N) \cdot d\{(X(y)-X0(y)\}/dy = 0.6936 \times 10^{-7}$
$y = 2.6600 \ldots \phi1 \cdot (N'-N) \cdot d\{(X(y)-X0(y)\}/dy = 0.5334 \times 10^{-6}$
$y = 3.9900 \ldots \phi1 \cdot (N'-N) \cdot d\{(X(y)-X0(y)\}/dy = 0.1716 \times 10^{-5}$
$y = 5.3200 \ldots \phi1 \cdot (N'-N) \cdot d\{(X(y)-X0(y)\}/dy = 0.3938 \times 10^{-5}$
$y = 6.6500 \ldots \phi1 \cdot (N'-N) \cdot d\{(X(y)-X0(y)\}/dy = 0.7728 \times 10^{-5}$
$y = 7.9800 \ldots \phi1 \cdot (N'-N) \cdot d\{(X(y)-X0(y)\}/dy = 0.1401 \times 10^{-4}$
$y = 9.3100 \ldots \phi1 \cdot (N'-N) \cdot d\{(X(y)-X0(y)\}/dy = 0.2404 \times 10^{-4}$
$y = 10.6400 \ldots \phi1 \cdot (N'-N) \cdot d\{(X(y)-X0(y)\}/dy = 0.3925 \times 10^{-4}$
$y = 11.9700 \ldots \phi1 \cdot (N'-N) \cdot d\{(X(y)-X0(y)\}/dy = 0.6228 \times 10^{-4}$
$y = 13.3000 \ldots \phi1 \cdot (N'-N) \cdot d\{(X(y)-X0(y)\}/dy = 0.1026 \times 10^{-3}$

[Values Corresponding to Condition (10) (aspherical surface r5 in the second lens unit Gr2)]

$y = 1.0900 \ldots \phi2 \cdot (N'-N) \cdot d\{(X(y)-X0(y)\}/dy = -0.1836 \times 10^{-5}$
$y = 2.1800 \ldots \phi2 \cdot (N'-N) \cdot d\{(X(y)-X0(y)\}/dy = -0.1494 \times 10^{-4}$
$y = 3.2700 \ldots \phi2 \cdot (N'-N) \cdot d\{(X(y)-X0(y)\}/dy = -0.5184 \times 10^{-4}$
$y = 4.3600 \ldots \phi2 \cdot (N'-N) \cdot d\{(X(y)-X0(y)\}/dy = -0.1275 \times 10^{-3}$
$y = 5.4500 \ldots \phi2 \cdot (N'-N) \cdot d\{(X(y)-X0(y)\}/dy = -0.2602 \times 10^{-3}$
$y = 6.5400 \ldots \phi2 \cdot (N'-N) \cdot d\{(X(y)-X0(y)\}/dy = -0.4710 \times 10^{-3}$
$y = 7.6300 \ldots \phi2 \cdot (N'-N) \cdot d\{(X(y)-X0(y)\}/dy = -0.7807 \times 10^{-3}$
$y = 8.7200 \ldots \phi2 \cdot (N'-N) \cdot d\{(X(y)-X0(y)\}/dy = -0.1200 \times 10^{-2}$
$y = 9.8100 \ldots \phi2 \cdot (N'-N) \cdot d\{(X(y)-X0(y)\}/dy = -0.1707 \times 10^{-2}$
$y = 10.9000 \ldots \phi2 \cdot (N'-N) \cdot d\{(X(y)-X0(y)\}/dy = -0.2207 \times 10^{-2}$

[Values Corresponding to Condition (10) (aspherical surface r8 in the second lens unit Gr2)]

$y = 0.8700 \ldots \phi2 \cdot (N'-N) \cdot d\{(X(y)-X0(y)\}/dy = 0.1586 \times 10^{-5}$
$y = 1.7400 \ldots \phi2 \cdot (N'-N) \cdot d\{(X(y)-X0(y)\}/dy = 0.1282 \times 10^{-4}$
$y = 2.6100 \ldots \phi2 \cdot (N'-N) \cdot d\{(X(y)-X0(y)\}/dy = 0.4413 \times 10^{-4}$
$y = 3.4800 \ldots \phi2 \cdot (N'-N) \cdot d\{(X(y)-X0(y)\}/dy = 0.1081 \times 10^{-3}$
$y = 4.3500 \ldots \phi2 \cdot (N'-N) \cdot d\{(X(y)-X0(y)\}/dy = 0.2220 \times 10^{-3}$
$y = 5.2200 \ldots \phi2 \cdot (N'-N) \cdot d\{(X(y)-X0(y)\}/dy = 0.4105 \times 10^{-3}$
$y = 6.0900 \ldots \phi2 \cdot (N'-N) \cdot d\{(X(y)-X0(y)\}/dy = 0.7078 \times 10^{-3}$
$y = 6.9600 \ldots \phi2 \cdot (N'-N) \cdot d\{(X(y)-X0(y)\}/dy = o;1155 \times 10^{-2}$
$y = 7.8300 \ldots \phi2 \cdot (N'-N) \cdot d\{(X(y)-X0(y)\}/dy = 0.1788 \times 10^{-2}$
$y = 8.7000 \ldots \phi2 \cdot (N'-N) \cdot d\{(X(y)-X0(y)\}/dy = 0.2597 \times 10^{-2}$

[Values Corresponding to Condition (14) (aspherical surface r15 in the third lens unit Gr3)]

$y = 0.5755 \ldots \phi3 \cdot (N'-N) \cdot d\{(X(y)-X0(y)\}/dy = -0.1387 \times 10^{-6}$
$y = 1.1510 \ldots \phi3 \cdot (N'-N) \cdot d\{(X(y)-X0(y)\}/dy = -0.1188 \times 10^{-5}$
$y = 1.7265 \ldots \phi3 \cdot (N'-N) \cdot d\{(X(y)-X0(y)\}/dy = -0.4402 \times 10^{-5}$
$y = 2.3020 \ldots \phi3 \cdot (N'-N) \cdot d\{(X(y)-X0(y)\}/dy = -0.1150 \times 10^{-4}$
$y = 2.8775 \ldots \phi3 \cdot (N'-N) \cdot d\{(X(y)-X0(y)\}/dy = -0.2445 \times 10^{-4}$
$y = 3.4530 \ldots \phi3 \cdot (N'-N) \cdot d\{(X(y)-X0(y)\}/dy = -0.4505 \times 10^{-4}$
$y = 4.0285 \ldots \phi3 \cdot (N'-N) \cdot d\{(X(y)-X0(y)\}/dy = -0.7469 \times 10^{-4}$
$y = 4.6040 \ldots \phi3 \cdot (N'-N) \cdot d\{(X(y)-X0(y)\}/dy = -0.1152 \times 10^{-3}$
$y = 5.1795 \ldots \phi3 \cdot (N'-N) \cdot d\{(X(y)-X0(y)\}/dy = -0.1723 \times 10^{-3}$
$y = 5.7550 \ldots \phi3 \cdot (N'-N) \cdot d\{(X(y)-X0(y)\}/dy = -0.2629 \times 10^{-3}$

[Values Corresponding to Condition (16) (aspherical surface r17 in the fourth lens unit Gr4)]

$y = 1.1100 \ldots \phi4 \cdot (N'-N) \cdot d\{(X(y)-X0(y)\}/dy = -0.8669 \times 10^{-\#7}$
$y = 2.2200 \ldots \phi4 \cdot (N'-N) \cdot d\{(X(y)-X0(y)\}/dy = -0.4639 \times 10^{-\#6}$
$y = 3.3300 \ldots \phi4 \cdot (N'-N) \cdot d\{(X(y)-X0(y)\}/dy = -0.2378 \times 10^{-\#5}$
$y = 4.4400 \ldots \phi4 \cdot (N'-N) \cdot d\{(X(y)-X0(y)\}/dy = -0.1729 \times 10^{-\#4}$
$y = 5.5500 \ldots \phi4 \cdot (N'-N) \cdot d\{(X(y)-X0(y)\}/dy = -0.8596 \times 10^{-\#4}$
$y = 6.6600 \ldots \phi4 \cdot (N'-N) \cdot d\{(X(y)-X0(y)\}/dy = -0.2949 \times 10^{-\#3}$
$y = 7.7700 \ldots \phi4 \cdot (N'-N) \cdot d\{(X(y)-X0(y)\}/dy = -0.7572 \times 10^{-\#3}$
$y = 8.8800 \ldots \phi4 \cdot (N'-N) \cdot d\{(X(y)-X0(y)\}/dy = -0.1495 \times 10^{-\#2}$
$y = 9.9900 \ldots \phi4 \cdot (N'-N) \cdot d\{(X(y)-X0(y)\}/dy = -0.2123 \times 10^{-\#2}$
$y = 11.1000 \ldots \phi4 \cdot (N'-N) \cdot d\{(X(y)-X0(y)\}/dy = -0.1195 \times 10^{-\#2}$

[Values Corresponding to Condition (16) (aspherical surface r18 in the fourth lens unit Gr4)]

$y = 1.1800 \ldots \phi4 \cdot (N'-N) \cdot d\{(X(y)-X0(y)\}/dy = -0.3596 \times 10^{-5}$
$y = 2.3600 \ldots \phi4 \cdot (N'-N) \cdot d\{(X(y)-X0(y)\}/dy = -0.2985 \times 10^{-4}$
$y = 3.5400 \ldots \phi4 \cdot (N'-N) \cdot d\{(X(y)-X0(y)\}/dy = -0.1047 \times 10^{-3}$
$y = 4.7200 \ldots \phi4 \cdot (N'-N) \cdot d\{(X(y)-X0(y)\}/dy = -0.2509 \times 10^{-3}$
$y = 5.9000 \ldots \phi4 \cdot (N'-N) \cdot d\{(X(y)-X0(y)\}/dy = -0.4644 \times 10^{-3}$
$y = 7.0800 \ldots \phi4 \cdot (N'-N) \cdot d\{(X(y)-X0(y)\}/dy = -0.6818 \times 10^{-3}$
$y = 8.2600 \ldots \phi4 \cdot (N'-N) \cdot d\{(X(y)-X0(y)\}/dy = -0.7985 \times 10^{-3}$
$y = 9.4400 \ldots \phi4 \cdot (N'-N) \cdot d\{(X(y)-X0(y)\}/dy = -0.9172 \times 10^{-3}$
$y = 10.6200 \ldots \phi4 \cdot (N'-N) \cdot d\{(X(y)-X0(y)\}/dy = -0.2240 \times 10^{-2}$
$y = 11.8000 \ldots \phi4 \cdot (N'-N) \cdot d\{(X(y)-X0(y)\}/dy = -0.9419 \times 10^{-2}$

TABLE 11

<< Embodiment 11 >>
f = 39.1~87.3~178.0
FNO = 4.12~7.00~9.50

| Radius of Curvature | Axial Distance | Index of Refraction | Abbe Number |
|---|---|---|---|
| r1    32.200 | | | |
| | d1   1.800 | N1  1.84666 | ν1  23.82 |
| r2*   24.809 | | | |
| | d2   0.500~0.350~0.300 | | |
| r3    27.548 | | | |
| | d3   5.000 | N2  1.51680 | ν2  64.20 |
| r4    423.969 | | | |
| | d4   2.742~18.742~37.742 | | |
| r5*   −52.344 | | | |
| | d5   1.400 | N3  1.80700 | ν3  39.79 |
| r6    13.245 | | | |
| | d6   0.500 | | |
| r7    13.812 | | | |
| | d7   4.600 | N4  1.78472 | ν4  25.75 |
| r8*   124.418 | | | |
| | d8   8.600~6.588~2.643 | | |
| r9    ∞ | | | |
| | d9   11.000 | N5  1.51680 | ν5  64.20 |
| r10   ∞ | | | |
| | d10  0.400 | | |
| r11   ∞ (Aperture Diaphragm) | | | |
| | d11  0.700 | | |
| r12   23.200 | | | |
| | d12  1.735 | N6  1.84666 | ν6  23.82 |
| r13   14.228 | | | |
| | d13  0.300 | | |
| r14   14.509 | | | |
| | d14  4.700 | N7  1.51728 | ν7  69.43 |
| r15*  −21.167 | | | |
| | d15  0.200 | | |
| r16   ∞ (Light Beam Restricting Plate) | | | |
| | d16  23.562~10.932~2.500 | | |
| r17*  −53.948 | | | |
| | d17  4.300 | N8  1.84666 | ν8  23.82 |
| r18*  −24.109 | | | |
| | d18  3.300 | | |
| r19   −14.105 | | | |
| | d19  1.302 | N9  1.74400 | ν9  44.93 |
| r20   227.438 | | | |
| | Σd = 76.641~77.85~84.423 | | |

[Aspherical Coefficients]

r2:   $\epsilon = 1.0000$
  $A4 = -0.41997 \times 10^{-6}$
  $A6 = -0.42211 \times 10^{-8}$
  $A8 = 0.39331 \times 10^{-10}$
  $A10 = -0.21650 \times 10^{-12}$
  $A12 = 0.35858 \times 10^{-15}$ r5:   $\epsilon = 1.0000$
  $A4 = 0.20297 \times 10^{-4}$
  $A6 = 0.55042 \times 10^{-7}$
  $A8 = 0.47109 \times 10^{-11}$
  $A10 = -0.12667 \times 10^{-11}$
  $A12 = -0.27882 \times 10^{-14}$ r8:   $\epsilon = 1.0000$
  $A4 = 0.32154 \times 10^{-4}$
  $A6 = 0.10919 \times 10^{-6}$
  $A8 = 0.23480 \times 10^{-8}$
  $A10 = -0.12936 \times 10^{-10}$
  $A12 = -0.43940 \times 10^{-13}$ r15:  $\epsilon = 1.0000$
  $A4 = 0.97282 \times 10^{-5}$
  $A6 = 0.49559 \times 10^{-6}$
  $A8 = -0.16909 \times 10^{-7}$
  $A10 = 0.22867 \times 10^{-9}$
  $A12 = -0.40309 \times 10^{-13}$ r17:  $\epsilon = 1.0000$
  $A4 = 0.11634 \times 10^{-5}$
  $A6 = -0.86594 \times 10^{-7}$
  $A8 = 0.46093 \times 10^{-8}$ TABLE 11-continued

```
            A10 = -0.24384 × 10⁻¹⁰
            A12 = -0.35299 × 10⁻¹⁴
      r18:  ε = 1.0000
            A4 = -0.19011 × 10⁻⁴
            A6 = -0.14546 × 10⁻⁶
            A8 = 0.25440 × 10⁻⁸
            A10 = 0.68368 × 10⁻¹¹
            A12 = -0.12457 × 10⁻¹²
```

[Values Corresponding to Condition (6a) (aspherical surface r2 in the first lens unit Gr1)]

y = 1.3300    ... [W] ... φ1,2 · (N' − N) · d{(X(y) − X0(y)}/dy = 0.3516 × 10⁻⁷
              ... [T] ... φ1,2 · (N' − N) · d{(X(y) − X0(y)}/dy = 0.3507 × 10⁻⁷
y = 2.6600    ... [W] ... φ1,2 · (N' − N) · d{(X(y) − X0(y)}/dy = 0.3009 × 10⁻⁶
              ... [T] ... φ1,2 · (N' − N) · d{(X(y) − X0(y)}/dy = 0.3002 × 10⁻⁶
y = 3.9900    ... [W] ... φ1,2 · (N' − N) · d{(X(y) − X0(y)}/dy = 0.1108 × 10⁻⁵
              ... [T] ... φ1,2 · (N' − N) · d{(X(y) − X0(y)}/dy = 0.1105 × 10⁻⁵
y = 5.3200    ... [W] ... φ1,2 · (N' − N) · d{(X(y) − X0(y)}/dy = 0.2860 × 10⁻⁵
              ... [T] ... φ1,2 · (N' − N) · d{(X(y) − X0(y)}/dy = 0.2853 × 10⁻⁵
y = 6.6500    ... [W] ... φ1,2 · (N' − N) · d{(X(y) − X0(y)}/dy = 0.6005 × 10⁻⁵
              ... [T] ... φ1,2 · (N' − N) · d{(X(y) − X0(y)}/dy = 0.5991 × 10⁻⁵
y = 7.9800    ... [W] ... φ1,2 · (N' − N) · d{(X(y) − X0(y)}/dy = 0.1104 × 10⁻⁴
              ... [T] ... φ1,2 · (N' − N) · d{(X(y) − X0(y)}/dy = 0.1101 × 10⁻⁴
y = 9.3100    ... [W] ... φ1,2 · (N' − N) · d{(X(y) − X0(y)}/dy = 0.1874 × 10⁻⁴
              ... [T] ... φ1,2 · (N' − N) · d{(X(y) − X0(y)}/dy = 0.1869 × 10⁻⁴
y = 10.6400   ... [W] ... φ1,2 · (N' − N) · d{(X(y) − X0(y)}/dy = 0.3080 × 10⁻⁴
              ... [T] ... φ1,2 · (N' − N) · d{(X(y) − X0(y)}/dy = 0.3072 × 10⁻⁴
y = 11.9700   ... [W] ... φ1,2 · (N' − N) · d{(X(y) − X0(y)}/dy = 0.5061 × 10⁻⁴
              ... [T] ... φ1,2 · (N' − N) · d{(X(y) − X0(y)}/dy = 0.5049 × 10⁻⁴
y = 13.3000   ... [W] ... φ1,2 · (N' − N) · d{(X(y) − X0(y)}/dy = 0.8331 × 10⁻⁴
              ... [T] ... φ1,2 · (N' − N) · d{(X(y) − X0(y)}/dy = 0.8311 × 10⁻⁴

[Values Corresponding to Condition (10a) (aspherical surface r5 in the third lens unit Gr3)]

y = 1.0900    ... φ3 · (N' − N) · d{(X(y) − X0(y)}/dy = −0.2072 × 10⁻⁵
y = 2.1800    ... φ3 · (N' − N) · d{(X(y) − X0(y)}/dy = −0.1681 × 10⁻⁴
y = 3.2700    ... φ3 · (N' − N) · d{(X(y) − X0(y)}/dy = −0.5808 × 10⁻⁴
y = 4.3600    ... φ3 · (N' − N) · d{(X(y) − X0(y)}/dy = −0.1420 × 10⁻³
y = 5.4500    ... φ3 · (N' − N) · d{(X(y) − X0(y)}/dy = −0.2878 × 10⁻³
y = 6.5400    ... φ3 · (N' − N) · d{(X(y) − X0(y)}/dy = −0.5172 × 10⁻³
y = 7.6300    ... φ3 · (N' − N) · d{(X(y) − X0(y)}/dy = −0.8507 × 10⁻³
y = 8.7200    ... φ3 · (N' − N) · d{(X(y) − X0(y)}/dy = −0.1298 × 10⁻²
y = 9.8100    ... φ3 · (N' − N) · d{(X(y) − X0(y)}/dy = −0.1836 × 10⁻²
y = 10.9000   ... φ3 · (N' − N) · d{(X(y) − X0(y)}/dy = −0.2363 × 10⁻²

[Values Corresponding to Condition (10a) (aspherical surface r8 in the third lens unit Gr3)]

y = 0.8700    ... φ3 · (N' − N) · d{(X(y) − X0(y)}/dy = 0.1621 × 10⁻⁵
y = 1.7400    ... φ3 · (N' − N) · d{(X(y) − X0(y)}/dy = 0.1314 × 10⁻⁴
y = 2.6100    ... φ3 · (N' − N) · d{(X(y) − X0(y)}/dy = 0.4540 × 10⁻⁴
y = 3.4800    ... φ3 · (N' − N) · d{(X(y) − X0(y)}/dy = 0.1118 × 10⁻³
y = 4.3500    ... φ3 · (N' − N) · d{(X(y) − X0(y)}/dy = 0.2304 × 10⁻³
y = 5.2200    ... φ3 · (N' − N) · d{(X(y) − X0(y)}/dy = 0.4272 × 10⁻³
y = 6.0900    ... φ3 · (N' − N) · d{(X(y) − X0(y)}/dy = 0.7372 × 10⁻³
y = 6.9600    ... φ3 · (N' − N) · d{(X(y) − X0(y)}/dy = 0.1201 × 10⁻²
y = 7.8300    ... φ3 · (N' − N) · d{(X(y) − X0(y)}/dy = 0.1850 × 10⁻²
y = 8.7000    ... φ3 · (N' − N) · d{(X(y) − X0(y)}/dy = 0.2667 × 10⁻²

[Values Corresponding to Condition (14a) (aspherical surface r15 in the fourth lens unit Gr4)]

y = 0.5755    ... φ4 · (N' − N) · d{(X(y) − X0(y)}/dy = −0.1431 × 10⁻⁶
y = 1.1510    ... φ4 · (N' − N) · d{(X(y) − X0(y)}/dy = −0.1224 × 10⁻⁵
y = 1.7265    ... φ4 · (N' − N) · d{(X(y) − X0(y)}/dy = −0.4519 × 10⁻⁵
y = 2.3020    ... φ4 · (N' − N) · d{(X(y) − X0(y)}/dy = −0.1176 × 10⁻⁴
y = 2.8775    ... φ4 · (N' − N) · d{(X(y) − X0(y)}/dy = −0.2492 × 10⁻⁴
y = 3.4530    ... φ4 · (N' − N) · d{(X(y) − X0(y)}/dy = −0.4574 × 10⁻⁴
y = 4.0285    ... φ4 · (N' − N) · d{(X(y) − X0(y)}/dy = −0.7544 × 10⁻⁴
y = 4.6040    ... φ4 · (N' − N) · d{(X(y) − X0(y)}/dy = −0.1155 × 10⁻³
y = 5.1795    ... φ4 · (N' − N) · d{(X(y) − X0(y)}/dy = −0.1707 × 10⁻³
y = 5.7550    ... φ4 · (N' − N) · d{(X(y) − X0(y)}/dy = −0.2566 × 10⁻³

[Values Corresponding to Condition (16a) (aspherical surface r17 in the fifth lens unit Gr5)]

y = 1.1100    ... φ5 · (N' − N) · d{(X(y) − X0(y)}/dy = −0.1583 × 10⁻⁶
y = 2.2200    ... φ5 · (N' − N) · d{(X(y) − X0(y)}/dy = −0.9213 × 10⁻⁶
y = 3.3300    ... φ5 · (N' − N) · d{(X(y) − X0(y)}/dy = −0.3250 × 10⁻⁵
y = 4.4400    ... φ5 · (N' − N) · d{(X(y) − X0(y)}/dy = −0.1710 × 10⁻⁴
y = 5.5500    ... φ5 · (N' − N) · d{(X(y) − X0(y)}/dy = −0.8012 × 10⁻⁴

TABLE 11-continued

| | |
|---|---|
| y = 6.6600 | ... φ5 · (N' − N) · d{(X(y) − X0(y)}/dy = −0.2749 × $10^{-3}$ |
| y = 7.7700 | ... φ5 · (N' − N) · d{(X(y) − X0(y)}/dy = −0.7136 × $10^{-3}$ |
| y = 8.8800 | ... φ5 · (N' − N) · d{(X(y) − X0(y)}/dy = −0.1430 × $10^{-2}$ |
| y = 9.9900 | ... φ5 · (N' − N) · d{(X(y) − X0(y)}/dy = −0.2085 × $10^{-2}$ |
| y = 11.1000 | ... φ5 · (N' − N) · d{(X(y) − X0(y)}/dy = −0.1346 × $10^{-2}$ |

[Values Corresponding to Condition (16a) (aspherical surface r18 in the fifth lens unit Gr5)]

| | |
|---|---|
| y = 1.1800 | ... φ5 · (N' − N) · d{(X(y) − X0(y)}/dy = −0.3610 × $10^{-5}$ |
| y = 2.3600 | ... φ5 · (N' − N) · d{(X(y) − X0(y)}/dy = −0.3002 × $10^{-4}$ |
| y = 3.5400 | ... φ5 · (N' − N) · d{(X(y) − X0(y)}/dy = −0.1056 × $10^{-3}$ |
| y = 4.7200 | ... φ5 · (N' − N) · d{(X(y) − X0(y)}/dy = −0.2543 × $10^{-3}$ |
| y = 5.9000 | ... φ5 · (N' − N) · d{(X(y) − X0(y)}/dy = −0.4737 × $10^{-3}$ |
| y = 7.0800 | ... φ5 · (N' − N) · d{(X(y) − X0(y)}/dy = −0.7016 × $10^{-3}$ |
| y = 8.2600 | ... φ5 · (N' − N) · d{(X(y) − X0(y)}/dy = −0.8262 × $10^{-3}$ |
| y = 9.4400 | ... φ5 · (N' − N) · d{(X(y) − X0(y)}/dy = −0.9116 × $10^{-3}$ |
| y = 10.6200 | ... φ5 · (N' − N) · d{(X(y) − X0(y)}/dy = −0.2024 × $10^{-2}$ |
| y = 11.8000 | ... φ5 · (N' − N) · d{(X(y) − X0(y)}/dy = −0.8430 × $10^{-2}$ |

TABLE 12

<< Embodiment 12 >>
f = 39.1~87.3~178.0
FNO = 4.12~7.00~9.50

| Radius of Curvature | Axial Distance | Index of Refraction | Abbe Number |
|---|---|---|---|
| r1  31.001 | | | |
| | d1  1.800 | N1  1.84666 | ν1  23.82 |
| r2*  23.751 | | | |
| | d2  0.600 | | |
| r3  27.548 | | | |
| | d3  5.000 | N2  1.51680 | ν2  64.20 |
| r4  531.019 | | | |
| | d4  2.742~18.842~35.942 | | |
| r5*  −59.876 | | | |
| | d5  1.400 | N3  1.80700 | ν3  39.79 |
| r6  13.245 | | | |
| | d6  0.600~0.500~0.400 | | |
| r7  13.812 | | | |
| | d7  4.600 | N4  1.78472 | ν4  25.75 |
| r8*  93.114 | | | |
| | d8  9.000~6.415~0.343 | | |
| r9  ∞ | | | |
| | d9  11.000 | N5  1.51680 | ν5  64.20 |
| r10  ∞ | | | |
| | d10  0.500 | | |
| r11  ∞ (Aperture Diaphragm) | | | |
| | d11  0.500 | | |
| r12  23.160 | | | |
| | d12  1.735 | N6  1.84666 | ν6  23.82 |
| r13  14.006 | | | |
| | d13  0.300 | | |
| r14  14.462 | | | |
| | d14  4.700 | N7  1.51728 | ν7  69.43 |
| r15*  −20.569 | | | |
| | d15  0.200 | | |
| r16  ∞ (Light Beam Restricting Plate) | | | |
| | d16  22.402~10.110~2.500 | | |
| r17*  −72.545 | | | |
| | d17  4.500 | N8  1.84666 | ν8  23.82 |
| r18*  −23.840 | | | |
| | d18  3.300 | | |
| r19  −13.713 | | | |
| | d19  1.302 | N9  1.74400 | ν9  44.93 |
| r20  119.969 | | | |
| | Σd = 76.181~77.304~80.623 | | |

[Aspherical Coefficients]

r2:   ε = 1.0000
      A4 = −0.12006 × $10^{-5}$
      A6 = 0.10019 × $10^{-7}$

TABLE 12-continued

|  |  |
|---|---|
|  | A8 = −0.15432 × 10$^{-9}$ |
|  | A10 = 0.87068 × 10$^{-12}$ |
|  | A12 = −0.18822 × 10$^{-14}$ |
| r5: | ε = 1.0000 |
|  | A4 = 0.11981 × 10$^{-4}$ |
|  | A6 = 0.95862 × 10$^{-7}$ |
|  | A8 = −0.35274 × 10$^{-9}$ |
|  | A10 = 0.40000 × 10$^{-12}$ |
|  | A12 = −0.27882 × 10$^{-14}$ |
| r8: | ε = 1.0000 |
|  | A4 = 0.26958 × 10$^{-4}$ |
|  | A6 = 0.12717 × 10$^{-6}$ |
|  | A8 = 0.21752 × 10$^{-8}$ |
|  | A10 = −0.12868 × 10$^{-10}$ |
|  | A12 = −0.75334 × 10$^{-14}$ |
| r15: | ε = 1.0000 |
|  | A4 = 0.11975 × 10$^{-4}$ |
|  | A6 = 0.44166 × 10$^{-6}$ |
|  | A8 = −0.16895 × 10$^{-7}$ |
|  | A10 = 0.23014 × 10$^{-9}$ |
|  | A12 = −0.30346 × 10$^{-13}$ |
| r17: | ε = 1.0000 |
|  | A4 = 0.43308 × 10$^{-5}$ |
|  | A6 = −0.43065 × 10$^{-7}$ |
|  | A8 = 0.46900 × 10$^{-8}$ |
|  | A10 = −0.28395 × 10$^{-10}$ |
|  | A12 = 0.27650 × 10$^{-14}$ |
| r18: | ε = 1.0000 |
|  | A4 = −0.21928 × 10$^{-4}$ |
|  | A6 = −0.10845 × 10$^{-6}$ |
|  | A8 = 0.27548 × 10$^{-8}$ |
|  | A10 = 0.33400 × 10$^{-11}$ |
|  | A12 = −0.13394 × 10$^{-12}$ |

[Values Corresponding to Condition (6) (aspherical surface r2 in the first lens unit Gr1)]

y = 1.3300 ... φ1 · (N' − N) · d{(X(y) − X0(y)}/dy = 0.9399 × 10$^{-7}$
y = 2.6600 ... φ1 · (N' − N) · d{(X(y) − X0(y)}/dy = 0.7097 × 10$^{-6}$
y = 3.9900 ... φ1 · (N' − N) · d{(X(y) − X0(y)}/dy = 0.2227 × 10$^{-5}$
y = 5.3200 ... φ1 · (N' − N) · d{(X(y) − X0(y)}/dy = 0.5000 × 10$^{-5}$
y = 6.6500 ... φ1 · (N' − N) · d{(X(y) − X0(y)}/dy = 0.9728 × 10$^{-5}$
y = 7.9800 ... φ1 · (N' − N) · d{(X(y) − X0(y)}/dy = 0.1773 × 10$^{-4}$
y = 9.3100 ... φ1 · (N' − N) · d{(X(y) − X0(y)}/dy = 0.3068 × 10$^{-4}$
y = 10.6400 ... φ1 · (N' − N) · d{(X(y) − X0(y)}/dy = 0.5014 × 10$^{-4}$
y = 11.9700 ... φ1 · (N' − N) · d{(X(y) − X0(y)}/dy = 0.7935 × 10$^{-4}$
y = 13.3000 ... φ1 · (N' − N) · d{(X(y) − X0(y)}/dy = 0.1344 × 10$^{-3}$

[Values Corresponding to Condition (10b) (aspherical surface r5 in the second lens unit Gr2)]

y = 1.0900 ... [W] ... φ2,3 · (N' − N) · d{(X(y) − X0(y)}/dy = −0.1234 × 10$^{-5}$
 ... [T] ... φ2,3 · (N' − N) · d{(X(y) − X0(y)}/dy = −0.1272 × 10$^{-5}$
y = 2.1800 ... [W] ... φ2,3 · (N' − N) · d{(X(y) − X0(y)}/dy = −0.1028 × 10$^{-4}$
 ... [T] ... φ2,3 · (N' − N) · d{(X(y) − X0(y)}/dy = −0.1059 × 10$^{-4}$
y = 3.2700 ... [W] ... φ2,3 · (N' − N) · d{(X(y) − X0(y)}/dy = −0.3686 × 10$^{-4}$
 ... [T] ... φ2,3 · (N' − N) · d{(X(y) − X0(y)}/dy = −0.3799 × 10$^{-4}$
y = 4.3600 ... [W] ... φ2,3 · (N' − N) · d{(X(y) − X0(y)}/dy = −0.9404 × 10$^{-4}$
 ... [T] ... φ2,3 · (N' − N) · d{(X(y) − X0(y)}/dy = −0.9692 × 10$^{-4}$
y = 5.4500 ... [W] ... φ2,3 · (N' − N) · d{(X(y) − X0(y)}/dy = −0.1987 × 10$^{-3}$
 ... [T] ... φ2,3 · (N' − N) · d{(X(y) − X0(y)}/dy = −0.2048 × 10$^{-3}$
y = 6.5400 ... [W] ... φ2,3 · (N' − N) · d{(X(y) − X0(y)}/dy = −0.3706 × 10$^{-3}$
 ... [T] ... φ2,3 · (N' − N) · d{(X(y) − X0(y)}/dy = −0.3820 × 10$^{-3}$
y = 7.6300 ... [W] ... φ2,3 · (N' − N) · d{(X(y) − X0(y)}/dy = −0.6293 × 10$^{-3}$
 ... [T] ... φ2,3 · (N' − N) · d{(X(y) − X0(y)}/dy = −0.6486 × 10$^{-3}$
y = 8.7200 ... [W] ... φ2,3 · (N' − N) · d{(X(y) − X0(y)}/dy = −0.9880 × 10$^{-3}$
 ... [T] ... φ2,3 · (N' − N) · d{(X(y) − X0(y)}/dy = −0.1018 × 10$^{-2}$
y = 9.8100 ... [W] ... φ2,3 · (N' − N) · d{(X(y) − X0(y)}/dy = −0.1441 × 10$^{-2}$
 ... [T] ... φ2,3 · (N' − N) · d{(X(y) − X0(y)}/dy = −0.1485 × 10$^{-2}$
y = 10.9000 ... [W] ... φ2,3 · (N' − N) · d{(X(y) − X0(y)}/dy = −0.1942 × 10$^{-2}$
 ... [T] ... φ2,3 · (N' − N) · d{(X(y) − X0(y)}/dy = −0.2001 × 10$^{-2}$

[Values Corresponding to Condition (10b) (aspherical surface r8 in the third lens unit Gr3)]

y = 0.8700 ... [W] ... φ2,3 · (N' − N) · d{(X(y) − X0(y)}/dy = 0.1361 × 10$^{-5}$
 ... [T] ... φ2,3 · (N' − N) · d{(X(y) − X0(y)}/dy = 0.1403 × 10$^{-5}$
y = 1.7400 ... [W] ... φ2,3 · (N' − N) · d{(X(y) − X0(y)}/dy = 0.1108 × 10$^{-4}$
 ... [T] ... φ2,3 · (N' − N) · d{(X(y) − X0(y)}/dy = 0.1142 × 10$^{-4}$
y = 2.6100 ... [W] ... φ2,3 · (N' − N) · d{(X(y) − X0(y)}/dy = 0.3858 × 10$^{-4}$
 ... [T] ... φ2,3 · (N' − N) · d{(X(y) − X0(y)}/dy = 0.3976 × 10$^{-4}$

TABLE 12-continued

| | | |
|---|---|---|
| y = 3.4800 | ... [W] | ... $\phi 2,3 \cdot (N' - N) \cdot d\{(X(y) - X0(y)\}/dy = 0.9595 \times 10^{-4}$ |
| | ... [T] | ... $\phi 2,3 \cdot (N' - N) \cdot d\{(X(y) - X0(y)\}/dy = 0.9889 \times 10^{-4}$ |
| y = 4.3500 | ... [W] | ... $\phi 2,3 \cdot (N' - N) \cdot d\{(X(y) - X0(y)\}/dy = 0.2003 \times 10^{-3}$ |
| | ... [T] | ... $\phi 2,3 \cdot (N' - N) \cdot d\{(X(y) - X0(y)\}/dy = 0.2064 \times 10^{-3}$ |
| y = 5.2200 | ... [W] | ... $\phi 2,3 \cdot (N' - N) \cdot d\{(X(y) - X0(y)\}/dy = 0.3767 \times 10^{-3}$ |
| | ... [T] | ... $\phi 2,3 \cdot (N' - N) \cdot d\{(X(y) - X0(y)\}/dy = 0.3883 \times 10^{-3}$ |
| y = 6.0900 | ... [W] | ... $\phi 2,3 \cdot (N' - N) \cdot d\{(X(y) - X0(y)\}/dy = 0.6604 \times 10^{-3}$ |
| | ... [T] | ... $\phi 2,3 \cdot (N' - N) \cdot d\{(X(y) - X0(y)\}/dy = 0.6806 \times 10^{-3}$ |
| y = 6.9600 | ... [W] | ... $\phi 2,3 \cdot (N' - N) \cdot d\{(X(y) - X0(y)\}/dy = 0.1096 \times 10^{-2}$ |
| | ... [T] | ... $\phi 2,3 \cdot (N' - N) \cdot d\{(X(y) - X0(y)\}/dy = 0.1130 \times 10^{-2}$ |
| y = 7.8300 | ... [W] | ... $\phi 2,3 \cdot (N' - N) \cdot d\{(X(y) - X0(y)\}/dy = 0.1731 \times 10^{-2}$ |
| | ... [T] | ... $\phi 2,3 \cdot (N' - N) \cdot d\{(X(y) - X0(y)\}/dy = 0.1784 \times 10^{-2}$ |
| y = 8.7000 | ... [W] | ... $\phi 2,3 \cdot (N' - N) \cdot d\{(X(y) - X0(y)\}/dy = 0.2593 \times 10^{-2}$ |
| | ... [T] | ... $\phi 2,3 \cdot (N' - N) \cdot d\{(X(y) - X0(y)\}/dy = 0.2673 \times 10^{-2}$ |

[Values Corresponding to Condition (14a) (aspherical surface r15 in the fourth lens unit Gr4)]

| | |
|---|---|
| y = 0.5948 | ... $\phi 4 \cdot (N' - N) \cdot d\{(X(y) - X0(y)\}/dy = -0.1934 \times 10^{-6}$ |
| y = 1.1895 | ... $\phi 4 \cdot (N' - N) \cdot d\{(X(y) - X0(y)\}/dy = -0.1628 \times 10^{-5}$ |
| y = 1.7843 | ... $\phi 4 \cdot (N' - N) \cdot d\{(X(y) - X0(y)\}/dy = -0.5887 \times 10^{-5}$ |
| y = 2.3790 | ... $\phi 4 \cdot (N' - N) \cdot d\{(X(y) - X0(y)\}/dy = -0.1495 \times 10^{-4}$ |
| y = 2.9738 | ... $\phi 4 \cdot (N' - N) \cdot d\{(X(y) - X0(y)\}/dy = -0.3088 \times 10^{-4}$ |
| y = 3.5685 | ... $\phi 4 \cdot (N' - N) \cdot d\{(X(y) - X0(y)\}/dy = -0.5517 \times 10^{-4}$ |
| y = 4.1633 | ... $\phi 4 \cdot (N' - N) \cdot d\{(X(y) - X0(y)\}/dy = -0.8856 \times 10^{-4}$ |
| y = 4.7581 | ... $\phi 4 \cdot (N' - N) \cdot d\{(X(y) - X0(y)\}/dy = -0.1323 \times 10^{-3}$ |
| y = 5.3528 | ... $\phi 4 \cdot (N' - N) \cdot d\{(X(y) - X0(y)\}/dy = -0.1928 \times 10^{-3}$ |
| y = 5.9476 | ... $\phi 4 \cdot (N' - N) \cdot d\{(X(y) - X0(y)\}/dy = -0.2924 \times 10^{-3}$ |

[Values Corresponding to Condition (16a) (aspherical surface r17 in the fifth lens unit Gr5)]

| | |
|---|---|
| y = 1.1000 | ... $\phi 5 \cdot (N' - N) \cdot d\{(X(y) - X0(y)\}/dy = -0.6247 \times 10^{-6}$ |
| y = 2.2000 | ... $\phi 5 \cdot (N' - N) \cdot d\{(X(y) - X0(y)\}/dy = -0.4955 \times 10^{-5}$ |
| y = 3.3000 | ... $\phi 5 \cdot (N' - N) \cdot d\{(X(y) - X0(y)\}/dy = -0.1838 \times 10^{-4}$ |
| y = 4.4000 | ... $\phi 5 \cdot (N' - N) \cdot d\{(X(y) - X0(y)\}/dy = -0.5700 \times 10^{-4}$ |
| y = 5.5000 | ... $\phi 5 \cdot (N' - N) \cdot d\{(X(y) - X0(y)\}/dy = -0.1648 \times 10^{-3}$ |
| y = 6.6000 | ... $\phi 5 \cdot (N' - N) \cdot d\{(X(y) - X0(y)\}/dy = -0.4263 \times 10^{-3}$ |
| y = 7.7000 | ... $\phi 5 \cdot (N' - N) \cdot d\{(X(y) - X0(y)\}/dy = -0.9434 \times 10^{-3}$ |
| y = 8.8000 | ... $\phi 5 \cdot (N' - N) \cdot d\{(X(y) - X0(y)\}/dy = -0.1718 \times 10^{-2}$ |
| y = 9.9000 | ... $\phi 5 \cdot (N' - N) \cdot d\{(X(y) - X0(y)\}/dy = -0.2352 \times 10^{-2}$ |
| y = 11.0000 | ... $\phi 5 \cdot (N' - N) \cdot d\{(X(y) - X0(y)\}/dy = -0.1445 \times 10^{-2}$ |

[Values Corresponding to Condition (16a) (aspherical surface r18 in the fifth lens unit Gr5)]

| | |
|---|---|
| y = 1.1800 | ... $\phi 5 \cdot (N' - N) \cdot d\{(X(y) - X0(y)\}/dy = -0.4003 \times 10^{-5}$ |
| y = 2.3600 | ... $\phi 5 \cdot (N' - N) \cdot d\{(X(y) - X0(y)\}/dy = -0.3277 \times 10^{-4}$ |
| y = 3.5400 | ... $\phi 5 \cdot (N' - N) \cdot d\{(X(y) - X0(y)\}/dy = -0.1127 \times 10^{-3}$ |
| y = 4.7200 | ... $\phi 5 \cdot (N' - N) \cdot d\{(X(y) - X0(y)\}/dy = -0.2641 \times 10^{-3}$ |
| y = 5.9000 | ... $\phi 5 \cdot (N' - N) \cdot d\{(X(y) - X0(y)\}/dy = -0.4780 \times 10^{-3}$ |
| y = 7.0800 | ... $\phi 5 \cdot (N' - N) \cdot d\{(X(y) - X0(y)\}/dy = -0.6920 \times 10^{-3}$ |
| y = 8.2600 | ... $\phi 5 \cdot (N' - N) \cdot d\{(X(y) - X0(y)\}/dy = -0.8330 \times 10^{-3}$ |
| y = 9.4400 | ... $\phi 5 \cdot (N' - N) \cdot d\{(X(y) - X0(y)\}/dy = -0.1120 \times 10^{-2}$ |
| y = 10.6200 | ... $\phi 5 \cdot (N' - N) \cdot d\{(X(y) - X0(y)\}/dy = -0.3061 \times 10^{-2}$ |
| y = 11.8000 | ... $\phi 5 \cdot (N' - N) \cdot d\{(X(y) - X0(y)\}/dy = -0.1198 \times 10^{-1}$ |

TABLE 13

<< Embodiment 13 >>
f = 39.1~87.3~178.0
FNO = 4.12~7.00~9.50

| Radius of Curvature | | Axial Distance | | Index of Refraction | | Abbe Number | |
|---|---|---|---|---|---|---|---|
| r1 | 33.415 | | | | | | |
| | | d1 | 1.800 | N1 | 1.84666 | ν1 | 23.82 |
| r2* | 25.158 | | | | | | |
| | | d2 | 0.500 | | | | |
| r3 | 27.548 | | | | | | |
| | | d3 | 5.000 | N2 | 1.51680 | ν2 | 64.20 |
| r4 | 578.590 | | | | | | |
| | | d4 | 2.742~18.742~37.742 | | | | |
| r5* | −55.376 | | | | | | |
| | | d5 | 1.400 | N3 | 1.80700 | ν3 | 39.79 |
| r6 | 13.245 | | | | | | |
| | | d6 | 0.500 | | | | |
| r7 | 13.812 | | | | | | |

TABLE 13-continued

| | | | | | | | |
|---|---|---|---|---|---|---|---|
| | | d7 | 4.600 | N4 | 1.78472 | ν4 | 25.75 |
| r8* | 110.866 | | | | | | |
| | | d8 | 8.600~6.252~1.485 | | | | |
| r9 | ∞ | | | | | | |
| | | d9 | 11.000 | N5 | 1.51680 | ν5 | 64.20 |
| r10 | ∞ | | | | | | |
| | | d10 | 0.400 | | | | |
| r11 | ∞ (Aperture Diaphragm) | | | | | | |
| | | d11 | 0.500~0.300~0.250 | | | | |
| r12 | 23.437 | | | | | | |
| | | d12 | 1.735 | N6 | 1.84666 | ν6 | 23.82 |
| r13 | 14.481 | | | | | | |
| | | d13 | 0.300~0.500~0.550 | | | | |
| r14 | 14.504 | | | | | | |
| | | d14 | 4.700 | N7 | 1.51728 | ν7 | 69.43 |
| r15* | −21.733 | | | | | | |
| | | d15 | 0.200 | | | | |
| r16 | ∞ (Light Beam Restricting Plate) | | | | | | |
| | | d16 | 23.601~10.686~2.500 | | | | |
| r17* | −57.319 | | | | | | |
| | | d17 | 4.300 | N8 | 1.84666 | ν8 | 23.82 |
| r18* | −23.866 | | | | | | |
| | | d18 | 3.300 | | | | |
| r19 | −14.152 | | | | | | |
| | | d19 | 1.302 | N9 | 1.74400 | ν9 | 44.93 |
| r20 | 148.087 | | | | | | |
| | | Σd = 76.480~77.216~83.264 | | | | | |

[Aspherical Coefficients]

r2: $\epsilon = 1.0000$
$A4 = -0.66593 \times 10^{-6}$
$A6 = 0.53240 \times 10^{-8}$
$A8 = -0.76318 \times 10^{-10}$
$A10 = 0.40487 \times 10^{-12}$
$A12 = -0.83815 \times 10^{-15}$ r5: $\epsilon = 1.0000$
$A4 = 0.16315 \times 10^{-4}$
$A6 = 0.54717 \times 10^{-7}$
$A8 = -0.37022 \times 10^{-9}$
$A10 = 0.65664 \times 10^{-12}$
$A12 = -0.27882 \times 10^{-14}$ r8: $\epsilon = 1.0000$
$A4 = 0.28423 \times 10^{-4}$
$A6 = 0.72185 \times 10^{-7}$
$A8 = 0.17395 \times 10^{-8}$
$A10 = -0.14348 \times 10^{-10}$
$A12 = 0.70147 \times 10^{-14}$ r15: $\epsilon = 1.0000$
$A4 = 0.14476 \times 10^{-4}$
$A6 = 0.50487 \times 10^{-6}$
$A8 = -0.16441 \times 10^{-7}$
$A10 = 0.23260 \times 10^{-9}$
$A12 = -0.17869 \times 10^{-13}$ r17: $\epsilon = 1.0000$
$A4 = 0.16063 \times 10^{-5}$
$A6 = -0.45520 \times 10^{-7}$
$A8 = 0.49220 \times 10^{-8}$
$A10 = -0.27445 \times 10^{-10}$
$A12 = -0.39059 \times 10^{-13}$ r18: $\epsilon = 1.0000$
$A4 = -0.17364 \times 10^{-4}$
$A6 = -0.32086 \times 10^{-7}$
$A8 = 0.27130 \times 10^{-8}$
$A10 = -0.15467 \times 10^{-11}$
$A12 = -0.12397 \times 10^{-12}$

[Values Corresponding to Condition (6) (aspherical surface r2 in the first lens unit Gr1)]

y = 1.3300 ... $\phi 1 \cdot (N' - N) \cdot d\{(X(y) - X0(y))\}/dy = 0.5218 \times 10^{-7}$
y = 2.6600 ... $\phi 1 \cdot (N' - N) \cdot d\{(X(y) - X0(y))\}/dy = 0.3947 \times 10^{-6}$
y = 3.9900 ... $\phi 1 \cdot (N' - N) \cdot d\{(X(y) - X0(y))\}/dy = 0.1239 \times 10^{-5}$
y = 5.3200 ... $\phi 1 \cdot (N' - N) \cdot d\{(X(y) - X0(y))\}/dy = 0.2769 \times 10^{-5}$
y = 6.6500 ... $\phi 1 \cdot (N' - N) \cdot d\{(X(y) - X0(y))\}/dy = 0.5333 \times 10^{-5}$
y = 7.9800 ... $\phi 1 \cdot (N' - N) \cdot d\{(X(y) - X0(y))\}/dy = 0.9612 \times 10^{-5}$
y = 9.3100 ... $\phi 1 \cdot (N' - N) \cdot d\{(X(y) - X0(y))\}/dy = 0.1655 \times 10^{-4}$
y = 10.6400 ... $\phi 1 \cdot (N' - N) \cdot d\{(X(y) - X0(y))\}/dy = 0.2713 \times 10^{-4}$
y = 11.9700 ... $\phi 1 \cdot (N' - N) \cdot d\{(X(y) - X0(y))\}/dy = 0.4302 \times 10^{-4}$ TABLE 13-continued y = 13.3000   ... $\phi1 \cdot (N' - N) \cdot d\{(X(y) - X0(y))\}/dy = 0.7110 \times 10^{-4}$
[Values Corresponding to Condition (10) (aspherical surface r5 in the second lens unit Gr2)]

y = 1.0900   ... $\phi2 \cdot (N' - N) \cdot d\{(X(y) - X0(y))\}/dy = -0.1667 \times 10^{-5}$
y = 2.1800   ... $\phi2 \cdot (N' - N) \cdot d\{(X(y) - X0(y))\}/dy = -0.1356 \times 10^{-4}$
y = 3.2700   ... $\phi2 \cdot (N' - N) \cdot d\{(X(y) - X0(y))\}/dy = -0.4693 \times 10^{-4}$
y = 4.3600   ... $\phi2 \cdot (N' - N) \cdot d\{(X(y) - X0(y))\}/dy = -0.1145 \times 10^{-3}$
y = 5.4500   ... $\phi2 \cdot (N' - N) \cdot d\{(X(y) - X0(y))\}/dy = -0.2303 \times 10^{-3}$
y = 6.5400   ... $\phi2 \cdot (N' - N) \cdot d\{(X(y) - X0(y))\}/dy = -0.4075 \times 10^{-3}$
y = 7.6300   ... $\phi2 \cdot (N' - N) \cdot d\{(X(y) - X0(y))\}/dy = -0.6554 \times 10^{-3}$
y = 8.7200   ... $\phi2 \cdot (N' - N) \cdot d\{(X(y) - X0(y))\}/dy = -0.9735 \times 10^{-3}$
y = 9.8100   ... $\phi2 \cdot (N' - N) \cdot d\{(X(y) - X0(y))\}/dy = -0.1340 \times 10^{-2}$
y = 10.9000  ... $\phi2 \cdot (N' - N) \cdot d\{(X(y) - X0(y))\}/dy = -0.1696 \times 10^{-2}$
[Values Corresponding to Condition (10) (aspherical surface r8 in the second lens unit Gr2)]

y = 0.8700   ... $\phi2 \cdot (N' - N) \cdot d\{(X(y) - X0(y))\}/dy = 0.1432 \times 10^{-5}$
y = 1.7400   ... $\phi2 \cdot (N' - N) \cdot d\{(X(y) - X0(y))\}/dy = 0.1157 \times 10^{-4}$
y = 2.6100   ... $\phi2 \cdot (N' - N) \cdot d\{(X(y) - X0(y))\}/dy = 0.3975 \times 10^{-4}$
y = 3.4800   ... $\phi2 \cdot (N' - N) \cdot d\{(X(y) - X0(y))\}/dy = 0.9702 \times 10^{-4}$
y = 4.3500   ... $\phi2 \cdot (N' - N) \cdot d\{(X(y) - X0(y))\}/dy = 0.1976 \times 10^{-3}$
y = 5.2200   ... $\phi2 \cdot (N' - N) \cdot d\{(X(y) - X0(y))\}/dy = 0.3607 \times 10^{-3}$
y = 6.0900   ... $\phi2 \cdot (N' - N) \cdot d\{(X(y) - X0(y))\}/dy = 0.6105 \times 10^{-3}$
y = 6.9600   ... $\phi2 \cdot (N' - N) \cdot d\{(X(y) - X0(y))\}/dy = 0.9739 \times 10^{-3}$
y = 7.8300   ... $\phi2 \cdot (N' - N) \cdot d\{(X(y) - X0(y))\}/dy = 0.1471 \times 10^{-2}$
y = 8.7000   ... $\phi2 \cdot (N' - N) \cdot d\{(X(y) - X0(y))\}/dy = 0.2094 \times 10^{-2}$
[Values Corresponding to condition (14b) (aspherical surface r15 in the fifth lens unit Gr5)]

y = 0.5876   ... [W] ... $\phi4,5 \cdot (N' - N) \cdot d\{(X(y) - X0(y))\}/dy = -0.2252 \times 10^{-6}$
             ... [T] ... $\phi4,5 \cdot (N' - N) \cdot d\{(X(y) - X0(y))\}/dy = -0.2270 \times 10^{-6}$
y = 1.1753   ... [W] ... $\phi4,5 \cdot (N' - N) \cdot d\{(X(y) - X0(y))\}/dy = -0.1890 \times 10^{-5}$
             ... [T] ... $\phi4,5 \cdot (N' - N) \cdot d\{(X(y) - X0(y))\}/dy = -0.1905 \times 10^{-5}$
y = 1.7629   ... [W] ... $\phi4,5 \cdot (N' - N) \cdot d\{(X(y) - X0(y))\}/dy = -0.6821 \times 10^{-5}$
             ... [T] ... $\phi4,5 \cdot (N' - N) \cdot d\{(X(y) - X0(y))\}/dy = -0.6875 \times 10^{-5}$
y = 2.3506   ... [W] ... $\phi4,5 \cdot (N' - N) \cdot d\{(X(y) - X0(y))\}/dy = -0.1737 \times 10^{-4}$
             ... [T] ... $\phi4,5 \cdot (N' - N) \cdot d\{(X(y) - X0(y))\}/dy = -0.1750 \times 10^{-4}$
y = 2.9382   ... [W] ... $\phi4,5 \cdot (N' - N) \cdot d\{(X(y) - X0(y))\}/dy = -0.3618 \times 10^{-4}$
             ... [T] ... $\phi4,5 \cdot (N' - N) \cdot d\{(X(y) - X0(y))\}/dy = -0.3647 \times 10^{-4}$
y = 3.5258   ... [W] ... $\phi4,5 \cdot (N' - N) \cdot d\{(X(y) - X0(y))\}/dy = -0.6578 \times 10^{-4}$
             ... [T] ... $\phi4,5 \cdot (N' - N) \cdot d\{(X(y) - X0(y))\}/dy = -0.6630 \times 10^{-4}$
y = 4.1135   ... [W] ... $\phi4,5 \cdot (N' - N) \cdot d\{(X(y) - X0(y))\}/dy = -0.1085 \times 10^{-3}$
             ... [T] ... $\phi4,5 \cdot (N' - N) \cdot d\{(X(y) - X0(y))\}/dy = -0.1093 \times 10^{-3}$
y = 4.7011   ... [W] ... $\phi4,5 \cdot (N' - N) \cdot d\{(X(y) - X0(y))\}/dy = -0.1676 \times 10^{-3}$
             ... [T] ... $\phi4,5 \cdot (N' - N) \cdot d\{(X(y) - X0(y))\}/dy = -0.1689 \times 10^{-3}$
y = 5.2887   ... [W] ... $\phi4,5 \cdot (N' - N) \cdot d\{(X(y) - X0(y))\}/dy = -0.2521 \times 10^{-3}$
             ... [T] ... $\phi4,5 \cdot (N' - N) \cdot d\{(X(y) - X0(y))\}/dy = -0.2541 \times 10^{-3}$
y = 5.8764   ... [W] ... $\phi4,5 \cdot (N' - N) \cdot d\{(X(y) - X0(y))\}/dy = -0.3865 \times 10^{-3}$
             ... [T] ... $\phi4,5 \cdot (N' - N) \cdot d\{(X(y) - X0(y))\}/dy = -0.3895 \times 10^{-3}$
[Values Corresponding to Condition (16b) (aspherical surface r17 in the sixth lens unit Gr6)]

y = 1.1100   ... $\phi6 \cdot (N' - N) \cdot d\{(X(y) - X0(y))\}/dy = -0.2391 \times 10^{-6}$
y = 2.2200   ... $\phi6 \cdot (N' - N) \cdot d\{(X(y) - X0(y))\}/dy = -0.1868 \times 10^{-5}$
y = 3.3300   ... $\phi6 \cdot (N' - N) \cdot d\{(X(y) - X0(y))\}/dy = -0.8252 \times 10^{-5}$
y = 4.4400   ... $\phi6 \cdot (N' - N) \cdot d\{(X(y) - X0(y))\}/dy = -0.3528 \times 10^{-4}$
y = 5.5500   ... $\phi6 \cdot (N' - N) \cdot d\{(X(y) - X0(y))\}/dy = -0.1309 \times 10^{-3}$
y = 6.6600   ... $\phi6 \cdot (N' - N) \cdot d\{(X(y) - X0(y))\}/dy = -0.3866 \times 10^{-3}$
y = 7.7700   ... $\phi6 \cdot (N' - N) \cdot d\{(X(y) - X0(y))\}/dy = -0.8917 \times 10^{-3}$
y = 8.8800   ... $\phi6 \cdot (N' - N) \cdot d\{(X(y) - X0(y))\}/dy = -0.1534 \times 10^{-2}$
y = 9.9900   ... $\phi6 \cdot (N' - N) \cdot d\{(X(y) - X0(y))\}/dy = -0.1476 \times 10^{-2}$
y = 11.1000  ... $\phi6 \cdot (N' - N) \cdot d\{(X(y) - X0(y))\}/dy = 0.1977 \times 10^{-2}$
[Values Corresponding to Condition (16b) (aspherical surface r18 in the sixth lens unit Gr6)]

y = 1.1800   ... $\phi6 \cdot (N' - N) \cdot d\{(X(y) - X0(y))\}/dy = -0.3256 \times 10^{-5}$
y = 2.3600   ... $\phi6 \cdot (N' - N) \cdot d\{(X(y) - X0(y))\}/dy = -0.2612 \times 10^{-4}$
y = 3.5400   ... $\phi6 \cdot (N' - N) \cdot d\{(X(y) - X0(y))\}/dy = -0.8646 \times 10^{4}$
y = 4.7200   ... $\phi6 \cdot (N' - N) \cdot d\{(X(y) - X0(y))\}/dy = -0.1899 \times 10^{-3}$
y = 5.9000   ... $\phi6 \cdot (N' - N) \cdot d\{(X(y) - X0(y))\}/dy = -0.3078 \times 10^{-3}$
y = 7.0800   ... $\phi6 \cdot (N' - N) \cdot d\{(X(y) - X0(y))\}/dy = -0.3625 \times 10^{-3}$
y = 8.2600   ... $\phi6 \cdot (N' - N) \cdot d\{(X(y) - X0(y))\}/dy = -0.2998 \times 10^{-3}$
y = 9.4400   ... $\phi6 \cdot (N' - N) \cdot d\{(X(y) - X0(y))\}/dy = -0.4550 \times 10^{-3}$
y = 10.6200  ... $\phi6 \cdot (N' - N) \cdot d\{(X(y) - X0(y))\}/dy = -0.2657 \times 10^{-2}$
y = 11.8000  ... $\phi6 \cdot (N' - N) \cdot d\{(X(y) - X0(y))\}/dy = -0.1292 \times 10^{-1}$

TABLE 14

<< Embodiment 14 >>
f = 39.1~87.3~178.0
FNO = 4.12~7.00~9.50

| Radius of Curvature | | Axial Distance | | Index of Refraction | | Abbe Number | |
|---|---|---|---|---|---|---|---|
| r1 | 33.610 | | | | | | |
| | | d1 | 2.000 | N1 | 1.84666 | ν1 | 23.82 |
| r2* | 25.100 | | | | | | |
| | | d2 | 0.400 | | | | |
| r3 | 27.548 | | | | | | |
| | | d3 | 5.000 | N2 | 1.51680 | ν2 | 64.20 |
| r4 | 753.614 | | | | | | |
| | | d4 | 2.742~16.742~33.742 | | | | |
| r5* | −52.743 | | | | | | |
| | | d5 | 1.400 | N3 | 1.80700 | ν3 | 39.79 |
| r6 | 13.245 | | | | | | |
| | | d6 | 0.500 | | | | |
| r7 | 13.812 | | | | | | |
| | | d7 | 4.800 | N4 | 1.78472 | ν4 | 25.75 |
| r8* | 122.571 | | | | | | |
| | | d8 | 9.100~6.998~0.481 | | | | |
| r9 | ∞ | | | | | | |
| | | d9 | 11.000 | N5 | 1.51680 | ν5 | 64.20 |
| r10 | ∞ | | | | | | |
| | | d10 | 0.400 | | | | |
| r11 | ∞ (Aperture Diaphragm) | | | | | | |
| | | d11 | 0.500 | | | | |
| r12 | 22.313 | | | | | | |
| | | d12 | 1.000 | N6 | 1.84666 | ν6 | 23.82 |
| r13 | 14.288 | | | | | | |
| | | d13 | 0.300 | | | | |
| r14 | 14.606 | | | | | | |
| | | d14 | 4.700 | N7 | 1.51728 | ν7 | 69.43 |
| r15* | −22.509 | | | | | | |
| | | d15 | 0.200 | | | | |
| r16 | ∞ (Light Beam Restricting Plate) | | | | | | |
| | | d16 | 24.470~10.857~2.500 | | | | |
| r17* | −54.612 | | | | | | |
| | | d17 | 3.800 | N8 | 1.84666 | ν8 | 23.82 |
| r18* | −25.402 | | | | | | |
| | | d18 | 3.200~3.700~4.100 | | | | |
| r19 | −14.306 | | | | | | |
| | | d19 | 1.302 | N9 | 1.74400 | ν9 | 44.93 |
| r20 | 343.832 | | | | | | |
| | | Σd = 76.814~75.599~78.124 | | | | | |

[Aspherical Coefficients]

r2: $\epsilon = 1.0000$
$A4 = -0.54576 \times 10^{-6}$
$A6 = 0.36121 \times 10^{-8}$
$A8 = -0.54180 \times 10^{-10}$
$A10 = 0.28687 \times 10^{-12}$
$A12 = -0.61819 \times 10^{-15}$ r5: $\epsilon = 1.0000$
$A4 = 0.15595 \times 10^{-4}$
$A6 = 0.10752 \times 10^{-6}$
$A8 = -0.62298 \times 10^{-9}$
$A10 = 0.13699 \times 10^{-11}$
$A12 = -0.27882 \times 10^{-14}$ r8: $\epsilon = 1.0000$
$A4 = 0.26334 \times 10^{-4}$
$A6 = 0.16845 \times 10^{-6}$
$A8 = 0.14229 \times 10^{-8}$
$A10 = -0.16403 \times 10^{-10}$
$A12 = 0.40194 \times 10^{-13}$ r15: $\epsilon = 1.0000$
$A4 = 0.89173 \times 10^{-5}$
$A6 = 0.49406 \times 10^{-6}$
$A8 = -0.17305 \times 10^{-7}$
$A10 = 0.22222 \times 10^{-9}$
$A12 = -0.91183 \times 10^{-13}$ r17: $\epsilon = 1.0000$
$A4 = 0.16014 \times 10^{-5}$
$A6 = -0.14312 \times 10^{-6}$
$A8 = 0.46824 \times 10^{-8}$
$A10 = -0.25385 \times 10^{-10}$

TABLE 14-continued

```
         A12 = -0.28051 × 10⁻¹³
    r18: ε = 1.0000
         A4  = -0.16857 × 10⁻⁴
         A6  = -0.12711 × 10⁻⁶
         A8  =  0.21265 × 10⁻⁸
         A10 =  0.41439 × 10⁻¹¹
         A12 = -0.12654 × 10⁻¹²
```

[Values Corresponding to Condition (6) (aspherical surface r2 in the first lens unit Gr1)]

| | |
|---|---|
| y = 1.3300 | ... φ1 · (N' − N) · d{(X(y) − X0(y)}/dy = 0.4292 × 10⁻⁷ |
| y = 2.6600 | ... φ1 · (N' − N) · d{(X(y) − X0(y)}/dy = 0.3280 × 10⁻⁶ |
| y = 3.9900 | ... φ1 · (N' − N) · d{(X(y) − X0(y)}/dy = 0.1046 × 10⁻⁵ |
| y = 5.3200 | ... φ1 · (N' − N) · d{(X(y) − X0(y)}/dy = 0.2376 × 10⁻⁵ |
| y = 6.6500 | ... φ1 · (N' − N) · d{(X(y) − X0(y)}/dy = 0.4631 × 10⁻⁵ |
| y = 7.9800 | ... φ1 · (N' − N) · d{(X(y) − X0(y)}/dy = 0.8388 × 10⁻⁵ |
| y = 9.3100 | ... φ1 · (N' − N) · d{(X(y) − X0(y)}/dy = 0.1448 × 10⁻⁴ |
| y = 10.6400 | ... φ1 · (N' − N) · d{(X(y) − X0(y)}/dy = 0.2397 × 10⁻⁴ |
| y = 11.9700 | ... φ1 · (N' − N) · d{(X(y) − X0(y)}/dy = 0.3884 × 10⁻⁴ |
| y = 13.3000 | ... φ1 · (N' − N) · d{(X(y) − X0(y)}/dy = 0.6593 × 10⁻⁴ |

[Values Corresponding to Condition (10) (aspherical surface r5 in the second lens unit Gr2)]

| | |
|---|---|
| y = 1.0900 | ... φ2 · (N' − N) · d{(X(y) − X0(y)}/dy = −0.1603 × 10⁻⁵ |
| y = 2.1800 | ... φ2 · (N' − N) · d{(X(y) − X0(y)}/dy = −0.1327 × 10⁻⁴ |
| y = 3.2700 | ... φ2 · (N' − N) · d{(X(y) − X0(y)}/dy = −0.4712 × 10⁻⁴ |
| y = 4.3600 | ... φ2 · (N' − N) · d{(X(y) − X0(y)}/dy = −0.1185 × 10⁻³ |
| y = 5.4500 | ... φ2 · (N' − N) · d{(X(y) − X0(y)}/dy = −0.2460 × 10⁻³ |
| y = 6.5400 | ... φ2 · (N' − N) · d{(X(y) − X0(y)}/dy = −0.4488 × 10⁻³ |
| y = 7.6300 | ... φ2 · (N' − N) · d{(X(y) − X0(y)}/dy = −0.7436 × 10⁻³ |
| y = 8.7200 | ... φ2 · (N' − N) · d{(X(y) − X0(y)}/dy = −0.1138 × 10⁻² |
| y = 9.8100 | ... φ2 · (N' − N) · d{(X(y) − X0(y)}/dy = −0.1623 × 10⁻² |
| y = 10.9000 | ... φ2 · (N' − N) · d{(X(y) − X0(y)}/dy = −0.2158 × 10⁻² |

[Values Corresponding to Condition (10) (aspherical surface r8 in the second lens unit Gr2)]

| | |
|---|---|
| y = 0.8700 | ... φ2 · (N' − N) · d{(X(y) − X0(y)}/dy = 0.1332 × 10⁻⁵ |
| y = 1.7400 | ... φ2 · (N' − N) · d{(X(y) − X0(y)}/dy = 0.1090 × 10⁻⁴ |
| y = 2.6100 | ... φ2 · (N' − N) · d{(X(y) − X0(y)}/dy = 0.3821 × 10⁻⁴ |
| y = 3.4800 | ... φ2 · (N' − N) · d{(X(y) − X0(y)}/dy = 0.9560 × 10⁻⁴ |
| y = 4.3500 | ... φ2 · (N' − N) · d{(X(y) − X0(y)}/dy = 0.2001 × 10⁻³ |
| y = 5.2200 | ... φ2 · (N' − N) · d{(X(y) − X0(y)}/dy = 0.3750 × 10⁻³ |
| y = 6.0900 | ... φ2 · (N' − N) · d{(X(y) − X0(y)}/dy = 0.6505 × 10⁻³ |
| y = 6.9600 | ... φ2 · (N' − N) · d{(X(y) − X0(y)}/dy = 0.1061 × 10⁻² |
| y = 7.8300 | ... φ2 · (N' − N) · d{(X(y) − X0(y)}/dy = 0.1640 × 10⁻² |
| y = 8.7000 | ... φ2 · (N' − N) · d{(X(y) − X0(y)}/dy = 0.2408 × 10⁻² |

[Values Corresponding to Condition (14) (aspherical surface r15 in the third lens unit Gr3)]

| | |
|---|---|
| y = 0.6279 | ... φ3 · (N' − N) · d{(X(y) − X0(y)}/dy = −0.1716 × 10⁻⁶ |
| y = 1.2558 | ... φ3 · (N' − N) · d{(X(y) − X0(y)}/dy = −0.1492 × 10⁻⁵ |
| y = 1.8837 | ... φ3 · (N' − N) · d{(X(y) − X0(y)}/dy = −0.5606 × 10⁻⁵ |
| y = 2.5116 | ... φ3 · (N' − N) · d{(X(y) − X0(y)}/dy = −0.1474 × 10⁻⁴ |
| y = 3.1395 | ... φ3 · (N' − N) · d{(X(y) − X0(y)}/dy = −0.3120 × 10⁻⁴ |
| y = 3.7674 | ... φ3 · (N' − N) · d{(X(y) − X0(y)}/dy = −0.5655 × 10⁻⁴ |
| y = 4.3953 | ... φ3 · (N' − N) · d{(X(y) − X0(y)}/dy = −0.9135 × 10⁻⁴ |
| y = 5.0232 | ... φ3 · (N' − N) · d{(X(y) − X0(y)}/dy = −0.1374 × 10⁻³ |
| y = 5.6511 | ... φ3 · (N' − N) · d{(X(y) − X0(y)}/dy = −0.2052 × 10⁻³ |
| y = 6.2790 | ... φ3 · (N' − N) · d{(X(y) − X0(y)}/dy = −0.3304 × 10⁻³ |

[Values Corresponding to Condition (16c) (aspherical surface r17 in the fourth lens unit Gr4)]

| | |
|---|---|
| y = 1.1100 | ... [W] ... φ4,5 · (N' − N) · d{(X(y) − X0(y)}/dy = −0.2114 × 10⁻⁶ |
| | ... [T] ... φ4,5 · (N' − N) · d{(X(y) − X0(y)}/dy = −0.2056 × 10⁻⁶ |
| y = 2.2200 | ... [W] ... φ4,5 · (N' − N) · d{(X(y) − X0(y)}/dy = −0.9555 × 10⁻⁶ |
| | ... [T] ... φ4,5 · (N' − N) · d{(X(y) − X0(y)}/dy = −0.9294 × 10⁻⁶ |
| y = 3.3300 | ... [W] ... φ4,5 · (N' − N) · d{(X(y) − X0(y)}/dy = −0.1203 × 10⁻⁵ |
| | ... [T] ... φ4,5 · (N' − N) · d{(X(y) − X0(y)}/dy = −0.1170 × 10⁻⁵ |
| y = 4.4400 | ... [W] ... φ4,5 · (N' − N) · d{(X(y) − X0(y)}/dy = −0.5107 × 10⁻⁵ |
| | ... [T] ... φ4,5 · (N' − N) · d{(X(y) − X0(y)}/dy = −0.4968 × 10⁻⁵ |
| y = 5.5500 | ... [W] ... φ4,5 · (N' − N) · d{(X(y) − X0(y)}/dy = −0.3802 × 10⁻⁴ |
| | ... [T] ... φ4,5 · (N' − N) · d{(X(y) − X0(y)}/dy = −0.3698 × 10⁻⁴ |
| y = 6.6600 | ... [W] ... φ4,5 · (N' − N) · d{(X(y) − X0(y)}/dy = −0.1568 × 10⁻³ |
| | ... [T] ... φ4,5 · (N' − N) · d{(X(y) − X0(y)}/dy = −0.1526 × 10⁻³ |
| y = 7.7700 | ... [W] ... φ4,5 · (N' − N) · d{(X(y) − X0(y)}/dy = −0.4128 × 10⁻³ |
| | ... [T] ... φ4,5 · (N' − N) · d{(X(y) − X0(y)}/dy = −0.4016 × 10⁻³ |
| y = 8.8800 | ... [W] ... φ4,5 · (N' − N) · d{(X(y) − X0(y)}/dy = −0.6837 × 10⁻³ |
| | ... [T] ... φ4,5 · (N' − N) · d{(X(y) − X0(y)}/dy = −0.4016 × 10⁻³ |

TABLE 14-continued y = 9.9900  ... [W] ... φ4,5 · (N' − N) · d{(X(y) − X0(y)}/dy = −0.2305 × $10^{-3}$
            ... [T] ... φ4,5 · (N' − N) · d{(X(y) − X0(y)}/dy = −0.2242 × $10^{-3}$
y = 11.1000 ... [W] ... φ4,5 · (N' − N) · d{(X(y) − X0(y)}/dy = 0.3251 × $10^{-2}$
            ... [T] ... φ4,5 · (N' − N) · d{(X(y) − X0(y)}/dy = 0.3163 × $10^{-2}$

[Values Corresponding to Condition (16c) (aspherical surface r18 in the fourth lens unit Gr4)]

y = 1.1800  ... [W] ... φ4,5 · (N' − N) · d{(X(y) − X0(y)}/dy = −0.3217 × $10^{-5}$
            ... [T] ... φ4,5 · (N' − N) · d{(X(y) − X0(y)}/dy = −0.3129 × $10^{-5}$
y = 2.3600  ... [W] ... φ4,5 · (N' − N) · d{(X(y) − X0(y)}/dy = −0.2675 × $10^{-4}$
            ... [T] ... φ4,5 · (N' − N) · d{(X(y) − X0(y)}/dy = −0.2602 × $10^{-4}$
y = 3.5400  ... [W] ... φ4,5 · (N' − N) · d{(X(y) − X0(y)}/dy = −0.9424 × $10^{-4}$
            ... [T] ... φ4,5 · (N' − N) · d{(X(y) − X0(y)}/dy = −0.9167 × $10^{-4}$
y = 4.7200  ... [W] ... φ4,5 · (N' − N) · d{(X(y) − X0(y)}/dy = −0.2283 × $10^{-3}$
            ... [T] ... φ4,5 · (N' − N) · d{(X(y) − X0(y)}/dy = −0.2220 × $10^{-3}$
y = 5.9000  ... [W] ... φ4,5 · (N' − N) · d{(X(y) − X0(y)}/dy = −0.4338 × $10^{-3}$
            ... [T] ... φ4,5 · (N' − N) · d{(X(y) − X0(y)}/dy = −0.4220 × $10^{-3}$
y = 7.0800  ... [W] ... φ4,5 · (N' − N) · d{(X(y) − X0(y)}/dy = −0.6830 × $10^{-3}$
            ... [T] ... φ4,5 · (N' − N) · d{(X(y) − X0(y)}/dy = −0.6643 × $10^{-3}$
y = 8.2600  ... [W] ... φ4,5 · (N' − N) · d{(X(y) − X0(y)}/dy = −0.9674 × $10^{-3}$
            ... [T] ... φ4,5 · (N' − N) · d{(X(y) − X0(y)}/dy = −0.9410 × $10^{-3}$
y = 9.4400  ... [W] ... φ4,5 · (N' − N) · d{(X(y) − X0(y)}/dy = −0.1606 × $10^{-2}$
            ... [T] ... φ4,5 · (N' − N) · d{(X(y) − X0(y)}/dy = −0.1562 × $10^{-2}$
y = 10.6200 ... [W] ... φ4,5 · (N' − N) · d{(X(y) − X0(y)}/dy = −0.4224 × $10^{-2}$
            ... [T] ... φ4,5 · (N' − N) · d{(X(y) − X0(y)}/dy = −0.4109 × $10^{-2}$
y = 11.8000 ... [W] ... φ4,5 · (N' − N) · d{(X(y) − X0(y)}/dy = −0.1423 × $10^{-1}$
            ... [T] ... φ4,5 · (N' − N) · d{(X(y) − X0(y)}/dy = −0.4109 × $10^{-2}$

TABLE 15

<< Values Corresponding to Conditions >>

| | Condition | Emb. 1 | Emb. 2 | Emb. 3 | Emb. 4 |
|---|---|---|---|---|---|
| (1) | BFW/Y' | 0.34636 | 0.34290 | 0.31487 | 0.29697 |
| (2) | fT/fW | 4.55 | 4.5536 | 4.55360 | 4.55 |
| (3) | T(2–3)/fW | 0.512 | 0.524 | 0.489 | 0.478 |
| (4) | M2/M3 | 0.826 | 0.838 | 0.9087 | 0.9075 |
| (5) | f1/fT | 0.56124 | 0.55956 | 0.56124 | 0.56124 |
| (7) | (R1 − R2)/(R1 + R2) R1:r5, R2:r6 | 1.70819 | 1.67630 | 1.68272 | 1.73612 |
| (8) | D2/fW | 0.164 | 0.166 | 0.166 | 0.164 |
| (9) | D2/fT | 0.0360 | 0.0365 | 0.0365 | 0.0360 |
| (11) | |f2|/fT | 0.23605 | 0.23119 | 0.23408 | 0.23408 |
| (12) | D3/fW | 0.172 | 0.132 | 0.172 | 0.172 |
| (13) | D3/fT | 0.0378 | 0.0291 | 0.0378 | 0.0378 |
| (15) | f3/fT | 0.275 | 0.15434 | 0.15392 | 0.15392 |
| (17) | |f4|/fT | 0.30255 | 0.17014 | 0.17736 | 0.17879 |

TABLE 16

<< Values Corresponding to Conditions >>

| | Condition | Emb. 5 | Emb. 6 | Emb. 7 | Emb. 8 |
|---|---|---|---|---|---|
| (1) | BFW/Y' | 0.36325 | 0.35779 | 0.37511 | 0.33939 |
| (2) | fT/fW | 4.55 | 4.55 | 4.55 | 4.5536 |
| (3) | T(2–3)/fW | 0.542 | 0.517 | 0.542 | 0.512 |
| (4) | M2/M3 | 0.829 | 0.831 | 0.825 | 0.838 |
| (5) | f1/fT | 0.55624 | 0.561 | 0.55623 | 0.56124 |
| (7) | (R1 − R2)/(R1 + R2) R1:r5, R2:r6 | 1.65893 | 1.65159 | 1.65585 | 1.65709 |
| (8) | D2/fW | 0.169 | 0.171 | 0.171 | 0.169 |
| (9) | D2/fT | 0.0371 | 0.0376 | 0.0376 | 0.0371 |
| (11) | |f2|/fT | 0.20209 | 0.22745 | 0.2034 | 0.22745 |
| (12) | D3/fW | 0.172 | 0.172 | 0.172 | 0.172 |
| (13) | D3/fT | 0.0378 | 0.0378 | 0.0378 | 0.0378 |
| (15) | f3/fT | 0.15266 | 0.15562 | 0.15266 | 0.15562 |
| (17) | |f4|/fT | 0.18154 | 0.17283 | 0.18148 | 0.17347 |

TABLE 17

<< Values Corresponding to Conditions >>

| | Condition | Emb. 9 | Emb. 10 |
|---|---|---|---|
| (1) | BFW/Y' | 0.40141 | 0.34290 |
| (2) | fT/fW | 4.55 | 4.55 |
| (3) | T(2–3)/fW | 0.574 | 0.526 |
| (4) | M2/M3 | 0.833 | 0.8380 |
| (5) | f1/fT | 0.55734 | 0.55956 |
| (7) | (R1 − R2)/(R1 + R2) R1:r5,R2:r6 | 1.62345 | 1.67630 |
| (8) | D2/fW | 0.166 | 0.166 |
| (9) | D2/fT | 0.0365 | 0.0365 |
| (11) | |f2|/fT | 0.23119 | 0.23119 |
| (12) | D3/fW | 0.172 | 0.172 |
| (13) | D3/fT | 0.0378 | 0.0378 |
| (15) | f3/fT | 0.15434 | 0.15434 |
| (17) | |f4|/fT | 0.16754 | 0.17014 |

TABLE 18

<< Values Corresponding to Conditions >>

| | Condition | Emb. 11 | Emb. 12 | Emb. 13 | Emb. 14 |
|---|---|---|---|---|---|
| (1) | BFW/Y' | 0.33204 | 0.38636 | 0.33552 | 0.32743 |
| (2) | fT/fW | 4.55 | 4.55 | 4.55 | 4.55 |
| (3) | T(2–3)/fW | — | — | — | 0.537 |
| (3a) | T(3–4)/fW | 0.530 | 0.537 | — | — |
| (3b) | T(2–4)/fW | — | — | 0.5244 | — |
| (4) | M2/M3 | — | — | — | 0.826 |
| (4a) | M3/M4 | 0.861 | 0.82997 | — | — |
| (4b) | M2/M4 | — | 0.82548 | 0.8334 | — |
| (4c) | M2/M5 | — | — | 0.8387 | — |
| (5) | f1/fT | — | 0.55956 | 0.55956 | 0.55956 |
| (5a) | f1,2/fT | 0.5499 | — | — | — |
| (7) | (R1 − R2)/(R1 + R2) R1:r5,R2:r6 | 1.67751 | 1.56808 | 1.62876 | 1.67066 |
| (8) | D2/fW | — | — | 0.166 | 0.171 |
| (8a) | D3/fW | 0.166 | — | — | — |
| (8b) | D2,3/fW | — | 0.16884 | — | — |
| (9) | D2/fT | — | — | 0.0365 | 0.0376 |

TABLE 18-continued

<< Values Corresponding to Conditions >>

| Condition | | Emb. 11 | Emb. 12 | Emb. 13 | Emb. 14 |
|---|---|---|---|---|---|
| (9a) | D3/fT | 0.0365 | — | — | — |
| (9b) | D2,3/fT | — | 0.03596 | — | — |
| (11) | \|f2\|/fT | — | — | 0.23119 | 0.23119 |
| (11a) | \|f3\|/fT | 0.23119 | — | — | — |
| (11b) | \|f2,3\|/fT | — | 0.22432 | — | — |
| (12) | D3/fW | — | — | — | 0.153 |
| (12a) | D4/fW | 0.172 | 0.172 | — | — |
| (12b) | D4,5/fW | — | — | 0.172 | — |
| (13) | D3/fT | — | — | — | 0.0337 |
| (13a) | D4/fT | 0.0378 | 0.0378 | — | — |
| (13b) | D4,5/fT | — | — | 0.0392 | — |
| (15) | f3/fT | — | — | — | 0.15434 |
| (15a) | f4/fT | 0.15434 | 0.15434 | — | — |
| (15b) | f4,5/fT | — | — | 0.15312 | — |
| (17a) | \|f5\|/fT | 0.16718 | 0.17293 | — | — |
| (17b) | \|f6\|/fT | — | — | 0.16724 | — |
| (17c) | \|f4,5\|/fT | — | — | — | 0.17095 |

TABLE 19

<< Zooming Movement Amount (D = ∞) >>

| | Zoom Movement | | Gr1 | Gr2 | Gr3 | Gr4 |
|---|---|---|---|---|---|---|
| Emb. 1 | Each lens unit independent | W | 0.0000 | 0.0000 | 0.0000 | 0.0000 |
| | | M | 31.0000 | 15.0000 | 17.5767 | 30.2266 |
| | | T | 72.0000 | 37.0000 | 44.8109 | 65.7044 |
| Emb. 3 | Gr1–Gr4 linked | W | 0.0000 | 0.0000 | 0.0000 | 0.0000 |
| | | M | 32.0542 | 16.6329 | 18.4329 | 32.0542 |
| | | T | 81.5401 | 54.7646 | 60.2646 | 81.5401 |
| Emb. 4 | Gr1–Gr4 linked | W | 0.0000 | 0.0000 | 0.0000 | 0.0000 |
| | | M | 31.9230 | 16.2663 | 18.0663 | 31.9230 |
| | | T | 81.1557 | 53.9663 | 59.4663 | 81.1557 |

TABLE 20

<< Focusing Movement Amount (D = 5 m) >>

| | | Focus Movement (mm) | |
|---|---|---|---|
| | Focusing Method | Gr1 | Gr2 |
| Emb. 5 | Gr2 focus | — | 1.578 |
| Emb. 6 | Gr1–Gr2 floating focus | 1.503 | 0.835 |
| Emb. 7 | Gr2 floating focus | — | G3 0.334 |
| | | | G4 0.284 |
| Emb. 8 | Gr1–Gr2 floating focus | 1.522 | 0.846 |

What is claimed is:

1. A zoom lens system comprising, from an object side:
a first lens component having a positive refractive power;
a second lens component having a negative refractive power;
a splitter for splitting a light beam having passed through said second lens component;
a third lens component having a positive refractive power; and
a fourth lens component having a negative refractive power;
wherein each of the distances among the first, second, third, and fourth lens components varies during a zooming operation.

2. A zoom lens system as claimed in claim 1, wherein said first component is composed of a first lens unit having a positive refractive power, said second component is composed of a second lens unit having a negative refractive power, said third component is composed of a third lens unit having a positive refractive power, and said fourth component is composed of a fourth lens unit having a negative refractive power, the first lens unit to the fourth lens unit constituting a zoom lens system having a four-unit construction.

3. A zoom lens system as claimed in claim 1, wherein said splitter is a beam splitter having a semi-transparent reflecting surface.

4. A zoom lens system as claimed in claim 3, wherein said splitter is a half-prism.

5. A zoom lens system as claimed in claim 3, wherein said splitter is a pellicle mirror.

6. A zoom lens system as claimed in claim 2, wherein each of said lens units includes at least one lens element having a positive refractive power and at least one lens element having a negative refractive power.

7. A zoom lens system as claimed in claim 1, wherein, during zooming from a wide-angle end to a telephoto end, said splitter is moved together with said third component, with a constant distance kept therebetween.

8. A zoom lens system as claimed in claim 1, wherein, during zooming from a wide-angle end to a telephoto end, said splitter is moved together with said second component, with a constant distance kept therebetween.

9. A zoom lens system as claimed in claim 2, wherein said second lens unit is moved for focusing.

10. A zoom lens system as claimed in claim 9, wherein said first lens unit is also moved during focusing, and a distance between said first lens unit and said second lens unit is varied as focusing is performed.

11. A zoom lens system as claimed in claim 10, wherein said second lens unit is composed of a lens element having a negative refractive power and a lens element having a positive refractive power, and a distance between these lens elements is varied as focusing is performed.

12. A zoom lens system as claimed in claim 1, wherein at least one component disposed on an object side of said splitter and at least one component disposed on an image side of said splitter are linked when those components are moved.

13. A zoom lens system as claimed in claim 1, wherein two or more lens units are disposed on an object side of said splitter.

14. A zoom lens system as claimed in claim 1, wherein two or more lens units are disposed on an image side of said splitter.

15. A zoom lens system as claimed in claim 1, wherein said first component is composed of a first lens unit having a negative refractive power and a second lens unit having a positive refractive power, said second component is composed of a third lens unit having a negative refractive power, said third component is composed of a fourth lens unit having a positive refractive power, and said fourth component is composed of a fifth ends unit having a negative refractive power, the first lens unit to the fifth lens unit constituting a zoom lens system having a five-unit construction.

16. A zoom lens system as claimed in claim 15, wherein, during zooming from a wide-angle end to a telephoto end, a distance between said first lens unit and said second lens unit is varied.

17. A zoom lens system as claimed in claim 1, wherein said first component is composed of a first lens unit having a positive refractive power, said second component is composed of a second lens unit having a negative refractive power and a third lens unit having a positive refractive power, said third component is composed of a fourth lens unit having a positive refractive power, and said fourth component is composed of a fifth lens unit having a negative refractive power, the first lens unit to the fifth lens unit constituting a zoom lens system having a five-unit construction.

18. A zoom lens system as claimed in claim 17, wherein, during zooming from a wide-angle end to a telephoto end, a distance between said second lens unit and said third lens unit is varied.

19. A zoom lens system as claimed in claim 1, wherein said first component is composed of a first lens unit having a positive refractive power, said second component is composed of a second lens unit having a negative refractive power, said third component is composed of a third lens unit having no power, a fourth lens unit having a negative refractive power, and a fifth lens unit having a positive refractive power, and said fourth component is composed of a sixth lens unit having a negative refractive power, the first lens unit to the sixth lens unit constituting a zoom lens system having a six-unit construction.

20. A zoom lens system as claimed in claim 19, wherein, during zooming from a wide-angle end to a telephoto end, a distance between said fourth lens unit and said fifth lens unit is varied.

21. A zoom lens system as claimed in claim 1, wherein said first component is composed of a first lens unit having a positive refractive power, said second component is composed of a second lens unit having a negative refractive power, said third component is composed of a third lens unit having a positive refractive power, and said fourth component is composed of a fourth lens unit having a positive refractive power and a fifth lens unit having a negative refractive power, the first lens unit to the fifth lens unit constituting a zoom lens system having a five-unit construction.

22. A zoom lens system as claimed in claim 21, wherein, during zooming from a wide-angle end to a telephoto end, a distance between said fourth lens unit and said fifth lens unit is varied.

23. A zoom lens system that comprises, from an object side:

a first lens unit having a positive refractive power;

a second lens unit having a negative refractive power;

a third lens unit having a positive refractive power;

a fourth lens unit having a negative refractive power; and a splitter disposed between said second lens unit and said third lens unit for splitting a light beam having passed through said second lens unit, wherein said first and second lens units are moved during focusing and a distance between the first lens unit and the second lens unit varies during focusing.

24. A zoom lens system that comprises, from an object side:

a first lens unit having a positive refractive power;

a second lens unit having a negative refractive power;

a third lens unit having a positive refractive power;

a fourth lens unit having a negative refractive power;

a fifth lens unit having a positive refractive power; and a splitter disposed between said second lens unit and said third lens unit for splitting a light beam having passed through said second lens unit, wherein during zooming from a wide-angle end to a telephoto end, a distance between said fourth lens unit and said fifth lens unit is varied.

* * * * *